US012794697B2

(12) United States Patent
Mullaney et al.

(10) Patent No.: US 12,794,697 B2
(45) **Date of Patent: *Nov. 10, 2026**

(54) SYSTEMS AND METHODS FOR CYBERSECURITY TOKENIZATION

(71) Applicant: AS0001, Inc., Carmel, IN (US)

(72) Inventors: Simon Mullaney, Dublin (IE); Jonathan J. Thompson, Carmel, IN (US)

(73) Assignee: AS0001, Inc., Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/826,145

(22) Filed: Sep. 5, 2024

(65) Prior Publication Data

US 2025/0358116 A1 Nov. 20, 2025

Related U.S. Application Data

(60) Provisional application No. 63/649,296, filed on May 17, 2024.

(51) Int. Cl.
*H04L 9/32* (2006.01)

(52) U.S. Cl.
CPC .......... *H04L 9/3213* (2013.01); *H04L 9/3218* (2013.01)

(58) Field of Classification Search
CPC ....... H04L 9/3213; H04L 9/3218; H04L 9/50; H04L 9/3239
See application file for complete search history.

(56) References Cited

U.S. PATENT DOCUMENTS

| | | | |
|---|---|---|---|
| 10,630,726 | B1 | 4/2020 | Linn et al. |
| 10,979,448 | B2 | 4/2021 | Kras et al. |
| 11,140,193 | B2 | 10/2021 | Patel et al. |

(Continued)

FOREIGN PATENT DOCUMENTS

WO WO-2020/189926 A1 9/2020

OTHER PUBLICATIONS

Dai, J., Yang, J., Wang, Y., & Xu, Y. (2023). Blockchain-enabled cyber-resilience enhancement framework of microgrid distributed secondary control against false data injection attacks. IEEE Transactions on Smart Grid, 15(2), 2226-2236. (Year: 2023).*

(Continued)

*Primary Examiner* — Philip J Chea
*Assistant Examiner* — Dorianne Alvarado David
(74) *Attorney, Agent, or Firm* — Foley & Lardner LLP

(57) ABSTRACT

Systems, methods, and computer-readable media for modeling cyber resilience data using cyber resilience identities and associated metadata are disclosed. A system can include one or more processing circuits configured to receive an access request for a cyber resilience identity from an entity or authorized entity. The access request can include a data structure compatible with a control structure for restricting updates or redemptions of a metadata object corresponding with the cyber resilience identity. The processing circuits can verify, using a control structure, the access data structure. The processing circuits can grant access to the metadata object and a performance event dataset to the entity or authorized entity. The processing circuits can decrypt the metadata object and provide access to the metadata object and the performance event dataset by facilitating retrieval using a secure interface.

20 Claims, 62 Drawing Sheets

(56) References Cited

U.S. PATENT DOCUMENTS

| | | | | |
|---|---|---|---|---|
| 11,750,643 | B1 | 9/2023 | Imrem et al. | |
| 11,757,923 | B1 | 9/2023 | Vandeventer et al. | |
| 11,811,818 | B1 | 11/2023 | Vandeventer et al. | |
| 11,816,223 | B1 | 11/2023 | Vandeventer et al. | |
| 11,824,888 | B1 | 11/2023 | Vandeventer et al. | |
| 11,870,799 | B1 | 1/2024 | Imrem et al. | |
| 11,893,121 | B1 | 2/2024 | Imrem et al. | |
| 11,895,141 | B1 | 2/2024 | Vandeventer et al. | |
| 12,149,557 | B2 | 11/2024 | Fricano et al. | |
| 12,192,364 | B1 * | 1/2025 | Mullaney | H04L 9/3213 |
| 12,229,275 | B2 | 2/2025 | Cross et al. | |
| 12,299,162 | B1 * | 5/2025 | Butler | G06F 21/6218 |
| 12,499,265 | B2 | 12/2025 | Turgeman et al. | |
| 2016/0192166 | A1 | 6/2016 | Decharms | |
| 2017/0374067 | A1 * | 12/2017 | Quintas | H04L 63/20 |
| 2019/0349372 | A1 | 11/2019 | Smith et al. | |
| 2019/0377712 | A1 * | 12/2019 | Miller | H04L 9/50 |
| 2020/0401734 | A1 * | 12/2020 | Murdoch | H04L 9/0825 |
| 2021/0201328 | A1 | 7/2021 | Gunther | |
| 2021/0240498 | A1 | 8/2021 | Padmanabhan et al. | |
| 2021/0390478 | A1 | 12/2021 | Krishnamoorthy et al. | |
| 2022/0006651 | A1 | 1/2022 | Soundararajan et al. | |
| 2022/0109667 | A1 | 4/2022 | Gorog | |
| 2022/0116335 | A1 | 4/2022 | Banjade et al. | |
| 2022/0156249 | A1 * | 5/2022 | Luedtke | G06F 16/2379 |
| 2023/0066272 | A1 | 3/2023 | Patel et al. | |
| 2023/0098246 | A1 | 3/2023 | Simpson | |
| 2023/0186293 | A1 | 6/2023 | Dolev et al. | |
| 2023/0252470 | A1 | 8/2023 | Dhodapkar | |
| 2023/0283521 | A1 | 9/2023 | Berger et al. | |
| 2023/0308474 | A1 * | 9/2023 | Thompson | H04L 63/1416 |
| 2023/0334473 | A1 | 10/2023 | Kara et al. | |
| 2023/0344860 | A1 | 10/2023 | Agranonik et al. | |
| 2023/0379699 | A1 | 11/2023 | Oerton et al. | |
| 2023/0388324 | A1 * | 11/2023 | Thompson | H04L 63/1416 |
| 2024/0091646 | A1 * | 3/2024 | McDonnell | A63F 13/573 |
| 2024/0121259 | A1 | 4/2024 | Imrem et al. | |
| 2024/0129318 | A1 | 4/2024 | Vandeventer et al. | |
| 2024/0184659 | A1 | 6/2024 | Vandeventer et al. | |
| 2024/0223587 | A1 | 7/2024 | Berger et al. | |
| 2024/0256525 | A1 * | 8/2024 | Manamohan | G06F 16/2379 |
| 2025/0028873 | A1 | 1/2025 | Sun et al. | |
| 2025/0080416 | A1 | 3/2025 | Mitrache et al. | |
| 2025/0267146 | A1 * | 8/2025 | Siegel | G06F 21/6245 |
| 2025/0293882 | A1 * | 9/2025 | Gilchrist | G06F 3/0655 |
| 2026/0205814 | A1 | 7/2026 | Ozanian | |
| 2026/0211869 | A1 | 7/2026 | Simpson | |

OTHER PUBLICATIONS

Ahmed et al., "Blockchain-Based Identity Management System and Self-Sovereign Identity Ecosystem: A Comprehensive Survey", IEEE Access, date of publication Oct. 25, 2022, date of current version Nov. 3, 2022.

Ahmed et al., "Blockchain-Based Identity Management System and Self-Sovereign Identity Ecosystem: A Comprehensive Survey," in IEEE Access, vol. 10, pp. 113436-1 13481, (Year: 2022).

Hopkins et al., "Cyber Resilience using State Estimation Updates Based on Cyber Attack Matrix Classification," 2020 IEEE Kansas Power and Energy Conference (KPEC), Manhattan, KS, USA, pp. 1-6 (Year: 2020).

Kim et al., "Resilient End-to-End Message Protection for Cyber-Physical System Communications," in IEEE Transactions on Smart Grid, vol. 9, No. 4, pp. 2478-2487, July (Year: 2018).

Mishra et al., "A factual study on hybrid multi cloud cyber security threats and proposed methodologies to enable cyber resilience," 2024 IEEE International Conference on Electronics, Computing and Communication Technologies (Con Ecct), Bangalore, India, pp. 1-6 (Year: 2024).

Kreutz et al., "Increasing the Resilience and Trustworthiness of OpenID Identity Providers for Future Networks and Services," 2014 Ninth International Conference on Availability, Reliability and Security, Fribourg, Switzerland, 2014, pp. 317-324 (Year: 2014).

* cited by examiner

2200

SYSTEMS AND METHODS FOR CYBERSECURITY TOKENIZATION

CROSS-REFERENCE TO RELATED PATENT APPLICATIONS

This application claims priority under 35 U.S.C. § 119 to U.S. Provisional Patent Application No. 63/649,296, filed May 17, 2024, the contents of which are hereby incorporated herein by reference in its entirety and for all purposes.

BACKGROUND

The present implementations relates generally to computer security architecture and software for information security and cybersecurity. In a computer networked environment, entities such as people or companies have vulnerabilities that can result in security incidents. Some entities may desire to implement protections and some entities may desire to offer protections.

SUMMARY

Some embodiments of the present disclosure relate to a method for modeling cyber resilience data using cyber resilience identities and associated metadata. In some arrangements, the method can include receiving or identifying, by one or more processing circuits, cyber resilience data. In some arrangements, the method can include encrypting, by the one or more processing circuits, a portion of the cyber resilience data. In some arrangements, the method can include generating, by the one or more processing circuits, a metadata object including metadata of cyber resilience data. In some arrangements, the method can include generating, by the one or more processing circuits, a cyber resilience identity including at least a link with the metadata object, a unique identifier (UID), and a performance event dataset. In some arrangements, the method can include encapsulating, by the one or more processing circuits, the cyber resilience identity within a control structure restricting one or more updates and redemptions of the metadata object. In some arrangements, the method can include determining, by the one or more processing circuits, at least one access data structure being compatible with the control structure. In some arrangements, the method can include broadcasting, by the one or more processing circuits using the control structure, the cyber resilience identity to a ledger or distributed ledger.

In some arrangements, the method can further include the control structure including a verification function to restrict the one or more updates and redemptions of the metadata object. In some arrangements, the verification function can be executable by the control structure to validate one or more of the one or more updates and redemptions of the metadata object by verifying one or more cryptographic proofs of authorization of authorized entities prior to updating the cyber resilience identity.

In some arrangements, the method can further include receiving or identifying, by the one or more processing circuits, additional cyber resilience data of an entity corresponding to the cyber resilience identity. In some arrangements, the method can further include receiving, by the one or more processing circuits, at least one cryptographic proof of provenance of the additional cyber resilience data. In some arrangements, the method can further include verifying, by the one or more processing circuits using the verification function of the control structure, the at least one cryptographic proof of provenance. In some arrangements, the method can further include updating, by the one or more processing circuits using the control structure, the cyber resilience identity by updating the metadata object or appending the additional cyber resilience data to the performance event dataset. In some arrangements, the method can further include broadcasting, by the one or more processing circuits using the control structure, the updated cyber resilience identity to the ledger or the distributed ledger.

In some arrangements, the method can further include receiving, by the one or more processing circuits from an entity computing system of an entity corresponding to the cyber resilience identity or from an authorized entity computing system corresponding to an authorized entity of authorized entities, an access request for the cyber resilience identity, where the access request can include the at least one access data structure. In some arrangements, the method can further include verifying, by the one or more processing circuits using the control structure, the at least one access data structure. In some arrangements, the method can further include granting, by the one or more processing circuits, access to the metadata object and the performance event dataset within the cyber resilience identity to an entity or an authorized entity. In some arrangements, the method can further include decrypting, by the one or more processing circuits, the metadata object. In some arrangements, the method can further include providing, by the one or more processing circuits, access to the metadata object and the performance event dataset by facilitating retrieval using a secure interface between the one or more processing circuits and the entity computing system or the authorized entity computing system.

In some arrangements, the method can further include the cyber resilience identity being a data structure encapsulating resilience tokens, where each of the resilience tokens can correspond to a cybersecurity dimension of a posture of an entity corresponding to the cyber resilience identity. In some arrangements, the resilience tokens can include at least one unified token including the cyber resilience data captured over a period of time, at least one evaluation token including the cyber resilience data captured at points in time over the period of time, and at least one roll-up token including data of the at least one unified token and the at least one real-time token corresponding with a security performance of the entity over the period of time.

In some arrangements, the at least one unified token can include a unified safeguard token including data of implemented safeguards and configurations over the period of time, a unified requirements token including data of entity-specific requirements and third-party requirements over the period of time, a unified asset token including data of assets of the entity over the period of time, or a unified attestation token including data of entity attestations over the period of time.

In some arrangements, the at least one real-time token can include evaluation tokens including data of at least one of a posture of the entity, a state of the entity, or a protection of the entity at a point in time over the period of time.

In some arrangements, the method can further include generating, by the one or more processing circuits, the at least one access data structure for at least one of an entity computing system of an entity corresponding to the cyber resilience identity or an authorized entity computing system corresponding to an authorized entity. In some arrangements, the method can further include receiving, by the one or more processing circuits from at least one of the entity computing system or the authorized entity computing system, the at least one access data structure.

In some arrangements, the at least one access data structure can include a token, key, certificate, or access mechanism, where determining the at least one access data structure being compatible with the control structure can include, in response to receiving the at least one access data structure, configuring the at least one access data structure by updating the control structure to enforce restricting the one or more updates and redemptions of the metadata object. In some arrangements, updating the control structure can include updating access parameters of the control structure. In some arrangements, determining the at least one access data structure being compatible with the control structure can include, in response to generating the at least one access data structure, providing, by the one or more processing circuits, the at least one access data structure to the entity computing system or the authorized entity computing system.

In some arrangements, the cyber resilience data can include least one of firmographics data, safeguard data, performance data, policy data, incident data, or claims data. In some arrangements, the control structure can include a smart contract.

Some embodiments of the present disclosure relate to a system for modeling cyber resilience data using cyber resilience identities and associated metadata. In some arrangements, the system can include one or more processing circuits configured to receive or identify cyber resilience data. In some arrangements, the one or more processing circuits can be configured to encrypt a portion of the cyber resilience data. In some arrangements, the one or more processing circuits can be configured to generate a metadata object including metadata of cyber resilience data. In some arrangements, the one or more processing circuits can be configured to generate a cyber resilience identity including at least a link with the metadata object, a unique identifier (UID), and a performance event dataset. In some arrangements, the one or more processing circuits can be configured to encapsulate the cyber resilience identity within a control structure restricting one or more updates and redemptions of the metadata object. In some arrangements, the one or more processing circuits can be configured to determine at least one access data structure being compatible with the control structure. In some arrangements, the one or more processing circuits can be configured to broadcast, using the control structure, the cyber resilience identity to a ledger or distributed ledger.

In some arrangements, the control structure can include a verification function to restrict the one or more updates and redemptions of the metadata object. In some arrangements, the verification function can be executable by the control structure to validate one or more of the one or more updates and redemptions of the metadata object by verifying one or more cryptographic proofs of authorization of authorized entities prior to updating the cyber resilience identity.

In some arrangements, the one or more processing circuits can be further configured to receive or identify additional cyber resilience data of an entity corresponding to the cyber resilience identity. In some arrangements, the one or more processing circuits can be further configured to receive at least one cryptographic proof of provenance of the additional cyber resilience data. In some arrangements, the one or more processing circuits can be further configured to verify, using the verification function of the control structure, the at least one cryptographic proof of provenance. In some arrangements, the one or more processing circuits can be further configured to update, using the control structure, the cyber resilience identity by updating the metadata object or appending the additional cyber resilience data to the performance event dataset. In some arrangements, the one or more processing circuits can be further configured to broadcast, using the control structure, the updated cyber resilience identity to the ledger or the distributed ledger.

In some arrangements, the one or more processing circuits can be further configured to receive, from an entity computing system of an entity corresponding to the cyber resilience identity or from an authorized entity computing system corresponding to an authorized entity, an access request for the cyber resilience identity, where the access request can include the at least one access data structure. In some arrangements, the one or more processing circuits can be further configured to verify, using the control structure, the at least one access data structure. In some arrangements, the one or more processing circuits can be further configured to grant access to the metadata object and the performance event dataset within the cyber resilience identity to an entity or an authorized entity. In some arrangements, the one or more processing circuits can be further configured to decrypt the metadata object. In some arrangements, the one or more processing circuits can be further configured to provide access to the metadata object and the performance event dataset by facilitating retrieval using a secure interface between the one or more processing circuits and the entity computing system or the authorized entity computing system.

In some arrangements, the cyber resilience identity can be a data structure encapsulating resilience tokens, where each of the resilience tokens can correspond to a cybersecurity dimension of a posture of an entity corresponding to the cyber resilience identity. In some arrangements, the resilience tokens can include at least one unified token including the cyber resilience data captured over a period of time, at least one evaluation token including the cyber resilience data captured at points in time over the period of time, and at least one roll-up token including data of the at least one unified token and the at least one real-time token corresponding with a security performance of the entity over the period of time.

In some arrangements, the at least one unified token can include a unified safeguard token including data of implemented safeguards and configurations over the period of time, a unified requirements token including data of entity-specific requirements and third-party requirements over the period of time, a unified asset token including data of assets of the entity over the period of time, or a unified attestation token including data of entity attestations over the period of time.

In some arrangements, the at least one real-time token can include evaluation tokens including data of at least one of a posture of the entity, a state of the entity, or a protection of the entity at a point in time over the period of time.

In some arrangements, the one or more processing circuits can be further configured to generate the at least one access data structure for at least one of an entity computing system of an entity corresponding to the cyber resilience identity or an authorized entity computing system corresponding to an authorized entity. In some arrangements, the one or more processing circuits can be further configured to receive, from at least one of the entity computing system or the authorized entity computing system, the at least one access data structure.

In some arrangements, the at least one access data structure can include a token, key, certificate, or access mechanism, where the one or more processing circuits can be further configured to, in determining the at least one access data structure being compatible with the control structure, in response to receiving the at least one access data structure, configure the at least one access data structure by updating the control structure to enforce restricting the one or more updates and redemptions of the metadata object. In some arrangements, updating the control structure can include updating access parameters of the control structure. In some arrangements, the one or more processing circuits can be further configured to, in response to generating the at least one access data structure, provide the at least one access data structure to the entity computing system or the authorized entity computing system.

In some arrangements, the method can include the cyber resilience data including least one of firmographics data, safeguard data, performance data, policy data, incident data, or claims data. In some arrangements, the method can include the control structure including a smart contract.

Some embodiments of the present disclosure relate to a non-transitory computer-readable medium (CRM) including one or more instructions stored thereon and executable by one or more processors to model cyber resilience data using cyber resilience identifiers and associated metadata. In some arrangements, the instructions can cause the one or more processors to receive or identify cyber resilience data. In some arrangements, the instructions can cause the one or more processors to encrypt a portion of the cyber resilience data. In some arrangements, the instructions can cause the one or more processors to generate a metadata object including metadata of cyber resilience data. In some arrangements, the instructions can cause the one or more processors to generate a cyber resilience identity including at least a link with the metadata object, a unique identifier (UID), and a performance event dataset. In some arrangements, the instructions can cause the one or more processors to encapsulate the cyber resilience identity within a control structure restricting one or more updates and redemptions of the metadata object. In some arrangements, the instructions can cause the one or more processors to determine at least one access data structure being compatible with the control structure. In some arrangements, the instructions can cause the one or more processors to broadcast, using the control structure, the cyber resilience identity to a ledger or distributed ledger.

Some embodiments of the present disclosure relate to a method for controlling access to cyber resilience data using cyber resilience identities and associated metadata. The method can include receiving, by one or more processing circuits from an entity computing system of an entity corresponding to a cyber resilience identity or from an authorized entity computing system corresponding to an authorized entity of a plurality of authorized entities, an access request for the cyber resilience identity. The access request can include at least one access data structure compatible with a control structure for restricting one or more updates and redemptions of a metadata object corresponding with the cyber resilience identity. The method can further include verifying, by the one or more processing circuits using the control structure, the at least one access data structure. The method can further include granting, by the one or more processing circuits, access to the metadata object and a performance event dataset of the cyber resilience identity to the entity or the authorized entity. The method can further include decrypting, by the one or more processing circuits, the metadata object. The method can further include providing, by the one or more processing circuits, the access to the metadata object and the performance event dataset by facilitating retrieval using a secure interface between the one or more processing circuits and the entity computing system or the authorized entity computing system.

In some arrangements, the method can include the metadata object including metadata of cyber resilience data. The method can include the cyber resilience identity including at least a link with the metadata object, a unique identifier (UID), and the performance event dataset. In some arrangements, the method can include at least a portion of the cyber resilience data being encrypted. The method can include the cyber resilience identity being encapsulated in a control structure. The method can include the cyber resilience identity being broadcasted to a ledger or a distributed ledger.

In some arrangements, the method can further include the control structure including a verification function to restrict the one or more updates and redemptions of the metadata object. In some arrangements, the verification function can be executable by the control structure to validate one or more of the one or more updates and redemptions of the metadata object by verifying one or more cryptographic proofs of authorization of authorized entities prior to updating the cyber resilience identity.

In some arrangements, the method can further include receiving or identifying, by the one or more processing circuits, additional cyber resilience data of an entity corresponding to the cyber resilience identity. In some arrangements, the method can further include receiving, by the one or more processing circuits, at least one cryptographic proof of provenance of the additional cyber resilience data. In some arrangements, the method can further include verifying, by the one or more processing circuits using the verification function of the control structure, the at least one cryptographic proof of provenance. In some arrangements, the method can further include updating, by the one or more processing circuits using the control structure, the cyber resilience identity by updating the metadata object or appending the additional cyber resilience data to the performance event dataset. In some arrangements, the method can further include broadcasting, by the one or more processing circuits using the control structure, the updated cyber resilience identity to the ledger or the distributed ledger.

In some arrangements, the method can further include the cyber resilience identity being a data structure encapsulating resilience tokens, where each of the resilience tokens can correspond to a cybersecurity dimension of a posture of an entity corresponding to the cyber resilience identity. In some arrangements, the resilience tokens can include at least one unified token including the cyber resilience data captured over a period of time, at least one evaluation token including the cyber resilience data captured at points in time over the period of time, and at least one roll-up token including data of the at least one unified token and the at least one real-time token corresponding with a security performance of the entity over the period of time.

In some arrangements, the at least one unified token can include a unified safeguard token including data of implemented safeguards and configurations over the period of time, a unified requirements token including data of entity-specific requirements and third-party requirements over the period of time, a unified asset token including data of assets of the entity over the period of time, or a unified attestation token including data of entity attestations over the period of time.

In some arrangements, the at least one real-time token can include evaluation tokens including data of at least one of a posture of the entity, a state of the entity, or a protection of the entity at a point in time over the period of time.

In some arrangements, the method can further include generating, by the one or more processing circuits, the at least one access data structure for at least one of an entity computing system of an entity corresponding to the cyber resilience identity or an authorized entity computing system corresponding to an authorized entity. In some arrangements, the method can further include receiving, by the one or more processing circuits from at least one of the entity computing system or the authorized entity computing system, the at least one access data structure.

In some arrangements, the at least one access data structure can include a token, key, certificate, or access mechanism, where determining the at least one access data structure being compatible with the control structure can include, in response to receiving the at least one access data structure, configuring the at least one access data structure by updating the control structure to enforce restricting the one or more updates and redemptions of the metadata object. In some arrangements, updating the control structure can include updating access parameters of the control structure. In some arrangements, determining the at least one access data structure being compatible with the control structure can include, in response to generating the at least one access data structure, providing, by the one or more processing circuits, the at least one access data structure to the entity computing system or the authorized entity computing system.

In some arrangements, the cyber resilience data can include least one of firmographics data, safeguard data, performance data, policy data, incident data, or claims data. In some arrangements, the control structure can include a smart contract.

Some embodiments of the present disclosure relate to a system for controlling access to cyber resilience data using cyber resilience identities and associated metadata. The system can include one or more processing circuits configured to receive, from an entity computing system of an entity corresponding to a cyber resilience identity or from an authorized entity computing system corresponding to an authorized entity of a plurality of authorized entities, an access request for the cyber resilience identity. In some embodiments, the access request includes at least one access data structure compatible with a control structure for restricting one or more updates and redemptions of a metadata object corresponding with the cyber resilience identity. The one or more processing circuits can be configured to verify, using the control structure, the at least one access data structure. The one or more processing circuits can be configured to grant access to the metadata object and a performance event dataset of the cyber resilience identity to the entity or the authorized entity. The one or more processing circuits can be configured to decrypt the metadata object. The one or more processing circuits can be configured to provide access to the metadata object and the performance event dataset by facilitating retrieval using a secure interface between the one or more processing circuits and the entity computing system or the authorized entity computing system.

In some arrangements, the metadata object can include metadata of cyber resilience data. In some arrangements, the cyber resilience identity can include at least a link with the metadata object, a unique identifier (UID), and the performance event dataset. In some arrangements, at least a portion of the cyber resilience data can be encrypted. In some arrangements, the cyber resilience identity can be encapsulated in the control structure. In some arrangements, the cyber resilience identity can be broadcasted to a ledger or a distributed ledger.

In some arrangements, the control structure can include a verification function to restrict the one or more updates and redemptions of the metadata object. In some arrangements, the verification function can be executable by the control structure to validate one or more of the one or more updates and redemptions of the metadata object by verifying one or more cryptographic proofs of authorization of authorized entities prior to updating the cyber resilience identity.

In some arrangements, the one or more processing circuits can be further configured to receive or identify additional cyber resilience data of an entity corresponding to the cyber resilience identity. In some arrangements, the one or more processing circuits can be further configured to receive at least one cryptographic proof of provenance of the additional cyber resilience data. In some arrangements, the one or more processing circuits can be further configured to verify, using the verification function of the control structure, the at least one cryptographic proof of provenance. In some arrangements, the one or more processing circuits can be further configured to update, using the control structure, the cyber resilience identity by updating the metadata object or appending the additional cyber resilience data to the performance event dataset. In some arrangements, the one or more processing circuits can be further configured to broadcast, using the control structure, the updated cyber resilience identity to the ledger or the distributed ledger.

In some arrangements, the cyber resilience identity can be a data structure encapsulating resilience tokens, where each of the resilience tokens can correspond to a cybersecurity dimension of a posture of an entity corresponding to the cyber resilience identity. In some arrangements, the resilience tokens can include at least one unified token including the cyber resilience data captured over a period of time, at least one evaluation token including the cyber resilience data captured at points in time over the period of time, and at least one roll-up token including data of the at least one unified token and the at least one real-time token corresponding with a security performance of the entity over the period of time.

In some arrangements, the at least one unified token can include a unified safeguard token including data of implemented safeguards and configurations over the period of time, a unified requirements token including data of entity-specific requirements and third-party requirements over the period of time, a unified asset token including data of assets of the entity over the period of time, or a unified attestation token including data of entity attestations over the period of time.

In some arrangements, the at least one real-time token can include evaluation tokens including data of at least one of a posture of the entity, a state of the entity, or a protection of the entity at a point in time over the period of time.

In some arrangements, the one or more processing circuits can be further configured to generate the at least one access data structure for at least one of an entity computing system of an entity corresponding to the cyber resilience identity or an authorized entity computing system corresponding to an authorized entity. In some arrangements, the one or more processing circuits can be further configured to receive, from at least one of the entity computing system or the authorized entity computing system, the at least one access data structure.

In some arrangements, the at least one access data structure can include a token, key, certificate, or access mechanism, where the one or more processing circuits can be further configured to, in determining the at least one access data structure being compatible with the control structure, in response to receiving the at least one access data structure, configure the at least one access data structure by updating the control structure to enforce restricting the one or more updates and redemptions of the metadata object. In some arrangements, updating the control structure can include updating access parameters of the control structure. In some arrangements, the one or more processing circuits can be further configured to, in response to generating the at least one access data structure, provide the at least one access data structure to the entity computing system or the authorized entity computing system.

Some embodiments of the present disclosure relate to a non-transitory computer-readable medium (CRM) comprising one or more instructions stored thereon and executable by one or more processors to receive, from an entity computing system of an entity corresponding to a cyber resilience identity or from an authorized entity computing system corresponding to an authorized entity of a plurality of authorized entities, an access request for the cyber resilience identity. In some embodiments, the access request can include at least one access data structure compatible with a control structure for restricting one or more updates and redemptions of a metadata object corresponding with the cyber resilience identity. The instructions can be further executable to verify, using the control structure, the at least one access data structure. The instructions can be further executable to grant access to the metadata object and a performance event dataset of the cyber resilience identity to the entity or the authorized entity. The instructions can be further executable to decrypt the metadata object. The instructions can be further executable to provide access to the metadata object and the performance event dataset by facilitating retrieval using a secure interface between the one or more processors and the entity computing system or the authorized entity computing system.

Figure 1:
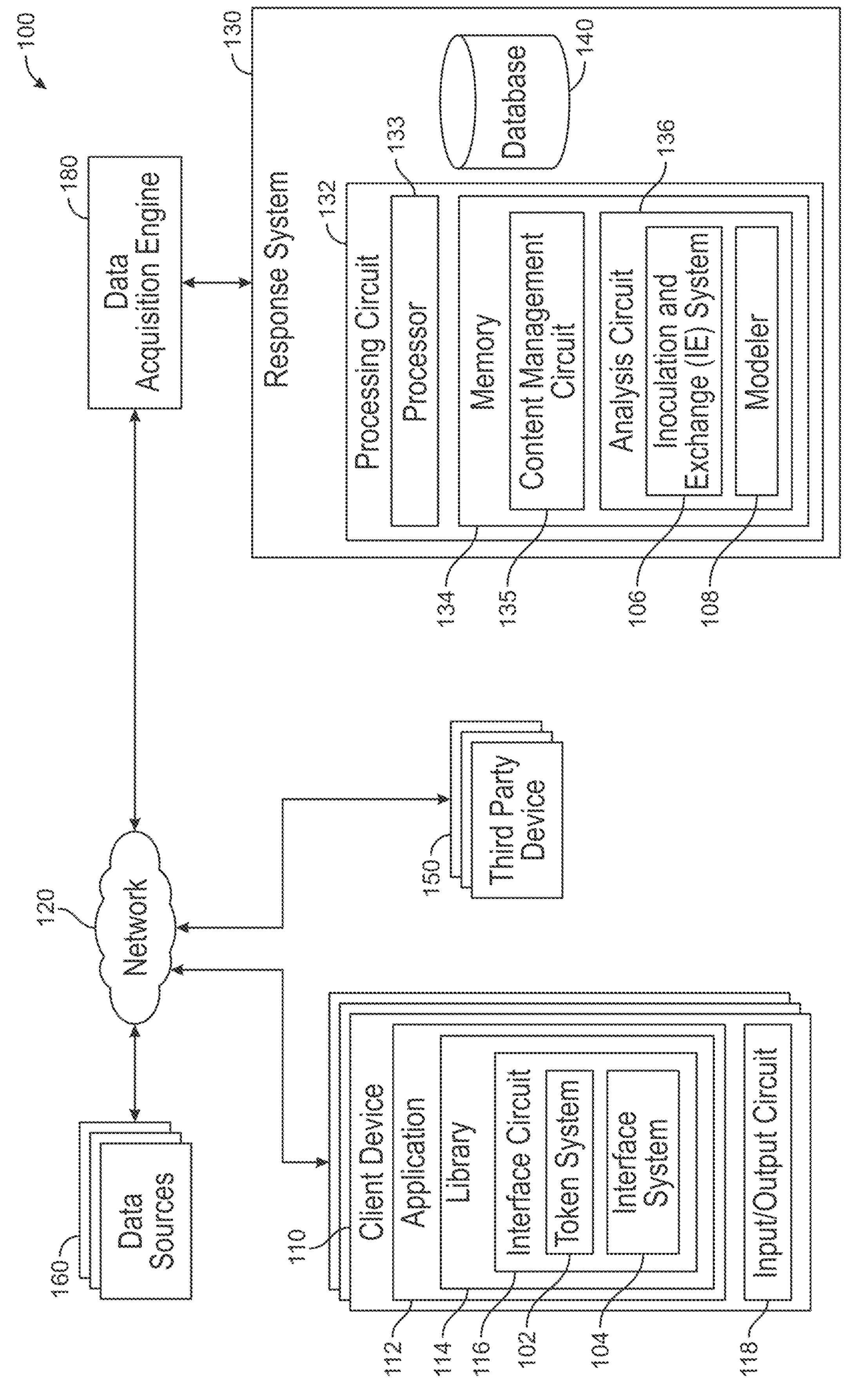
FIG. 1 depicts a block diagram of an implementation of a security architecture for synchronizing and protecting data, according to some arrangements.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the FIGURES, systems and methods relate generally to implementing a cybersecurity framework. In some arrangements, the system represents an embodiment of a security architecture that employs modeling to distribute verified intelligence, and employs the generating of various data packages for proof of controls and configurations. In some arrangements, the system represents an embodiment of a security architecture that models cyber resilience data using cyber resilience identities and associated metadata.

Existing cybersecurity systems and architectures exhibit multiple technical limitations, reducing effectiveness in managing and responding to cyber threats. One technical limitation involves the absence of integrated incident response capabilities. Numerous systems operate in isolation, utilizing separate tools for threat detection, response, and recovery, leading to delays in response times, communication challenges between components, and fragmented visibility into the overall security posture. Another limitation includes the absence of streamlined processes for engaging third-party vendors for incident response services, often including navigation through complex procurement protocols during a cyber incident, which delays mitigation efforts. Systems frequently implement incomplete assessment mechanisms for readiness in incident response, resulting in unclear visibility into system capabilities and constraints, complicating communication with potential response providers. Static defenses, often employed by current systems, fail to adjust to emerging threats. These static defenses introduce vulnerabilities, as attackers continuously evolve their strategies and methods. Systems fail to account for changes in infrastructure and operations, such as the integration of new technologies or modifications in business processes, introducing new potential attack vectors. The reliance on static defenses limits the system from maintaining a robust security posture, increasing exposure to an evolving threat landscape.

The implementations described herein provide technical solutions for preventing cyber threats, including unauthorized access, data breaches, and cyberattacks, by generating a customized cybersecurity framework tailored to technical requirements. The framework and implementations can be used to identify current cybersecurity vulnerabilities and facilitate connections with vendors offering targeted protection plans. Thereby, the systems can provide enhanced data protections including safeguarding sensitive information such as medical records, financial data, and proprietary business information. The framework and implementations can also reduce economic and infrastructure burdens associated with data breaches, including expenses related to infrastructure failures, forensic investigations, and legal actions. The cybersecurity models described herein can detect and address vulnerabilities while providing dynamic monitoring of relationships between networks, hardware, devices, and financial entities. The implementations can also improve cybersecurity by enhancing network, infrastructure, technology, and data security. Vendors can use the systems and methods described herein to actively monitor and provide responses to potential threats, improving the overall security posture. The customized cybersecurity frameworks address existing vulnerabilities and anticipate future threats, offering an adaptive and proactive solution to cybersecurity.

Implementation of customized cybersecurity frameworks facilitate technical systems to identify existing vulnerabilities, map vulnerabilities to assets, and provide targeted protection strategies. The technical benefit includes generating remediation recommendations and preventing successful hacking activities, cyberattacks, data breaches, and other cyber incidents. Systems and methods disclosed herein facilitate connections of systems to suitable vendors and other entities, offering security plans customized to vulnerabilities and technical needs identified. Implementations of customized cybersecurity frameworks can improve the process of identifying and addressing vulnerabilities by streamlining resources, allowing continuous monitoring of the system's cybersecurity status by vendors, providing dynamic responses to potential threats, and maintaining the integrity and security of system infrastructure. Customized frameworks provide technical capabilities to facilitate determinations about cybersecurity strategies by selecting from a range of vendor plans and services, activating plans dynamically, and ensuring cybersecurity is actively monitored and managed.

A technical improvement in dynamic cybersecurity architecture comprehension is provided by identifying and mapping cybersecurity vulnerabilities within customized cybersecurity frameworks. The need to maintain separate inventories of network weaknesses, infrastructure vulnerabilities, and operating system susceptibilities can be reduced or eliminated. The implementations of the customized cybersecurity framework can include identifying potential security gaps associated with system identifiers, such as domain identifiers, IP addresses, or subnets. Rather than assessing each subclass of vulnerabilities separately, a computing system utilizes a unified view into the computing environment of the target system and centrally manages the identification of different types of vulnerabilities and associated potential security threats. Vulnerability identification operations can include computer-executed processes to model one or more cybersecurity statuses, determine vulnerabilities based on statuses, and integrate or connect systems to suitable vendors offering appropriate cybersecurity plans.

Additionally, the cybersecurity framework enhances data management and sharing through tokenization of cybersecurity information. Tokenization can encrypt cybersecurity posture and insurance information for secure access and storage, with access controlled by smart contracts. Tokenization can be used to prevent unauthorized access and improves data integrity, enhancing data sharing and trust among stakeholders. Additionally, Distributed Non-Fungible Tokens (DNFTs) can provide transparency in tracking and verifying cybersecurity management events and insurance-related activities. Transparency in these processes can improve the accuracy of cyber risk assessments and reduces the likelihood of fraud, as multiple parties can verify the authenticity of performance history events through mechanisms such as multi-signature wallets or signature verification within smart contracts. Tokenization of cybersecurity information, using NFTs or DNFTs, provides real-time visibility into a client's cyber risk posture. For example, dynamic visibility can facilitate monitoring of compliance and adjustments to policies based on the client's current risk status. That is, access to up-to-date information facilitates insurers to provide accurate and fair policy pricing, aligning incentives between insurers, brokers, and policyholders. Real-time monitoring capabilities can also provide responsive updates to potential threats and improve the overall security posture of an entity or organization.

Token integration within cybersecurity frameworks provides a unified and view of system cybersecurity status. By consolidating information from various security systems into a single platform, the implementations can conduct cyber threat and risk assessments with greater accuracy and efficiency by accessing data mapped to tokens. That is, the implementations facilitate communication and collaboration between systems, vendors, and carriers to identify cyber risks collectively. Data location mapping, connection of security stacks, and provision of targeted protection strategies can improve alignment of incentives between various cyber resilience entities. Tokenization further improves cyber resilience systems through improved protection and fair policy pricing, and provides insurers, vendors, and brokers with access to cyber protection data. Decentralized ledger implementation, such as Blockchain, can be used to improve the security and integrity of the data exchange process. Decentralized ledgers provide transactions and data entries that are immutable and verifiable, providing a secure and transparent audit trail for cybersecurity activities. Blockchain architecture provides a distributed consensus mechanism that validates transactions without using a central authority, reducing the risk of data tampering and unauthorized access. The decentralized nature of Blockchain improves interoperability between different security platforms and facilitates communication among various cybersecurity tools and stakeholders. Resilient infrastructure configured to withstand cyberattacks facilitates secure and efficient data sharing and management. Tokens on a decentralized ledger improve reliability in cyber risk assessments and improve stakeholder access to implemented security measures and other cyber resilience data.

Systems and Methods for Synchronizing and Protecting Data

Referring to FIG. 1, a block diagram of an implementation of a security architecture for synchronizing and protecting data is shown, according to some implementations. The implementation shown in FIG. 1 includes a client device 110 (also referred to herein as a "user computing system 110"), response system 130, third-party device 150, data sources 160, blockchain 170, and data acquisition engine 180 for modeling proof-of-controls (e.g., cybersecurity policies, procedures, technologies, practices, etc. used by an entity). These components can be interconnected through a network 120 that supports secure communications profiles (e.g., TLS, SSL, HTTPS, etc.).

In some arrangements, the client device 110 can include an application 112 and an input/output circuit 118. The application 112 can include a library 114, and the library 114 can include an interface circuit 116. The interface circuit 116 can further include a token system 102 and an interface system 104. In some arrangements, the response system 130 can include a processing circuit 132 and a database 140. The processing circuit 132 can include a processor 133 and memory 134. The memory 134 can further include a content management circuit 135 and an analysis circuit 136, and the analysis circuit 136 can include an inoculation and exchange (IE) system 106 and a modeler 108, as further described herein.

In some arrangements, one or more elements of FIG. 1 can be communicably coupled (connected) to a distributed ledger (e.g., blockchain 170) or other authoritative data source to provide data integrity and security. For example, the database 140 can be a private ledger and data source 160 can be a public ledger, and data transactions (e.g., updates to proof/posture state data, cybersecurity parameters, entity data, etc.) recorded on the database 140 can be validated against entries recorded on the data source 160 to verify that updates to entries are accurately reflected and can be audited against an immutable record (e.g., results can be traceable and linkable). In some arrangements, the application 112 can be configured to integrate with technology and databases (e.g., database 140, response system 130, etc.) to access information used synchronizing or protecting data. The user can access the application 112 through a variety of devices, including client device 110. The application 112 is described in greater detail below and with reference to FIGS. 2A-2B.

In some arrangements, the response system 130 is operably connected to data acquisition engine 180 and includes analysis circuit 136 to democratize posture threats, incidents, and claim data (e.g., cyber security data, protection data, protection control schemas, historical protection data, etc.) to synchronize and protect the data. The analysis circuit 136 can use the democratized data in underwriting, claims, the resilience process, and more (e.g., in embedding data in a protection application). Using the data acquisition engine 180, the response system 130 can collect and process data (e.g., unstructured data) from various sources, such as client device 110, third-party devices 150 and data sources 160 to model proof-of-controls.

In some arrangements, the client device 110 (or entity computing system) can provide a proof token corresponding with a protective entity (e.g., cybersecurity company, etc.) via the network 120, and the proof token may be received or identified by other components shown in FIG. 1 (e.g., response system 130). In some arrangements, the proof token may be generated by the token system 102 and/or communicated to other elements of FIG. 1 (e.g., response system 130) by the token system 102. For example, the response system 130 can identify or receive a proof token corresponding with a prospective entity (e.g., an organization using or desiring cybersecurity protection) from client device 110, and the proof token received or identified by the response system 130 can include an encoded proof and an encoded posture state based on cybersecurity safeguards and firmographic data. For example, the encoded proof of the proof token can be generated by and transmitted from the token system 102 and can include a digitally encoded verification in a secure format (e.g., digital signature generated using a private key of the client device 110 and verified using a public key of the client device 110). For example, the encoded posture state can include entity data and/or other cybersecurity data (e.g., encryption standards, data collection policy, other cyber security safeguards, entity size, entity industry, other firmographic data, etc.) and be encoded by the token system 102 using public/private key pairs, as described above.

In some arrangements, the modeler 108 of analysis circuit 136 can generate the proof token corresponding with the prospective entity based on encoding a proof and encoding a posture state based on the cybersecurity safeguards and the firmographic data. That is, the process includes correlating the cybersecurity measures and business characteristics into a unified token that signifies an entity's security posture and risk profile. For example, the modeler 108 could incorporate data reflecting the entity's adherence to cybersecurity frameworks like NIST or its deployment of technologies such as firewalls or intrusion detection systems. In another example, the modeler 108 could incorporate data of the entity's operational practices, such as employee cybersecurity training programs or incident response protocols. Additionally, while the client device 110 or the modeler 108 can generate the proof token, the modeler 108 can further model the proof-of-controls using the proof token.

Generally, encoding the proof can include the embedded of verification evidence into a secure, digital format that can be both tamper-evident and verifiable. For example, encoding proof can includes the application of cryptographic algorithms to create a digital signature using a private key, which can then be verified with the corresponding public key. Encoding the posture state can include generating a digital representation of an entity's cybersecurity posture, including its adherence to security policies, deployment of security measures, and compliance with regulatory standards. For example, encoding the posture state can include the use of public/private key pairs to encrypt the data. The encoded posture state can provide a snapshot of the entity's security status, encapsulating data on encryption standards, cybersecurity safeguards, and other relevant firmographic information.

In some arrangements, the proof token received via the token system 102 can be modeled (or analyzed) by the response system 130 (e.g., modeler 108) in modeling proof-of-controls. In some arrangements, the modeler 108 can model the proof token with a set of protection parameters (e.g., encryption standards such as AES-76 for secure data storage, incident response plans, regulatory requirements, etc.) defined by a third-party (sometimes referred to herein as a protection entity, e.g., vendor, insurer, certification authorities (Cas), technology partners, audit and compliance firms, cybersecurity framework organizations) to generate a protection eligibility. For example, the modeler 108 can analyze the proof token with a set of protection parameters defined by a protection entity to generate a cybersecurity protection eligibility. In another example, the protection eligibility may be generated by the modeler 108 based on the alignment of an entity's cybersecurity measures with cybersecurity standards (e.g., AES-256, ISO/IEC 27001).

In some arrangements, the modeler 108 can model the proof token by matching the proof token to the set of protection parameters based on comparing the encoded proof and the encoded posture state to the set of protection parameters of a protection provider to generate protection eligibility. For example, the modeler 108 can compare data of the encoded proof and/or encoded posture state (e.g., an entity's encryption standards) to cybersecurity requirements of a cybersecurity protection product. In some arrangements, the proof token modeled by the modeler 108 can correspond to a secured authenticated bundle of entity information identifying the prospective entity's protection posture. For example, the information identifying the prospective entity's protection posture can include legal data (e.g., regulatory impact, privacy impact, etc.), firmographic data (e.g., industry, revenue, etc.), and cybersecurity data (e.g., safeguards, root cause, etc.) of the entity. In some arrangements, the set of protection parameters used by the modeler 108 can correspond to at least one of a verifiable configuration (e.g., network firewall configurations benchmarked against industry best practices), a revenue range (e.g., enterprises with annual revenues exceeding $100 million), one or more cyber security implementations (e.g., MDR, endpoint detection and response systems, etc.), and/or one or more compliance attestations (e.g., ISO 27001 certification for information security management).

In some arrangements, a posture state within the proof token can be a data package encapsulating an entity's cybersecurity disposition. This includes a mapping of compliances (e.g., regulatory and privacy impacts) and firmographic insights (e.g., industry classification and revenue metrics). Furthermore, the cybersecurity dimension of the posture state can include a spectrum of protective measures and their rationale. For example, the encoded posture state may integrate data reflecting the entity's encryption protocols, thereby offering a "snapshot" of its technical safeguards. This data can be used by a vendor, provider, CAs, cybersecurity framework organization, or insurer to assess the entity's alignment with cybersecurity benchmarks and standards, such as ISO 27001 certification. In some arrangements, the proof, embedded within the proof token, provide verifiable elements that support the assertions made in the posture state. It provides a verifiable account of the entity's cybersecurity measures, such as the implementation of advanced threat detection systems like MDR and endpoint detection and response solutions.

Furthermore, the encoded proof and posture state of the proof token can be subject to modeling having a set of protection parameters. This set may include criteria like network firewall configurations benchmarked against industry best practices, revenue thresholds that categorize enterprises based on financial size, the presence of cybersecurity implementations or compliance attestations, and so on. In some arrangements, the comparative analysis can facilitate the modeling of the proof token, facilitating the identification of a secured, authenticated bundle of information that accurately reflects the prospective entity's protection posture.

In some arrangements, the proof token can be recorded and validated in a distributed ledger or another data source (e.g., blockchain 170, for example, using database 140 and/or data source 160) corresponding to an immutable recorded of the encoded proof and the encoded posture state. For example, the token system 102 or modeler 108 can create a digital token representing cybersecurity/entity proof data (e.g., by generating a unique cryptographic token including an encoded proof and encoded posture state based on cybersecurity safeguards and firmographic data), which can be stored on a distributed ledger (e.g., by token system 102, response system 130, etc.) and can communicate data related to the digital token to the application 112 for display to the user (e.g., to verify data integrity, to show modifications to data, etc.). In some arrangements, the database 140 can be a private ledger and data source 160 can be a public ledger. Further, the proof token received or identified from the token system 102 can be recorded in the database 140 (e.g., maintaining and storing blockchain 170) and can be validated against entries recorded on the data source 160 to verify that proofs and states are reflected and can be audited against an immutable record. For example, an entry on the database 140 can include the encoded proof and/or encoded posture state generated by the token system 102. The proof token is described in greater detail below with regard to FIG. 5.

In some arrangements, the response system 130 (e.g., modeler 108) can generate a protection product (e.g., cybersecurity product, compliance certification, security audit, insurance product, vendor product) for protection of the prospective entity's computing and networking infrastructure. For example, the protection product can be a cybersecurity protection offering or plan, vendor protection offering or plan, or insurance product or plan for an entity. In another example, the modeler 108 can generate a product for protection of a prospective entity's computing and networking infrastructure (e.g., client device 110) based on the generated protection eligibility and protection entity-provided rates In some arrangements, after modeling the proof token with a set of protection parameters, the modeler 108 can generate the protection product based on the generated protection eligibility and dynamic value parameters. For example, the generated protection eligibility can be an eligibility of a prospective entity for a protection plan based on cybersecurity requirements of the protection plan (e.g., encryption standards, managed detection and response (MDR) system requirements, etc.). Additionally, the dynamic value parameters may include rates tied to the effectiveness of current cybersecurity measures, such as encryption strength, endpoint security coverage, and MDR system efficiency. In some arrangements, the protection product generated based on the generated protection eligibility and dynamic value parameters can be provided to the entity computing system (e.g., client device 110).

In some arrangements, modeling proof-of-controls can further include determining a recency or quality of the prospective entity's cybersecurity based on the encoded proof and the encoded posture state. For example, the IE system 106 can determine a recency (e.g., 30 days or less) or quality (e.g., configured to receive certain data types, matching fields, etc.) of the prospective entity's cyber security based on data collected from an external data source (e.g., distributed ledger, database 140/data source 160, third party device 150, etc.). In some arrangements, modeling proof-of-controls can further include automatically disqualifying the prospective entity based on a set of threshold parameters of the third party. For example, automatically disqualifying the prospective entity based on threshold parameters can include comparing the recency and quality metrics of the entity's cybersecurity data against the third-party's minimum standards, and disqualifying entities whose cybersecurity measures are outdated or below an established benchmark. In another example, disqualification may occur if an entity's cybersecurity profile does not include mandatory data fields used by the third-party's risk assessment protocol.

In some arrangements, modeling proof-of-controls can further include determining dynamic value parameters for the protection product based on third-party-provided rates, and the dynamic value parameters can be based on the encoded proof and encoded posture state data within the proof token. For example, the dynamic value parameters may be adjusted in real-time, reflecting the current security posture as indicated by the latest encoded proof and posture state data. In some arrangements, modeling proof-of-controls can further include receiving an acceptance of the protection product included an exchange instrument satisfying the dynamic value parameters for processing the acceptance and activating the protection product. For example, the dynamic value parameters may be adjusted according to a protection (or risk) score derived from the encoded proof and posture state data, where higher scores indicating better security measures result in more favorable protection rates from the third-party. In some arrangements, receiving acceptance of the protection product may include verifying that the payment or exchange instrument aligns with the calculated risk-based pricing before finalizing the transaction. In another example, the acceptance process could include a smart contract on a blockchain that automatically executes when the dynamic value parameters are met and modeled by the encoded data.

In some arrangements, modeling proof-of-controls can further include providing an exchange record of the acceptance to the prospective entity. For example, the IE system 106 may generate and transmit a secure digital confirmation to the entity, including the acceptance of the protection product. In some arrangements, modeling proof-of-controls can further include recording the exchange record, a proof of exchange, and the protection product in a distributed ledger. For example, the transaction data (e.g., the digital confirmation number, timestamp, and cryptographic hashes representing the protection product and terms) can be encrypted and recorded as a new block in blockchain 170, using smart contracts to automate the verification and verify the integrity and non-repudiation of the acceptance and terms agreed upon.

In some arrangements, modeling proof-of-controls can further include activating the protection product and, in response to activating the protection product, identifying a new cybersecurity incident. For example, upon activation, the protection product's monitoring systems may automatically scan the entity's network for anomalies, identifying a new cybersecurity incident by comparing network traffic against known threat patterns. For example, the new cybersecurity incident can correspond with the prospective entity of a plurality of entities. For example, the new cybersecurity incident can correspond with incident data captured by at least the entity computing system (e.g., client device 110). In some arrangements, modeling proof-of-controls can further include normalizing the incident data and providing the normalized incident data to a plurality of third-party computer systems (e.g., third-party device 150). For example, the IE system 106 can normalize the incident data by applying a standardized formatting and classification scheme. For example, the IE system 106 can provide the normalized incident data to other computing elements of FIG. 1 (e.g., third party device 150).

Additionally, providing the normalized incident data can be provided to third party devices 150 for herd inoculation of a plurality of computing systems against the new cybersecurity incident and one or more identified threats of the new cybersecurity incident. For example, the plurality of third-party (also referred to herein as "third party") computing systems can include at least one of a protectors computing system, a vendor computing system, or the cybersecurity computing system. In some arrangements, herd inoculation can include disseminating updates to threat intelligence databases and deploying security patches or configuration changes aimed at mitigating the risk posed by the identified threats across the network of participating computing systems. For example, this process may include the automatic distribution of signatures for newly discovered malware or instructions for reconfiguring firewalls and intrusion detection systems to recognize and block the emerging threat vectors. Additionally, the various third-party computing systems can integrate this shared threat intelligence into their security operations centers (SOCs) and incident response protocols, facilitating an improved response to emerging threats, effectively raising the collective security posture of the networked entities.

In some arrangements, the IE system 106 can group the incident data to generate grouped incident data based on one or more metrics or threat vector of the new cybersecurity incident. For example, the IE system 106 may group incidents by their similarity in attack patterns, such as phishing attempts, malware distribution methods, or exploitation of vulnerabilities. In another example, the IE system 106 could classify incidents based on their impact severity, targeted industry sectors, or the geographical location of the affected systems. That is, the grouping process allows a more structured analysis and response by highlighting commonalities among incidents, facilitating the identification of widespread campaigns or targeted attacks, and aiding in the prioritization of response efforts based on the potential impact or threat vectors identified.

In some arrangements, the incident data can be identified, normalized, and/or grouped based on the prospective entity enrolling in a cyber incident sharing plan. For example, the enrollment process includes configuring the entity's systems to automatically detect and report cybersecurity incidents through a API (e.g., secure API using a data channel) to the response system 130 (e.g., a centralized monitoring platform). In some arrangements, the entity computing system (e.g., client device 110), after enrolling in the cyber incident sharing plan, can share the incident data when new cybersecurity incidents occur. For example, this data sharing provides real-time alerts and collaborative threat intelligence sharing among enrolled entities.

In some arrangements, the incident data can be further identified, normalized, and/or grouped based on at least one of the plurality of third party computing systems (e.g., third-party devices 150) enrolling in the cyber incident sharing plan. For example, third-party systems may contribute to a collective threat intelligence pool by sharing anonymous incident data, which can be analyzed for emerging threat patterns. In some arrangements, at least one of the plurality of third-party computing systems, after enrolling in the cyber incident sharing plan, can share (e.g., automatically, upon request, or periodically) data when a new cybersecurity incidents occur.

In some arrangements, modeling proof-of-controls can further include modeling the normalized incident data using a cyber threat intelligence (CTI) attribute model. For example, the modeler 108 can model the normalized incident data and/or grouped incident data (e.g., indicators of compromise, attack patterns, vulnerabilities) using a machine learning-based model or agnostic framework. In some arrangements, modeling the normalized incident data using the CTI attribution model can further include determining a first valuative portion of the incident data provided by the entity computing system. For example, this process includes attributing a value to the incident data shared by the entities as a form of compensation or incentive for their contribution (e.g., per use compensation, per time period compensation, per X number of uses compensation). In some arrangements, modeling the normalized incident data can further include determining the first valuative portion of the incident data provided by the entity computing system based on a first quantitative proportional impact (e.g., attribution) of the incident data's contribution in an acquisition or use by another computing system. For example, the first valuative portion could be calculated based on the number of times the incident data is accessed or used by a vendor, with compensation increasing incrementally with each access or application within their security solutions. In another example, this attribution could be quantified in terms of the enhancement of detection rates or the expansion of the model's threat intelligence database. In some arrangements, modeling the normalized incident data can further include determining a second valuative portion of the incident data provided by at least one of the plurality of third-party computing systems. For example, this evaluation could assess the strategic value of third-party data in an acquisition or use by another computing system. In some arrangements, the second valuative portion of the incident data may be determined based on a second quantitative proportional impact of the incident data's contribution in an acquisition or use by another computing system. For example, the second valuative portion of the incident data may be determined by the volume of uses or the application context in which the third-party computing system employs the data, such as for developing new security products or enhancing existing ones. In another example, this might reflect the role of third-party data in improving the model's predictive accuracy or broadening its analytical scope.

In some arrangements, a CTI attribution model can implement a compensation mechanism for data providers (e.g., entities, third-parties). Furthermore, the CTI attribution model can be, but is not limited to, a framework that dynamically adjusts compensation based on the qualitative and quantitative value of data contributions and/or per use or acquisition by a vendor. In another example, the CTI attribution model executed by the IE system 106 could allocate credits or monetary rewards to entities based on the assessed impact of their shared data on the model's performance. In yet another example, the CTI attribution model can deploy smart contracts on blockchain platforms to automate the compensation process. In some arrangements, the CTI attribution model's performance metrics can be, but is not limited to, the efficiency of data utilization, improvement in threat identification, and reduction in false positives. For example, the effectiveness of the compensation mechanism can be evaluated by the growth in the volume and quality of data shared by participating entities.

The analysis by the CTI attribution model of each entity's data contribution can be quantified using algorithms and statistical models. The quantification can include parsing through normalized and enriched incident data to evaluate its direct impact on the acquisition or use by a vendor (e.g., cyber security vendor). For example, if an entity submits incident data containing indicators of compromise (IoC) that is used by a vendor that leads to the identification of a new malware variant, the contribution is evaluated based on several parameters. These might include the uniqueness of the IoC, measured by comparing them against a database of known IoC, and the relevance to current threat landscapes, with a higher weight given to IoC related to active campaigns. As an example, a submitted IoC may increase the cybersecurity vendor's threat detection rate by 5%, an uplift considering the baseline accuracy might be 90%. This improvement is then translated into an attribution score, with the model assigning a value, for example, 100 points for every 1% improvement in detection rate, resulting in a 500-point increase for the contributing entity. Additionally, if the data also leads to a 3% reduction in false positives by a cybersecurity vendor, from a baseline rate of 10% down to 7%, and given the model values each percentage point reduction at 200 points, this could add another 600 points to the entity's attribution score. Consequently, the entity's total contribution would be quantified at 1100 points. These points could then be converted into compensation values, such as monetary rewards, service credits, or access to premium intelligence feeds or products (e.g., offered by the response system 130 for acquisitions or uses by vendors), based on a predefined conversion scale established by the CTI platform.

In some arrangements, modeling proof-of-controls and normalized incident can further include performing a first exchange for the first valuative portion. For example, the IE system 106 can perform the first exchange by distributing credits or compensation to the entity computing system based on the first quantitative proportional impact of the entity computing system's contributed incident data. For example, this could include assigning credit values to different tiers of impact, such as 100 credits for viewing and up to 500 credits for downloading that lead to the identification of new threats. In some arrangements, modeling proof-of-controls and normalized incident data can further include performing a second exchange for the second valuative portion. For example, the IE system 106 can perform the second exchange by distributing credits or compensation to the entity computing system based on the second quantitative proportional impact of the entity computing system's contributed incident data, as described above regarding the first exchange. For example, this could include additional rewards for data that fills in gaps in the vendor's knowledge, quantified by the rarity and usefulness of the information provided.

In some arrangements, modeling proof-of-controls and normalized incident can further include calculating a protection savings of the third-party issuing the protection product. For example, the IE system 106 can calculate a protection savings (e.g., reduced premium rates for cybersecurity product) of a cybersecurity protection entity administering the protection product by evaluating the overall impact of shared incident data on risk mitigation. In some arrangements, calculating the protection savings can include determining an avoidance amount based on the identification of the new cybersecurity incident corresponding with another cybersecurity incident from affecting a plurality of protected entities of the third party. For example, an avoidance amount can be a monetary cost that would have resulted from a breach but was prevented by proactive measures informed by shared incident data, quantified as the sum saved from potential claims. For example, this calculation might compare the cost of potential breaches, averaging $200,000 per incident, against the operational cost of implementing new security measures, leading to a net savings of $50,000 when factoring in the reduced risk of breach occurrences. In some arrangements, the avoidance amount can be determined based at least on a comparison of potential claim expenses against a new cybersecurity expense and generating a new savings as a result of the incident data provided to the plurality of third-party computing systems. For example, this includes a financial analysis projecting long-term savings from enhanced security measures versus immediate cybersecurity investments. In some arrangements, modeling proof-of-controls and normalized incident can further include providing an exchange request for the protection savings for the third party. For example, submitting a report and request for reduced premiums based on demonstrated risk mitigation through effective use of shared incident data.

In some arrangements, modeling proof-of-controls can further include determining an update or patch derived from the incident data. For example, analyzing the shared incident data to generate a software patch that addresses a vulnerability exploited in a recent cyber-attack. In some arrangements, the update or patch can correspond to remediating a vulnerability or exploit identified in the incident data. For example, deploying a security patch that closes an SQL injection vulnerability discovered through analysis of incident data. In some arrangements, modeling proof-of-controls further includes distributing the update or patch to a plurality of entity computing systems. For example, automatically pushing the update to some or all affected systems within the network to provide rapid mitigation of the vulnerability. In some arrangements, the distribution can correspond to executing herd inoculation of the plurality of entity computing systems against the new cybersecurity incident and one or more identified threats of the new cybersecurity incident. For example, generating and transmitting a widespread deployment of the patch across multiple organizations to preemptively protect against a malware campaign identified through shared threat intelligence.

In some arrangements, in response to the generation of the protection product and prior to providing the protection product to the entity computing system, modeling proof-of-controls can further include providing the protection product to a third party computing system for issuance by the third party. For example, the IE system 106 could digitally transmit the finalized protection product data, such as cybersecurity product policies or software-based security solutions, to the third party's system for review, customization according to the third party's offerings, and formal issuance processes. In some arrangements, in response to the generation of the protection product and prior to providing the protection product to the entity computing system, modeling proof-of-controls can further include receiving an issuance acceptance including the protection product. For example, the third party could respond with a digitally signed acceptance confirmation, including any modifications or terms to their issuance protocols, thereby recording the protection product's readiness for distribution to the targeted entity computing systems.

In some arrangements, the IE system 106 can prepare and report cyber incidents according to various governmental regulations. In some arrangements, the IE system 106 can determine when a cyber incident is substantial based on a government regulation, which could range from significant losses in the confidentiality, integrity, or availability of information systems, to serious impacts on operational safety, disruptions in business activities, or unauthorized access stemming from third-party compromises. Upon identifying such incidents, the IE system 106 can gather a set of data for reporting. This data collection can encompass correspondence with threat actors, indicators of compromise, relevant log entries, forensic artifacts, network data, and information on how the threat actor compromised the system, among others. Additionally, the IE system 106 can track and document data related to any ransom payments, including the amount, the decision process, and the aftermath of the payment.

For example, a substantial cyber incident can lead to one or more of the following: a substantial loss of confidentiality, integrity or availability of a covered entity's information system or network, a serious impact on the safety and resiliency of a covered entity's operational systems and processes, a disruption of a covered entity's ability to engage in business or industrial operations, or deliver goods or services, unauthorized access to a covered entity's information system or network, or any nonpublic information contained therein, that is facilitated through or caused by a: compromise of a cloud service provider, managed service provider, or other third-party data hosting provider; or supply chain compromise.

Furthermore, in some arrangements, the IE system 106 can also be configured to manage and submit follow-up reports dynamically. This can include generating supplemental reports when new or different information about a cyber incident becomes available or if additional ransom payments are made. Thus, the IE system 106 can provide relevant data such that it is accurately preserved and maintained for a minimum period (e.g., set at two years), following the submission of the most recent report. This data preservation can include the initial detection of a compromise to the full resolution and analysis of the incident, including any payments made and the identification of exploited vulnerabilities.

In some arrangements, the operational framework of the IE system 106 aligns with the need for timely and incident reporting and data preservation to assist organizations in maintaining compliance with regulatory requirements. By automating the process of collecting, preserving, and reporting information about cyber incidents and ransom payments, the IE system 106 reduces manual effort and enhances the accuracy of the information reported. This approach can be used to fulfil legal and regulatory obligations and strengthen the overall cybersecurity posture of organizations by providing a structured response to incidents and facilitating continuous improvement through incident analysis and feedback.

In some arrangements, the preservation requirement of the IE system 106 can include correspondence with the threat actor, regardless of the forum or method; indicators of compromise; relevant log entries; relevant forensic artifacts; network data; data and information that may help identify how a threat actor compromised or potentially compromised an information system; system information that may help identify exploited vulnerabilities; information about exfiltrated data; data or records related to the disbursement or payment of any ransom payment; and any forensic or other reports concerning the incident, whether internal or prepared for the covered entity by a cybersecurity company or other third-party vendor.

Figure 2A:
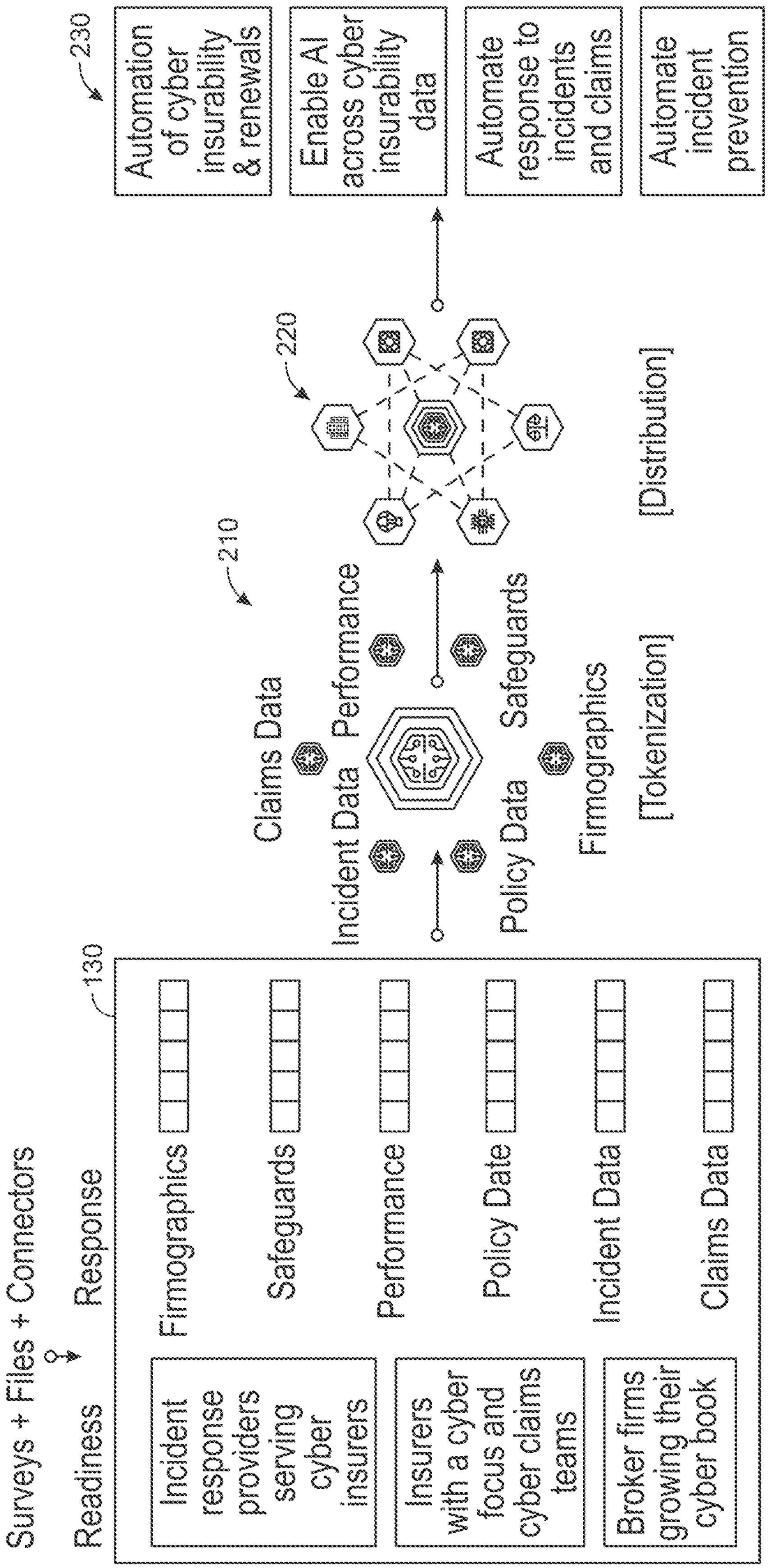
FIGS. 2A-2B depicts a block diagram of another architecture of certain systems or devices of FIG. 1, according to some arrangements.
Figure 2B:
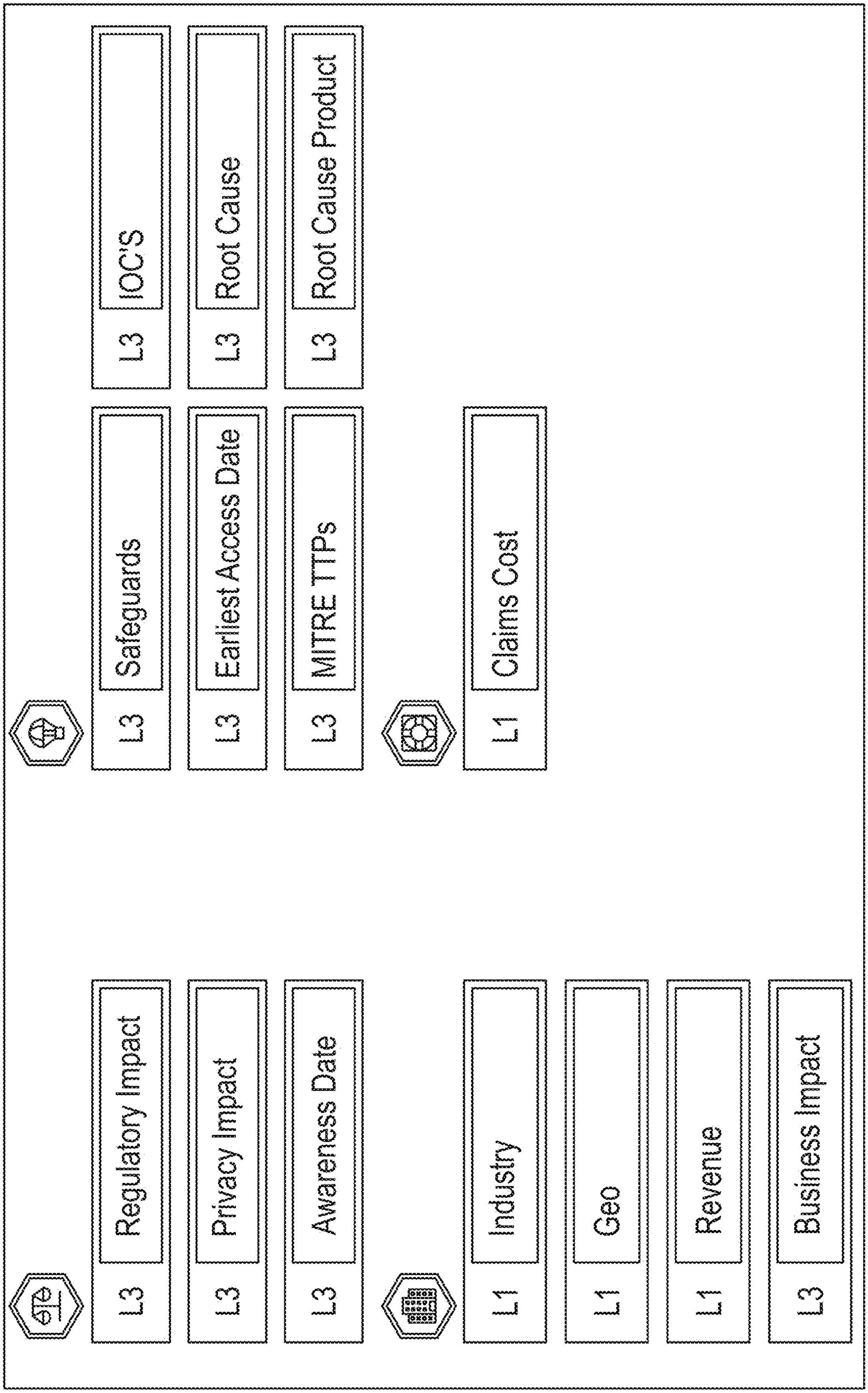

Referring generally to FIGS. 2A-2B, block diagrams of implementations of a system for tokenizing cybersecurity data and a system for managing and exchanging cybersecurity data are shown, respectively. Referring to FIG. 2A in more detail, tokenizing posture, state, cybersecurity protection, insurance, and incident data is shown. In some arrangements, FIG. 2A includes a response system 130, posture state data at step 210, mapped posture state data (tokenization) at step 220, and automations (distribution) at step 230. In some arrangements, the response system 130 shown in FIG. 2A can incorporate the same or similar functionality as the response system 130 of FIG. 1. In some arrangements, the response system 130 can analyze posture, state, cybersecurity protection, insurance, and/or incident data to generate posture state data at step 210 (e.g., firmographics, safeguards, performance data, policy data, incident data, claims data, etc.). For example, the posture, state, cybersecurity protection, insurance, and incident data can be provided by incident response providers (e.g., those serving cyber protection entities), by cyber protection entities (e.g., those with cyber claims teams), and/or by brokerage firms (e.g., those expanding into cyber fields). In some arrangements, the generated posture state data at step 210 can be mapped (e.g., using modeler 108 and/or IE system 106 of FIG. 1) and output as mapped posture state data at step 220 (e.g., mapped firmographics, mapped safeguards, etc.). Further, the generated posture state data at step 210 can be used to mapped at step 220 to allow automations at step 230. In some arrangements, the automations at step 230 (allowed by the normalization, tokenization, and distribution) can include automation of cyber protectability and renewals, automation of responses to cybersecurity incidents and cybersecurity claims, automation of incident prevent, and allowing artificial intelligence (AI) models to interact with cybersecurity data.

As shown, surveys, files, and connectors can be provided (e.g., by a plurality of entities) to the response system 130, where the response system communicates and integrates with incident response providers serving cyber protectors, protectors with a cyber focus and cyber claims teams, and broker firms growing their cyber book (e.g., various uses). The response system 130 can also analyze, sort, interpolate, and store various data including, but not limited to, firmographics, safeguards, performance, policy data, incident data, claims, based on the third-parties and the data provided by the entities (e.g., customers of the third-parties or enrolled in the response system 130). The analyzing, sort, interpolating, and storing is collectively referred to herein as normalization of the data into categorization for modeling and analysis. That is, the data can be structured into one or more formats by the response system 130. The various data can be modeled (e.g., tokenized, encoded) at step 210 and mapped (for distribution) at step 220. For example, tokenizing the normalized data can include converting the data into a series of discrete tokens that represent aspects of the data, such as individual firmographics, cybersecurity safeguards, incident specifics, or claims information. These tokens can then be used within the system to securely and efficiently handle and analyze the data. That is, tokenizing by modeling the normalized data can facilitate the creation of a structured, machine-readable format that enhances data privacy, security, and interoperability among the different components of the response system 130 and its integration with third-party services. In another example, the modeling at step 210 might include leveraging natural language processing (NLP) and machine learning techniques to extract actionable insights from unstructured data sources like surveys and incident reports. In yet another example, the mapping at step 220 relates to a sharing mechanism of the tokenized data without transferring actual data around or outside the network. That is, mapping the tokenized data for distribution includes creating a reference system that allows third parties to access or query data tokens without needing to transfer the raw data itself, thereby preserving data confidentiality and minimizing data exposure. For example, the tokens could be distributed through a secure API that permits third-party systems to request data tokens based on criteria or needs, with access controls verifying that only authorized users can retrieve the tokens. In another example, the system might utilize blockchain technology to create a decentralized ledger of data tokens, where each token's access and usage can be transparently tracked and audited without compromising the underlying data's security. This approach can be used such that the integrity and confidentiality of the original data are maintained by avoiding the direct transfer of sensitive information between parties. Additionally, automation at this stage may include deploying AI-driven algorithms to predict future cyber incidents based on patterns identified in the data, thereby facilitating proactive mitigation strategies. In another example, it could include the use of robotic process automation (RPA) to streamline the processing of cyber claims, reducing response times and operational costs.

Referring to FIG. 2B in detail, data packages for managing and exchanging cybersecurity data is shown. In some arrangements, the system can attribute (e.g., credit) tangible value to in-network entities providing cybersecurity information to the system. For example, cybersecurity information provided to the system can include legal data (e.g., regulatory impact, privacy impact, awareness date, etc.), firmographic data (e.g., industry, geo, revenue, business impact, etc.), cybersecurity data (e.g., safeguards; earliest access data; MITRE tactics, techniques, and procedures (TTPs); IOC's, root cause, root cause product, etc.), and claim data (e.g., claims cost) of the entity. In general, the method and steps of FIG. 2A facilitates the processing circuits of the response system 130 to attributing ownership of the entities provide data into the system, and persist that ownership through subsequent use cases, thereby providing royalty (payout) distribution based on use (or acquisition) of that data.

In some arrangements, once the entity inputs cybersecurity information (e.g. legal data, firmographic data, etc.) into the system, the inputs can be tagged for attribution (e.g., credit). In some arrangements, in response to a new user inputting cybersecurity information replacing unpublished information inputted by a previous user, the system can tag the new user for attribution. In some arrangements, licensing for accessing the system can be granted by in-network protection providers to participating entities on a usage basis, on a participation basis, for a fee/for free, etc.

Figure 3:
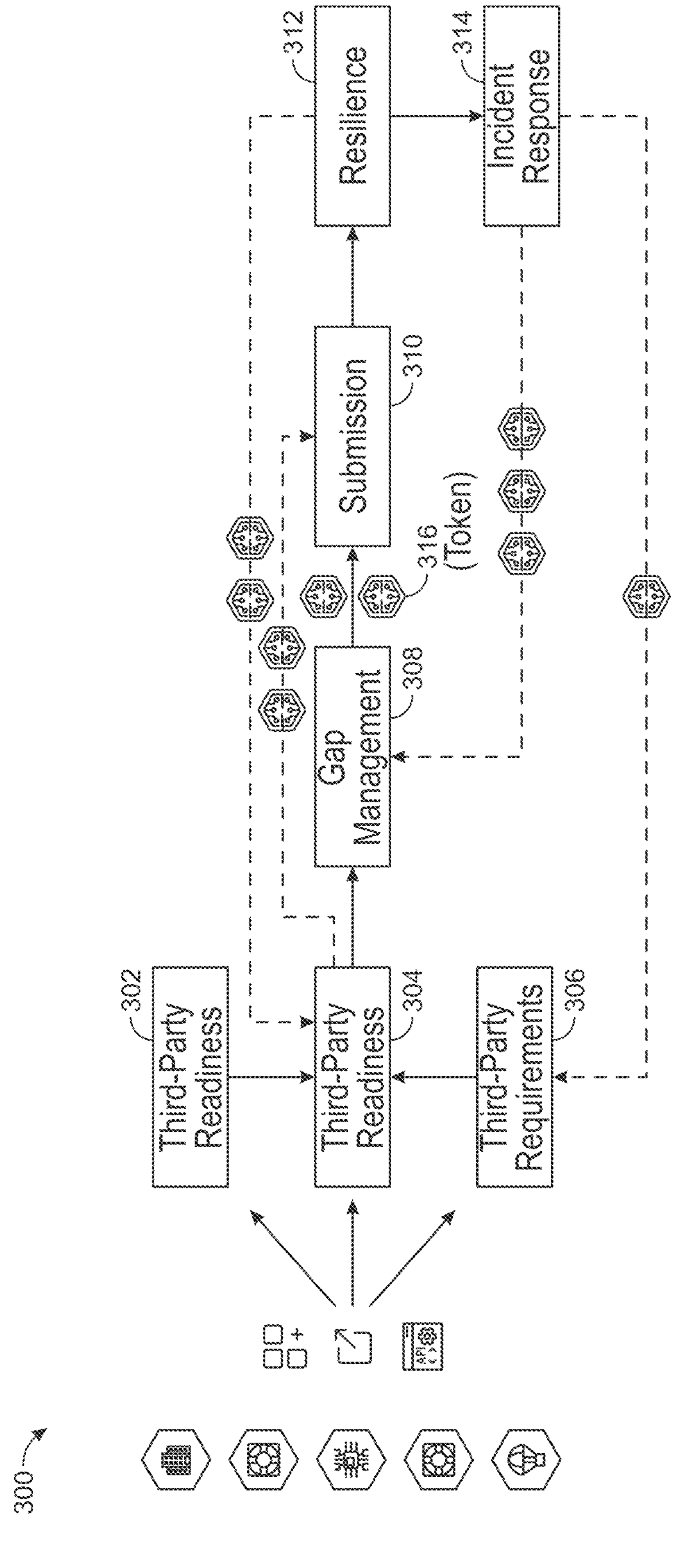
FIG. 3 depicts a block diagram of another architecture of certain systems or devices of FIG. 1, according to some arrangements.

Referring to FIG. 3, a block diagram of an implementation of a system 300 for matching protection providers with entities is shown. In general, response system 130 of FIG. 1 can include the various systems and devices of system 300, for example, as subsystems of the analysis circuit 136. In some arrangements, the system 300 can include a third-party readiness system 302, protectability (or insurability or eligibility) readiness system (e.g., third-party insurability readiness system 304), protection provider (cybersecurity provider, insurer, vendor, or another third-party) requirements system (e.g., third-party requirements system 306), gap management system 308, submission system 310, resilience system 312, and incident response system 314. In some arrangement, the system 300 may receive and analyze cyber security data such as entity readiness data, protectability readiness data, and protection provider requirements.

In general, the various systems of FIG. 3 can transmit and provide tokens (e.g., token 316) to the various other systems described in FIG. 3. For example, the gap management system can generate or receive a token 316 and transmit the token to the submission system 310 when a gap in protection requirements is identified, allowing targeted adjustments to be made before finalizing the submission for coverage. Token 316 can act as a digital representation encapsulating data related to the cybersecurity readiness and gap analysis or other analyses described herein, facilitating secure and efficient data exchange between systems. In some arrangements, the third-party readiness system 302 can receive incident data, entity data, environmental data, and cybersecurity information about a plurality of entities. The third-party readiness system 302 can analyze this data to assess the current cybersecurity posture and readiness of entities for protection coverage (e.g., cybersecurity coverage, insurance coverage, data breach defense, identify theft defense, regulatory compliance coverage, network security defense, cyber extortion defense), identifying areas of strength and potential vulnerabilities. In some arrangements, the third-party requirements system 306 can also receive incident data, entity data, environmental data, and cybersecurity information about a plurality of entities. The third-party requirements system 306 can process this information to define and update the criteria and benchmarks for eligibility for a cybersecurity product or insurability, reflecting emerging cyber threats and industry best practices. Furthermore, the third-party insurability readiness system 304 can also receive incident data, entity data, environmental data, and cybersecurity information about a plurality of entities. The third-party insurability readiness system 304 can evaluate the alignment between an entity's cybersecurity measures and the third-party's requirements (e.g., protection requirements, cybersecurity requirements, insurance requirements, third-party requirements), identifying gaps and recommending improvements. Additionally, the third-party readiness system 302 and third-party requirements system 306 can provide outputs to the third-party insurability readiness system 304 that can include consolidated reports on cybersecurity readiness, gap analyses, and recommendations for achieving or maintaining third-party standards.

The third-party insurability readiness system 304 can then send gap analysis reports and recommendations for improvements to the gap management system 308. After an entity is uses or enrolls in a product, or is protected, the gap management system 308 can connect entities with gaps to in-network vendors to close the gaps and provide proof of closure. For example, this could include automating the dispatch of cybersecurity improvement tasks to specialized service providers and tracking the implementation progress in real-time. The gap management system 308 and the third-party insurability readiness system 304 can provide outputs to the submission system 310 which can be configured to tokenize the results. For example, the gap management system 308 could provide digital certificates of gap closure and the third-party insurability readiness system 304 could provide standardized risk profiles, which is used by the submission system 310 to create a blockchain-based ledger entry verifying the integrity and verifiability of the risk assessment and remediation actions.

Additionally, the submission system can output the tokenized results and information to the resilience system 312 to perform external checks and pre-renewals to increase stickiness for lowest risk entities (e.g., external vulnerability scans). For example, the resilience system 312 may utilize automated scanning tools to continuously assess the cybersecurity posture of entities, identifying new vulnerabilities before they can be exploited. The resilience system 312 can output security assessment reports back to the third-party insurability readiness system 304 to update the entity's risk profile and tailor cybersecurity products, cybersecurity defense products, and other protection offerings accordingly. For example, adjustments to cybersecurity product premiums or coverage limits may be recommended based on the improved security stance. Additionally, the resilience system 312 can output alerts and recommendations to an incident response system 314.

The incident response system 314 can initiate immediate response protocols for new threats identified during the resilience checks. The outputs of the incident response system 314 can be provided to the gap management system 308 and the third-party requirements system 306. For example, one output could be updates on new cybersecurity incidents and their resolutions, enhancing the third-party's understanding of current threat vectors. In another example, an output could be data on the effectiveness of implemented security measures, contributing to the refinement of underwriting criteria.

In some arrangements, the cybersecurity data (e.g., entity readiness data, cybersecurity readiness, insured readiness, environmental data, etc.) can be transmitted to the gap management system 308. For example, the gap management system 308 can allow brokerage services within its network to automatically match a prospective entity with protection providers that have a appetite for the risk profile of the prospective entity (e.g., before submission of a formal protection application). For example, if a prospective entity is identified by the gap management system 308 (e.g., response system 130 of FIG. 1) to have gaps in a risk profile (e.g., missing data in entity profiles used by protection providers), the gap management system 308 can connect the prospective entity with service providers in the system 300.

In some arrangements, data analyzed and/or output by the gap management system 308 can be transmitted to the submission system 310. In some arrangements, the response system 130 of FIG. 1 can manage the submission (e.g., electronic submission) of protection applications using the submission system 310. For example, the results of submitting a protection application can be tokenized by a protection system (e.g., submission system 310) to standardize and digitize the data analyzed and/or output by the gap management system (e.g., cybersecurity information such as firmographic data, legal data, etc.). In some arrangements, the resilience system 312 can execute external checks (e.g., external scans, DarkwebIQ checks, pixel checks, etc.) for cybersecurity threats prior to renewal of a protection product of the entity. In some arrangements, the incident response system 314 can execute a collaborative data exchange function (e.g., using electronic surveys) to collect cyber claims data and/or to allow streamlined renewal of the protection product. Additionally, information related to resilience and incident response are described above with reference to FIGS. 1 and 4.

Figure 4:
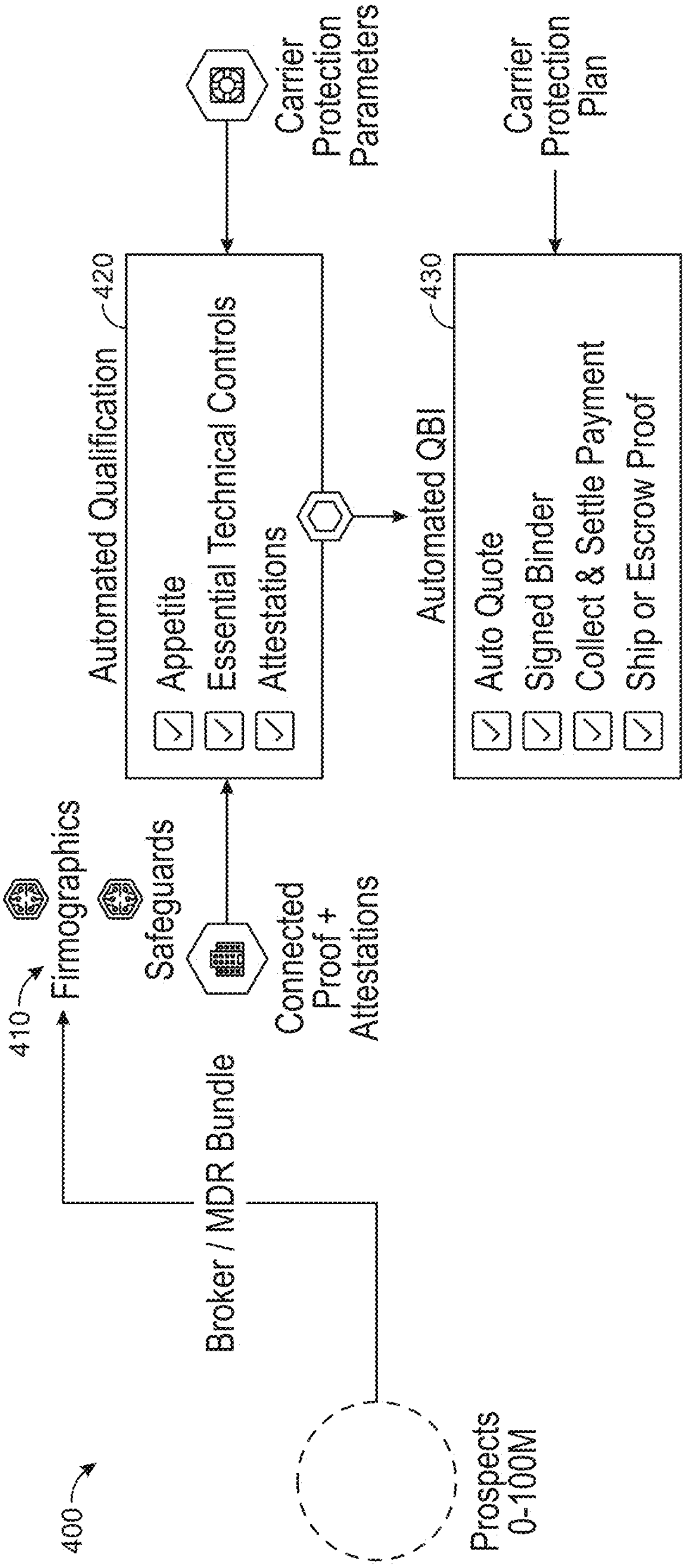
FIG. 4 depicts a block diagram of another architecture of certain systems or devices of FIG. 1, according to some arrangements.

Referring now to FIG. 4, a block diagram of an implementation of a system 400 for cybersecurity protection qualification is shown. For example, the prospects of 0-100 M is an example of vendor appetite (requirement) sizing (e.g., other bands include 101-250 M, 251-500 M, and 500 M+). In some arrangements, the system 400 can include cybersecurity data 410, an automated qualification system 420, and an automated quote-bind-issue (QBI) system 830. For example, the cybersecurity data 410 can be collected or received from prospective entities and can include firmographic data, safeguards, etc. In some arrangements, the cybersecurity data 410 can be transmitted to the automated qualification system 420, and the automated qualification system 420 can assess the cybersecurity data of the prospective entity using various parameters. For example, the automated qualification system 420 can use cybersecurity data (e.g., protection provider appetite/desire, essential technical controls, etc.) to determine whether the entity meets requirements (e.g., protection parameters) of a protection provider and/or protection product (e.g., minimum encryption standards). For example, the automated qualification system 420 can validate known risks related to the cybersecurity of the prospective entity and remove unqualified risks and/or risks for further risk mitigation before being protectable. In some arrangements, the automated QBI system 430 can receive cybersecurity data from the automated qualification system 420, and the QBI system 430 can generate a protection product for the prospective entity. For example, the QBI system 430 can generate a protection product (e.g., carrier protection plan) by generating a cybersecurity quote for a protection product, allowing the execution of an agreement related to the cybersecurity quote using a signed binder, collecting and settling payment, and selling or providing escrow proof (e.g., secure holding of the technical proof and/or of documents) for the protection product.

Figure 5:
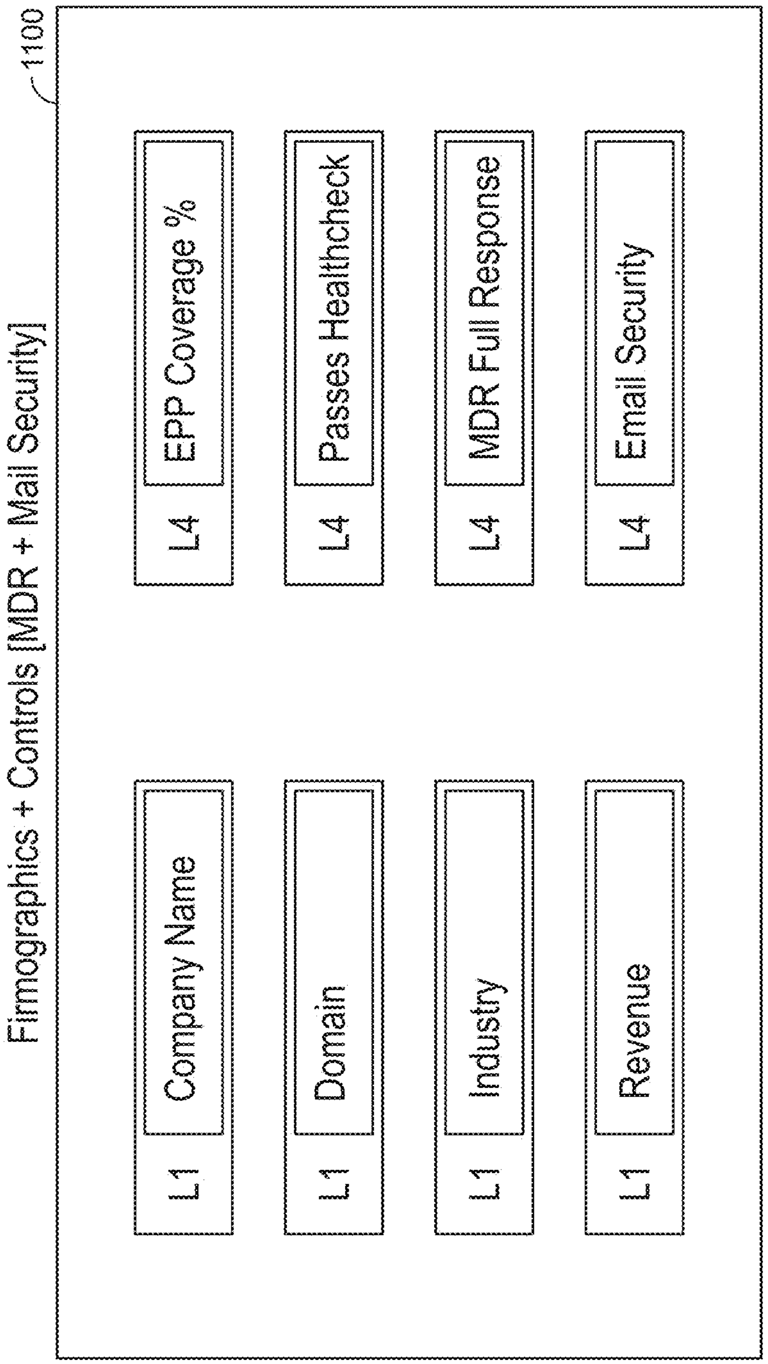
FIG. 5 depicts a block diagram of another architecture of certain systems or devices of FIG. 1, according to some arrangements.

Referring now to FIG. 5, a block diagram of an implementation of a token 500 including cybersecurity data is shown. In some arrangements, the token 500 provides structured data including level 1 firmographics (company name, domain, industry, revenue, etc.) and level 4 controls (e.g., percentage of entity devices covered by endpoint protection platforms (EPPs), whether entity system pass a health check, whether an entity has managed detection and response (MDR) services and a full incident response plan, email security measures, etc.). In some arrangements, the structured data of token 500 may not have levels. As described above regarding FIG. 1, the token 500 can be stored on a distributed ledger and accessed and/or updated in modeling proof-of-controls (e.g., cybersecurity measures). In some arrangements, the token 500 can be used to identify low-risk (e.g., MDR-implementing) prospective entities, and the low-risk prospective entities can be provided protection products based on cybersecurity information (e.g., email security, etc.) included in the token 500. Furthermore, the token 500 can facilitate real-time updates to cybersecurity profiles, facilitating dynamic assessment and protection premium adjustments. For example, token 500 can automate the exchange of cybersecurity data among stakeholders. In another example, token 500 can enhance the transparency and traceability of cybersecurity measures, allowing entities to demonstrate compliance with regulatory requirements and best practices through immutable records.

Figure 6:
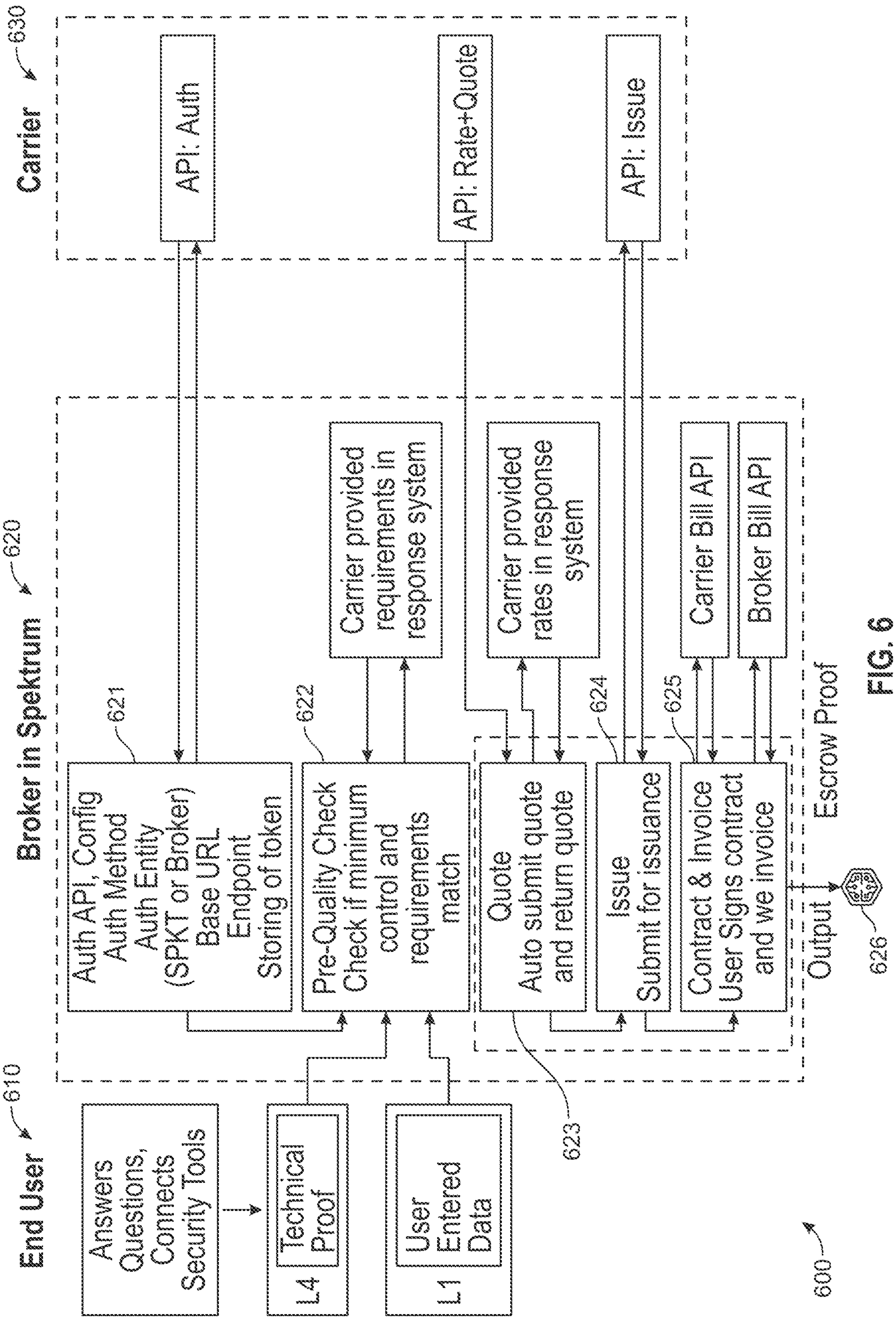
FIG. 6 depicts a block diagram of another architecture of certain systems or devices of FIG. 1, according to some arrangements.

Referring now to FIG. 6, a block diagram of an implementation of a system for generating a protection product is shown. In some arrangements, the system 600 can include an end user system 610, a response system 620 (including similar features and functionality of response system 130 of FIG. 1), and a carrier system 630. In some arrangements, the response system 620 can include an authentication system 621, a pre-quality check system 622, a quote system 623, an issuance system 624, and a contract/invoice system 625. For example, the end user (e.g., prospective entity) can interact with the end user system 610 to answer questions and connect security tools (e.g., technical proof) in seeking a protection product.

Further, the information collected from the end user system 610 can be transmitted to the broker in response system 620. In some arrangements, the authentication system 621 can authenticate the prospective entity's cybersecurity information inputted via the end user system 610 (e.g., authenticating the prospective entity's application programming interface (API), protection configurations/methods, the entity itself (e.g., using firmographic data), tokens provided, etc. In some arrangements, cybersecurity data from the end user system 610 and/or from the authentication system 621 can be transmitted to the pre-quality check system 622. Further, the pre-quality check system 622 can determine (e.g., check) if minimum control and requirements of a protection product (e.g., minimum email security standards) match the cybersecurity data of the prospective entity by comparing the cybersecurity data of the prospective entity to carrier-provided requirements in response system 620 (e.g., response system 130 of FIG. 1). For example, the pre-quality check system 622 might analyze the entity's encryption protocols against the requirements for data in transit and at rest security standards, ensuring that the entity's cybersecurity practices meet or exceed the baseline for protectability. In another example, the pre-quality check system 622 could compare the entity's incident response times and procedures to the benchmarks for effective incident management, highlighting areas where the entity's cybersecurity readiness aligns with or falls short of expected standards for proactive threat mitigation and response. Additionally, the pre-quality check system 622 access or receive carrier provided requirements stored in a database of response system 620 (e.g., database 140 of FIG. 1).

Still referring to FIG. 6, the quote system 623 can submit a protection product quote and return a quote. For example, the quote system 623 can access carrier-provided rates in a third party system (e.g., third-party device 150 of FIG. 1) using a carrier API (e.g., rate and quote API). Additionally, the quote system 623 access or receive carrier provided rates stored in a database of response system 620. In some arrangements, cybersecurity data from the quote system 623 can be transmitted to the issuance system 624 for issuance. For example, issuance system 624 can formalize and/or finalize a protection application using an issuance API of the carrier (e.g., protection provider). In some arrangements, cybersecurity data from the issuance system 624 can be transmitted to the contract/invoice system 625 and used for signing of a contract of the protection product by the user (e.g., prospective entity) and/or invoicing related to the protection product by the protection provider using various APIs. For example, the prospective entity can sign the contract using Carrier Bill API (or another API) and the protection provider can provide the invoice to the protection entity for payment using Broker Bill API (or another API).

Additionally, the contract/invoice system 625 can output a token 626 to a distributed ledger (e.g., WEB3) or anther data source (e.g., WEB2).

Systems and Methods for Security Intelligence Exchange

Figure 7:
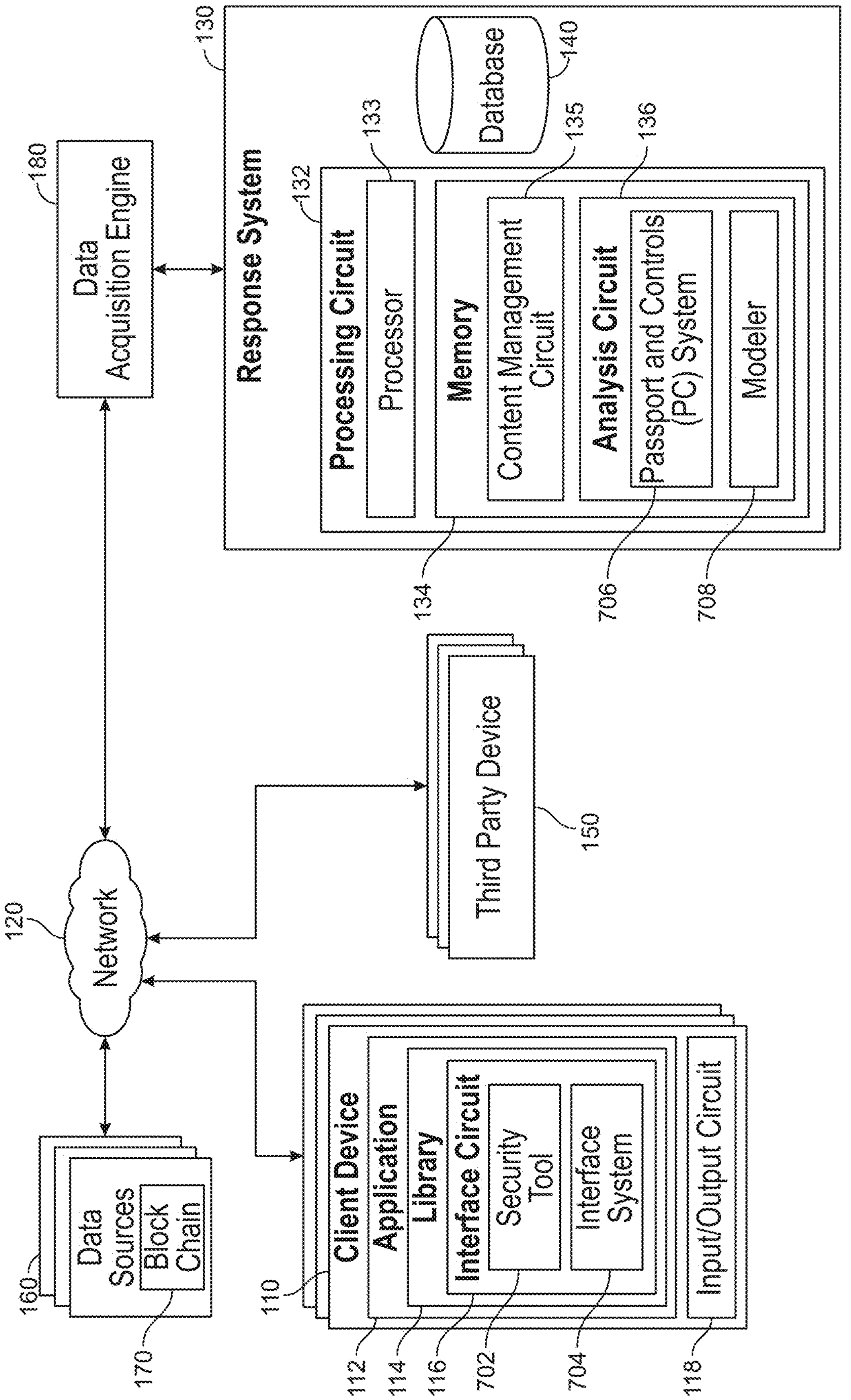
FIG. 7 depicts a block diagram of an implementation of a system for improving cybersecurity protections across a plurality of entities, according to some arrangements.

Referring now to FIG. 7, a block diagram depicting an implementation of a system 700 for improving cybersecurity protections across the plurality of entities. In some implementations, the interface circuit 116 of the client device 110 within the system 100 may include a security tool 702 and an interface system 704. As described herein, the library 114 may include the interface circuit 116. The security tool 702 of the interface circuit 116 may include a plurality of features to enhance the security of the client device 110 or the application 112. The plurality of features may include antivirus software, firewalls, instruction detection systems, vulnerability scanners, endpoint security software, and the like. The security tool 702 may monitor, secure, or protect the interface system 704 by executing the plurality of features. Using aspects of the technical solution described herein, may improve the cybersecurity protection of the client device 110, the third party device 150, and the data sources 160.

The interface system 704 may collect or identify the incident data associated with the cybersecurity incident. During the claims process of the claim handling by a claim handling system (e.g., system 400), the interface system 704 may monitor and collect the incident data at every step of the process. For example, the interface system 704 may collect incident data from the environmental data of the entity during the modeling of the plurality of cybersecurity protection plans. The incident data from the environmental data may correspond anomalies or potential cybersecurity incidents in the entity's environment. In some arrangements, the interface system 704 may identify incident data from the reports of the claim handling system. In some arrangements, the interface system 704 may collect incident data from the questionnaire 428 generated by the analysis circuit 136. For example, a questionnaire may gather information related to the incident or the claim submitted. From the information, the interface system 704 may extract incident data associated with the claim.

The interface system 704 may collect the incident data to satisfy a threshold or upon the reception of a signal from the analysis circuit 136. For example, the interface system 704 may identify incident data from application 112, a questionnaire, proof of readiness, or other components within the analysis circuit 136. The threshold may increase or decrease based on the submitted claim or incident. Responsive to the interface system 704, the interface system 704 may record the incident data within the distributed ledger of the analysis circuit 136.

Figure 8:
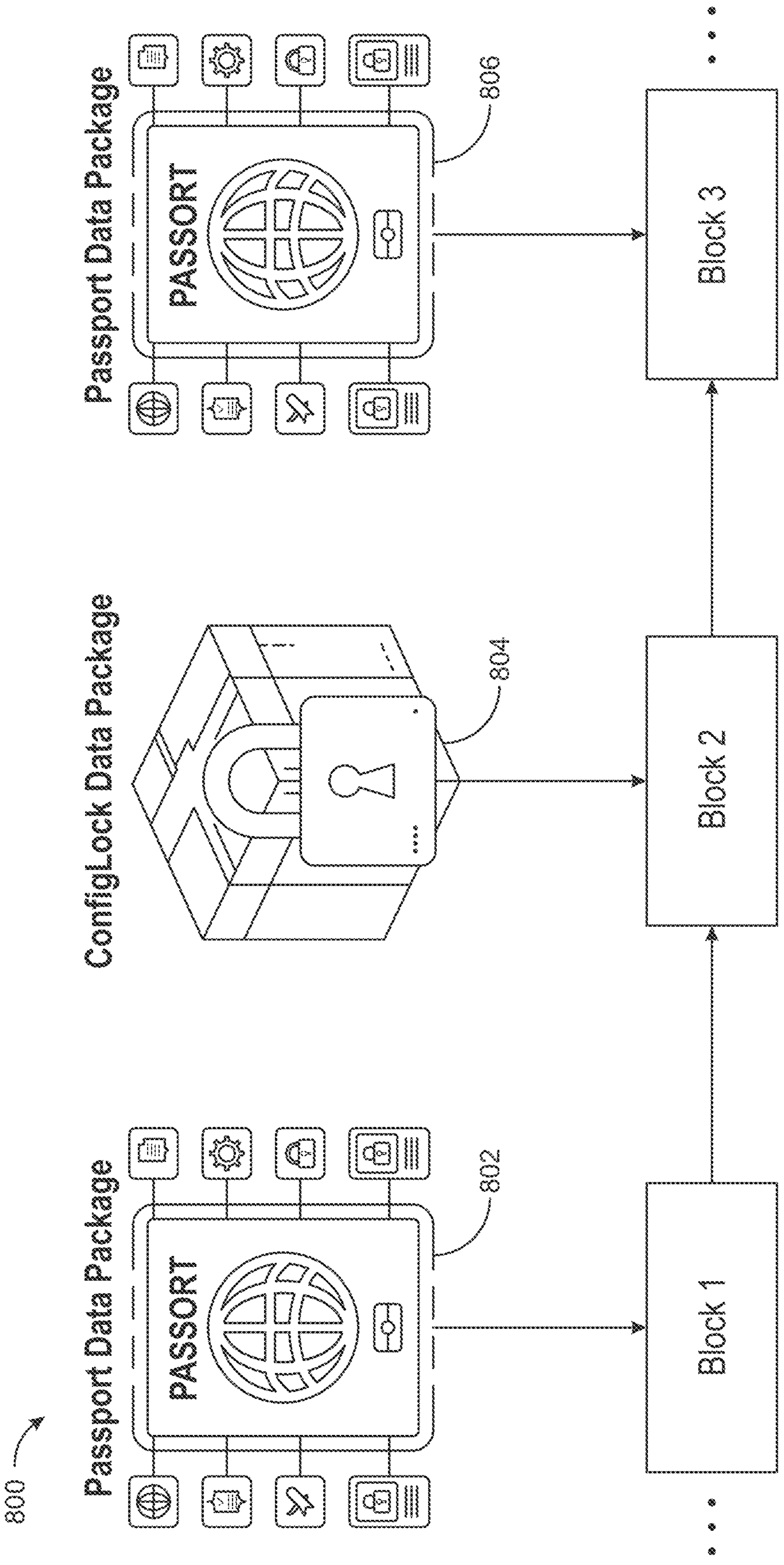
FIG. 8 depicts a block diagram of a system to analyze proof of performance of the plurality of entities to improve cybersecurity protections.

Referring now to FIG. 7 and FIG. 8, FIG. 8 depicts a block diagram 800 depicting a passport and controls (PC) system 706. The analysis circuit 136 may include the passport and controls (PC) system 706 and a modeler 708. The PC system 706 may include a passport data package 802 (e.g., first passport data package), a ConfigLock data package 804, and a second passport data package. In some implementations, the PC system 706 may generate a decentralized identity passport for each entity in the plurality of entities. The decentralized identity passport may be located with the passport data package 802. The decentralized identity passport may be built from a distributed ledger and stored within a blockchain network, as shown in FIG. 8. Each decentralized identity passport may include a decentralized identifier to ensure each identify passport is distinct.

In some implementations, the PC system 706 may attach or embed a plurality of proof of controls to the corresponding decentralized identity passport of one entity in the plurality of entities. The plurality of proof of controls may be based on one or more cybersecurity protection actions implemented by the entity. For example, a first entity may use mitigation strategies as a cybersecurity protection action, whereas a second company may use firewalls as a cybersecurity protection action.

The analysis circuit 136 of response system 130 of FIG. 7 may monitor environmental data of the third-party devices 150 (e.g., computing devices) of an entity. To monitor for environmental data, the analysis circuit 136 may detect interactions between an end-user and a computing device. The computing devices may be servers, laptops, tablets, phone, and the like associated with an entity of the decentralized identity passport. The interactions may reveal or indicate compliance corresponding to the cyber protections of the entity. For example, a first end-user may access a website blocked by a firewall on the computing device of then entity. The analysis circuit 136 may flag the interaction as out of compliance with the cyber security protection.

When the analysis circuit 136 flags an interaction, the entity may receive an indication that the entity is out of compliance with a cybersecurity parameter from the analysis circuit 136. The indication may be at least one of an alert, a notification, or a message. For example, after the analysis circuit 136 flags the interaction, the analysis circuit 136 may transmit the indication to the entity to notify the entity of the lack of compliance. The indication may include a recommendation to update the one or more cybersecurity protection actions. Updating the one or more cyber security protection actions may including updating the security tools 702 of the client device 110.

Each time an entity executes at least one proof control of the plurality of proof controls, the PC system 706 may embed the proof control within the decentralized identity passport. The proof control may indicate that the entity executed the one or more cyber security protection actions in response to a cyberthreat. For each attached proof control, the PC system 706 may record or store the proof control within the data sources 160 or the distributed ledger. When on the distributed ledger, each block corresponding to the attached proof control may link to the decentralized identity passport as one or more exchanges. In some implementations, the analysis circuit 136 may validate the one or more cyber security protections for each entity. The database 140 may include a collection of cyber security protections for each entity. The analysis circuit 136 may match the cybersecurity protection action with the stored cybersecurity action in the database 140 to validate the one or more cybersecurity protections. Upon validation of the one or more cybersecurity protections, the analysis circuit 136 may record the validation in the distributed ledger or within the data sources 160 as a new exchange linked to the decentralized identity passport.

The PC system 706 may identify a plurality of level 1 (L1) or first level configurations corresponding to at least one operational or security action performed on the plurality of client devices 110 of the entity. The L1 configurations may include at least one of network settings, security tool settings, access control lists, endpoint protection settings, or encryption keys. The L1 configurations may include system-level operations or security actions performed on the plurality of computing systems. In some implementations, the PC system 706 may include a plurality of level 2 (L2) configurations that include secondary or maintenance operations or security actions on the plurality of computing systems.

The PC system 706 may tokenize the plurality of L1 configurations within the ConfigLock data package 804. The ConfigLock data package 804 may include the plurality of L2 configurations. To tokenize the plurality of L1 configurations, the PC system 706 may digitize and represent the plurality of L1 configurations on a blockchain. The PC system 706 may execute one or more smart contracts to tokenize the L1 configurations. For example, the PC system 706 may execute a first smart contract to tokenize one or more L1 configurations and a second smart contract to tokenize one or more L2 configurations. Upon tokenizing the L1 configurations, the PC system 706 may store or record the L1 and L2 configurations on the distributed ledger or a data source 160 as show in FIG. 8.

In some implementations, the PC system 706 may provide a recovery key to the entity. The recovery key may be configured to allow the recovery of the tokenized L1 configurations. In some embodiments, the interface circuit 116 may receive the recovery key and provide the plurality of L1 configurations from the distributed ledger or data source 160. The interface circuit 116 may detokenize or decrypt the plurality of L1 configuration using the recovery key.

The modeler 708 may be an artificial intelligence (AI) or machine learning (ML) model designed to identify, detect, and respond to incidents, claims, or cyber threats. The modeler 708 may include a data collection layer to gather incident data from the interface system 704. The modeler 708 may include a preprocessing layer and a feature engineering layer. The modeler 708 may use a model training layer to train the modeler 708 to model the incident data by using one or more training data sets within the database 140. In some implementations, the modeler 708 may include a model evaluation layer to evaluate the trained model using one or more validation data sets within the database 140. In some implementations, the modeler 708 may execute heuristic analysis, pattern identification, anomaly identification, or threat projections.

In some arrangements, the modeler 708 can generate verifiable credentials, designed to encapsulate and validate the cybersecurity efforts of entities. Utilizing statistical analysis and correlation techniques, the modeler 708 can analyze, correlate, and cross-reference datasets to identify patterns indicative of potential security threats or vulnerabilities. This process can employs algorithms capable of detecting anomalies in network traffic, unauthorized access attempts, and the presence of malicious software by comparing observed behaviors against established norms. For example, the modeler 708 can evaluate an organization's security posture by analyzing both historical incident data and existing cybersecurity measures. This thorough assessment aids in the stratification of security priorities. The verifiable credentials generated as a result encapsulate the evaluated security posture, offering entities a means to demonstrably showcase their cybersecurity diligence to partners, regulators, and other stakeholders. Moreover, the modeler 708 can integrate domain-specific heuristic analysis to bolster its predictive analysis capabilities. This provides the generation of verifiable credentials that are broad in scope and also customized to address the unique threats pertinent to an entity's operational domain. Additionally, the incorporation of regulatory compliance tracking into the modeler's 708 analytical framework provides that the generated verifiable credentials also reflect adherence to legal and industry standards.

Using the modeler 708, the analysis circuit 136 may model the incident data to generate one or more verified intelligences corresponding to at least one cybersecurity threat. For example, the modeler 708 may model the incident data by generating a cyberthreat and transmit the generated cyberthreat to the analysis circuit 136. Responsive to receiving the generated cyberthreat, the analysis circuit 136 may use the generated cyberthreat to generate one or more verified intelligences to address the cyberthreat. The one or more verified intelligences may include at least one of threat indicators, vulnerability patches, or mitigation strategies corresponding to the at least one cybersecurity threat. In some implementations, the generated one or more verified intelligences may be a plurality of steps, a process, or a method to protect against the cyber threat.

The analysis circuit 136 may determine the one or more verified intelligences by using the generated cyberthreat. In some implementations, the one or more verified intelligences may correspond to at least one of firmographic data, identified security gaps, or existing protection guards. For example, the one or more verified intelligences may be based on firmographic data of the cyberthreat. In another example, the one or more verified intelligences may be based on identified security gaps of the cyberthreat. The firmographic data, the identified security gaps, and the existing protection guards may correspond to an entity profile of each of the plurality of entities.

To determine the one or more verified intelligences, the analysis circuit 136 may monitor interactions between an end-user and the interface system 704. The interactions may reveal that the end-user executed intelligences stored within the database 140. For each executed intelligence, the analysis circuit 136 may identify the verified intelligence if the executed intelligence corresponds to the cyberthreat. For example, an entity may execute a mitigation strategy to protect against a cyberthreat. The analysis circuit 136 may detect the mitigation strategy and determine or identify the mitigation strategy as verified intelligence.

The analysis circuit 136 may decode the one or more verified intelligences into entity data formats of one entity in the plurality of entities. In this manner, the analysis circuit 126 may automatically generate the one or more verified intelligences in a format of one entity. For example, a first entity may need seven verified intelligences, whereas a second entity may need eight verified intelligences. Each of the verified intelligences for the first entity and each of the verified intelligences for the second entity may differ based on the protections of the first entity and the second entity.

During the decoding of the one or more verified intelligences, the analysis circuit 136 may translate the one or more verified intelligences into formats compatible with the security tool 702. The format may define the configuration for the security tool 702. For example, the format may be an API in the programming language of the security tool 702. The format for a first entity may differ from the format for a second entity to ensure the security tools 702 of each entity are not the same.

The analysis circuit 136 may configure or reconfigure the security tool 702 of the respective entity. The analysis circuit 136 may transmit a configuration to the security tool 702 to modify, adjust, or change the API of the security tool. The configuration may allow the security tool 702 to protect the entity again the cyberthreat. In some implementations, the analysis circuit 136 may transmit a subsequent configuration that may include the first configuration. The subsequent configuration may update the security tool 702 to protect again a subsequent cyberthreat and the first cyber threat. In this manner, the analysis circuit 136 may continuously update each security tool 702 from each entity to protect the respective entity from the cyberthreat.

Still referring to FIGS. 7-14, the modeler 708 can be configured to generate of a decentralized identity passport (e.g., passport data package 802 and 806) for each entity (or sub-entity, such as group or subsidiary of an entity or company). The generation by the modeler 708 can include collecting and integrating cybersecurity-related actions and measures performed and executed by these entities into their respective identity passports. These actions can be encapsulated in proofs of control, which demonstrate the entity's adherence to prescribed cybersecurity practices and measures. Once generated, these proofs are linked with the entity's decentralized identity passport and recorded on a distributed ledger or data source. Accordingly, the cybersecurity action by an entity can be transparently and immutably documented.

Upon attaching or embedding the proofs of control to the decentralized identity passports, the modeler 708 can validate the cybersecurity measures for each entity. This validation process determines the efficacy and adherence of the implemented cybersecurity actions against established benchmarks or standards. After successful validation, the modeler 708 can record this validation as a new exchange on the distributed ledger or data source, linked to the entity's decentralized identity passport. This recorded validation acts as a verifiable badge of cybersecurity compliance, enhancing the entity's credibility and trustworthiness within a digital ecosystem. Continuously monitoring environmental data across computing systems of the registered entities, the modeler 708 can uphold one or more cybersecurity standards. This monitoring can be used to identify deviations or non-compliance with cybersecurity parameters. In response to any detected discrepancies, the modeler 708 can issue alerts to the entities involved, advising them on updating their cybersecurity measures.

In some arrangements, the modeler 708 can identify a plurality of first-level configurations corresponding to operational or security actions performed on computing systems of an entity. The modeler 708 can encrypt or tokenize these configurations and record them on a distributed ledger or data source. For example, the modeler might encrypt network settings adjustments made to enhance security, ensuring that such changes are securely documented and verifiable. That is, the verifiable configurations can be stored in a ConfigLock data package 804. For example, ConfigLock data package 804 can be encrypted and compartmentalized into segments, each representing different dimensions or areas of the entity's cybersecurity framework, such as network configurations, access controls, and endpoint security settings. Furthermore, the ConfigLock data package 804 can then be indexed and timestamped. This process ensures that changes to configurations are auditable and resistant to tampering.

In some arrangements, the modeler 708 can provide a recovery key to the entity, allowing for the recovery of encrypted or tokenized first-level configurations. For example, a client device 110 (particularly the security tool 702) can use the recovery key to receive the first-level configurations from the distributed ledger based on decrypting or detokenizing with the recovery key by the modeler 708. The modeler 708 can regenerate the recovery key upon detecting a potential compromise or at predefined intervals. For example, in the case of a security breach, the modeler 708 could regenerate the recovery key to maintain the integrity of the stored configurations.

In some arrangements, the configurations of the plurality of first-level configurations can be system-level operations or security actions, while a plurality of second-level configurations pertain to secondary or maintenance operations. For example, the modeler differentiates between the application of a security patch (first-level) and routine software updates (second-level), ensuring each is appropriately categorized and documented. In some arrangements, the first-level configurations include network settings, security tool settings, access control lists, endpoint protection settings, or encryption keys. For example, the modeler 708 could record changes to firewall rules or the deployment of new antivirus definitions, capturing data for security management.

In some arrangements, the configurations can be a level of configuration such as, cryptographic proof of provenance (e.g., Level 4 or L4), with subsequent levels corresponding to validations (e.g., Level 3 or L3), documented evidence of actions (e.g., Level 2 or L2), and commitments made by the entity (e.g., Level 1 or L1). For example, the modeler 708 could verify a new encryption key's provenance through digital signatures, then document its deployment across the network as an action taken. It should be understood the various levels of configuration are described herein but should not be limited to hierarchical categorizations, as configurations may also be interdependent or require cross-validation for security assessments. In particular, the flexibility of the modeler 708 allows for dynamic adaptation to emerging security challenges and technological advancements, ensuring that the modeler 708 remains effective in a rapidly evolving cybersecurity landscape.

In some arrangements, the highest or best configuration level can be for cryptographic proof of provenance obtained by the modeler 708 from the entity and programmatically. For example, the modeler 708 could derive and encode the cryptographic proof of provenance for software updates from development logs and code repositories, ensuring that only verified updates are applied to the entity's systems. In another example, the modeler 708 could programmatically attest to the integrity of third-party components by validating their cryptographic signatures against trusted certificate authorities, bolstering supply chain security.

In some arrangements, the second highest or second best configuration level can be validation by one or more authorized entities. For example, validation could include cross-referencing the digital signatures of installed applications with a database of verified publishers to confirm authenticity. In another example, validation might include checking the conformity of network configuration changes against industry-standard security protocols, ensuring that the entity's network remains resilient against known vulnerabilities.

In some arrangements, the third highest or third best configuration level can be documented evidence of an action. For example, documented evidence could include logging the sequence of steps taken to apply a security patch, complete with timestamps and system snapshots. In another example, it might involve retaining change logs that include the rationale and implementation data of new access control policies, providing a clear audit trail for security audits.

In some arrangements, the fourth highest or fourth best configuration level can be commitments made by the entity. For example, commitments made by the entity could be encapsulated in a policy document that outlines the entity's approach to data encryption, specifying the algorithms and key management practices to be adhered to. In another example, commitments might be demonstrated through the publication of a regular security newsletter that includes the entity's ongoing efforts to maintain and enhance its cybersecurity posture, fostering transparency and accountability.

In some arrangements, the identifying process includes acquiring and verifying cryptographic proof of provenance based on digital signatures and transaction records. For example, the modeler 708 could use digital signatures to confirm the authenticity of a newly implemented access control list before recording it. In some arrangements, the modeler 708 updates second, third, or fourth-level configurations in response to updates in operational or security actions. For example, if an entity revises its data retention policy, the modeler 708 could update the relevant configurations to reflect this change, ensuring the ledger remains current and accurate.

In some arrangements, the passport and controls (PC) system 706 can prepare and report cyber incidents according to various governmental regulations. In some arrangements, the PC system 706 can determine when a cyber incident is substantial based on a government regulation, which could range from significant losses in the confidentiality, integrity, or availability of information systems, to serious impacts on operational safety, disruptions in business activities, or unauthorized access stemming from third-party compromises. Upon identifying such incidents, the PC system 706 can gather a set of data necessary for reporting. This data collection can encompass correspondence with threat actors, indicators of compromise, relevant log entries, forensic artifacts, network data, and information on how the threat actor compromised the system, among others. Additionally, the PC system 706 can track and document data related to any ransom payments, including the amount, the decision process, and the aftermath of the payment.

For example, a substantial cyber incident can lead to one or more of the following: a substantial loss of confidentiality, integrity or availability of a covered entity's information system or network, a serious impact on the safety and resiliency of a covered entity's operational systems and processes, a disruption of a covered entity's ability to engage in business or industrial operations, or deliver goods or services, unauthorized access to a covered entity's information system or network, or any nonpublic information contained therein, that is facilitated through or caused by a: compromise of a cloud service provider, managed service provider, or other third-party data hosting provider; or supply chain compromise.

Furthermore, in some arrangements, the PC system 706 can also be configured to manage and submit follow-up reports dynamically. This can include generating supplemental reports when new or different information about a cyber incident becomes available or if additional ransom payments are made. Thus, the PC system 706 can provide relevant data such that it is accurately preserved and maintained for a minimum period (e.g., set at two years), following the submission of the most recent report. This data preservation can include the initial detection of a compromise to the full resolution and analysis of the incident, including any payments made and the identification of exploited vulnerabilities.

In some arrangements, the operational framework of the PC system 706 aligns with the need for timely and incident reporting and data preservation to assist organizations in maintaining compliance with regulatory requirements. By automating the process of collecting, preserving, and reporting information about cyber incidents and ransom payments, the PC system 706 reduces manual effort and enhances the accuracy of the information reported. This approach can be used to fulfil legal and regulatory obligations and strengthen the overall cybersecurity posture of organizations by ensuring a structured response to incidents and facilitating continuous improvement through incident analysis and feedback.

In some arrangements, the preservation requirement of the PC system 706 can include correspondence with the threat actor, regardless of the forum or method; indicators of compromise; relevant log entries; relevant forensic artifacts; network data; data and information that may help identify how a threat actor compromised or potentially compromised an information system; system information that may help identify exploited vulnerabilities; information about exfiltrated data; data or records related to the disbursement or payment of any ransom payment; and any forensic or other reports concerning the incident, whether internal or prepared for the covered entity by a cybersecurity company or other third-party vendor.

Verified Intelligence

Figure 9:
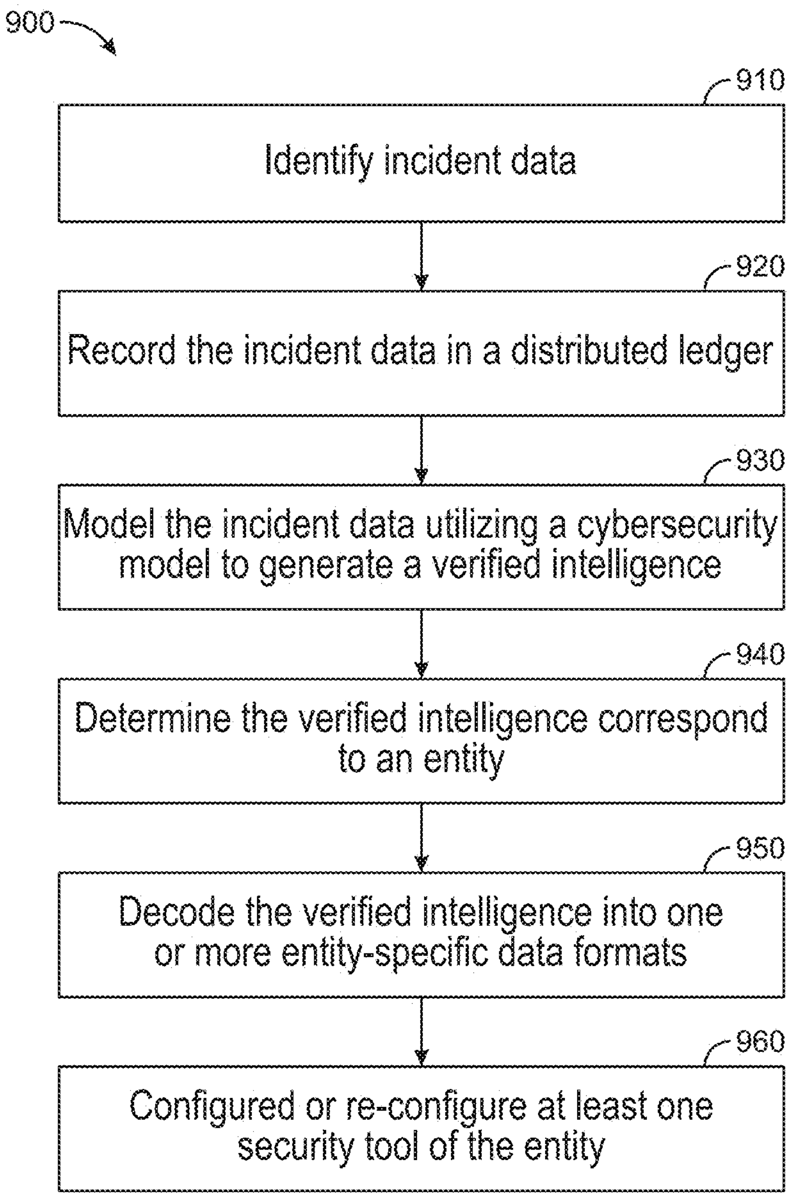
FIG. 9 depicts a flowchart of a method for improving cybersecurity protections across the plurality of entities, according to some arrangements.

FIG. 9 depicts a flowchart of a method 900 for improving cybersecurity protections across the plurality of entities. At least the computing/security architecture shown and described regarding FIG. 7 can perform method 900 according to present implementations.

In a broad overview of method 900, at block 910, the one or more processing circuits (e.g., response system 130 of FIG. 7) can identify incident data. At block 920, the one or more processing circuits can record incident data in a distributed ledger. At block 930, the one or more processing circuits can model the incident data utilizing a cybersecurity model to generate a verified intelligence. At block 940, the one or more processing circuits can determine the verified intelligence correspond to an entity. At block 950, the one or more processing circuits can decode the verified intelligence into one or more entity-specific data formats. At block 960, the one or more processing circuits can configure or reconfigure at least one security tool of the entity. In some embodiments, some, or all operations of method 900 may be performed by one or more processors executing on one or more computing devices, systems, or servers. In various embodiments, each operation may be re-ordered, added, removed, or repeated.

At block 910, the processing circuits identify or collect incident data corresponding with a cybersecurity incident. In some arrangements, the processing circuits can scan network traffic and log files for abnormal patterns. For example, identifying can include parsing security logs for unauthorized access attempts. In another example, collecting can include aggregating data from intrusion detection systems. Furthermore, the cybersecurity incident may include a detected breach or unauthorized data access attempt. Additionally information related to identifying and collecting incident data is described above with reference to FIGS. 22-24.

At block 920, the processing circuits record the incident data in a distributed ledger or data source. In some arrangements, the processing circuits can record the incident data in the distributed ledger (e.g., WEB3 data source) by encrypting and hashing the data to ensure integrity and confidentiality. For example, the process could include generating a unique cryptographic hash for each incident record. In some arrangements, the processing circuits can record the incident data in the data source (e.g., WEB2 data source) by structuring the data into predefined formats for consistency and easy retrieval. For example, the data could be formatted according to JSON or XML schemas. Furthermore, recording can include timestamping each incident entry to establish a chronological order of events.

At block 930, the processing circuits can analyze the incident data utilizing a cybersecurity model to generate one or more verified intelligences corresponding to at least one cybersecurity threat. In some arrangements, the cybersecurity model includes at least one of heuristic analysis, pattern identification, anomaly identification, or threat projections. For example, the processing circuits can apply machine learning techniques to the incident data to identify patterns indicative of types of cyber threats. For example, heuristic analysis could be employed to compare incident data against known threat signatures. In another example, anomaly detection algorithms might identify deviations from baseline network behavior as potential threats. In yet another example, threat projections could be generated by extrapolating current data trends. The cybersecurity model can be executed by processing circuits in response to the cybersecurity incident. That is, the model can dynamically adjust its parameters based on the nature and severity of the incident. For example, the model could prioritize incident data indicating a zero-day vulnerability.

In some arrangements, the one or more verified intelligences include at least one of threat indicators, vulnerability patches, or mitigation strategies corresponding to the at least one cybersecurity threat. For example, the verified intelligence might include a digital signature of a malware file for antivirus software to block. In another example, it could recommend configuration changes to firewall rules to prevent similar incidents. Additionally, the firmographic data, the identified security gaps, and the existing protection guards can correspond to an entity profile of each of the plurality of entities. In some arrangements, an entity profile can include the technological infrastructure and software dependencies of an entity. For example, it can list network endpoints and their respective security statuses. Furthermore, the verified intelligences can guide the refinement of entity-specific cybersecurity measures. For example, they might suggest enhancements to encryption practices based on identified vulnerabilities.

At block 940, the processing circuits can determine the one or more verified intelligences corresponds to at least one of the plurality of entities based on at least one of firmographic data, identified security gaps, or existing protection guards. In some arrangements, the generated verifiable intelligence can be cross-referenced and analyzed against entity data to determine, for example, if the cybersecurity threat is exploitable or could present a cyber vulnerability to one or more entities. For example, matching the threat indicators to network architectures or operating systems prevalent within the target entities. In another example, correlating vulnerability patches to software versions identified in the firmographic data of entities. That is, the processing circuits can use incident data collected during the claims process with a distributed ledger and automation to automatically determine the correct verified intelligence for the correct businesses who need it, based on firmographic, gaps, and safeguard matching, with technology translated and usable data that can auto-change configurations of security tools to defend against these verified relevant threats. For example, automation to automatically determine can include analyzing historical breach data against current entity profiles to predict susceptibility. That is, determining the correct business includes evaluating entity-specific IT environments against the threat model to ensure relevance. For example, comparing the unique digital footprint of each entity against the incident pattern to identify potential targets.

In some arrangements, the firmographics of the entity can include, but is not limited to, industry sector, size, geographical location, and technology stack. For example, the verified intelligence can be determined for an entity using the firmographics when matching industry-specific threats to entities within the same sector. Additionally, the gaps of the entity can include, but is not limited to, outdated software, missing patches, or weak encryption protocols. For example, the verified intelligence can be determined for an entity using the gaps when identifying entities running software versions vulnerable to a newly discovered exploit. Furthermore, the safeguards of the entity can include, but is not limited to, firewalls, antivirus software, and intrusion detection systems. For example, the verified intelligence can be determined for an entity using the safeguard when matching mitigation strategies to existing security infrastructure. Accordingly, the various data of the entity can be matched to the verified intelligence to customize cybersecurity advice and action plans, ensuring that recommendations are actionable and address the entity's security needs.

At blocks 950 and 960, the processing circuits can decode the one or more verified intelligences into one or more entity-specific data formats of the at least one of the plurality of entities and configure or re-configure at least one security tool of the at least one of the plurality of entities. For example, configuration or re-configuration can include protecting the at least one of the plurality of entities from the at least one cybersecurity threat. Additionally, decoding into the one or more entity-specific data formats can include translating the one or more verified intelligences into formats compatible with the at least one security tool of the at least one of the plurality of entities. For example, decoding could include converting threat indicators into firewall rule updates to block malicious IP addresses. In another example, decoding could include translating vulnerability patches into update commands for antivirus software. That is, decoding transforms threat data into actionable security measures tailored to each entity's systems and protection tools.

In some arrangements, configuring the security tool of an entity can include setting up intrusion detection systems to monitor for patterns of malicious activity identified in the verified intelligence. For example, adjusting sensitivity levels of the detection algorithms based on the severity of the threat. In another example, configuring could include updating access control lists to restrict traffic from suspect sources. In some arrangements, re-configuring the security tool of an entity can include modifying existing firewall rules to address new vulnerabilities revealed by the verified intelligence. For example, adding or removing rules to better protect against the identified threats.

In some arrangements, the processing circuits can automatically generate and apply patches or updates to the at least one security tool. Generating can include creating custom patches for proprietary software based on the vulnerabilities identified. For example, compiling code changes that neutralize a newly discovered exploit. In some arrangements, applying the patches or updates can include remotely pushing updates to endpoint protection tools across the entity's network. For example, automating the deployment of patches during off-peak hours to minimize disruption. That is, the security tool can be kept up-to-date with the latest defenses against emerging threats. For example, ensuring devices and software within the entity's network are equipped with the latest protective measures.

Passport Data Package

In some arrangements, method 900 can further include a method for generating passport data packages (e.g., passport data package 802 and 806 of FIG. 8) with decentralized proof of controls attached for the entities proof of performance. It should be understood that the generation of passport data packages described with reference to method 900 can be executed and completed independently of method 900. For ease of understanding, the generation of passport data packages will be referred to in steps.

Generally, the passport data package can be a digitally encrypted file encapsulating the entity's identity and its cybersecurity practices. For example, the passport data package can include embedded digital certificates and cryptographic proofs. Furthermore, the passport data package can be used as a verifiable credential for demonstrating compliance with cybersecurity standards and practices to partners and regulators.

In some arrangements, at step 1, the processing circuit can generate a decentralized identity passport for each of a plurality of entities. Generation can include compiling a record of the entity's cybersecurity protocols and identity verification documents. For example, incorporating business registration documents and cybersecurity policy documents into the passport. Alternatively or in combination, generation can include digitally signing the compiled documents to ensure authenticity and integrity. For example, using SHA-256 for hashing and RSA for digital signatures. In some arrangements, generating the decentralized identity passport includes using a public-private key pair unique to each entity of the plurality of entities. For example, the public key can be recorded on the distributed ledger and the private key remains confidential to the entity.

At step 2 of the generation of the passport data package, the processing circuits can attach or embed a plurality of proof of controls to the decentralized identify passport of an entity of the plurality of entities, the plurality of proof of controls corresponding to one or more cybersecurity protection actions implemented by the entity. In some arrangements, attaching could include digitally linking cybersecurity protection actions documentation to the passport. For example, appending metadata of security audits and certifications to the passport. Furthermore, the processing circuits can sign the plurality of proof of controls using a digital signature scheme before attaching the plurality of proof of controls to the decentralized identity passport. For example, employing ECDSA for digital signatures. In some arrangements, embedding could include integrating QR codes or unique identifiers that link to proofs of control hosted securely online. For example, QR codes that direct to encrypted online repositories containing audit logs. The cybersecurity protection actions could include network encryption enhancements and multi-factor authentication implementation. That is, the entity can demonstrate compliance with industry security standards. Furthermore, the proofs of control are verified and timestamped to ensure their validity.

In some arrangements, the processing circuits can validate the one or more cybersecurity protections of each of the plurality of entities and record the validation on the distributed ledger or data source as a new exchange linked to the decentralized identity passport. That is, validating the one or more cybersecurity protections can include comparing the one or more cybersecurity protection actions to a predefined set of security standards or benchmarks. In some arrangements, the predefined set of security standards or benchmarks can include ISO/IEC 27001 and NIST cybersecurity frameworks. For example, comparing entity's cybersecurity measures against these frameworks to ensure compliance. In some arrangements, recording can include encrypting and hashing the validation data before storage. For example, using blockchain technology to immutably store the validation results. That is, the new exchange linked to the decentralized identity passport can include a timestamped record of the validation, along with references to the standards or benchmarks used for validation. For example, a blockchain transaction containing validation metadata and outcomes.

At step 3 of the generation of the passport data package, the processing circuits can record the plurality of proof of controls on a distributed ledger or data source as one or more exchanges linked to the decentralized identity passport. In some arrangements, recording the proof of controls on the distributed ledger can include creating a smart contract for each proof of control, ensuring traceability and non-repudiation. For example, deploying smart contracts on Ethereum to represent each proof of control. In some arrangements, recording the proof of controls on the data sources can include utilizing secure cloud storage services with access control lists tailored for privacy and security. For example, storing proofs of control in buckets with encrypted data transfer. Additionally, linking to the decentralized identity passport can include assigning a unique identifier to each proof of control that corresponds to the passport's digital identity. For example, using UUIDs to link proofs of control to the passport within the distributed ledger. In another example, creating hyperlinks within the passport document that lead to the recorded proofs of control on the ledger.

In some arrangements, the processing circuits can monitor environmental data of a plurality of computing systems of the plurality of entities with the decentralized identity passport. For example, utilizing network monitoring tools to detect and record changes in firewall settings or antivirus software updates. That is, the decentralized identity passport can be used by the processing circuits to authenticate and authorize access to monitored data. For example, the environmental data can correspond to the decentralized identity passport by mapping network traffic patterns and system performance metrics to the passport's unique identifier. The environmental data monitored can include at least one, but is not limited to, network traffic, system performance metrics, software integrity, or security event logs corresponding with the plurality of computing systems. For example, monitoring can include analyzing logs for indicators of compromise or unauthorized access attempts.

In some arrangements, in response to determining at least one of the plurality of entities out of compliance with a cybersecurity parameter, the processing circuits can issue an alert to at least one of the plurality of entities including a recommendation to update the one or more cybersecurity protection actions. In some arrangements, the alert can specify the non-compliance issue and provide steps for remediation. Furthermore, the recommendation can include best practices for updating security protocols or installing software patches. For example, the recommendation can be generated based on real-time threat intelligence and tailored to the entity's infrastructure and previously recorded cybersecurity actions.

In some arrangements, the processing circuits can update the decentralized identity passport to include additional proof of controls based on successful validation of a newly implemented cybersecurity protection actions by the entity of the plurality of entities. In some arrangements, an update to the decentralized identity passport can include appending new proofs of control and re-validating the passport's overall security status. For example, adding digital records of recently passed security audits or newly implemented security measures. Additionally, the additional proof of controls can be determined by assessing the impact and effectiveness of the newly implemented measures. For example, successful validation of a newly implemented cybersecurity protection actions by the entity of the plurality of entities can include conducting a thorough review of the updated security protocols, supported by external audit findings and internal performance metrics. In another example, updating the entity's cybersecurity profile within the passport to reflect the latest security posture and compliance status.

In some arrangements, the passport data package can serve as a dynamic, verifiable credential for entities to demonstrate their cybersecurity posture and compliance with relevant standards. Entities could present the passport data package, which includes digital certificates, cryptographic proofs, and a record of cybersecurity controls, to partners, regulators, or clients. Upon presentation, the recipient could verify the authenticity and integrity of the passport using public keys recorded on a distributed ledger, ensuring the digital signatures and cryptographic hashes match the entity's reported cybersecurity measures. Verification could involve checking the digital signatures against the public keys and ensuring the cryptographic proofs align with the stated security controls and actions. This process can be facilitated by software or digital platforms capable of reading and validating the contents of the passport data package, ensuring the entity adheres to the claimed security practices and standards. Such verification could support trust in digital transactions, facilitate secure partnerships, and streamline compliance audits by providing a transparent, immutable record of an entity's cybersecurity efforts.

ConfigLock Data Package

In some arrangements, method 900 can further include a method for generating ConfigLock data packages (e.g., ConfigLock data package 804 of FIG. 8) to store configs decentralized to recover, for example during an incident affecting the entities computing structure or network. It should be understood that the generation of ConfigLock data packages described with reference to method 900 can be executed and completed independently of method 900. For case of understanding, the generation of ConfigLock data packages will be referred to in steps.

Generally, the ConfigLock data package can be a secure, encrypted container for storing various configuration settings and proofs of compliance. For example, the ConfigLock data package can include embedded digital signatures and cryptographic hashes to ensure the integrity and authenticity of the data. Furthermore, the ConfigLock data package can be used as a means to quickly restore system configurations to a known secure state in the event of a cybersecurity incident, facilitating rapid recovery and minimizing downtime.

In some arrangements, at step 1, the processing circuit can identify a plurality of first level configurations corresponding to at least one of an operational or security action performed on the a plurality of computing systems of an entity of a plurality of entities. Identifying can include scanning and analyzing system logs and configuration files for changes. For example, an operational action can be an update to server software. In another example, a security action can be the application of a new firewall rule.

In some arrangements, identifying of step 1 can include (1) accessing one or more data channels of a plurality of computing systems of an entity of a plurality of entities, (2) identifying, by the one or more processing circuits, at least one of an operational or security action performed on the plurality of computing systems of the entity of the plurality of entities, and (3) modelling the at least one of an operational or security action using a cryptographic proof of provenance model to generate a plurality of first level configurations. Specifically, accessing can include connecting to system and application logs, network traffic analyses, and security event management systems. For example, aggregating data from endpoint detection and response (EDR) systems and security information and event management (SIEM) solutions. Additionally, identifying the operation or security action can include parsing and categorizing event logs based on predefined criteria. For example, classifying actions as routine maintenance or security enhancements or verifying the cryptographic proof of provenance based on one or more digital signatures. Furthermore, modeling can include applying algorithmic analysis to establish the chronological sequence and interdependencies of actions. That is, employing data science techniques to discern patterns that validate the authenticity and integrity of the actions. For example, utilizing blockchain technology to create an immutable record of configurations. In another example, applying machine learning models to predict the impact of configuration changes on system security. In some arrangements, the cryptographic proof of provenance model can be a heuristic algorithm or artificial intelligence model that evaluates the reliability and security implications of each action. For example, assessing the compatibility of new software updates with existing security protocols. In some arrangements, the cryptographic proof of provenance model can be a statistical analysis algorithm configured to identify outliers in configuration changes that may indicate unauthorized or malicious alterations. In some arrangements, the cryptographic proof of provenance model can be a cybersecurity analysis algorithm configured to assess the efficacy of new security configurations against emerging threat vectors. For example, simulating attack scenarios to evaluate the resilience of firewall settings.

In some arrangements, a first level configuration can be system-level operations or security actions performed on the plurality of computing systems, and a second level configurations can be secondary or maintenance operations or security actions on the plurality of computing systems. For example, a first level configuration could be the implementation of a new network encryption protocol. That is, the first level configurations can include at least one of network settings, security tool settings, access control lists, endpoint protection settings, or encryption keys. In another example, a second level configuration could pertain to the scheduling of regular system backups. Accordingly, the configurations can ensure security and operational efficiency across the entity's computing systems.

Alternatively or in combination, the configurations can be hierarchical according to the type of proof provided by the entity. For example, a first level configuration can be cryptographic proof of provenance obtained by the one or more processing circuits from the entity and programmatically. In this example, the proof of provenance might verify the source and integrity of a new software application before installation. Additionally, a second level configuration can be a validation by one or more authorized entities, for example, through third-party security audits. Furthermore, a third level configuration can be documented evidence of an action, for example, logs showing the successful application of a security patch. Moreover, a fourth level configuration can be commitments made by the entity, for example, a pledge to adhere to data protection standards. Generally, the processing circuits can prioritize or weight the first level or better level configurations to emphasize their importance in maintaining system integrity. That is, configurations at higher levels could receive more scrutiny during the verification process.

In some arrangements, the processing circuits can verify the cryptographic proof of provenance based on one or more digital signatures and transaction records stored within the distributed ledger or data source. For example, verifying the digital signature of a software update to confirm its authenticity. Furthermore, the processing circuits can generate the cryptographic proof of provenance for the plurality of first level configurations. That is, the generation can include creating a secure hash of the software package. For example, using SHA-256 to ensure the integrity of the configuration data.

In some arrangements, the processing circuits can update at least one of the plurality of second level configurations, the plurality of third level configurations, or the plurality of fourth level configurations, in response to an update in the operational or security action performed on the plurality of computing systems of the entity. For example, adjusting firewall settings in response to new threat intelligence. In another example, updating access control lists to restrict access to sensitive data following a policy change. That is, updates can include the recalibration of security measures to align with the latest security landscape and entity policies.

At step 2 of the generation of the ConfigLock data package, the processing circuits can encrypt or tokenize the plurality of first level configurations. In some arrangements, encrypting can include using AES-256 to secure configuration data against unauthorized access. For example, encrypting network configuration settings to prevent tampering. In some arrangements, tokenizing can include converting configuration settings into tokens stored on the blockchain, ensuring confidentiality and integrity. For example, representing access control settings as tokens. Accordingly, the ConfigLock data package can be securely stored and readily accessible by entities possessing the correct decryption or detokenization keys.

At step 3 of the generation of the ConfigLock data package, the processing circuits can record the plurality of first level configurations on the distributed ledger or data source. For example, recording the configurations on a distributed ledger can include hashing each configuration setting and storing it on a blockchain to ensure tamper-proof records. In another example, recording the configurations on a data source can include saving them in a secure, encrypted database with restricted access.

In some arrangements, the processing circuits can providing a recovery key to the entity. For example, the recovery key can configured to allow the recovery of the encrypted or tokenized plurality of first level configurations by the entity. That is, the recovery key can facilitate secure and controlled access to the stored configurations. For example, a recovery key can be generated by the processing circuits by employing a secure key generation algorithm. For example, using RSA encryption to create a unique recovery key for each entity. In another example, distributing the recovery key to authorized personnel through a secure channel.

In response to receiving the recovery key, the processing circuits can provide the plurality of first level configurations from the distributed ledger or data source based on decrypting or detokenizing the plurality of first level configurations using the recovery key. In some arrangements, providing or transmitting the configurations can include securely sending the decrypted or detokenized configurations over a secure communication channel. For example, using TLS to protect the transmission of configuration data. That is, the configurations allow the entity to restore its systems to a secure state following an incident. In some arrangements, the processing circuits can regenerate the recovery key based on a detection of a potential compromise or at predefined intervals. For example, automatically updating the recovery key annually or following the detection of a security breach. In another example, implementing a multi-factor authentication process for recovery key regeneration to enhance security.

In some arrangements, to restore from a ConfigLock data package, the entity could first authenticate using a predetermined recovery key to access the encrypted package. Upon successful authentication, the entity could decrypt the package, which contains serialized configuration settings, digital signatures, and cryptographic hashes of the original state of system configurations. These configurations could include network settings, firewall rules, access control lists, and software version information. The restoration process could include deserializing the configuration data and programmatically applying it to the respective systems and devices, ensuring that each component is reverted to its verified secure state. This process could include automated scripts or configuration management tools that validate each setting's integrity using the included cryptographic hashes before applying them, ensuring the restoration does not inadvertently introduce vulnerabilities.

In some arrangements, an NFT can be minted for each Passport Data Package or ConfigLock Data Package, encapsulating a unique digital representation of an entity's cybersecurity credentials or configuration settings. The minting process can include the processing circuits generating a digital hash of the package's contents, including digital certificates, cryptographic proofs, and configuration data, and embedding this hash within the NFT. Following the minting, the processing circuits can record the NFT on a distributed ledger, assigning a unique identifier to each NFT that correlates with the respective Passport or ConfigLock Data Package. Furthermore, the processing circuits facilitate the verification of the NFT by external parties, allowing for the authentication of the encapsulated data against the blockchain to confirm its validity and integrity. This mechanism facilitates entities to prove compliance with cybersecurity standards and the secure status of their system configurations in a decentralized, tamper-proof manner. Accordingly, by integrating NFT technology with method 900's framework and leveraging insights from FIG. 10, the processing circuits can utilize blockchain to enhance cybersecurity management.

In some arrangements, generative AI can be employed in creating and validating both Passport Data Packages and ConfigLock Data Packages within the framework of method 900. Initially, generative AI can automate the compilation of an entity's cybersecurity protocols and identity verification documents. This automation can include parsing through databases to extract relevant information, synthesizing cybersecurity policy documents, and integrating business registration documents. Furthermore, generative AI can assist in digitally signing these compiled documents, employing cryptographic algorithms to ensure their authenticity and integrity. During the second steps, generative AI can be used in attaching or embedding a plurality of proof of controls to the decentralized identity passport. The generative AI can analyze the cybersecurity protection actions implemented by the entity, generating metadata for each action. This metadata can then be digitally linked to the passport or embedded as QR codes or unique identifiers, directing to encrypted online repositories containing audit logs and certifications. Moreover, generative AI can optimize the digital signature process, selecting a secure and efficient digital signature scheme based on the latest advancements in cryptographic technology. The AI can also dynamically update these proofs of control based on new cybersecurity actions or validations, ensuring that the passport data package remains current and reflective of the entity's compliance status. In validating the cybersecurity protections of entities, generative AI can compare the documented cybersecurity protection actions against a predefined set of security standards or benchmarks, such as ISO/IEC 27001 and NIST frameworks. This can include an analysis of the entity's cybersecurity measures, utilizing machine learning algorithms to identify discrepancies or areas of non-compliance. Following validation, GAI can automate the recording of this data on a distributed ledger or data source, encrypting and hashing the validation results for security.

To safeguard the integrity and confidentiality of Passport Data Packages and ConfigLock Data Packages against potential future quantum computing threats, the processing circuits can implement quantum-resistant cryptographic algorithms. These algorithms can be designed to withstand the decryption capabilities of quantum computers, ensuring that digital signatures, cryptographic proofs, and the encryption of data remain secure. By incorporating post-quantum cryptography into the encryption process, the processing circuits secure the data against advanced computational attacks, maintaining the long-term viability and security of the stored information. The processing circuits can also integrate decentralized identity verification mechanisms to enhance the security and efficiency of verifying Passport Data Packages. Utilizing blockchain technology, this approach can be used by entities to prove their identity and the authenticity of their digital credentials autonomously, without the need for centralized verification authorities. Through this mechanism, the processing circuits facilitate a secure, privacy-preserving method of identity verification, allowing entities to manage their digital identities and associated proofs of control on a blockchain. In some arrangements, the processing circuits can use machine learning and statistical modeling to improve anomaly detection capabilities within the cybersecurity framework. These systems can be used to analyze datasets in real time, detecting unusual patterns that may indicate cybersecurity threats or vulnerabilities. By employing algorithms that learn from historical data, the processing circuits equip entities with dynamic monitoring tools that adapt to new and evolving threats.

Figure 10:
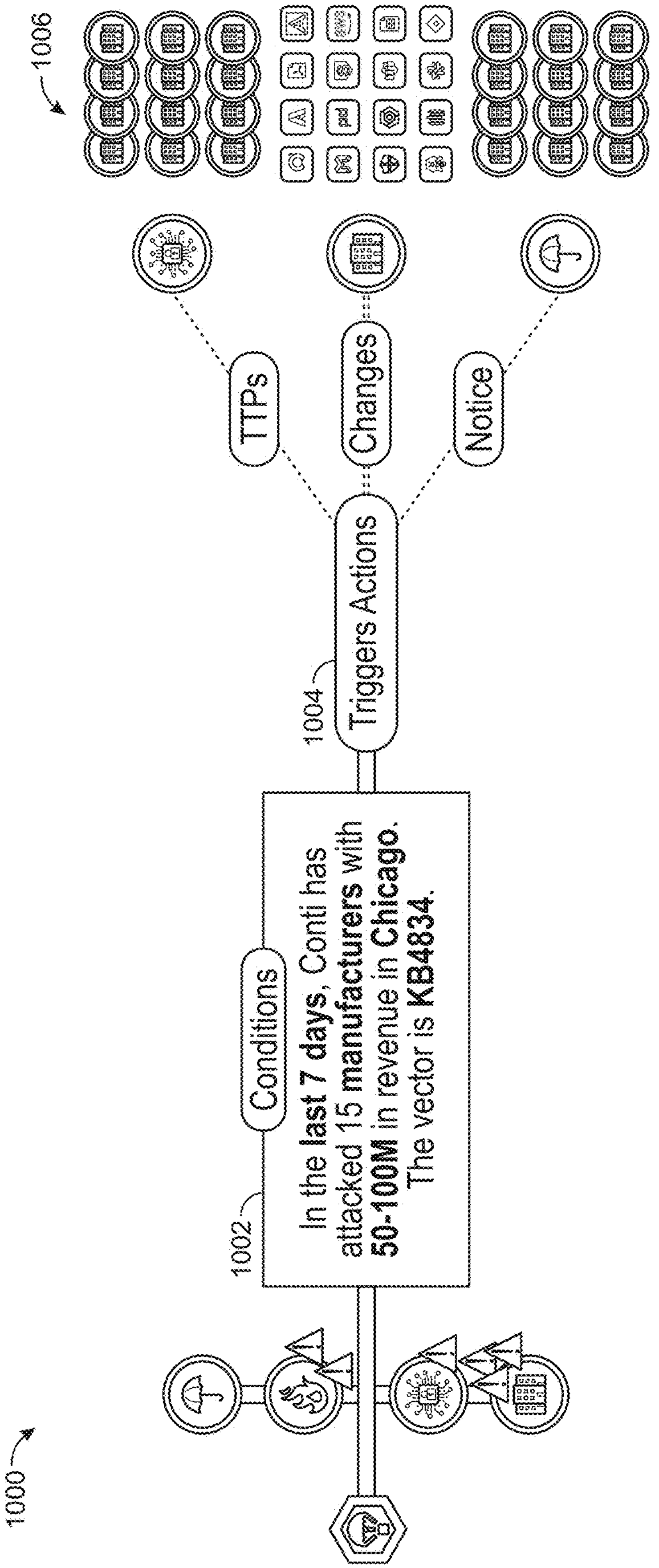
FIG. 10 depicts a block diagram of another architecture of certain systems or devices of FIG. 7, according to some arrangements.

Referring now to FIG. 10, a block diagram depicting a cyber threat intelligence (CTI) model 1000 to modify security tools, according to some embodiments. The response system 130 of FIG. 7 can be configured to perform the various actions and functions described in FIG. 10. At block 1002, a processing circuit of the response system 130 can be configured to determine various cyber threats such as phishing attacks, ransomware, and DDOS attacks. For example, the depiction of a locked processor with an explanation point could indicate. Additionally, the processing circuits can determine one or more conditions. For example, the cyber threat intelligence (CTI) model 1000 depicts the condition that "In the last 7 days, Conti has attached 15 manufacturers with 50-100 M in revenue in Chicago. The vector is KB4B4834." In this example, the affected sector is manufacturing, and the impact location is Chicago. In particular, the vector could be a malware signature or attack methodology.

Next, at block 1004, the processing circuits of the response system 130 of FIG. 7 can determine or model one or more trigger actions to perform on the security tools of companies, security vendors, and insurers/brokers. The security tools can be firewalls, intrusion detection systems, and antivirus software. In some arrangements, the trigger actions can be, but are not limited to, TTPs, changes, notices, and so on. The processing circuit of the response system 130 can model and determine trigger actions by analyzing threat intelligence and predicting likely attack vectors. For example, the processing circuits can determine TTPs of the security tools to address emerging threats identified through real-time data analysis. In another example, the processing circuit can determine changes of the security tools to enhance their responsiveness to threat indicators. In yet another example, the processing circuits can generate notices to be provided to the security to inform about necessary updates or patches. At block 1006, the security tools of the various entities can implement the trigger actions. For example, automatic updates to threat definitions. In yet another example, configuration changes to optimize threat detection and response. In some arrangements, the TTPs can be provided to an entity, the changes can be provided to a vendor, and notices can be provided to a protection entity.

For example, in the context of the CTI model's scenario, Conti, a cybercriminal group, has launched targeted attacks against 15 manufacturing companies within the Chicago area, all of which report revenues between 50 to 100 million dollars. This selection indicates Conti's preference for industries with significant financial turnovers but potentially weaker cybersecurity measures compared to larger conglomerates. The vector, identified as KB4B4834, would indicate a malware or attack methodology that has been previously associated with Conti's operations, for example, exploiting vulnerabilities that these mid-sized entities have overlooked. This incident can be modeled by the processing circuits to customize cybersecurity responses that are predictive, leveraging real-time threat intelligence to anticipate and mitigate such targeted attacks. The use of a vector such as KB4B4834 can allow cybersecurity systems (e.g., response system 130 of FIG. 7) to trace the attack pattern back to its source, allowing for a more directed and efficient countermeasure implementation. In this example, the cybersecurity model's is used to provide actionable intelligence based on firmographic data and threat vectors for the affected manufacturing entities in Chicago.

In some arrangements, the CTI model 1000 of FIG. 10 can be incorporated into various methods through its functionality for dynamically adapting security tools in response to cyber threat intelligence. For example, the CTI model 1000 can be incorporated into a process for capturing, verifying, and updating the cybersecurity capabilities of an organization, including configurations and technologies in use. The CTI model 1000, as part of this method, can determine the nature of cyber threats (e.g., phishing, ransomware) and model trigger actions for security tool adjustments. This is similar to steps of receiving capabilities, verifying their state, and adjusting configurations based on identified needs. Further, the CTI model 1000 can be shown in the analysis and application phases where cyber threats are analyzed, and appropriate responses are formulated. For example, the CTI model 1000 can provide real-time threat intelligence that informs the process of verifying the state of cybersecurity capabilities and deciding on adjustments. When the CTI model 1000 identifies a threat, such as a malware vector, mechanisms for changing state or configuration can be executed, providing an immediate and informed response to the identified threat. Thus, the integration of CTI model 1000 within the broader scope of other cybersecurity processes and methods improves the capability of the disclosed systems and methods to dynamically adapt cybersecurity measures to respond to threats. That is, by leveraging threat intelligence to inform verification and adjustment steps of cybersecurity capturing, updating, and verification methods, the CTI model 1000 can facilitate the use of security configurations and technologies that remain effective against current cyber threats.

Cyber Resilience Tokenization

Figure 11:
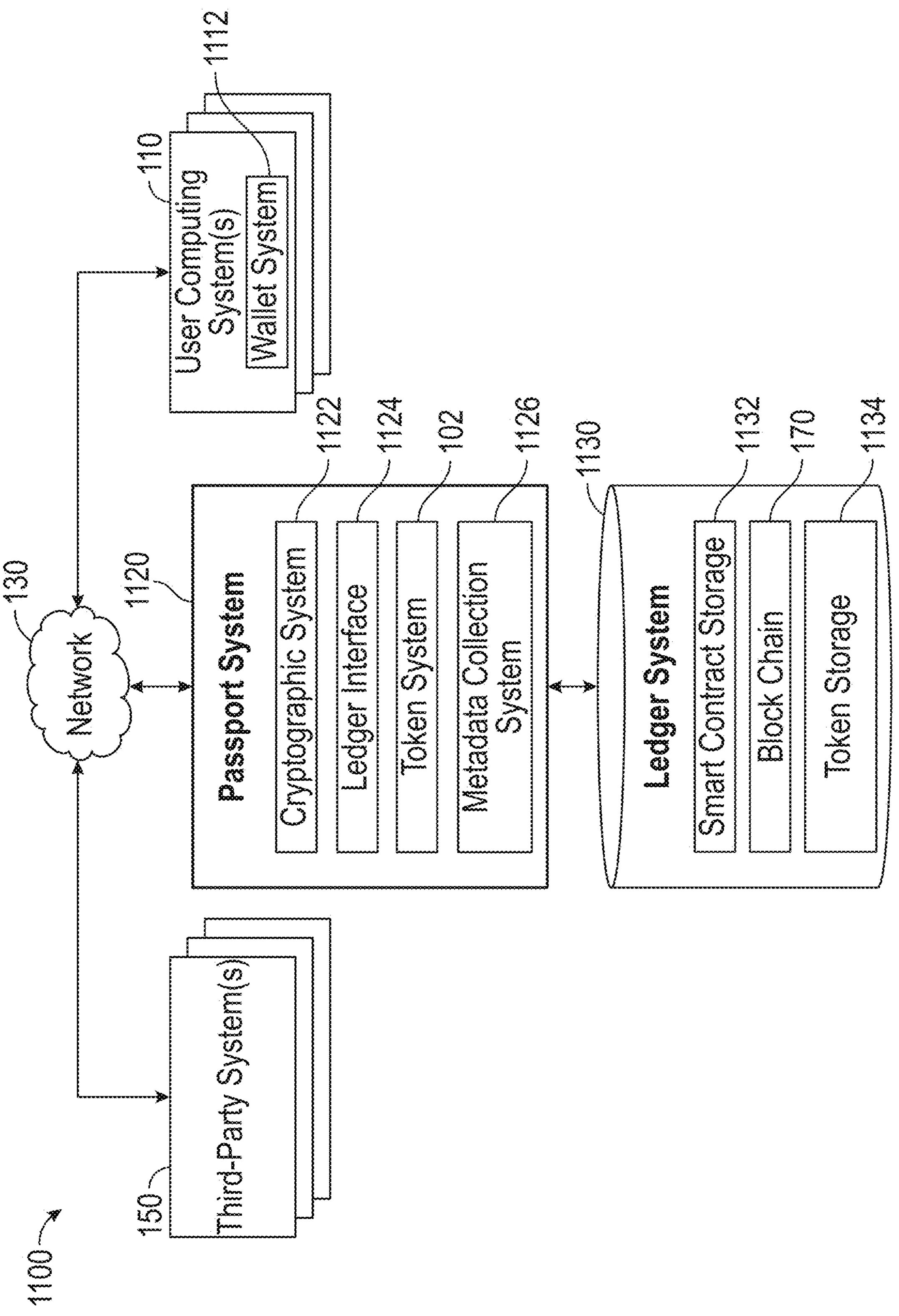
FIG. 11 depicts a block diagram of an implementation of a system for cyber resilience tokenization, according to some arrangements.

Referring to FIG. 11, a block diagram of an implementation of a system for cyber resilience tokenization is shown, according to some arrangements. The implementation shown in FIG. 11 can include user computing system(s) 110, third-party system(s) 150 (also referred to herein as "third-party devices 150", "third party systems 150", and "third party devices 150"), a passport system 1120, and a ledger system 1130. In some arrangements, the user computing system(s) 110 can include a wallet system 1112. In some arrangements, the passport system 1120 can include a cryptographic system 1122, a ledger interface 1124, a token system 102, and a metadata collection system 1126. In some arrangements, the ledger system 1130 can include smart contract storage 1132, blockchain 170, and token storage 1134. These components can be interconnected through a network 120 that supports secure communications profiles (e.g., TLS, SSL, HTTPS, etc.). In some arrangements, the passport system 1120 can incorporate the same or similar features and/or functionality as described regarding the response system 130 of FIG. 1. Although the various computing elements of FIG. 11 can be described in the singular form (e.g., user computing system 110, third-party system 150, etc.), it should be understood that the implementation shown in FIG. 11 can include two or more of any device/system described herein (e.g., two or more user computing system(s) 110, two or more third-party system(s) 150, etc.).

Each system or device of FIG. 11 may include one or more processors, memories, network interfaces (sometimes referred to herein as a "network circuit") and user interfaces. The memory may store programming logic that, when executed by the processor, controls the operation of the corresponding computing system or device. The memory may also store data in databases. For example, memory may store programming logic that when executed by a processor within a processing circuit, causes a database to update parameters or store a system or event log. The network interfaces may allow the computing systems and devices to communicate wirelessly or otherwise. The various components of devices in environment 100 may be implemented via hardware (e.g., circuitry), software (e.g., executable code), or any combination thereof. Devices, systems, and components in FIG. 11 can be added, deleted, integrated, separated, and/or rearranged in various embodiments of the disclosure.

Generally, the user computing system(s) 110, third-party system(s) 150, passport system 1120, and ledger system 1130, wallet system 1112, cryptographic system 1122, ledger interface 1124, token system 102, metadata collection system 1126, smart contract storage 1132, blockchain 170, token storage 1134, and/or network 120 can include one or more logic devices, which can be one or more computing devices equipped with one or more processing circuits that run instructions stored in a memory device to perform various operations. The processing circuit can be made up of various components such as a microprocessor, an ASIC, or an FPGA, and the memory device can be any type of storage or transmission device capable of providing program instructions. The instructions may include code from various programming languages commonly used in the industry, such as high-level programming languages, web development languages, and systems programming languages. The user computing system(s) 110, third-party system(s) 150, passport system 1120, and other various components of FIG. 11 may also include one or more databases for storing data that receive and provide data to other systems and devices on the network 120.

Generally, the passport system 1120 can execute and/or be utilized to execute various processes and/or tasks corresponding with modeling cyber resilience data. For example, the passport system 1120 can provide a single sign-on gateway (e.g., using an identity management system like AuthO) facilitating access to a user's associated security posture, threat, incident, and insurance data sets using data sets encapsulated within various tokens. For example, the passport system 1120 can generate a token (e.g., a passport) linked to various additional tokens and further linked to a control structure restricting access to one or more of the additional tokens based on rules (e.g., RBACs). For example, a cyber resilience identifier (e.g., passport) of an entity can include entity data and/or additional cyber resilience data stored in tokens, and the passport system 1120 can provide and/or restrict access to one or more portions of the tokenized data based on various conditions, entity types, data types, regulations, and so on. That is, an entity can have a control structure with access controls and a passport created by the passport system 1120 linked to both sensitive (e.g., private) and non-sensitive (e.g., public) data, and the passport system 1120 can deny access (e.g., to sensitive data) and provide access (e.g., to non-sensitive data) based the access control (e.g., whether the user to access the data is a customer, insurer, vendor, MDR/XDR provider, etc.).

Generally, the passport system 1120 can provide secure access to token-related data and facilitate interactions between different cybersecurity systems and data sources of FIG. 11 (e.g., user computing systems 110, third party systems 150, ledger system 1130, etc.) based on various access controls. For example, the passport system 1120 can create a cyber resilience identity with tokens and rule-based access controls controlling access to the tokens. For example, the passport system 1120 can generate a passport for a third party linked to controls such that the third party can only access their own data within the token structure. In some arrangements, a third-party entity can use the passport system 1120 to access performance tokens stored in the token structure, such as in a passport associated with the cybersecurity status of an entity, with RBAC rules restrict other entities from viewing or modifying these tokens. Another example can include third-party vendors having access to their own evaluation tokens that include the results of security assessments relevant to their services, without the ability to access data from other vendors.

In some arrangements, the passport system 1120 can include one or more processing circuits, including processor (s) and memory. The memory may have instructions stored thereon that, when executed by processor(s), cause the one or more processing circuits to perform the various operations described herein. The operations described herein may be implemented using software, hardware, or a combination thereof. The processor(s) may include a microprocessor, ASIC, FPGA, etc., or combinations thereof. In many implementations, the processor(s) may be a multi-core processor or an array of processors. Memory may include, but is not limited to, electronic, optical, magnetic, or any other storage devices capable of providing processor(s) with program instructions. The instructions may include code from any suitable computer programming language. In some embodiments, the passport system 1120 can include an interface circuit and function circuit.

In some arrangements, the passport system 1120 can model cyber resilience data using cyber resilience identities and associated metadata. For example, the passport system 1120 can use templates to structure cyber resilience data and apply attributes to model various cyber resilience metrics (e.g., threat detection capabilities, response readiness). In some arrangements, the passport system 1120 can receive or identify cyber resilience data. For example, the passport system 1120 can collect data from various sources, including security incident reports, vulnerability assessments, and system performance metrics. In some arrangements, the passport system 1120 can encrypt a portion of the cyber resilience data. For example, the passport system 1120 can apply cryptographic techniques to secure sensitive information within the cyber resilience dataset, such as private keys or confidential incident data. In some arrangements, the passport system 1120 can generate a metadata object including metadata of cyber resilience data. For example, the metadata object can include information such as data creation timestamps, data source identifiers, and encryption keys. In some arrangements, the passport system 1120 can generate a cyber resilience identity including at least a link with the metadata object, a unique identifier (UID), and a performance event dataset. For example, the cyber resilience identity can include a URI linking to the metadata object, a UID for tracking the identity, and a dataset summarizing key performance events.

In some arrangements, the passport system 1120 can encapsulate the cyber resilience identity within a control structure restricting one or more updates and redemptions of the metadata object. For example, the control structure can use access controls and permission rules to prevent unauthorized modifications or access to the metadata object. In some arrangements, the passport system 1120 can determine at least one access data structure being compatible with the control structure. For example, the passport system 1120 can analyze data structures such as access control lists (ACLs) or role-based access controls (RBAC) to facilitate compatibility with the control structure. In some arrangements, the passport system 1120 can broadcast, using the control structure, the cyber resilience identity to a ledger or distributed ledger. For example, the passport system 1120 can publish the cyber resilience identity to a blockchain or distributed ledger, and the identify can be securely recorded and accessed by authorized entities via the distributed ledger.

In some arrangements, the token system 102 can generates various tokens. In some arrangements, the token system 102 can generate cyber resilience identities (e.g., a passport including a token linked to various additional tokens with metadata). That is, generating the cyber resilience identities can include generating tokens that include metadata objects or metadata with information corresponding to components and/or metrics of an entity's cybersecurity posture, such as firmographic information, security safeguards, threat detection capabilities, incident response data, compliance metrics, or other relevant cybersecurity information. For example, the token system 102 can generate, mint, or otherwise create unified safeguard tokens, unified requirements tokens, performance tokens, coverage tokens, incident readiness tokens, insurability readiness tokens, gap tokens, effectiveness tokens, and/or various additional tokens. For example, the token system 102 can structure a token to encapsulate data sets related to different aspects of cybersecurity such that a set of tokens can facilitate an evaluation of an entity's security status (e.g., by an insurer or vendor). The various tokens generated by the token system 102 and encapsulated in cyber resilience identities are described in greater detail herein.

In some arrangements, the cyber resilience identities can include a coverage token. The coverage token can be structured to store information about insurance policies, including policy numbers, premium amounts, and coverage data. That is, the token system 102 can generate a coverage token when an entity's insurance coverage data need to be documented and managed. For example, the coverage token can be created to include policy information such as the insured client, domain, and premium data. In generating the cyber resilience identities, the coverage token generated by the token system 102 can include data on insurance coverage, retention terms, and claims associated with the policy. For example, the coverage token may store data related to premium payment schedules, policy numbers, and claim UIDs that are linked to an insurance policy of an entity corresponding to a cyber resilience identity.

In some arrangements, the cyber resilience identities can include an effectiveness token. The effectiveness token can be structured to store a record of an organization's security effectiveness over time, linking to historical data through performance tokens and capturing outcomes related to incidents and claims. That is, the token system 102 can generate an effectiveness token to document and evaluate the results of past and ongoing security measures within an organization. For example, the effectiveness token can be generated to include the unique effectiveness token UID, the creation date, a list of performance tokens, and outcomes related to security incidents and claims. In generating the cyber resilience identities, the effectiveness token generated by the token system 102 can include references to associated performance tokens, incident tokens, and claims tokens, providing a longitudinal view of security effectiveness. For example, the effectiveness token may include data indicative of how various incidents have impacted the organization's security posture over time, including the effectiveness of response efforts and any gaps identified during evaluations.

In some arrangements, the cyber resilience identities can include a gaps token. The gaps token can be structured to record and track information about vulnerabilities and compliance issues within an organization's IT infrastructure. That is, the token system 102 can generate a gaps token to identify and monitor security gaps that could affect an organization's cybersecurity posture. For example, the gaps token may be generated to include a unique gap UID, timestamp, description of the vulnerability, impact description, severity rating, and recommended actions for remediation. In generating the cyber resilience identities, the gaps token generated by the token system 102 can include metadata about each identified gap, including the category of the threat, impact on confidentiality, integrity, and availability, and references to external resources for further information.

For example, the gaps token may capture the severity of a local privilege escalation vulnerability in an organization's IT infrastructure and provide recommendations for mitigating the threat.

In some arrangements, the cyber resilience identities can include an IOC (Indicators of Compromise) token. The IOC token can be structured to store and describe indicators of malicious activity detected within an organization's environment. That is, the token system 102 can generate an IOC token to catalog and track known indicators of compromise that are associated with cybersecurity incidents. For example, the IOC token may be generated to include a unique indicator UID, type of indicator (e.g., file hash), description of the indicator, and a pattern representing the malicious activity. In generating the cyber resilience identities, the IOC token generated by the token system 102 can include data such as the confidence level in the indicator (e.g., high, medium, low, or a scale between 1 and 10), the type of malicious activity it represents, and the pattern or signature detected. For example, the IOC token may store information about a malicious file hash associated with a known malware instance, helping to identify and respond to similar threats in the future.

In some arrangements, the cyber resilience identities can include an incident token. The incident token can be structured to capture information about a cybersecurity incident, including the type, date, outcome, and associated claims data. That is, the token system 102 can generate an incident token when it is necessary to document and manage the lifecycle of a cybersecurity incident within an organization. For example, the incident token may be generated to include a unique incident UID, the title of the incident, incident data such as the type of attack, impacted data, response actions taken, and the associated costs. In generating the cyber resilience identities, the incident token generated by the token system 102 can include references to related tokens, such as TTPs (Tactics, Techniques, and Procedures) tokens, IOC tokens, and breach team data, providing an overview of the incident. For example, the incident token may document the timeline of a ransomware attack, the response efforts, the root cause analysis, and the financial impact on the organization.

In some arrangements, the cyber resilience identities can include a performance token. The performance token can be structured to provide a record of evaluations associated with safeguards and requirements within an organization at a time. That is, the token system 102 can generate a performance token when to store the results of evaluations and assessments related to the organization's cybersecurity safeguards. For example, the performance token may be generated to include a unique performance token UID, the date of creation, safeguard results, safeguard transformation results, and comparison results against predefined requirements. In generating the cyber resilience identities, the performance token generated by the token system 102 can include outcomes of safeguard evaluations, transformation proofs, and any identified gaps in compliance at a point in time. For example, the performance token may track the effectiveness of endpoint security measures, document how well the measures meet the thresholds, and identify areas for improvement.

In some arrangements, the cyber resilience identities can include a ransom token. The ransom token can be structured to capture data about a ransomware incident, including ransom demands, payment data, and outcomes. That is, the token system 102 can generate a ransom token when it is necessary to document and manage the specifics of a ransomware event within an organization. For example, the ransom token may be generated to include a unique ransom UID, the incident UID it is associated with, data of the ransomware attack such as the group involved, payment wallet address, currency type, and the outcome of the payment. In generating the cyber resilience identities, the ransom token generated by the token system 102 can include references to the breach team involved, post-incident follow-up data, and information about the threat actor. For example, the ransom token may document the financial impact of the ransom payment, the success rate of data decryption, and ongoing risks posed by the threat actor.

In some arrangements, the cyber resilience identities can include a TTPs (Techniques, Tactics, and Procedures) token. The TTPs token can be structured to provide an overview of a detected cybersecurity threat event, outlining the tactics, techniques, and procedures identified. That is, the token system 102 can generate a TTPs token when it is necessary to document and analyze adversarial behaviors detected during a cybersecurity incident. For example, the TTPs token may be generated to include a unique TTP UID, the event data such as the event code, provider, start and end time, and description of the event, as well as information about the threat, including the tactic employed, techniques used, procedures followed, and the threat actor involved. In generating the cyber resilience identities, the TTPs token generated by the token system 102 can include observations from the event, such as the actions taken by the adversary, the outcome of those actions, and any data artifacts observed. For example, the TTPs token may document a phishing attack, detailing how it was executed, the tools used by the attacker, and the impact on the organization.

In some arrangements, the cyber resilience identities can include a unified asset token. The unified asset token can be structured to provide information about the assets managed within an organization, including types, operational statuses, and associated identifiers. That is, the token system 102 can generate a unified asset token when to document and manage the lifecycle of assets within an organization's IT infrastructure. For example, the unified asset token may be generated to include a unique asset UID, the date of creation, asset data such as type, name, description, location, and owner, and the operational status of the asset. In generating the cyber resilience identities, the unified asset token generated by the token system 102 can include identifiers and sources related to the asset, such as inventory data, cloud provider information, and any additional metadata. For example, the unified asset token may document a server's operational status, its cloud instance data, and any associated identifiers such that an organization can track and monitor assets.

In some arrangements, the cyber resilience identities can include an incident readiness token. The incident readiness token can be structured to capture the attributes that demonstrate an organization's preparedness for responding to cybersecurity incidents. That is, the token system 102 can generate an incident readiness token to document and verify an organization's ability to handle cybersecurity incidents effectively. For example, the incident readiness token may be generated to include a unique incident readiness UID, the associated passport UID, and a description of the organization's readiness to respond to cybersecurity incidents. In generating the cyber resilience identities, the incident readiness token generated by the token system 102 can include attributes such as the incident response plan, training and awareness programs, tools and technologies used, and testing exercises conducted. For example, the incident readiness token can document the organization's annual incident response plan updates, quarterly training sessions, and various additional tools and technologies in place to detect and mitigate cybersecurity threats.

In some arrangements, the cyber resilience identities can include an insurability readiness token. The insurability readiness token can be structured to capture the attributes used for an organization to qualify for cybersecurity insurance, including risk assessments, security measures, and incident history. That is, the token system 102 can generate an insurability readiness token when it is necessary to document and assess an organization's preparedness for obtaining cybersecurity insurance. For example, the insurability readiness token may be generated to include a unique insurability readiness UID, the carrier UID, the associated passport UID, and a description of the organization's preparedness for cybersecurity insurance. In generating the cyber resilience identities, the insurability readiness token generated by the token system 102 can include attributes such as risk assessments, security measures, documentation and compliance, and incident history. For example, the insurability readiness token may document the organization's annual risk assessments, the implementation of strong cybersecurity controls, and the effective mitigation of past incidents, providing an overview of the organization's qualifications for cybersecurity insurance.

In some arrangements, the cyber resilience identities can include or be associated with a passport, which can be a token or a distinct entity interacting with other tokens. The passport can be structured to encapsulate information about an entity, including firmographic data, indicators of cybersecurity readiness, and more. That is, the token system 102 can generate or link to a passport to provide certain information corresponding to an entity's cybersecurity posture and readiness for insurance purposes. For example, the passport can contain or link to various tokens, such as unified safeguard tokens, unified requirements tokens, performance tokens, coverage tokens, incident readiness tokens, insurability readiness tokens, gap tokens, effectiveness tokens, and/or various additional tokens. For example, the token system can generate a cyber resilience identity or passport providing access to metadata inclusive of various cyber resilience data (e.g., entity's legal structure, number of protected records, preparedness for cyber insurance, etc.) through linked tokens. Additional, token system can 102 can generate the passport linked with a control structure to limit access to data and updates, as further described herein.

In some arrangements, the wallet system 1112 can include one or more processing circuits, including processor(s) and memory. The memory may have instructions stored thereon that, when executed by processor(s), cause the one or more processing circuits to perform the various operations described herein. The operations described herein may be implemented using software, hardware, or a combination thereof. The processor(s) may include a microprocessor, ASIC, FPGA, etc., or combinations thereof. In many implementations, the processor(s) may be a multi-core processor or an array of processors. Memory may include, but is not limited to, electronic, optical, magnetic, or any other storage devices capable of providing processor(s) with program instructions. The instructions may include code from any suitable computer programming language. In some embodiments, the wallet system 1112 can include an interface circuit and function circuit.

In some arrangements, the wallet system 1112 can include a storage mechanism for holding digital assets, including cyber resilience tokens, private keys, and access credentials. In some examples, the wallet system 1112 can perform cryptographic operations to encrypt and decrypt token-related data and sign transactions, authenticating the user computing system 110 during interactions with the passport system 1120 and the ledger system 1130. The wallet system 1112 can manage permissions and access control so that authorized can entities initiate or authorize updates to the cyber resilience tokens stored within the ledger system 1130. In some arrangements, the wallet system 1112 can communicate with dynamic non-fungible tokens (DNFTs) or other various tokens (e.g., fungible tokens, semi-fungible tokens, fractionalized tokens, synthetic tokens, quantum-resistant tokens, cross-chain tokens) or cryptographic elements (e.g., digital signatures, hashes, encryption keys, zero-knowledge proofs, homomorphic encryption keys, lattice-based cryptographic keys, quantum entanglement signatures) associated with the cyber resilience identity. For example, the wallet system 1112 can store and manage multiple NFTs or DNFTs representing different aspects of a cybersecurity posture (e.g., cyber resilience status) of an organization or entity. The wallet system 1112 can facilitate updates to the tokens by performing cryptographic operations that validate and record changes to the cybersecurity data encapsulated within the DNFTs. The wallet system 1112 can also provide an interface that authorized entities use to access and manage the DNFTs, facilitating the review and assessment of the cybersecurity posture of the entity over time.

In another example, a quantum-resistant token can be structured to secure cyber resilience data against potential attacks from quantum computers using post-quantum cryptographic techniques, and the wallet system 1112 can store, manage, and facilitate access to these tokens within a cyber resilience identity framework. In yet another example, a zero-knowledge proof can be a cryptographic method allowing verification of certain cybersecurity attributes (e.g., compliance status) without revealing the underlying sensitive data, and the wallet system 1112 can process and validate these proofs as part of secure interactions with the cyber resilience identity. In yet another example, a quantum entanglement signature can be a method for facilitating data authenticity and integrity using entangled quantum states, and the wallet system 1112 can generate, store, and apply these signatures to authenticate and validate the integrity of cyber resilience data. In yet another example, a fractionalized token can be a representation of a cyber resilience asset divided into smaller units (e.g., portions of an insurance policy or coverage token), and the wallet system 1112 can manage the distribution, ownership, and transactions involving these fractionalized units within the tokenized cyber resilience identity.

In some arrangements, the wallet system 1112 can store, create, and update a variety of tokens associated with the cybersecurity posture of an organization or entity. The wallet system 1112 can create and update performance tokens, which can include results of cybersecurity events, assessments, or incident responses (e.g., a security breach response or a periodic vulnerability assessment). The wallet system 1112 can create and maintain unified tokens, which can include data representing the state of various cybersecurity elements over time (e.g., safeguards implemented across the organization, internal and third-party requirements compliance, or asset management). The wallet system 1112 can capture and record evaluation tokens, which can include cybersecurity data captured at multiple points in time (e.g., snapshots of the organization cybersecurity posture at regular intervals). The wallet system 1112 can aggregate and store roll-up tokens, which can include combined data from unified and real-time tokens to provide a view of the cybersecurity performance over a specified period (e.g., annual security performance summary). The wallet system 1112 can create and update resilience tokens, which can include tokens representing different dimensions of the organization cybersecurity posture (e.g., tokens for cybersecurity resilience metrics). The wallet system 1112 can further provide interfaces for entities to access, manage, and review the various tokens.

In some arrangements, the systems or components of FIG. 11 can communicate over network 120. Network 120 can include computer networks such as the Internet, local, wide, metro or other area networks, intranets, satellite networks, other computer networks such as voice or data mobile phone communication networks, combinations thereof, or any other type of electronic communications network. Network 120 can include or constitute a display network. As a non-limiting example, network 120 can implement transport layer security (TLS), secure sockets layer (SSL), hypertext transfer protocol secure (HTTPS), and/or any other secure communication protocol. In some arrangements, network 120 can be composed of various network devices (nodes) communicatively linked to form one or more data communication paths between participating devices. The network 120 can facilitate communication between the various nodes, such as the user computing system(s) 110, third-party system(s) 150, passport system 1120, etc. (e.g., using an OSI layer-4 transport protocol such as the User Datagram Protocol (UDP), the Transmission Control Protocol (TCP), Stream Control Transmission Protocol (SCTP), etc.). Each networked device can include at least one network interface for receiving and/or transmitting data, typically as one or more data packets. An illustrative network 120 is the Internet (however, other networks can be used). Network 120 can be an autonomous system (AS), i.e., a network that is operated under a consistent unified routing policy (or at least appears to from outside the AS network) and is generally managed by a single administrative entity (e.g., a system operator, administrator, or administrative group).

In some arrangements, the ledger system 1130 can include one or more processing circuits, including processor(s) and memory. The memory may have instructions stored thereon that, when executed by processor(s), cause the one or more processing circuits to perform the various operations described herein. The operations described herein may be implemented using software, hardware, or a combination thereof. The processor(s) may include a microprocessor, ASIC, FPGA, etc., or combinations thereof. In many implementations, the processor(s) may be a multi-core processor or an array of processors. Memory may include, but is not limited to, electronic, optical, magnetic, or any other storage devices capable of providing processor(s) with program instructions. The instructions may include code from any suitable computer programming language. In some embodiments, the ledger system 1130 can include an interface circuit and function circuit.

In some arrangements, the ledger system 1130 can be a ledger or a decentralized ledger. For example, the ledger system 1130 can include a distributed ledger technology (DLT) that supports immutable record-keeping and secure data transactions. The ledger system 1130 can store various types of tokens and cybersecurity data, including performance tokens, unified tokens, evaluation tokens, roll-up tokens, and resilience tokens. The ledger system 1130 can securely record updates and changes to tokens (e.g., providing data integrity and traceability). For example, the ledger system 1130 can use blockchain to provide a tamper-evident record of token-related transactions.

In some arrangements, the ledger system 1130 can include smart contract storage 1132, blockchain 170, and token storage 1134. In some arrangements, the smart contract storage 1132, blockchain 170, and/or token storage 1134 can include one or more processing circuits, including processor(s) and memory. The memory may have instructions stored thereon that, when executed by processor(s), cause the one or more processing circuits to perform the various operations described herein. The operations described herein may be implemented using software, hardware, or a combination thereof. The processor(s) may include a microprocessor, ASIC, FPGA, etc., or combinations thereof. In many implementations, the processor(s) may be a multi-core processor or an array of processors. Memory may include, but is not limited to, electronic, optical, magnetic, or any other storage devices capable of providing processor(s) with program instructions. The instructions may include code from any suitable computer programming language. In some embodiments, the smart contract storage 1132, blockchain 170, and/or token storage 1134 can include an interface circuit and function circuit.

In some arrangements, smart contract storage 1132 can manage and execute predefined agreements related to token transactions and updates. In one example, smart contract storage 1132 can store role-based access controls (RBACs or other rule-based control systems) or other access control mechanisms restricting access or updates to tokenized cyber resilience data stored via the ledger system 1130. In some examples, the smart contract storage 1132 can store rules or other data to automate processes such as token validation, data access control, and compliance checks. For example, smart contract storage 1132 can store smart contracts that define the rules and logic for managing token transactions and updates. In some examples, smart contract storage 1132 can manage contract templates that specify access permissions, including RBACs to restrict access based on user roles. That is, the smart contract storage 1132 can implement RBAC to control permissions for executing transactions or modifying token data. Smart contract storage 1132 can execute stored access controls/smart contracts to enforce access permissions, validate transactions, and verify compliance of entities or organizations with various cyber resilience parameters. In some arrangements, smart contract storage 1132 can process transactions according to terms, parameters, or rules to restrict access to tokens or other cyber resilience data.

In some arrangements, blockchain 170 can include a decentralized ledger that records and validates token transactions. For example, blockchain 170 can utilize consensus mechanisms (e.g., proof of provenance, proof of work, proof of stake) to validate transactions involving tokenized cyber resilience data across a distributed network. In some examples, blockchain 170 can provide a tamper-evident and/or immutable record of token data by employing cryptographic techniques (e.g., hashing functions) to record and verify token transactions. That is, blockchain 170 can provide transparency and traceability of token-related activities by securely recording token transactions on a distributed computing architecture.

In some arrangements, token storage 1134 can store tokenized cyber resilience data. For example, token storage 1134 can store and/or manage tokens including performance tokens, unified tokens, evaluation tokens, and roll-up tokens generated and/or provided by the token system 102. In some examples, token storage 1134 interfaces with blockchain 170 to manage and organize token data. For example, token storage 1134 can handle different token types, including performance tokens, unified tokens, evaluation tokens, and roll-up tokens. Token storage 1134 can utilize data structures such as relational databases, NoSQL databases, or file systems to organize and manage tokens and/or corresponding data. In some examples, token storage 1134 can maintain data accuracy by integrating with blockchain 170 to validate and update token records.

In some arrangements, the passport system 1120 can include one or more systems and/or subsystems to model cyber resilience data using cyber resilience identities and associated metadata (e.g., cryptographic system 1122, ledger interface 1124, token system 102, and metadata collection system 1126). In some arrangements, the cryptographic system 1122, ledger interface 1124, token system 102, and/or metadata collection system 1126 can include one or more processing circuits, including processor(s) and memory. The memory may have instructions stored thereon that, when executed by processor(s), cause the one or more processing circuits to perform the various operations described herein. The operations described herein may be implemented using software, hardware, or a combination thereof. The processor(s) may include a microprocessor, ASIC, FPGA, etc., or combinations thereof. In many implementations, the processor(s) may be a multi-core processor or an array of processors. Memory may include, but is not limited to, electronic, optical, magnetic, or any other storage devices capable of providing processor(s) with program instructions. The instructions may include code from any suitable computer programming language. In some embodiments, the cryptographic system 1122, ledger interface 1124, token system 102, and/or metadata collection system 1126 can include an interface circuit and function circuit.

In some arrangements, the metadata collection system 1126 can receive or identify cyber resilience data. That is, receiving or identifying can include the metadata collection system 1126 acquiring, processing, and categorizing data from various sources, such as cybersecurity events, system performance metrics, and vulnerability assessments stored on ledger system 1130. For example, the metadata collection system 1126 can gather and/or organize data attributes like event timestamps, sources, and types corresponding to an entity's cyber resilience status and other cyber protection information. Additionally, the metadata collection system 1126 can link these data attributes to cyber resilience metrics and update the corresponding records to reflect changes in the entity's cyber protection posture.

In some arrangements, the encryption system 1122 can encrypt a portion of the cyber resilience data. That is, encrypting can include the encryption system 1122 securing sensitive data using cryptographic techniques tailored to the requirements of the data. For example, the encryption system 1122 can apply encryption algorithms to protect sensitive data, such as performance metrics or identifiers of an organization or entity. Further, the encryption system 1122 can utilize key management techniques to facilitate secure data encryption and decryption process such that only authorized entities can access the encrypted data. Additionally, the encryption system 1122 can use asymmetric encryption to secure data before it is stored or transmitted. For example, the encryption system 1122 can apply hashing algorithms to verify the integrity of data associated with cyber resilience events and assessments such that the data remains unaltered during transmission or storage.

In some arrangements, the token system 102 and/or metadata collection system 1126 can generate a metadata object including metadata of cyber resilience data. That is, the token system 102 can create structured metadata objects that include information about tokenized data, such as fields, tags, headers, and other relevant attributes like data type, source, and context. For example, the token system 102 can organize metadata into formats that provide descriptions and classifications for each element of cyber resilience data. Further, the metadata collection system 1126 can collect and integrate various metadata elements, such as timestamps, source identifiers, and data relevance indicators, into the metadata object. Additionally, the token system 102 can structure the metadata to improve the understanding and usability of the collected cyber resilience data.

In some arrangements, the token system 102 can generate a cyber resilience identity including at least a link with the metadata object, a unique identifier (UID), and a performance event dataset. That is, generating can include creating, associating, and linking metadata objects, unique identifiers, and performance datasets with an identifier of n organization or entity. For example, the token system 102 can generate a passport that links to metadata stored in one or more tokens, each containing data related to different aspects of an entity's cyber resilience. The passport can include a unique identifier for tracking and linking the metadata object to other associated tokens. Further, the performance event dataset within the passport can capture and store cyber resilience performance data, such as that stored in multiple performance tokens, which may be collected at different points in time. For example, the token system 102 can issue or mint tokens linked to a single token that reference metadata objects and include unique identifiers for tracking, and the token system 102 can embed performance metrics and historical data within the tokens to provide insights into cyber resilience.

In some arrangements, the token system 102 can encapsulate the cyber resilience identity within a control structure restricting one or more updates and redemptions of the metadata object. That is, encapsulating can include implementing token gating mechanisms or smart contracts to enforce rules on who can update or redeem the cyber resilience identity, based on predefined criteria and access control policies. For example, the token system 102 can establish a control structure that allows a customer to view relevant data within their own passport while restricting an insurer's access to only tokenized data used for underwriting decisions. Generally, the passport system 1120 can implement a control structure that enforces rules on who can update or redeem the cyber resilience identity based on predefined criteria (e.g., entity type, user preferences/selections, etc.)

In some arrangements, the ledger interface 1124 can determine at least one access data structure that is compatible with the control structure. That is, determining can include analyzing various data structures to identify or determine alignment with the access control policies and update restrictions defined by the control structure. For example, the ledger interface 1124 can evaluate different data structures to verify compatibility with access levels and permissions for interacting with the cyber resilience identity. Additionally, the ledger interface 1124 can select and implement data structures that support the secure and compliant management of access and updates within the token system 102.

The control structure (e.g., implemented as a smart contract) governs access to a token structure containing various tokens, such as performance tokens, unified tokens, evaluation tokens, and roll-up tokens. The token structure can include metadata, such as unique identifiers (UIDs), creation timestamps, and links to related data sets. The smart contract specifies predefined rules for accessing and updating these tokens. The ledger interface 1124 can process the smart contract to extract rules that define role-based access control (RBAC) permissions. For example, the smart contract can specify that each third party can only access their own data within the token structure. In some arrangements, a third-party entity can have access its own performance tokens stored in the token structure, such as in a passport associated with the cybersecurity status of an entity. The RBAC rules restrict other entities from viewing or modifying these tokens. Another example can include third-party vendors having access to their own evaluation tokens that detail the results of security assessments relevant to their services, without the ability to access data from other vendors.

The ledger interface 1124 can configure the selected access data structure to enforce these RBAC permissions as extracted from the smart contract. That is, the configuration can include mapping the access permissions to the token structure, linking each token type to the appropriate access control mechanisms. For example, performance tokens related to a particular third-party can be linked to a role of the third-party. Similarly, unified tokens related to internal compliance can only be accessible by authorized roles within the organization itself (e.g., excluding third-party access). The ledger interface 1124 can integrate the configuration within the ledger system 1130 to apply the rules of the control structure to token-related operations. The RBAC can facilitate access to tokens to entities or individuals that have been granted access or authorized to read, update, or add. For example, the control structure can use an access level of an entity or individual to determine whether to allow a user to read data but not update or add to the data (e.g., a third-party insurer can access performance datasets on performance tokens linked to a passport of the prosecutive insured, but can be restricted from modifying certain performance data stored thereon), to have full rights (e.g., read/update/add, etc.), and so on. That is, the passport system 1120 can determine, identify, and/or provide an access level or permissions to a person or entity attempting to access or otherwise interact with tokenized data corresponding to a cyber resilience identity, and the access level/permissions can be used by the passport system 1120 to restrict or allow the user or entity to perform various actions related to the tokens.

In some arrangements, if the smart contract is modified, the ledger interface 1124 can reconfigure the access data structures to match the updated RBAC rules. For example, if the smart contract is updated to change access permissions for a particular third-party entity, the ledger interface 1124 can adjust the RBAC configurations to reflect this change such that the access control mechanisms allows access and is consistent with the control structure. In some arrangements, an access data structure can function as a token or another access control mechanism within the token structure. That is, the access data structure can facilitate operations, such as reading, writing, adding, or removing metadata objects associated with tokens in the cyber resilience identity (e.g., also operating and implemented as a token). For example, an access control token can link to other tokens representing performance, evaluation, or resilience data. The access control token can encapsulate the permissions for interacting with the tokens and can include metadata defining allowed operations and roles or entities authorized to perform each operation. Additionally, an access data structure can implement write access to one or more metadata objects within the token structure. For example, an access control token can identify which entities have permission to update particular aspects of the cyber resilience identity, such as modifying performance metrics or altering the status of an evaluation token. Another access data structure can be used to manage read permissions, restricting a third-party entity to viewing metadata associated with its own tokens within the structure without granting modification rights. In some arrangements, an access control structure can function as a token that defines hierarchical permissions across multiple tokens. For example, a control structure token can specify that only a designated role within an organization has the authority to add or remove tokens from the cyber resilience identity. Additionally, the access control token can be used to facilitate interactions with other tokens within the token structure to apply these permissions.

In some arrangements, the ledger interface 1124 can broadcast, using the control structure, the cyber resilience identity to a ledger or distributed ledger. That is, broadcasting can include publishing, sharing, or otherwise transmitting a passport (e.g., cyber resilience identity) of an entity to authorized participants on the distributed ledger network, including insurers, regulators, or cybersecurity vendors, to facilitate secure access, auditing, or validation of the entity's cybersecurity posture or for use in in providing protection or insurance quotes, verifying compliance, offering targeted cybersecurity services (e.g., through advertisements), or generating analytical insights based on the entity's data. For example, the ledger interface 1124 can transmit the cyber resilience identity to a blockchain or similar distributed ledger to maintain an immutable record of the cyber resilience identity and associated data. In this example, the transmission process can include creating a transaction that includes the cyber resilience identity, signing the transaction using cryptographic keys associated with the control structure, and broadcasting the transaction to the distributed ledger network. The network nodes can then validate the transaction through a consensus mechanism (e.g., proof of work, proof of stake) and, once validated, add it to a block in the blockchain. Additionally, the ledger interface 1124 can store the cyber resilience identity locally (e.g., in a back-end database or other local data store). Further, the ledger interface 1124 can transmit or send the cyber resilience identity (e.g., via a shareable link) to various entities, who can access a portion of the data corresponding with the cyber resilience identity but not access another portion of the data based on various access controls.

Referring to the control structure (e.g., smart contract) generally, the one or more control structures can be embedded within the transaction or linked via a unique identifier or hash, which can be included in the transaction data. That is, the rules and conditions defined by the smart contract can be inherently tied to the cyber resilience identity, facilitating the for automated enforcement of access controls and other predefined operations when the identity is accessed or modified on the distributed ledger. In some embodiments, the one or more control structures can be referenced by a unique smart contract address included in the transaction. That is, the reference can allow the distributed ledger to call and execute the smart contract independently when certain events are triggered, such as a request to access or update the cyber resilience identity. In some embodiments, the one or more control structures can be included as a separate transaction linked to the cyber resilience identity transaction via a cryptographic reference. The smart contract transaction can be broadcasted and stored on the blockchain, where it can autonomously enforce the conditions and permissions associated with the cyber resilience identity when an interaction with the identity occurs on the distributed ledger. In some embodiments, the one or more control structures can be encoded into the blockchain transaction as executable code. That is, the smart contract can automatically execute its logic in response to blockchain events, such as validation of the cyber resilience identity transaction.

Figure 12:
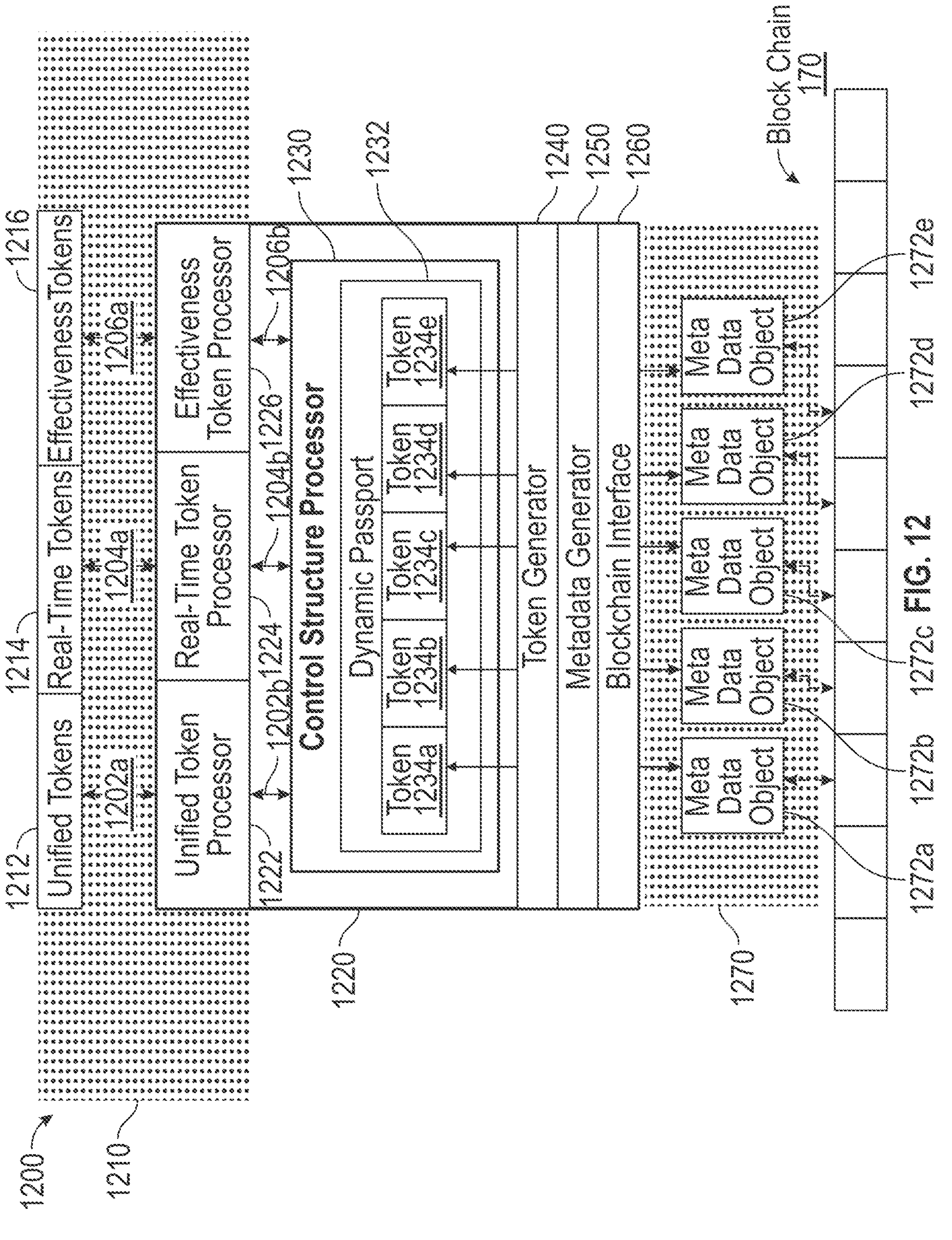
FIG. 12 depicts a block diagram of another architecture of certain systems or devices of FIG. 11, according to some arrangements.

Referring now to FIG. 12, a block diagram of an architecture of certain systems or devices of FIG. 11 is shown, according to some arrangements. The implementation shown in FIG. 12 can include a token interface 1210 including unified tokens 1212, real-time tokens 1214, and effectiveness tokens 1216. The implementation shown in FIG. 12 can also include a smart contract control structure 1220 including a unified token processor 1222, a real-time token processor 1224, and an effectiveness token processor 1226. Further, the smart contract control structure 1220 can include a control structure processor 1230, a token generator 1240, a metadata generator 1250, and a blockchain interface 1260. In some arrangements, the control structure processor 1230 can include a dynamic passport 1232, and dynamic passport 1232 can include tokens 1234*a*-1234*c* (collectively, 1234). Each of the tokens 1234 can be linked to a metadata interface 1270 including one or more metadata objects 1272*a*-1272*e* (collectively, metadata objects 1272). In some arrangements, the implementation shown in FIG. 12 can include blockchain 170.

In some arrangements, FIG. 12 depicts an example smart contract control structure 1220. In some examples, the unified token processor 1222, real-time token processor 1224, and effectiveness token processor 1226 can detect a presence of a token (fungible, non-fungible, partially-fungible, etc.), and can transmit the token to a compatibility processor (e.g., 1222, 1224, 1226) compatible with that particular token. The detection can be responsive to an action by the token interface 1210 to transmit the tokens to the smart contract control structure 1220. In some examples, the token interface 1210 can include a communication channel between one or more of the smart contract control structure 1220 and one or more of the unified tokens 1212, real-time tokens 1214, and effectiveness tokens 1216. The token interface 1210 can include an application programming interface compatible with the smart contract control structure 1220 to detect various cyber resilience tokens. At least the token interface 1210 or the smart contract control structure 1220 can execute one or more instructions to determine whether one or more of the tokens are compatible with the smart contract control structure 1220.

In some arrangements, the unified token processor 1222 can perform detection of unified tokens 1212 via a link 1202*a* or other communication channel (e.g., via a network such as network 120). The detection can be responsive to receiving a unified token from token system 102, user computing systems 110, or third-party systems 150, over link 1202*a*. The unified token processor 1222 can be configured to be compatible with a unified token 1212, or can be generated to be compatible with a particular unified token 1212. For example, the unified token processor 1222 can be integrated with or store a hash based on a unified token 1212 and a hash processor operable to generate a hash based on any unified token 1212. The unified token processor 1222 can generate a hash in response to detecting the presence of the unified token 1212, and can determine whether the unified token 1212 is compatible with the smart contract control structure 1220 by comparing the generated hash with the stored hash. The unified token processor 1222 can include logic to detect a unified token 1212 passed to it, by, for example, a JSON object or a header argument. Additionally, the unified token processor 1222 can provide the detected unified token to the control structure processor 1230 via link 1202*b*.

In some arrangements, the real-time token processor 1224 can perform detection of real-time tokens 1214 via link 1204*a*. The detection can be responsive to receiving a real-time token 1214 from token system 102, user computing systems 110, or third-party systems 150, over link 1204*a*. For example, the real-time token processor 1224 can be integrated with or store a hash based on a real-time token 1214 and a hash processor operable to generate a hash based on any real-time token 1214. The real-time token processor 1224 can generate a hash in response to detecting the presence of the real-time token 1214, and can determine whether the real-time token 1214 is compatible with the smart contract control structure 1220 by comparing the generated hash with the stored hash. The real-time token processor 1224 can include logic to detect a real-time token 1214 passed to it, by, for example, a JSON object or a header argument. Additionally, real-time token processor 1224 can provide the detected real-time token 1214 to the control structure processor 1230 via link 1204*a*.

In some arrangements, the effectiveness token processor 1226 can perform detection of effectiveness tokens 1216 via link 1206*a*. The detection can be responsive to receiving an effectiveness token 1216 from token system 102, user computing systems 110, or third-party systems 150, over link 1206*a*. For example, the effectiveness token processor 1226 can be integrated with or store a hash based on an effectiveness token 1216 and a hash processor operable to generate a hash based on any effectiveness token 1216. The effectiveness token processor 1226 can generate a hash in response to detecting the presence of the effectiveness token 1216, and can determine whether the effectiveness token 1216 is compatible with the smart contract control structure 1220 by comparing the generated hash with the stored hash. The effectiveness token processor 1226 can include logic to detect an effectiveness token 1216 passed to it, by, for example, a JSON object or a header argument. Additionally, the effectiveness token processor 1226 can provide the detected effectiveness token 1216 to the control structure processor 1230 via link 1206*b*.

In some arrangements, the smart contract control structure 1220 can include a control structure processor 1230 configured to generate and/or store tokens 1234. The tokens 1234 can include one or more unified tokens 1212, real-time tokens 1214, and effectiveness tokens 1216. That is, responsive to receiving one or more of the unified tokens 1212, real-time tokens 1214, and effectiveness tokens 1216 from the unified token processor 1222, real-time token processor 1224, and/or effectiveness token processor 1226, the control structure processor 1230 can receive the tokens 1234 via links 1202*b*, 1204*b*, and/or 1206*b*. It should be understood that a control structure (or smart contract control structure) used herein can refer to a logical or structural construct that encapsulates one or more elements, such as tokens, or metadata objects, within a defined boundary. The control structure serves as an organizational framework that groups these elements together, allowing them to be referenced, accessed, or transmitted as a single unit. The smart contract control structure 1220 or other control mechanisms can manage interactions and enforce access controls based on predefined rules. For example, a control structure can be a data structure that stores references or pointers to the encapsulated elements. In another example, it could be a structure that includes metadata defining relationships and dependencies between the elements.

In some embodiments, a container or wrapper can encapsulate a cyber resilience identity having a control structure, which can include multiple tokens linked to metadata objects. Encapsulation can be implemented by defining a data structure within a memory or storage system that can include relevant tokens and their associated metadata objects. The container itself can be a structured data object, such as a JSON object, a database schema, or a serialized data structure, that stores pointers, references, or data fields corresponding to each token and its linked metadata. The smart contract control structure 1220, such as a smart contract, can be included within the container by referencing its address or embedding its bytecode within the container data structure. When the container is instantiated or accessed, the control structure processor 1230 can reference the smart contract control structure 1220 to enforce the rules and permissions associated with the cyber resilience identity.

In some embodiments, a smart contract can encapsulate a cyber resilience identity, which can include multiple tokens linked to metadata objects. The smart contract can encapsulate the cyber resilience identity by defining a set of rules and data fields within its code that represent the cyber resilience identity and its components. The control structure processor 1230 can create and maintain a mapping or registry within the blockchain 170 or distributed ledger that associates each token with its corresponding metadata objects. The encapsulation occurs as the smart contract control structure 1220 references these tokens and metadata objects within its execution environment, using internal storage variables or linked data structures (e.g., mappings) to track and enforce relationships between them. The smart contract control structure 1220 can encapsulate the cyber resilience identity by controlling access to these mappings, allowing only authorized operations as defined by the contract's logic.

In some implementations, the control structure processor 1230 can generate a metadata object, such as a wrapper, where a smart contract control structure 1220 (e.g., a smart contract) is wrapped or otherwise linked to dynamic passport 1232, which can further include links to metadata (e.g., stored data, fields, etc.) of tokens 1234. For example, the dynamic passport 1232 can be encapsulated in a smart contract control structure 1220 and can generated by metadata generator 1250 as part of the metadata interface 1270. The linking dynamic passport 1232 and the smart contract processor 1230 can provide access to the tokenized cyber information based on the smart contract control structure 1220.

In some arrangements, the control structure processor 1230 can generate a dynamic passport 1232 including a token with a link to (e.g., encapsulated in) the smart contract control structure 1220. The link can be established via a digital signature or cryptographic hash that securely associates the dynamic passport 1232 with corresponding metadata. The dynamic passport 1232 can be provided to a metadata interface 1270 such that a blockchain (e.g., blockchain 170) can verify and store the metadata securely on the chain. Additionally, the control structure processor 1230 can encapsulate the dynamic passport 1232 and tokens 1234 within the smart contract control structure 1220. For example, encapsulating can include encrypting the data and setting permissions for data access. That is, the encapsulation can restrict outputs of the metadata objects 1272. For example, when the dynamic passport 1232 and tokens 1234 are encapsulated, the control structure processor 1230 may output when conditions or permissions are verified. In another example, when the dynamic passport 1232 and tokens 1234 are encapsulated in a smart contract control structure 1220, the control structure processor 1230 may output when a valid decryption key is presented. For example, the control structure processor 1230 can authorize transactions after verifying that compliance and regulatory requirements are met based on data of the tokens 1234.

In some arrangements, the control structure processor 1230 can be configured to perform segmentation or allocation of tokens 1234 of the dynamic passport 1232 based on parameters by accessing the metadata of a token and evaluating compliance with cyber resilience standards. Accordingly, the control structure processor 1230 can automatically pool (or tranche) asset tokens (associated with underlying assets) based on parameters. For example, the parameters can be programmed into smart contracts of the control structure processor 1230. For example, the dynamic passport 1232 can include one or more segmented allocations of the tokens 1234 (e.g., with token **1234*a* and 1234*b* segmented into an allocation and tokens 1234*c*-1234*e* segmented into another allocation). While not shown in FIG. 12, a segmented allocation smart contract control structure can be within the smart contract control structure 1220 and be operated by the control structure processor 1230**. In some examples, this integration facilitates automated re-segmentation based on real-time data analysis. In another example, this integration facilitates compliance checks and performance tracking without external system intervention.

In some arrangements, each of the tokens 1234 can include metadata objects 1272. For example, links 1209 can connect each token 1234 to a respective metadata object 1272. In some examples, the metadata interface 1270 can be utilized to connect each token 1234 to its metadata object 1272. For example, the token **1234*a* can be connected to the metadata object 1272*a* via the link 1209*a*, the token 1234*b* can be connected to the metadata object 1272*b* via the link 1209*b***, and so on.

In some examples, the metadata interface 1270 can include a communication channel between one or more of the tokens in the smart contract control structure 1220 and metadata objects of blockchain 170. That is, metadata objects 1272 can be accessed and verified through blockchain transactions to verify integrity and authenticity. Furthermore, blockchain 170 can store links to the metadata objects 1272 or store the metadata objects 1272 in blocks of the blockchain 170. For examples, the blockchain 170 can store the metadata objects 1272 in blocks to verify that participants have consistent and unalterable access to the cyber resilience information stored in the tokens 1234 of the dynamic passport 1232.

In some arrangements, the token interface 1210 can include an application programming interface compatible with the smart contract control structure 1220 to detect various cyber resilience tokens. In some examples, at least the token interface 1210 or the smart contract control structure 1220 can execute one or more instructions to determine whether one or more of the tokens (e.g., tokens 1234 or corresponding unified tokens 1212, real-time tokens 1214, and/or effectiveness tokens 1216) are compatible with the smart contract control structure 1220.

In some arrangements, the token generator 1240 (e.g., token system 102) can generate one or more tokens (e.g., fungible, semi-fungible, or non-fungible tokens, collectively referred to herein as "controllable electronic records") in accordance with a token obtained at one or more of the unified token processor 1222, real-time token processor 1224, and/or effectiveness token processor 1226. For example, the token generator 1240 can generate tokens based on a number of new metadata objects indicated by an obtained token, and linked with respective smart contract control structures. For example, the token generator 1240 can generate a cyber resilience identity (e.g., dynamic passport 1232) with links to one or more tokens each linked with a particular smart contract control structure 1220 with which the respective token is compatible. The token generator 1240 can thus generate a corresponding number of keys that can control restrictions on output by the particular metadata object linked with the particular smart contract control structure compatible with the particular token. The token generator 1240 can modify and delete tokens (e.g., tokens 1234) linked with cyber resilience identity (e.g., dynamic passport 1232), to update control of a partial distribution or exchange of metadata object control.

In some arrangements, the metadata generator 1250 can generate one or more metadata objects (e.g., metadata objects 1272) in accordance with a token obtained at one or more of the unified token processor 1222, real-time token processor 1224, and/or effectiveness token processor 1226 (e.g., at a compatibility processor). That is, the metadata object can include metadata of cyber resilience data. For example, metadata generator 1250 can generate multiple tokens based on a number of new metadata objects linked with respective smart contract control structure(s) 1220 and encapsulated with a cyber resilience identity (e.g., passport). For example, the metadata generator 1250 can generate one or more metadata objects 1272 each linked to respective tokens 1234 and further linked, via the tokens 1234, to the dynamic passport 1232 with a particular smart contract control structure 1220 by which the metadata object co is controlled. In some examples, the metadata generator 1250 can modify and delete metadata objects linked with tokens or smart contract control structures to update control of a partial transfer of metadata object control. Further, the metadata generator 1250 can modify and/or update tokens and/or associated information of existing tokens (e.g., tokens 1234) corresponding to a cyber resilience identity (e.g., passport 1232).

In some arrangements, the blockchain interface 1260 can include an API compatible with the blockchain 170 via metadata generator 1250. The blockchain interface 1260 can selectively add, modify, and delete blocks from the blockchain 170. The blockchain interface 1260 can add, modify, and delete blocks in accordance with restrictions or interfaces of the blockchain 170, and can add, modify, and delete blocks independently of the restrictions or interfaces of the blockchain 170 at any portion or index of the blockchain 170.

Figure 13:
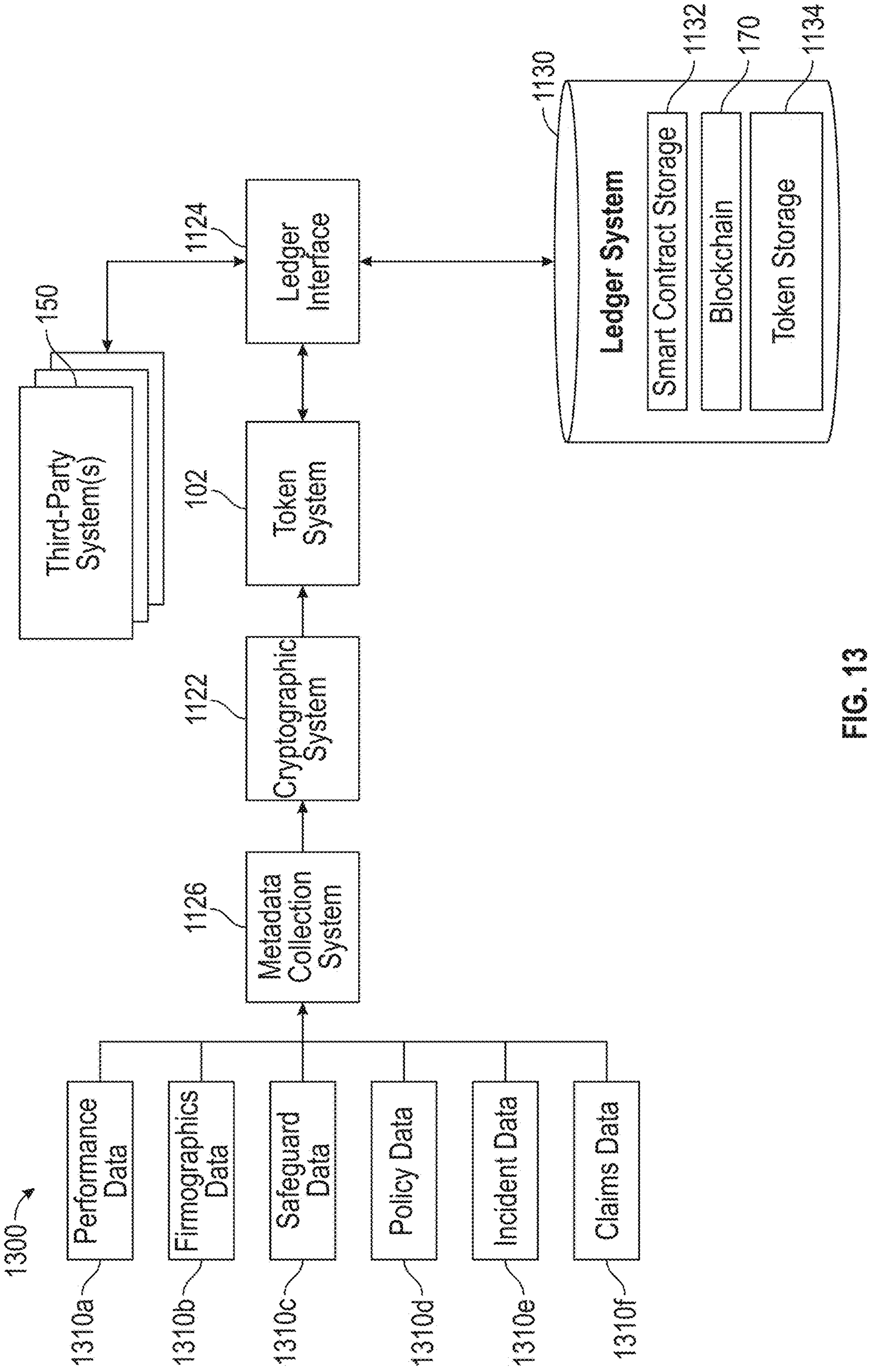
FIG. 13 depicts a block diagram of another architecture of certain systems or devices of FIG. 11, according to some arrangements.

Referring now to FIG. 13, a block diagram of an architecture of certain systems or devices of FIG. 11 is shown, according to some arrangements. The implementation shown in FIG. 13 includes third-party systems 150 and ledger system 1130. The ledger system 1130 can include smart contract storage 1132, blockchain 170, and token storage 1134. The implementation shown in FIG. 13 can also include metadata collection system 1126, cryptographic system 1122, token system 102, and ledger interface 1124. The implementation shown in FIG. 13 can also include performance data 1310*a*, firmographics data 1310*b*, safeguard data 1310*c*, policy data 1310*d*, incident data 1310*e*, and claims data 1310*f* (collectively, cyber resilience data 1310).

In some arrangements, the metadata collection system 1126 can receive or identify cyber resilience data 1310. For example, the metadata collection system 1126 can collect or retrieve performance data 1310*a* (e.g., metrics related to cybersecurity incidents or system performance), firmographics data 1310*b* (e.g., company size, industry type, or geographic location), safeguard data 1310*c* (e.g., implemented security controls or measures), policy data 1310*d* (e.g., security policies or compliance requirements), incident data 1310*e* (e.g., records of security breaches or system failures), and claims data 1310*f* (e.g., insurance claims or risk assessments) of an entity or organization. In some examples, the metadata collection system 1126 can integrate data from various cybersecurity tools and databases (e.g., third party systems 150, blockchain 170, etc.) to compile a cyber resilience dataset. In some arrangements, the metadata collection system 1126 can provide the received or identified cyber resilience data to the cryptographic system 1122.

In some arrangements, the cryptographic system 1122 can encrypt a portion of the cyber resilience data. For example, the cryptographic system 1122 can apply symmetric encryption algorithms (e.g., AES) to secure sensitive data such as performance metrics 1310*a* or firmographics data 1310*b*. In another example, the cryptographic system 1122 can use asymmetric encryption techniques (e.g., RSA) to protect keys and authentication credentials. Further, the cryptographic system 1122 can implement hashing algorithms (e.g., SHA-256) to verify the integrity of the data by generating unique hash values for each data record. In some arrangements, the cryptographic system 1122 can provide the portion of encrypted cyber resilience data to the token system 102.

In some arrangements, the token system 102 can generate a metadata object including metadata of cyber resilience data. For example, the token system 102 can create metadata objects that encapsulate encrypted performance data, safeguard records, and compliance data. In some arrangements, the token system 102 can include additional metadata such as timestamps, data sources, and integrity checks. In some arrangements, the token system 102 can generate a cyber resilience identity including at least a link with the metadata object, a unique identifier (UID), and a performance event dataset. For example, the cyber resilience identity can include a UID to uniquely identify the entity, a link to a metadata object (e.g., data of one or more tokens), and include a dataset with performance events or incidents. In some arrangements, the token system 102 can encapsulate the cyber resilience identity within a control structure restricting one or more updates and redemptions of the metadata object. The control structure can be a data structure or other system including a cyber resilience identifier (e.g., passport) with linked tokens and restricting accessing to metadata object (e.g., data) of certain tokens. In some arrangements, the token system 102 can determine at least one access data structure being compatible with the control structure. For example, the token system 102 can utilize various access management techniques, such as access control lists (ACLs), role-based access controls (RBACs), or attribute-based access controls (ABACs), to verify that the access data structure aligns with the permissions and restrictions defined within the control structure. The passport system 1102 can assess these access data structures to determine whether the structures comply with predefined standards or policies (e.g., determining whether an entity or authorized user has the appropriate credentials or attributes to access, modify, or update the metadata objects encapsulated within the control structure). Additionally, the token system 102 can dynamically adjust the access parameters based on changes in roles, permissions, or security requirements such that the control structure remains consistent with the evolving access needs of various entities and users involved in managing or interacting with the cyber resilience identity.

In some arrangements, access controls, such as role-based access controls (RBACs) or access parameters, can be implemented in various forms to manage permissions for entities interacting with the metadata object (e.g., token). Access controls can include any method or mechanism that limits, restricts, or authorizes access to certain data based on predefined criteria. Examples of access controls could involve establishing rules that dictate who can view, modify, or delete data elements within the metadata object or cyber resilience identity. Such controls can be used to regulate access across different entities, such as allowing a third party like an insurer to view certain data, modify data, or be restricted from accessing other sensitive data. These access controls may also be configured within a broader access management framework, such as ACLs or RBACs, that dynamically adapts to the roles and permissions associated with different users or systems.

In some arrangements, the token system 102 can generate a cyber resilience identity including at least a link with the metadata object, a unique identifier (UID), and a performance event dataset. For example, the cyber resilience identity can incorporate a UID to uniquely identify the entity, link to the metadata object to reference encrypted data, and include a dataset detailing performance events or incidents. The token system 102 can encapsulate the cyber resilience identity within a control structure restricting one or more updates and redemptions of the metadata object. Further, the token system 102 can determine at least one access data structure that aligns with the control structure. For example, the token system 102 can use access control lists or role-based access controls to verify alignment with the control structure for control over which data elements can be accessed or modified by different entities. In some arrangements, the ledger interface 1124 can broadcast, using the control structure, the cyber resilience identity to a ledger or distributed ledger. For example, the ledger interface 1124 can interact with the ledger system 1130, including smart contract storage 1132, blockchain 170, and token storage 1134, to submit the cyber resilience identity and associated metadata and publish the cyber resilience identity to blockchain 170. In some examples, the ledger interface 1124 can also communicate with third-party systems 150 to share and verify the cyber resilience identity across different platforms and networks (e.g., to transmit to a vendor or insurer).

Referring generally to FIGS. 14A-14F, a flowchart of a method 1400 of updating tokenized cyber resilience data is shown, according to some arrangements. Additionally, it should be understood that nodes (shown as circles, diamonds, rectangles, etc.) in the FIGS. represent decision points, process steps, or connectors within a workflow or method, guiding execution flow based on certain conditions or inputs. The nodes can also connect different FIGS. when the workflow or method cannot be contained within a single FIG.

Figure 14A:
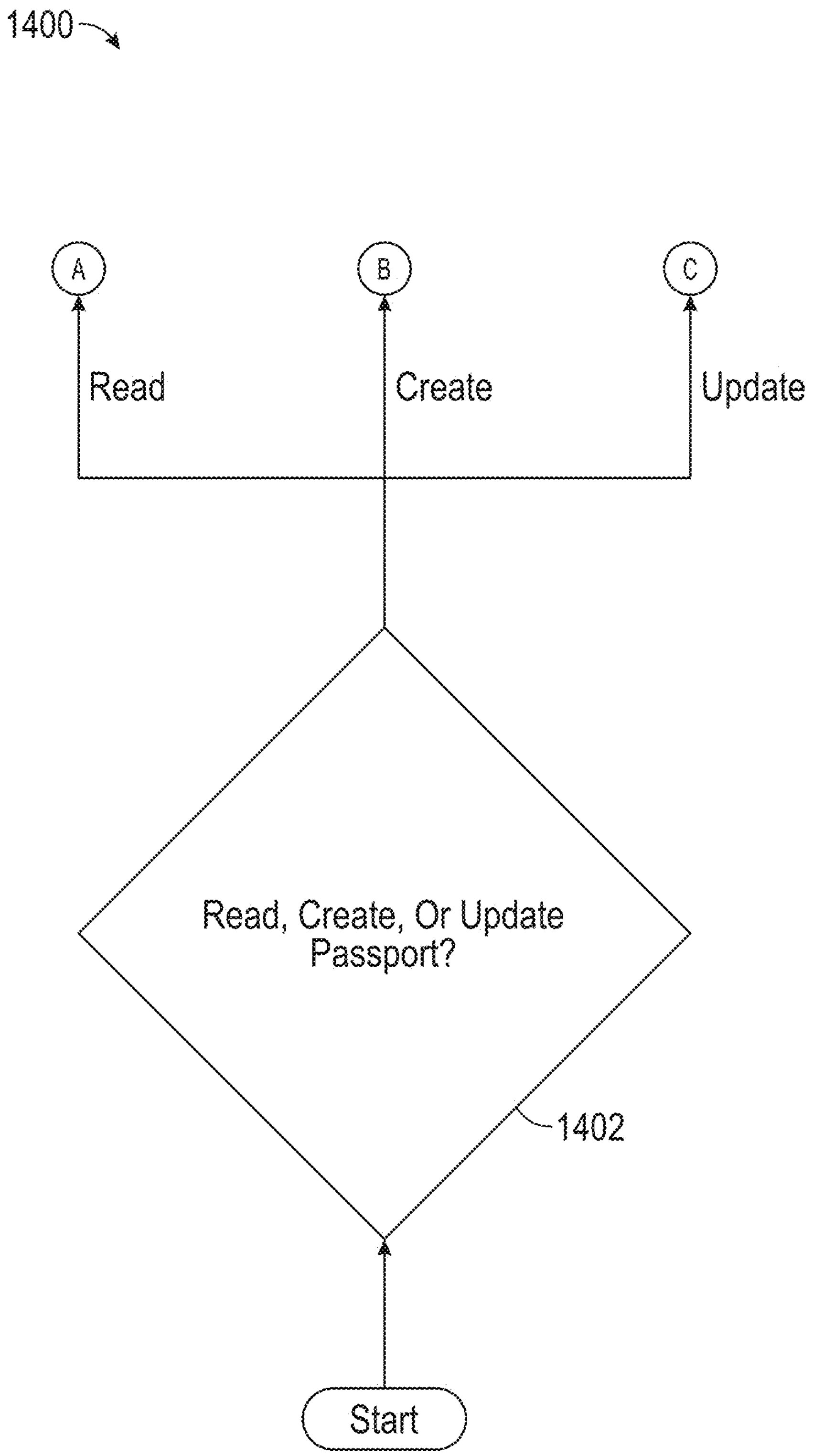
FIGS. 14A-14F depict a flowchart of a method of updating tokenized cyber resilience data, according to some arrangements.

Referring now to FIG. 14A, the method 1400 can including determining if data (e.g., a user identity such as dynamic passport 1232) is to be read (e.g., accessed), created (e.g., generated), or updated (e.g., modified) at block 1402. For example, the method 1400 can continue to node A (also referred to as a "decision node" or "decision point") responsive to determining an existing passport is to be read at block 1402. The method 1400 can continue to node B responsive to determining a passport does not exist and a new passport will be generated at block 1402. Further, the method 1400 can continue to node C responsive to determining an existing passport is to be updated (e.g., have data modified, altered, appended to, deleted from, etc.) at block 1402.

Figure 14B:
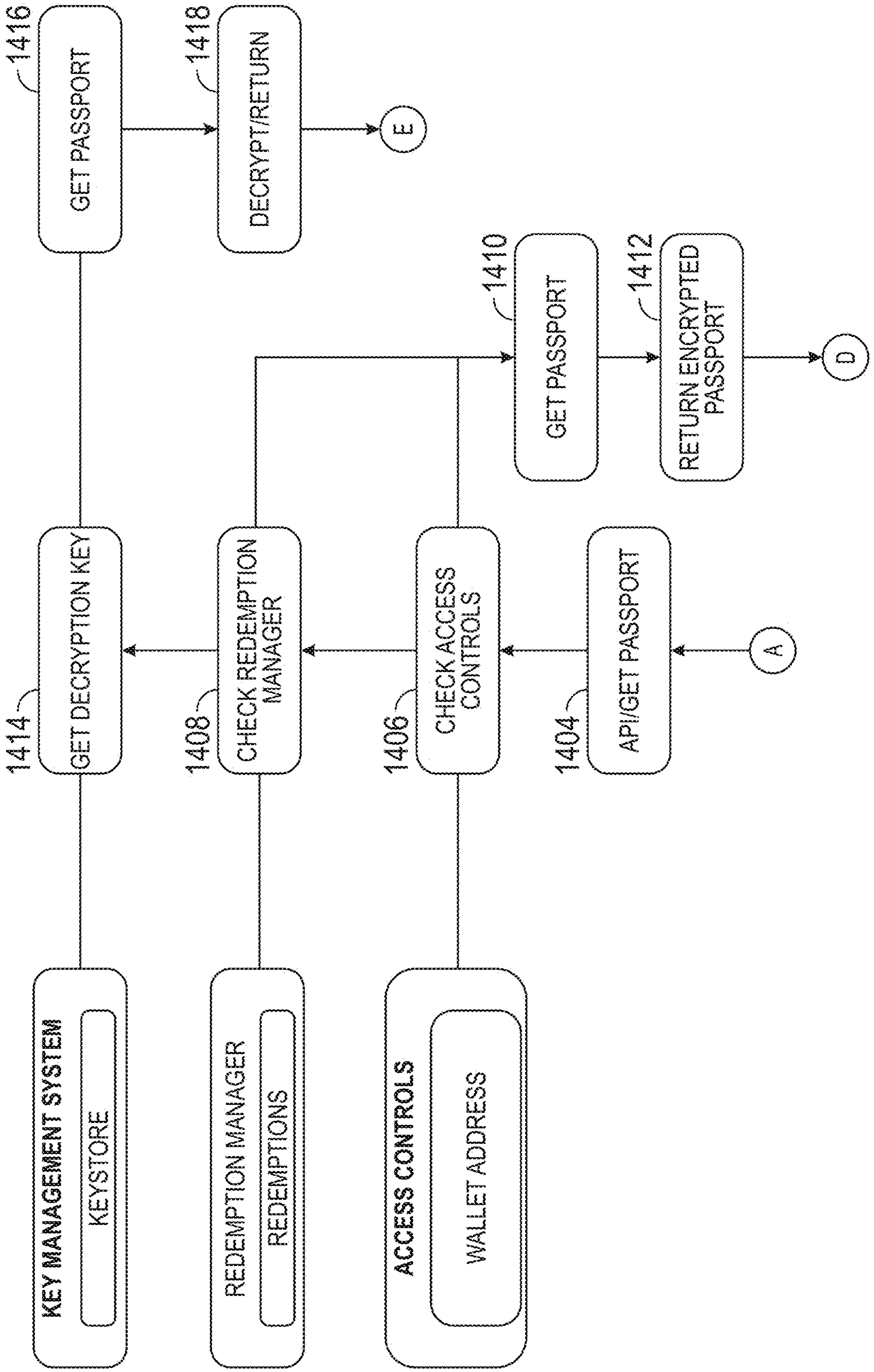

Referring now to FIG. 14B, after the passport is selected to be read at block 1402, the method 1400 can include executing an API call or otherwise executing a function to receive or get the passport at block 1404 (e.g., based on an identifier of the passport). For example, the passport system 1120 can receive a cyber resilience identifier (e.g., passport) at block 1402 and execute an API call to receive data corresponding to the identifier (e.g., tokens, etc.) at block 1404. For example, the passport system 1120 can execute an API call to cause a computing system to provide the cyber resilience identifier in response to the API call. At block 1408, the method 1400 can include checking access controls corresponding to the cyber resilience identifier. For example, checking access controls at block 1408 may include verifying whether the cyber resilience identifier is associated with role-based access controls (RBAC) that determine access to data or system functions. If access controls are identified at block 1408, the method 1400 can continue to block 1410 of providing the access controls (e.g., RBAC permissions) and a wallet address. If access controls are not identified at block 1408 (e.g., if the user does not have RBAC permissions), the method can proceed to block 1410 of receiving an encrypted passport and block 1412 of returning the encrypted passport, and further to node D as further described herein.

Still referring to FIG. 14B, if the wallet address identified at block 1406 has access control permission (e.g., RBAC permissions), the method can proceed to block 1408 and check a redemption manager. For example, checking the redemption manager at block 1408 may involve comparing the current request or transaction data against a stored list of purchased redemptions to verify whether the user has already redeemed a particular service or product at block 1410. If the redemption check is not successful at block 1408, the method 1400 can proceed block 1410 of receiving an encrypted passport and block 1412 of returning the encrypted passport, and further to node D as further described herein. If the redemption manager check at block 1408 is successful, the method may continue by receiving a decryption key at block 1414. For example, receiving the decryption key at block 1412 may involve a key management system accessing a keystore to retrieve the decryption key. After receiving the decryption key at block 1412, the method can proceed to block 1416 of receiving or retrieving a decrypted passport and block 1418 of returning or providing the decrypted passported, and further to node E as further described herein.

Figure 14C:
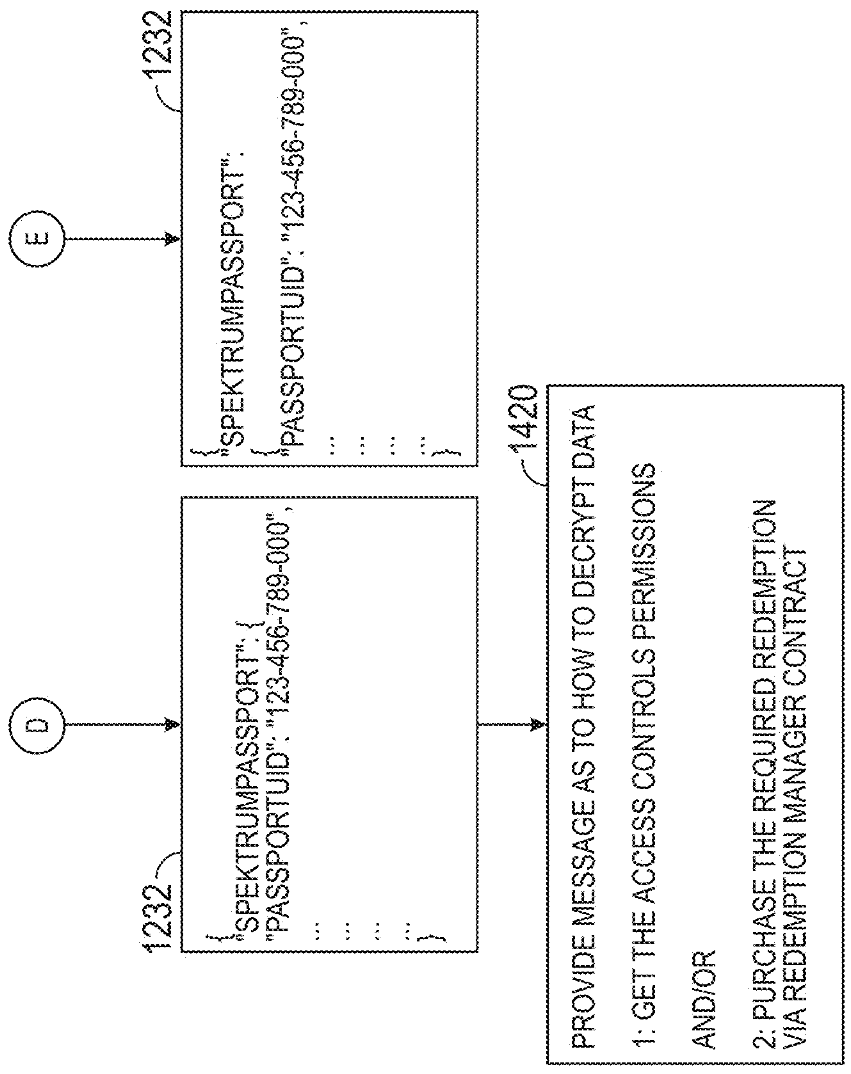

Referring now to FIG. 14C, the passport can be dynamic passport 1232 and include various cyber resilience data, including identifiers (e.g., passport UID), tokens (e.g., tokens 1234), and more. That is, dynamic passport 1232 can be the decrypted passport returned at block 1412. If the decrypted passport is returned at block 1412, the method 1400 can include block 1420 of providing a message for decrypting the data (e.g., getting access controls permissions and/or purchasing a redemption via a redemption manager contract). In other arrangements, the dynamic passport 1232 can be the encrypted passport returned at block 1418.

Figure 14D:
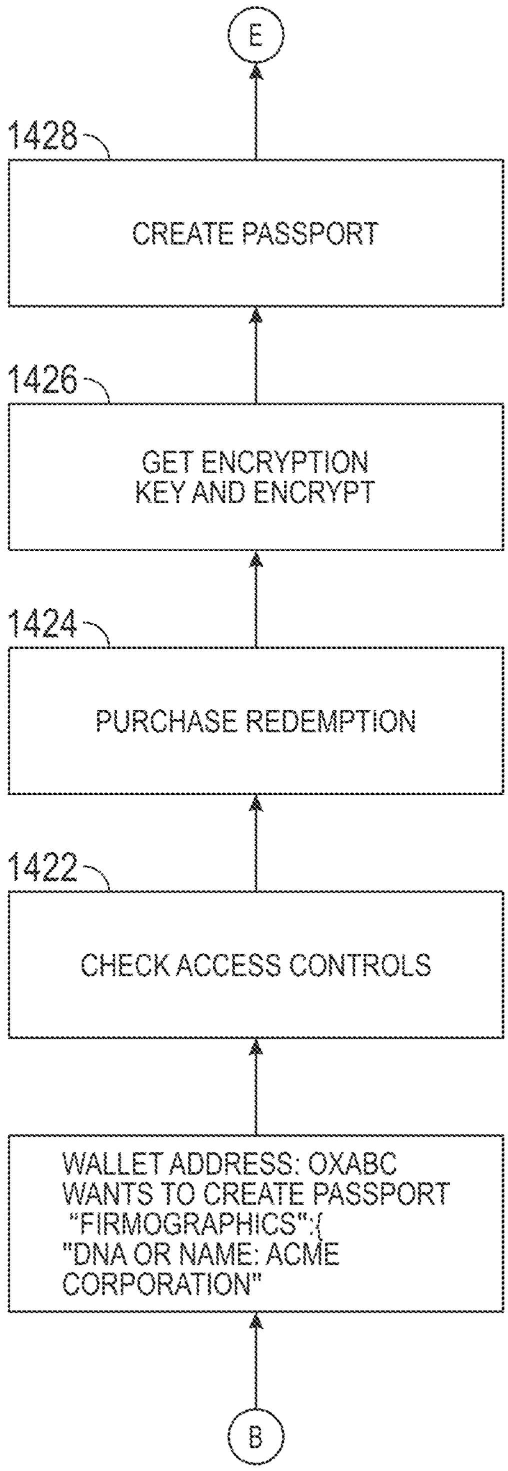

Referring now to FIG. 14D, after a passport is selected to be created at block 1402, the method 1400 can continue from node B and can include accessing a wallet (e.g., wallet system 1112) to determine various information for creating a passport (e.g., firmographics data such as entity name, security data, etc.). In some examples, the method 1400 can include checking access controls at block 1422 (e.g., as described regarding block 1406). The method 1400 can further include purchasing a redemption at block 1424 (e.g., as described regarding block 1408). In some arrangements, In the context of tokenized cyber resilience data, a "redemption" can refer to the process by which a token holder utilizes or exchanges a token to access services, benefits, or data within the cyber resilience framework. For example, redemption may involve using a token to unlock access to cyber resilience services, such as updated security audits, compliance certifications, or advanced security features. Additionally, redemption can facilitate the retrieval of cyber resilience data, such as incident response plans, readiness reports, or historical security posture records, which are secured within the system. In some implementations, redemption may involve exchanging tokens for digital assets, such as Non-Fungible Tokens (NFTs) that certify an organization's incident readiness or insurance readiness status. This process can be particularly relevant for demonstrating compliance or preparedness in cybersecurity contexts. Moreover, within systems that include claims tokens, redemption may be used to initiate or complete a claims process related to a cyber incident, with the redemption manager verifying that the claim meets the appropriate criteria before proceeding. A redemption manager can manage these various redemption processes, and tokens can be utilized within the system to grant access to the desired services, data, or assets.

Still referring to FIG. 14D, the method 1400 can include receiving the encryption key and encrypting at least a portion data corresponding to the wallet (e.g., the received data for generating the passport) at block 1426 (e.g., as described regarding block 1414). In some arrangements, the method 1400 can include creating the passport at block 1428 (e.g., based on the wallet data). For example, the passport system 1120 can generate the dynamic passport 1232 at block 1428 and provide or return the generated passport to a user or other entity (e.g., organization, vendor, etc.).

Figure 14E:
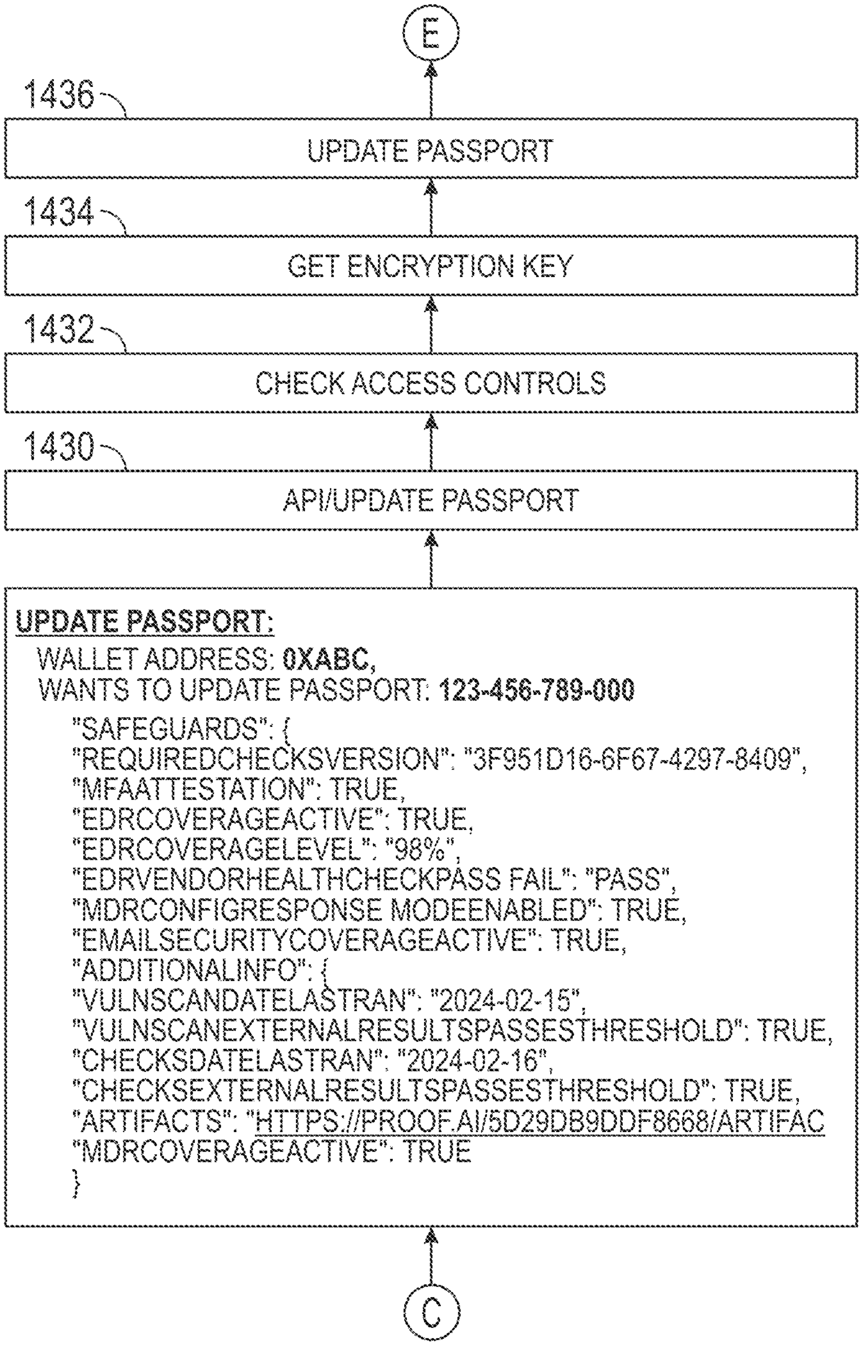

Referring now to FIG. 14E, after a passport is selected to be updated at block 1402, the method 1400 can continue from node C and can include executing an API call with various passport data (e.g., wallet address, passport identifier, etc.) at block 1430. In some examples, the API call can include information corresponding with the passported selected to be updated at block 1402 (e.g., based on a wallet address or passport identifier). The method 1400 can further include checking access controls at block 1432, retrieving a corresponding encryption key (e.g., based on the passport data) at block 1434, and updating the passport at block 1436 (e.g., as described above regarding blocks 1406, 1408, and 1414, respectively). For example, the dynamic passport 1232 can include data cyber resilience data (e.g., tokens, firmographic data, etc.) modified by the passport system 1120 at block 1436 and can be returned to the user in response to updating.

Figure 14F:
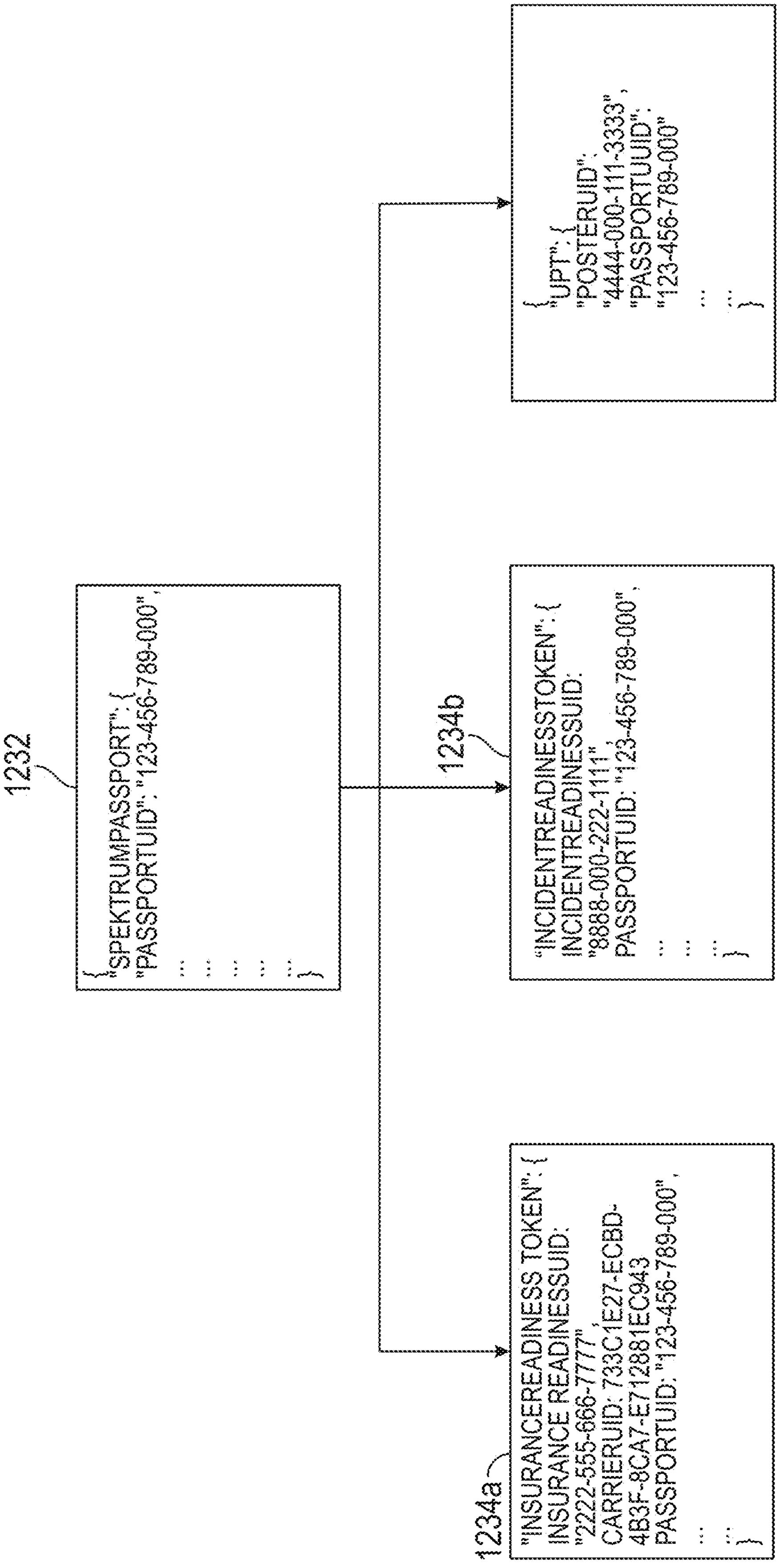

Referring now to FIG. 14F, responsive to reading, creating, or updating the passport at block 1402, the passport can be linked to a variety of cyber resilience data and/or other information and/or systems. For example, as shown in FIG. 14F, the dynamic passport 1232 can be linked with one or more tokens 1234*a*-1234*b* and various additional data structures or associated information, such as identifiers (e.g., UPT with a poster UID, passport UID, etc.) corresponding to the dynamic passport 1232.

Figure 15A:
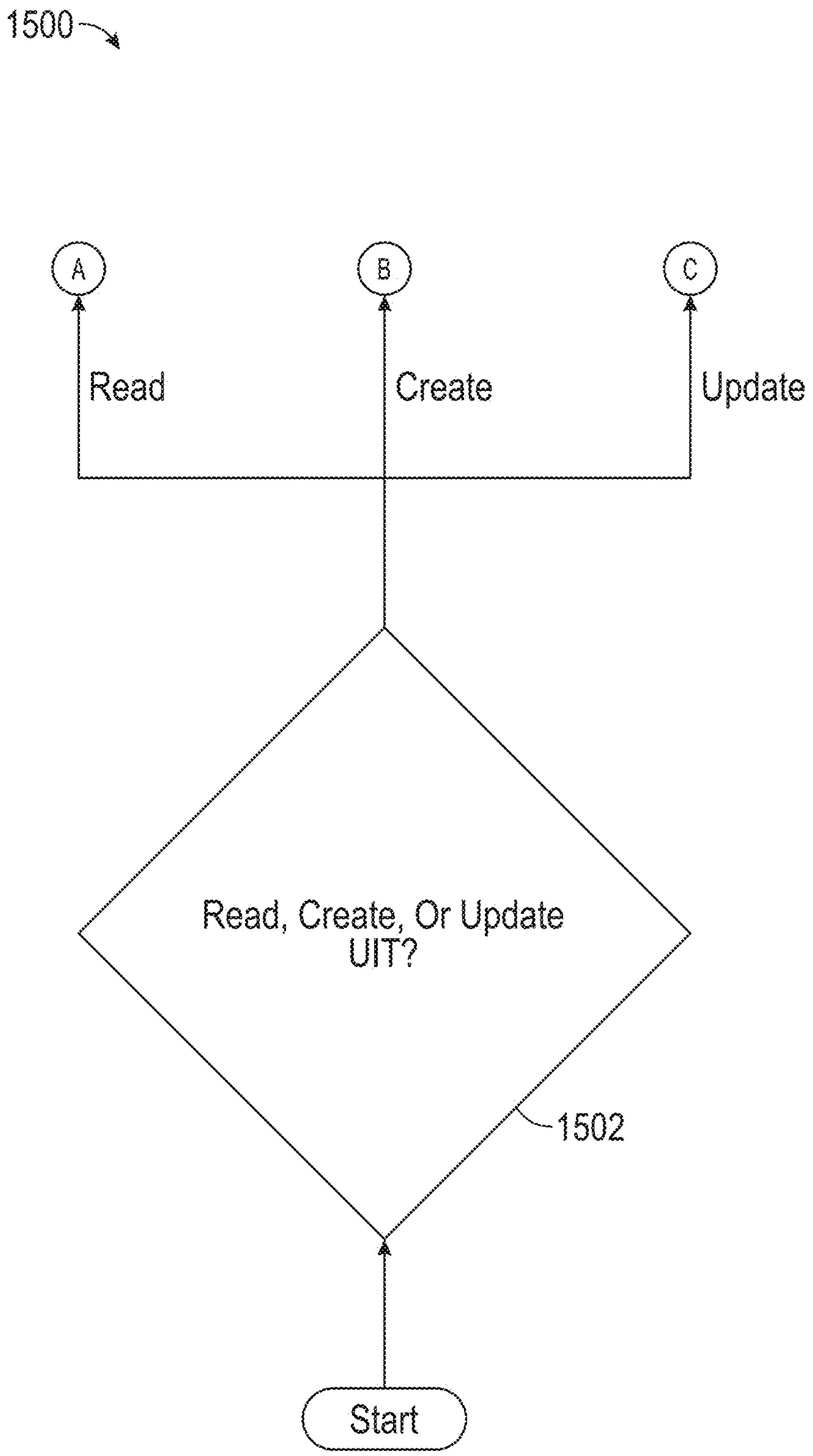
FIGS. 15A-15F depict a flowchart for a method of updating tokenized cyber resilience data, according to some arrangements.

Referring generally to FIGS. 15A-15F, a flowchart of a method 1500 of updating tokenized cyber resilience data is shown, according to some arrangements. Referring now to FIG. 15A, the method 1500 can including determining if data (e.g., a user identity token (UIT) or other identifier) is to be read (e.g., accessed), created (e.g., generated), or updated (e.g., modified) at block 1502.

In some arrangements, a user identity token (UIT) can serve as a secure digital identifier representing the unique identity of an entity or individual within the cyber resilience framework. A UIT can encapsulate various attributes such as user credentials, access permissions, and identity verification data, and can be used to authenticate and authorize interactions within a secure environment. For example, a UIT can be used to manage access to sensitive data or systems by linking the token to roles or privileges. Additionally, a UIT can be dynamically updated to reflect changes in an entity's status, permissions, or attributes, such that the token remains an accurate and secure representation of the user's identity within an environment. That is, in some arrangements, the method 1500 described in FIGS. 15A-15F is similar to the method 1400 described in FIGS. 14A-14F, but with a UIT being used in place of a passport. For example, the method 1500 can continue to node A responsive to determining an existing UIT is to be read at block 1502. The method 1500 can continue to node B responsive to determining a UIT does not exist and a new UIT will be generated at block 1502. Further, the method 1500 can continue to node C responsive to determining an existing UIT is to be updated (e.g., have data modified, altered, appended to, deleted from, etc.) at block 1502.

Figure 15B:
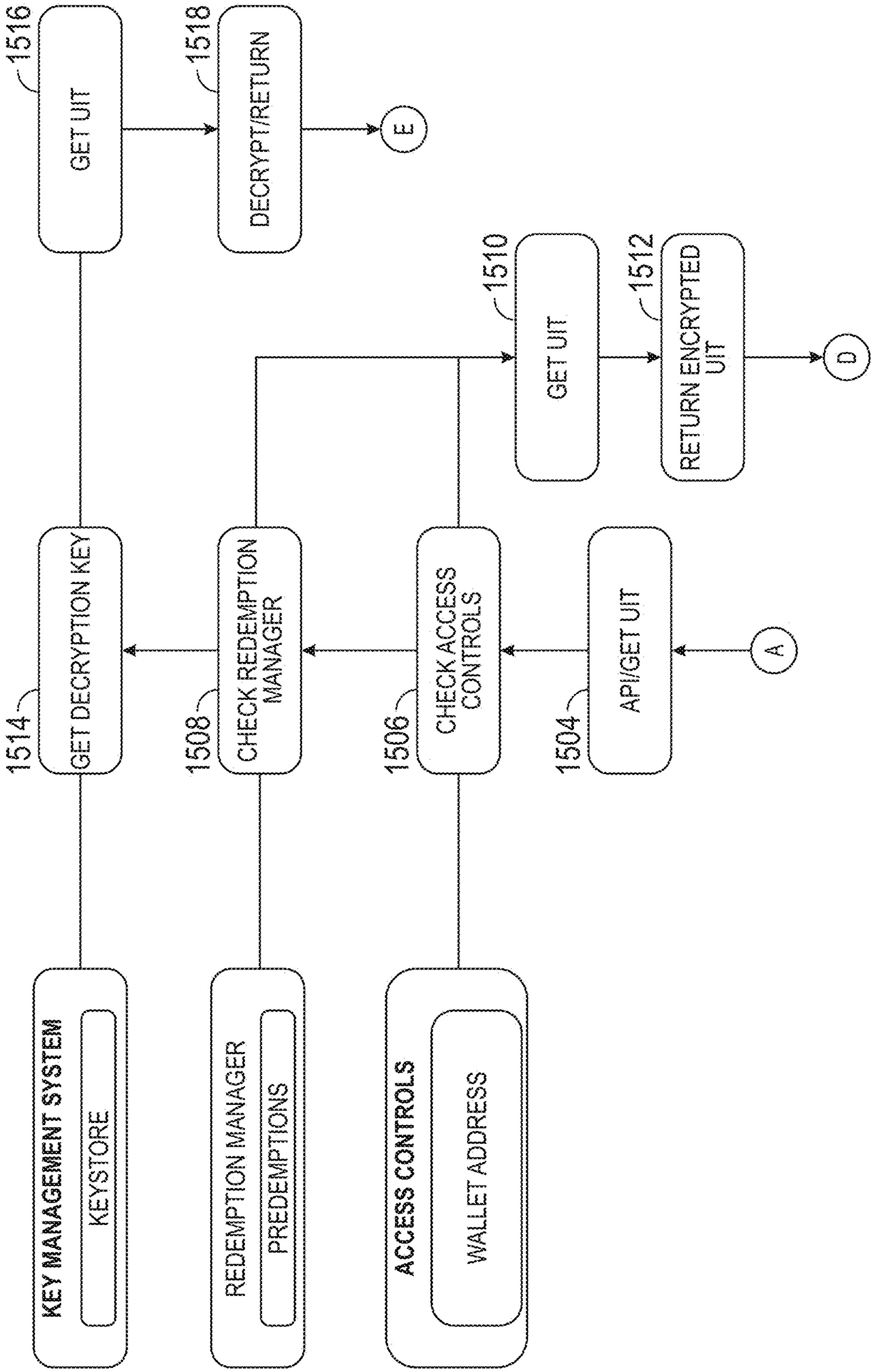

Referring now to FIG. 15B, after the UIT is selected to be read at block 1502, the method 1500 can include executing an API call or otherwise executing a function to receive or get the UIT at block 1504 (e.g., based on an identifier of the UIT). For example, the passport system 1120 can receive a cyber resilience identifier (e.g., UIT) at block 1502 and execute an API call to retrieve data corresponding to the identifier (e.g., tokens, etc.) at block 1504. In another example, the passport system 1120 can execute an API call that prompts a computing system to provide the cyber resilience identifier in response to the API call. At block 1508, the method 1500 can include checking access controls corresponding to the cyber resilience identifier. For example, checking access controls at block 1508 can include verifying whether the cyber resilience identifier is associated with role-based access controls (RBAC) that determine access to data or system functions.

For example, roles within the RBAC structure could include an "Administrator" role with full access to modify, update, and delete data within the cyber resilience identifier, a "Compliance Officer" role with the ability to view and audit data without making changes, and an "External Auditor" role with restricted access to metadata objects or performance datasets related to compliance verification. In a cyber resilience system, roles within the RBAC structure could include a "Customer" role (e.g., with access to view certain performance data and compliance information), an "Insurer" role (e.g., with permissions to view and modify metadata objects related to risk assessments or claims), and a "Vendor" role (e.g., with restricted access to only certain the metadata objects used for providing services or support). Various entities can be assigned permissions or otherwise authorized based on the RBAC system, and the access controls can include levels of access to different system functions or data points (e.g., reading, writing, or executing actions related to the cyber resilience identifier and/or related tokens/metadata). In some arrangements, If access controls are identified at block 1508, the method 1500 can continue to block 1510 of providing the access controls (e.g., RBAC permissions) and a wallet address. If access controls are not identified at block 1508 (e.g., if the user does not have RBAC permissions), the method can proceed to block 1510 of receiving an encrypted UIT and block 1512 of returning the encrypted UIT, and further to node D as further described herein.

Still referring to FIG. 15B, if the wallet address identified at block 1506 has access control permission (e.g., RBAC permissions), the method can proceed to block 1508 and check a redemption manager. For example, checking the redemption manager at block 1508 may involve comparing the current request or transaction data against a stored list of purchased redemptions to verify whether the user has already redeemed a particular service or product at block 1510. If the redemption check is not successful at block 1508, the method 1500 can proceed to block 1510 of receiving an encrypted UIT and block 1512 of returning the encrypted UIT, and further to node D as further described herein. If the redemption manager check at block 1508 is successful, the method may continue by receiving a decryption key at block 1514. For example, receiving the decryption key at block 1514 may involve a key management system accessing a keystore to retrieve the decryption key. After receiving the decryption key at block 1514, the method can proceed to block 1516 of receiving or retrieving a decrypted UIT and block 1518 of returning or providing the decrypted UIT, and further to node D as further described herein.

Figure 15C:
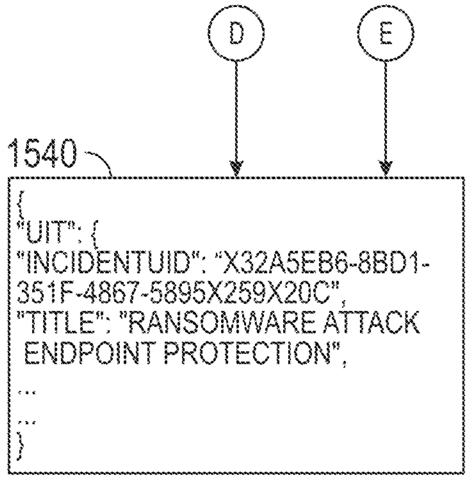

Referring now to FIG. 15C, the method 1500 can continue from node D or node E to provide the UIT 1540, which can include a tokenized data structure containing various cyber resilience data, such as incident identifiers (e.g., incident UID) and cyber protection data (e.g., "ransomware attack endpoint protection"). The UIT 1540 can be returned at block 1512 or block 1518, either in encrypted or decrypted form, as described regarding the passport in FIG. 1.

Figure 15D:
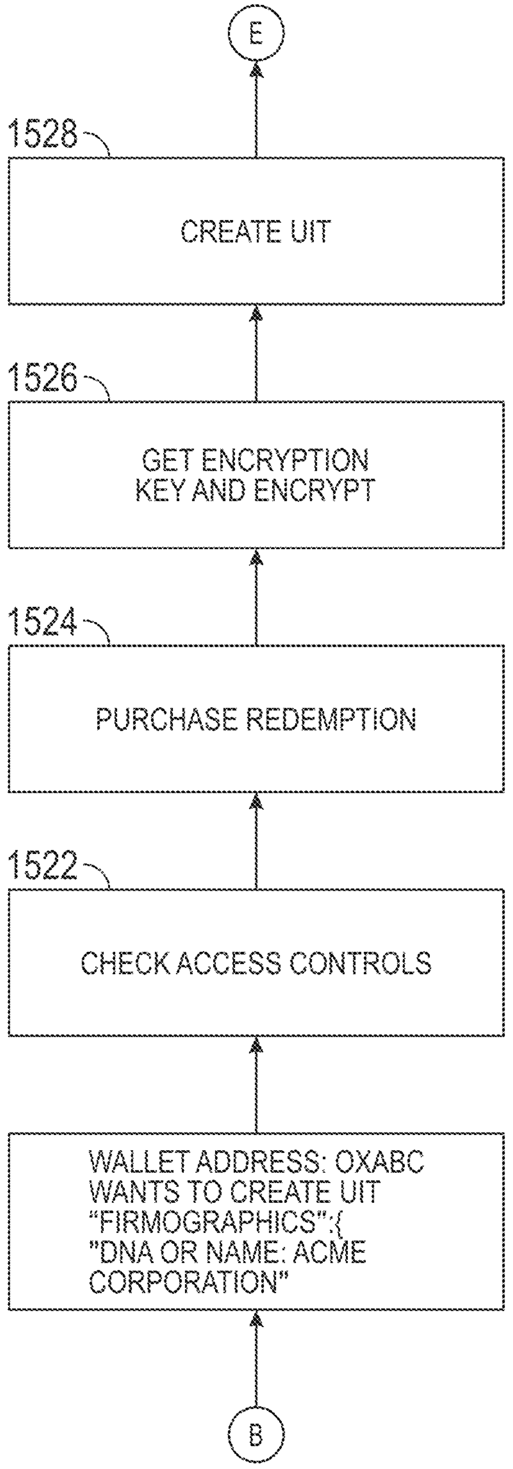

Referring now to FIG. 15D, after a UIT is selected to be created at block 1502, the method 1500 can continue from node B and include accessing a wallet (e.g., wallet system 1112) to determine information necessary for creating the UIT 1540 (e.g., firmographics data such as entity name, security data, etc.). The method 1500 can also include checking access controls at block 1522 and purchasing a redemption at block 1524, as described in previous steps. further, the method 1500 can include receiving an encryption key and encrypting data corresponding to the wallet at block 1526 (e.g., the data received for generating the UIT). The method 1500 can further include creating the UIT at block 1528, and further providing the UIT 1540 to a user or other entity (e.g., organization, vendor).

Figure 15E:
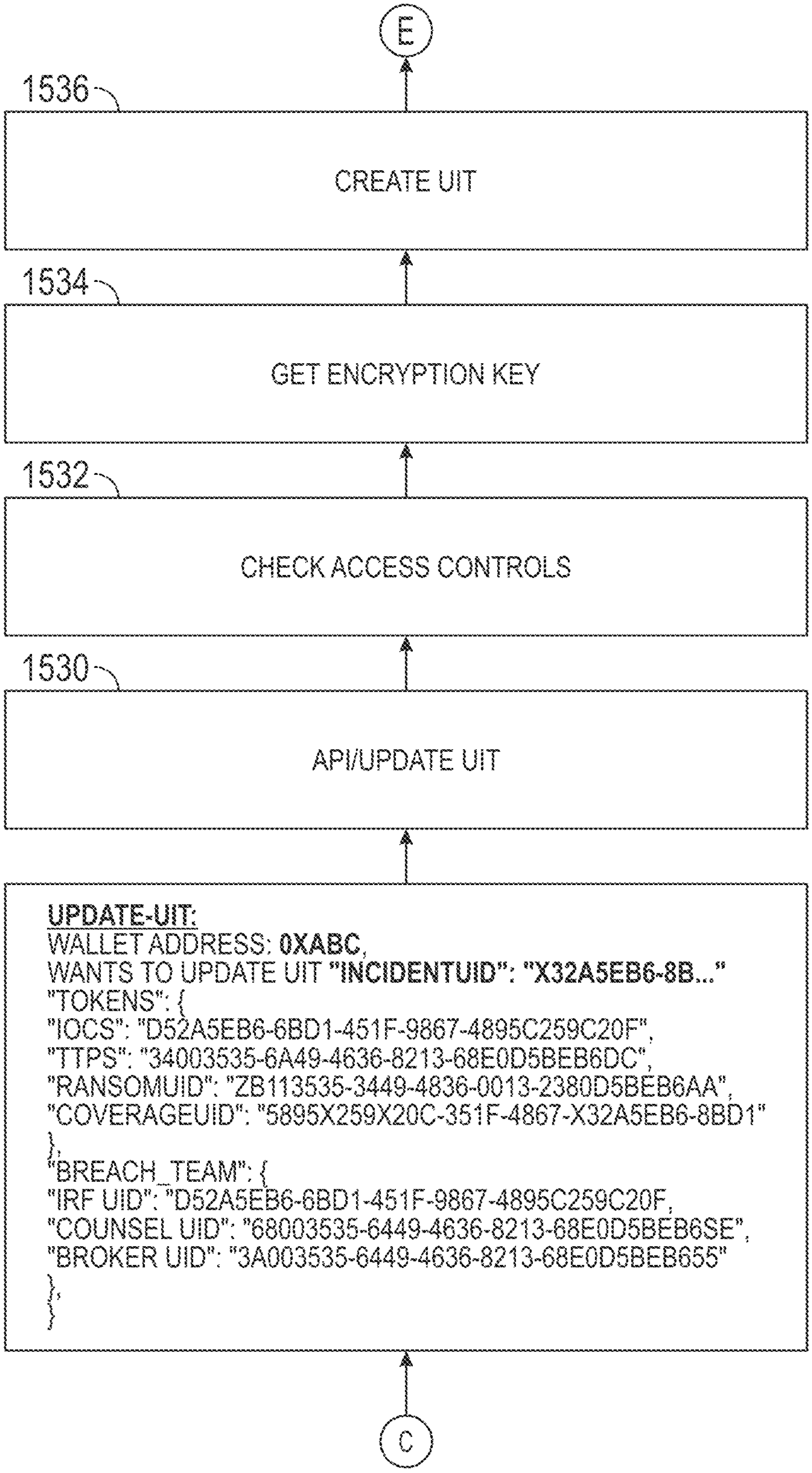

Referring now to FIG. 15E, after a UIT is selected to be updated at block 1502, the method 1500 can continue from node C and include executing an API call with various UIT data (e.g., wallet address, UIT identifier) at block 1530. The API call can include information corresponding with the UIT selected to be updated at block 1502. The method can further include checking access controls at block 1532, retrieving a corresponding encryption key at block 1534, and updating the UIT at block 1536.

Figure 15F:
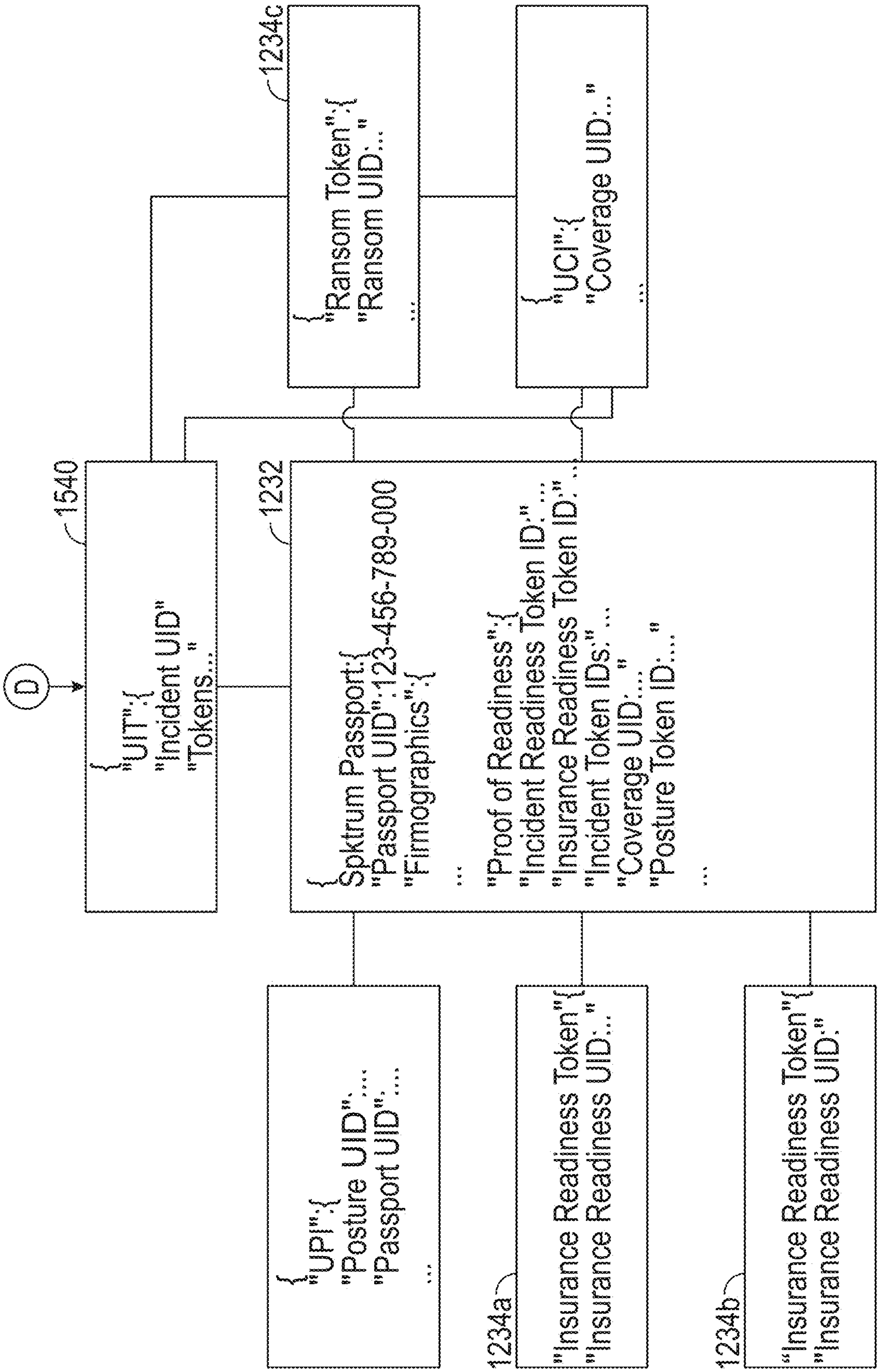

Referring now to FIG. 15F, responsive to reading, creating, or updating the UIT at block 1502, the UIT can be linked to various cyber resilience data and/or other systems. For example, the UIT 1540 can be linked with one or more tokens 1234*a*-1234*c* (e.g., directly or via a link with the dynamic passport 1232) and various additional data structures or associated information, such as identifiers (e.g., UPT with a poster UID and passport UID, UCI with coverage UID, etc.) corresponding to the at least one of dynamic passport 1232 or the UIT 1540.

Figure 16:
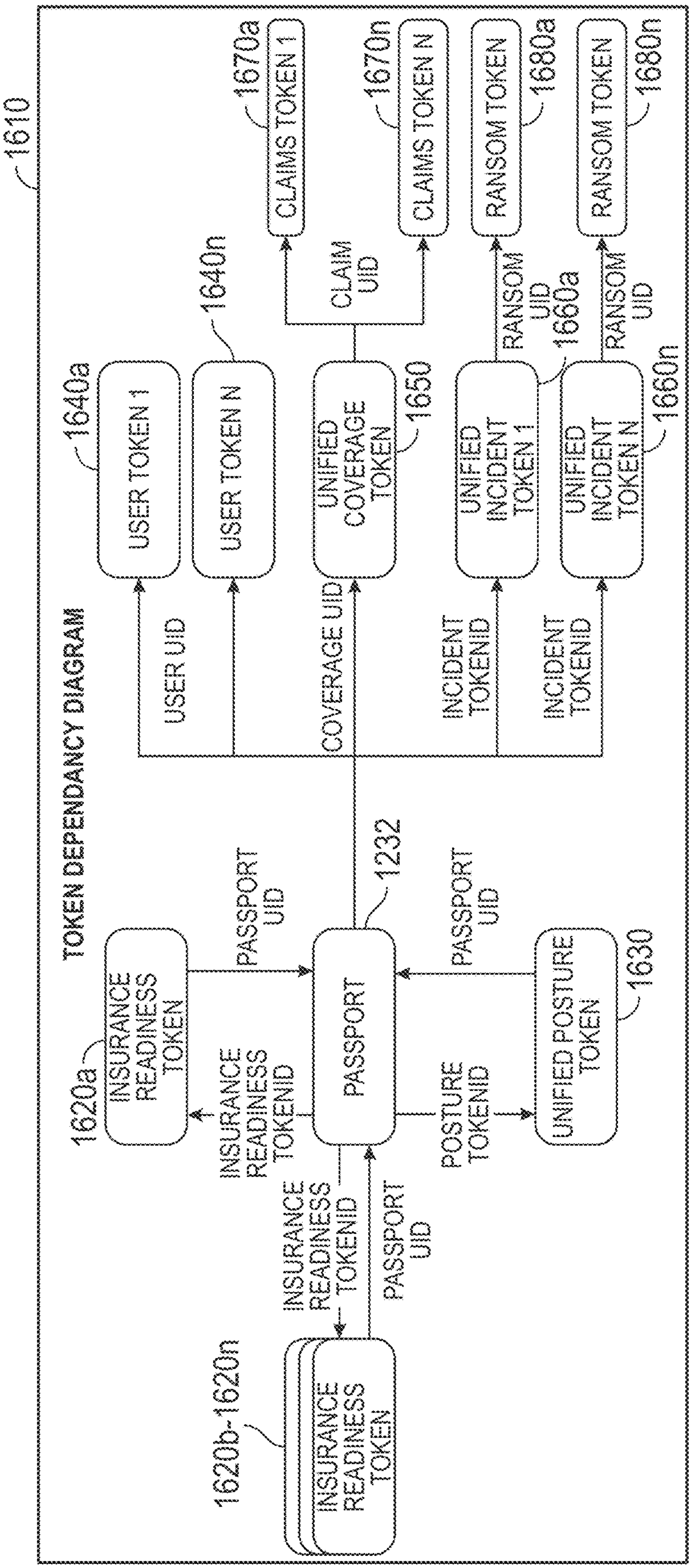
FIG. 16 depicts a block diagram of a token dependency system for tokenized cyber resilience data, according to some arrangements.

Referring now to FIG. 16, a block diagram of a token dependency system 1610 for tokenized cyber resilience data is shown, according to some arrangements. The implementation shown in FIG. 16 includes a dynamic passport 1232 and one or more insurance readiness tokens 1620*a*-1620*n* (collectively, 1620), a unified posture token 1630, one or more user tokens 1640*a*-1630*n* (collectively 1640), a unified coverage token 1650, one or more unified incident tokens 1660*a*-1660*n* (collectively 1660), claims tokens 1670*a*-1670*n* (collectively 1670 tokens), and ransom tokens 1680*a*-1680*n*.

In some arrangements, the dynamic passport 1232 can operate as a central node and be linked to tokenized cyber resilience data (e.g., tokens) to facilitate interactions across the various tokens in managing, accessing, and/or updating cyber resilience data. For example, the dynamic passport 1232 can be linked to the insurance readiness tokens 1620 via the passport UID and/or insurance readiness token ID. In another example, the dynamic passport 1232 can be linked to the unified posture token 1630 through the passport UID and/or posture token IDs. Further, the dynamic passport 1232 can be linked to user tokens 1640 through a user UID. The dynamic passport 1232 can further be linked to the user to a unified coverage token 1650 via a coverage UID. In some examples, the unified coverage token 1650 can be linked to claims tokens 1670 via a claim UID, and the link can provide the dynamic passport 1232 with access to the claims tokens 1670. Further, the dynamic passport 1232 can be linked with the unified incident tokens 1660 via an incident token ID. In some examples, the unified incidents tokens 1660 can be linked to the ransom tokens 1680 via a ransom UID, and the link can provide the dynamic passport 1232 with access to the ransom tokens 1680.

Figure 17:
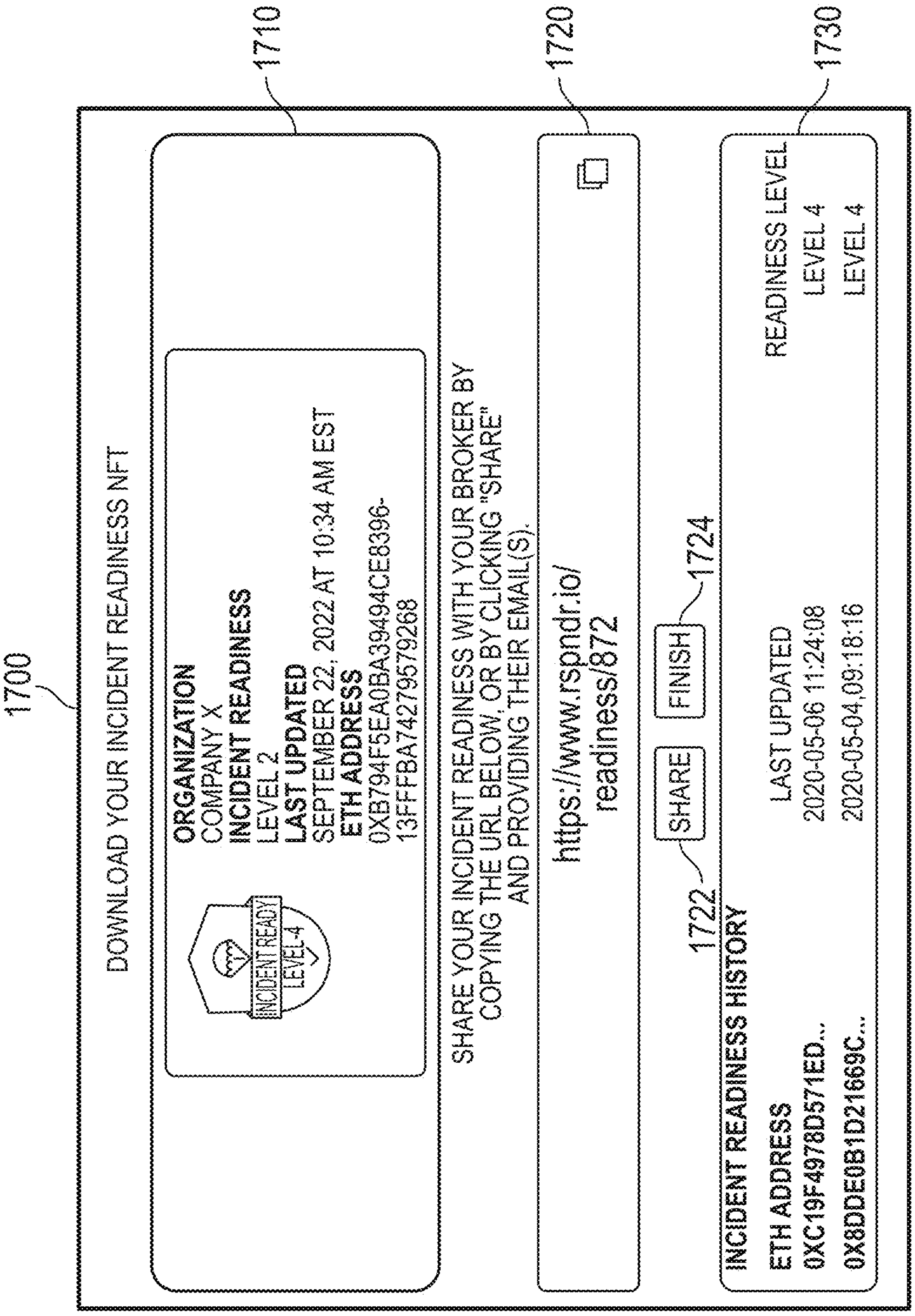
FIG. 17 depicts a block diagram of a graphical user interface for interfacing with tokenized cyber resilience data, according to some arrangements.

Referring now to FIG. 17, a block diagram of a graphical user interface (GUI) 1700 for interacting with tokenized cyber resilience data is shown, according to some arrangements. As shown in FIG. 17, the GUI 1700 can include security posture data 1710, a cyber resilience data sharing element 1720, and incident readiness data 1730. In some examples, the cyber resilience data sharing element 1720 can include a sharing button 1722 and a confirmation button 1724. In some arrangements, the GUI 1700 can include various additional elements (e.g., user input items, etc.) or content (e.g., data, images, text, etc.) to provide users with access to and management of cyber resilience information (e.g., tokens storing cyber resilience data). In some arrangements, the GUI 1700 can provide an incident readiness NFT (e.g., incident readiness token 1620) for download (e.g., to the user) or sharing (e.g., to another entity).

In some arrangements, the security posture data 1710 can display information regarding a current security status or other information of an entity or organization, such as a company name, readiness levels, recent updates, and/or addresses/identifiers of the entity or organization corresponding with a dynamic passport 1232. For example, the security posture data 1710 can include a portion of tokenized cyber resilience data corresponding to the entity (e.g., linked to the dynamic passport 1232) in a user interface (e.g., GUI 1700) for viewing. In some embodiments, the security posture data 1710 can provide entities with a centralized and/or summarized view of organizational security posture such that users can quickly access entity information and corresponding cybersecurity posture information. The security posture data 1710 can further include badges and/or other icons to provide graphical illustrations of cyber resilience information.

In some arrangements, the cyber resilience data sharing element 1720 can provide functionality for sharing relevant cyber resilience information with external parties, such as brokers or partners. For example, a user can interact with (e.g., click with a mouse, press on a touchscreen, select via voice control, etc.) the sharing button 1722 and/or the confirmation button 1724 to cause a shareable URL or other data sharing link to be generated for sharing tokenized cyber resilience data (e.g., for downloading or transmitting one or more incident readiness tokens 1620. For example, the cyber resilience data sharing element 1720 can provide options to send or transmit tokenized cyber resilience via email and include additional elements for receiving broker/vendor email addresses for sending the tokenized data. In some arrangements, the cyber resilience data sharing element 1720 can allow users to download or share an NFT (Non-Fungible Token) that encapsulates the organization's cyber readiness status in a verified and immutable format (e.g. incident readiness token 1620). For example, the entity can select the cyber resilience data sharing element 1720 (e.g., by clicking sharing button 1722 or confirmation button 1724) to share a hyperlink to provide a vendor with access to an NFT including cyber resilience data corresponding to the entity.

In some arrangements, the incident readiness data 1730 can present information or data corresponding to the organization or entity's preparedness for handling cyber incidents. This data may include historical readiness levels, associated Ethereum (ETH) addresses, and timestamps of updates. For example, the incident readiness data 1730 can include tokenized cyber resilience data stored on incident readiness tokens 1620 and/or other tokens (e.g., unified posture tokens 1630, etc.). For example, the incident readiness data 1730 can include incident readiness history including chronological data corresponding to the organization's cyber resilience status, as shown in FIG. 17.

Figure 18A:
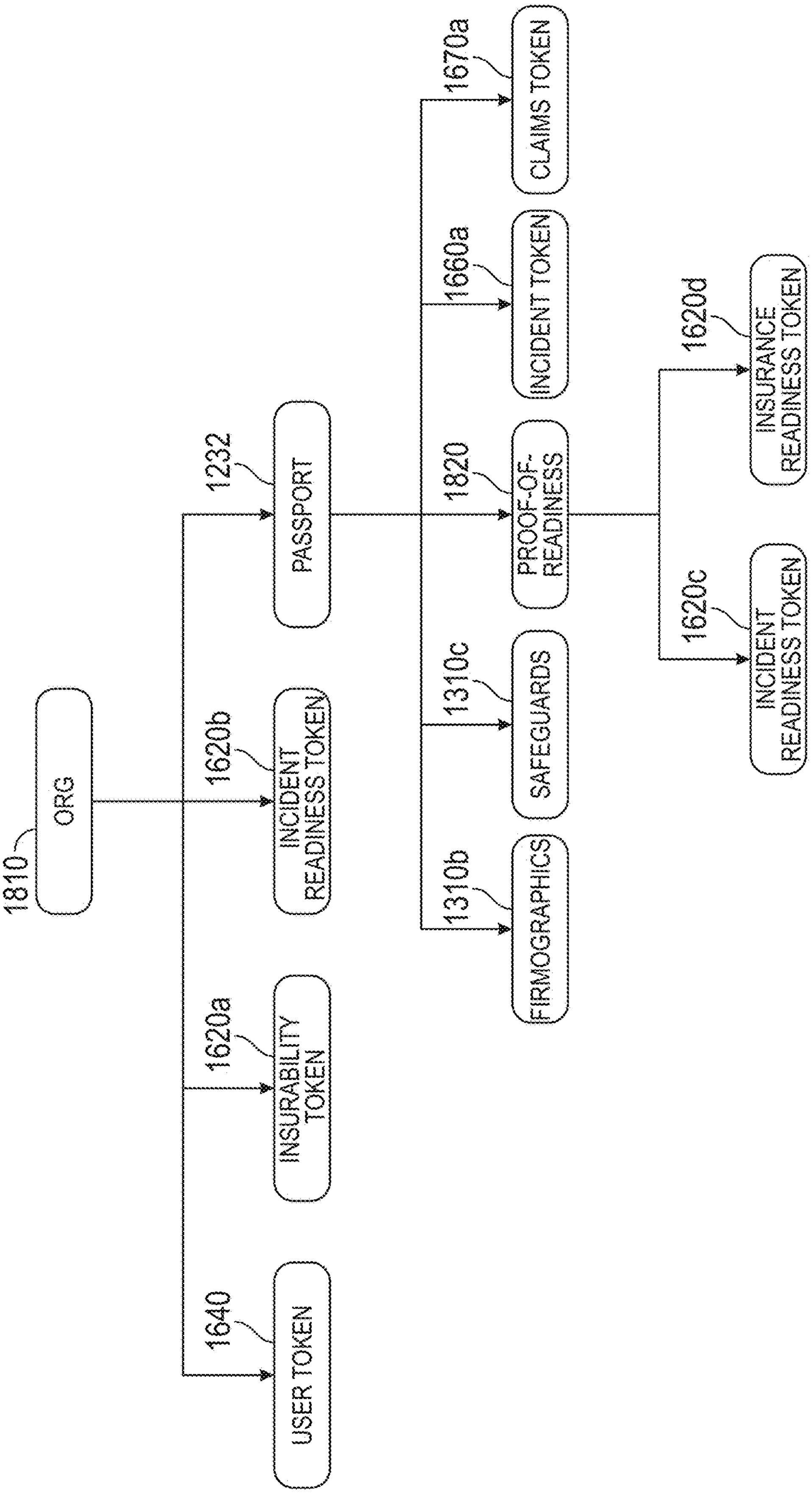
FIGS. 18A-18B depict a block diagram with tokenized cyber resilience data and corresponding entities or systems, according to some arrangements.
Figure 18B:
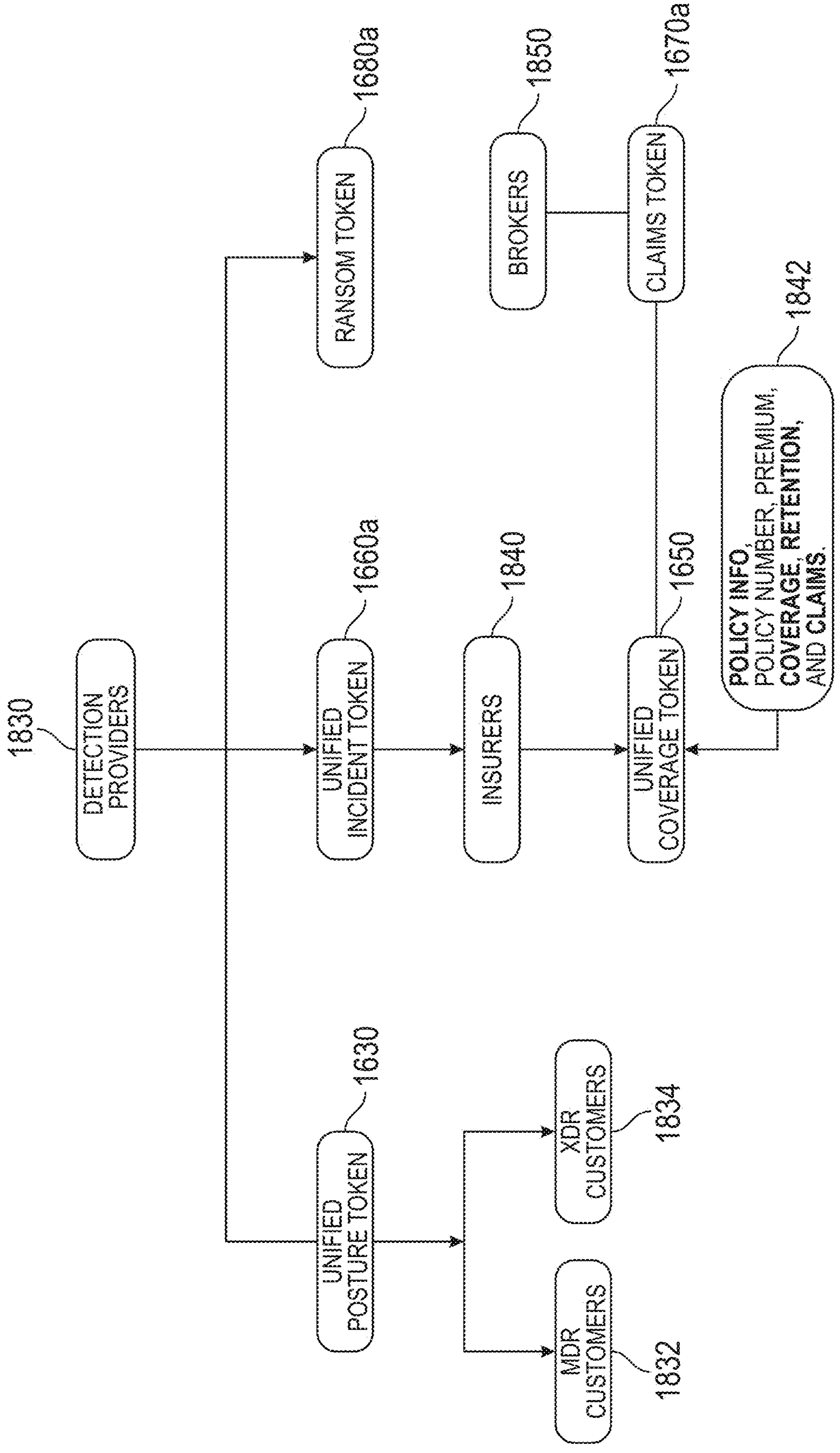

Referring generally to FIGS. 18A-18B, a block diagram with tokenized cyber resilience data and corresponding entities or systems is shown, according to some arrangements. Referring now to FIG. 18A, an organization 1810 can access tokens including user token 1640, insurability token 1620*a*, and incident readiness token 1620*b*. The organization 1810 can also access and be associated with a dynamic passport 1232 (e.g., cyber resilience identity), which can be linked to the user token 1640, insurability token 1620*a*, and incident readiness token 1620. The dynamic passport 1232 can be linked to various cyber resilience data, including firmographics data 1310*b*, safeguard data 1310*c*, and proof-of-readiness data 1820. The passport 1232 can also be linked to unified incident token 1660*a* and a claims token 1670*a*. The proof-of-readiness data 1820 can be linked to incident readiness token 1620*c* and insurance readiness token 1620*d*.

In some arrangements, the RBAC structure can define various rules or roles (e.g., general types, organization-level roles, etc.) and determine access to different data and system functions. For example, the RBAC structure can permit the a customer, such as organization 1810 and/or individuals associated with the organization 1810, to view performance data stored in the dynamic passport 1232, while restricting others (e.g., insurers, vendors, etc.) from modifying this data. For examples, vendors and insurers (e.g., detection providers 1830 and insurers 1840) may have read-only permissions to view datasets, such as the unified incident token 1660*a* or the unified coverage token 1650, but they are restricted from making modifications. Within the organization 1810, additional controls can further restrict access based on internal roles, such as a compliance officer being able to view, but not modify, the incident readiness token 1620*c*, while a system administrator may have RBAC authorization or authority to manage both views and modifications across various tokens. In some arrangements, the organization 1810 can access and/or be linked (e.g., via dynamic passport 1232) to various additional tokens not shown in FIG. 18A (e.g., gaps tokens, etc.).

Referring now to FIG. 18B, detection providers 1830 can access unified posture token 1630 of the organization 1810. The unified posture token 1630 can be linked to managed detection and response (MDR) customers 1832 and/or extended detection and response (XDR) customers 1834. For example, MDR customers 1832 can include entities that subscribe to services where continuous monitoring, threat detection, and incident response are managed by an external security provider. XDR customers 1834 can include organizations that utilize an integrated security approach, where data from multiple security layers (e.g., network, endpoint, and cloud) is correlated for threat detection and response. In some arrangements, detection providers 1830 can be a MDR provider or an XDR provider. Further, the detection providers 1830 can be linked to unified incident token 1660*a*. The unified incident token 1660*a* can further be linked to unified coverage token 1650.

In some arrangements, the RBAC structure can define various rules or roles specific to detection providers 1830. For example, the RBAC structure can allow detection providers 1830 to access the unified posture token 1630, which can be linked to managed detection and response (MDR) customers 1832 and extended detection and response (XDR) customers 1834. The RBAC structure can permit MDR customers 1832 to access real-time data linked to the unified posture token 1630 for continuous monitoring and threat detection, while restricting them from modifying the incident readiness token 1620*b* or the unified incident token 1660*a*. Further, XDR customers 1834 can be permitted to view aggregated security data correlated across multiple layers, such as network, endpoint, and cloud, but might be restricted from accessing safeguard data 1310*c* or firmographics data 1310*b*. In some arrangements, the RBAC structure can further specify that only some roles within detection providers 1830 can access and interact with some tokens. For example, within detection providers 1830, roles such as security analysts may have read-only access to the unified posture token 1630, whereas incident responders can be authorized to perform certain actions, such as triggering response protocols based on the data.

Still referring to FIG. 18B, insurers 1840 can access the unified coverage token 1650. Further, the unified coverage token 1650 can be linked to insurance data 1842, which can include information used by the insurers 1840 in providing cyber resilience protection (e.g., cyber insurance) such as policy information, a policy number, premiums, coverage, retention, and claims. In some arrangements, brokers 1850 can access the unified coverage token 1650. For example, brokers 1850 (e.g., cyber resilience brokers) can receive the insurance data 1842 via the unified coverage token 1650. Further, the brokers 1850 can access claims token 1670*a*. For example, the claims token 1670*a* can provide brokers 1850 with claims information, such as claims history, incident data, and payout amounts used by the brokers 1850 to analyze risk and recommend appropriate cyber resilience strategies or insurance products.

In some arrangements, the RBAC structure can define access parameters for insurers 1840 and brokers 1850 regarding their interaction with cyber resilience tokens. For example, insurers 1840 can be granted access to the unified coverage token 1650, which can be linked to insurance data 1842. The RBAC structure can allow insurers 1840 to view and analyze policy information, premiums, coverage data, and claims data necessary for underwriting and processing claims. However, insurers 1840 might be restricted from modifying or accessing other tokens linked to the cyber resilience identity, such as the unified incident token 1660*a* or user token 1640. In some arrangements, the RBAC structure can also define roles within insurers 1840 and brokers 1850. For example, within insurers 1840, roles such as underwriters may have permission to view claims history through the claims token 1670*a*, while claims adjusters might only have access to summary data without the ability to alter the underlying information. Brokers 1850, who may be involved in recommending cyber resilience strategies or insurance products, can access datasets via the unified coverage token 1650 but may be restricted from viewing more sensitive information, such as safeguard data 1310*c* or performance event datasets, based on access controls (e.g., RBACs) implemented via a control structure (e.g., smart contract).

Figure 19A:
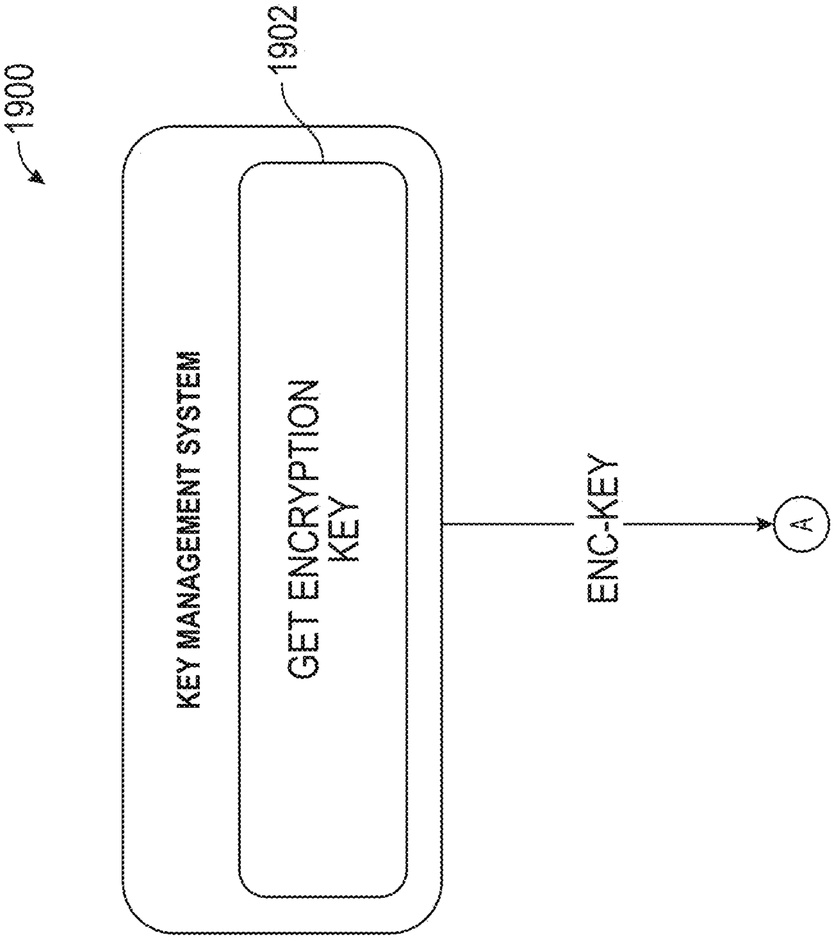
FIGS. 19A-19E depict a flowchart for a method of updating metadata of tokenized cyber resilience data, according to some arrangements.

Referring generally to FIGS. 19A-19E, a flowchart for a method 1900 of updating metadata of tokenized cyber resilience data is shown, according to some arrangements. Referring now to FIG. 19A, the method 1900 can include retrieving an encryption key at block 1902. For example, a key management system (KMS) can manage and provide the encryption key to decrypt and update the metadata associated with the tokenized cyber resilience data. That is, the KMS can decrypt a portion of encrypted, tokenized metadata (e.g., private data) with the encryption key. For example, the encryption key can be generated using standard encryption algorithms (e.g., AES-256, RSA) and stored securely within the KMS. In some arrangements, the method 1900 can continue to node A, as further described herein.

Figure 19B:
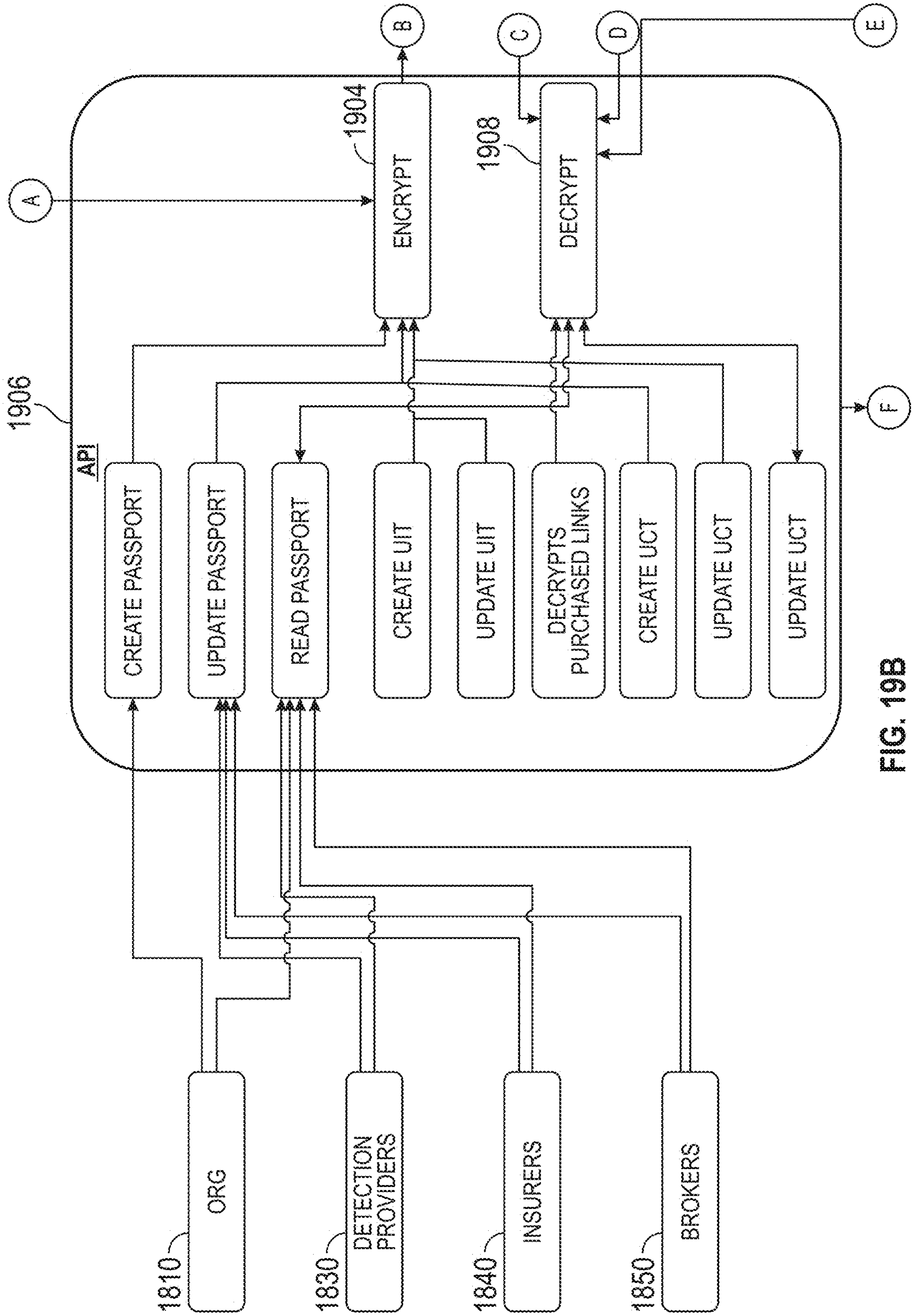

Referring now to FIG. 19B, the method 1900 can continue from node A to block 1904 of encrypting data. For example, the passport system 1120 can encrypt a portion of cyber resilience data at block 1904 using the encryption key received at block 1902. In some arrangements, organization 1810, detection providers 1830, insurers 1840, and/or brokers 1850 can access the data encrypted at block 1904 (e.g., a passport) via an application programming interface (API) 1906. For example, the organization 1810 can execute calls via the API 1906 to create a passport, to update a passport, or to read a passport (e.g., as described regarding FIGS. 14-14G). In another example, the data (e.g., passport) encrypted at block 1904 can be linked or used in API calls via the API 1906 to create a UIT or update a UIT (e.g., as described regarding FIGS. 15A-15F), and further to decrypt purchased links, create a UCT, or update a UCT. In some examples, data for block 1904 can be received via node B, as further described herein. In some arrangements, the method 1900 can further include decrypting data (e.g., a passport) at block 1908. For example, various calls via the API 1906 can be executed to read a passport, decrypt purchased links, update a UCT, etc. In some examples, data for block 1908 can be received via node C, node D, and/or node E, as further described herein. The API 1906 can also receive data via node F, as further described below.

Figure 19C:
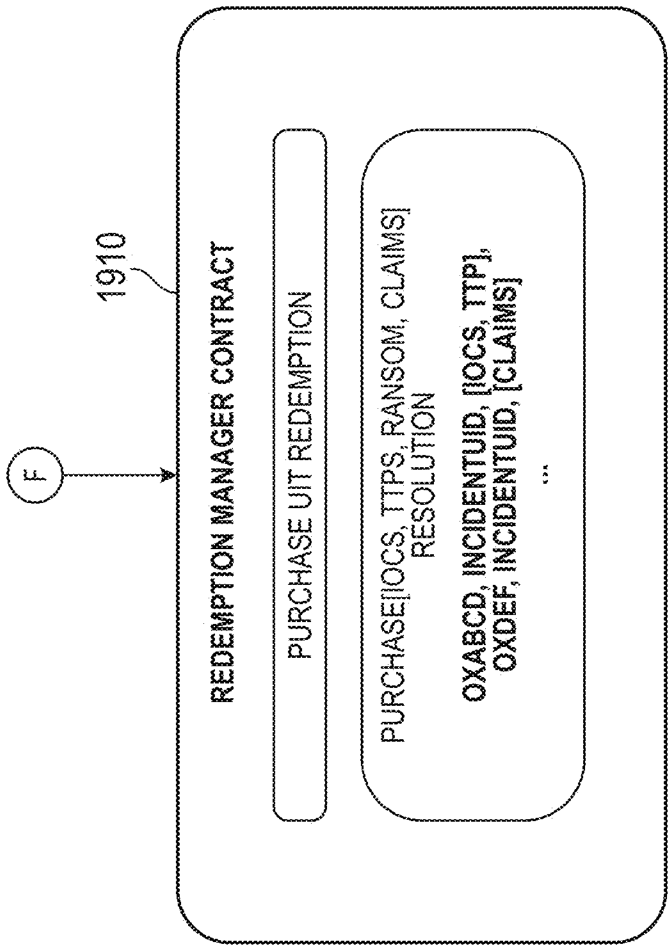

Referring now to FIG. 19C, the API 1906 can be linked, via node F, to a redemption manager contract 1910. For example, the redemption manager contract 1910 can include functions for managing and verifying the redemption of tokens or digital assets within the cyber resilience framework. In some examples, the redemption manager contract 1910 can include a purchase UIT redemption. For example, a purchase UIT redemption can allow a user or entity to redeem a user identity token (UIT) in exchange for services, data, or other benefits, such as accessing incident reports or obtaining specialized cybersecurity services. In some examples, the redemption manager contract 1910 can include data such as purchase data (e.g., Indicators of Compromise (IOC), Tactics, Techniques, and Procedures (TTPs), ransom data, claims data, resolution data, etc.) and/or identifiers (e.g., wallet address, incident UID, claims data, etc.).

Figure 19D:
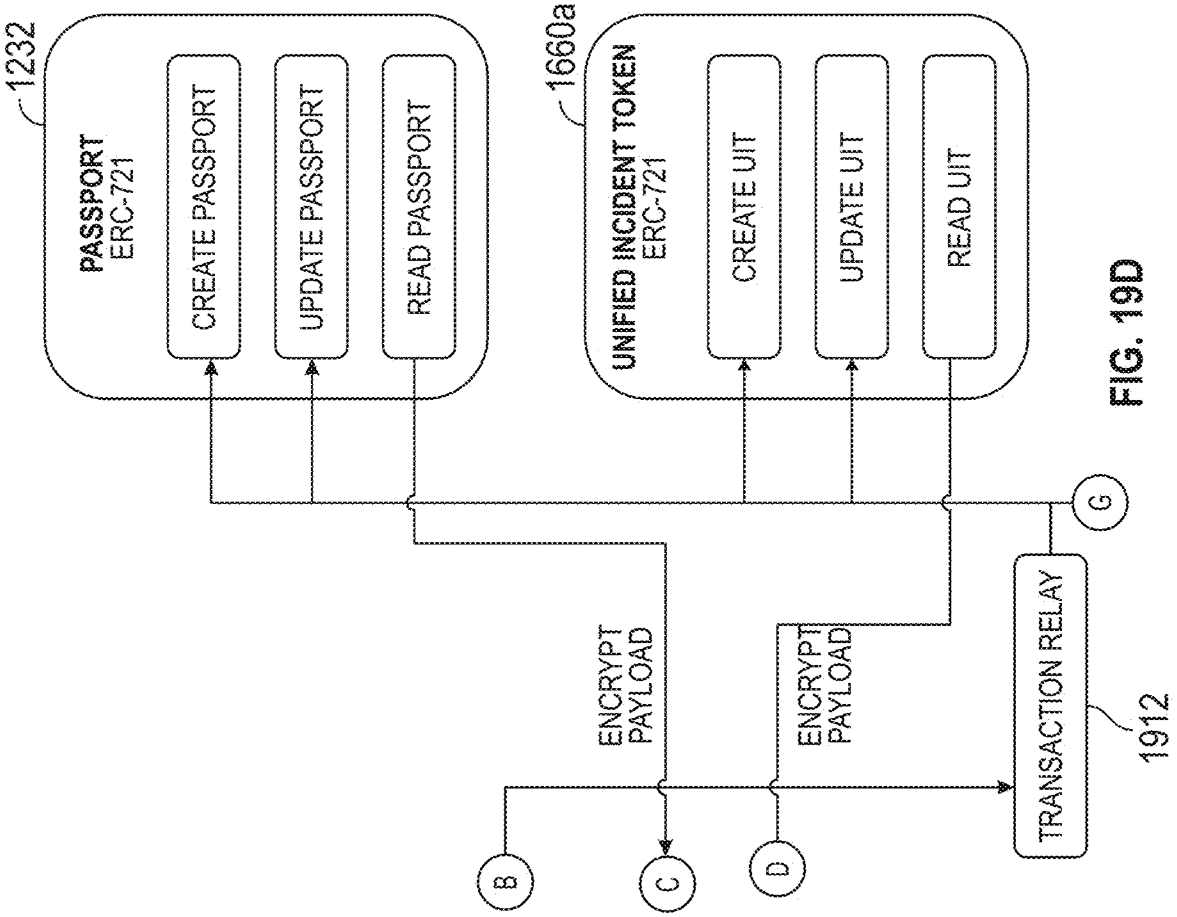

Referring now to FIG. 19D, data received via node B can be processed by a transaction relay 1912. For example, the transaction relay 1912 can facilitate the routing and forwarding of transaction data between various subsystems. In some arrangements, the data received via node C can include data of dynamic passport 1232. In some examples, the dynamic passport 1232 can include an interface for creating a passport, updating a passport, and/or reading a passport. Further, the passport data received via node C can be encrypted as an encrypted payload prior to reaching block 1908 for decryption. In some arrangements, the data received via node D can include data of unified incident token 1660*a*. In some examples, the unified incident token 1660*a* can include interfaces for creating a UIT, updating a UIT, and/or reading a UIT. Further, the UIT data received via unified incident token 1660*a* can be encrypted as an encrypted payload prior to reaching block 1908 for decryption. In some arrangements, the dynamic passport 1232 can be linked and/or receive data via node G, as further described herein.

Figure 19E:
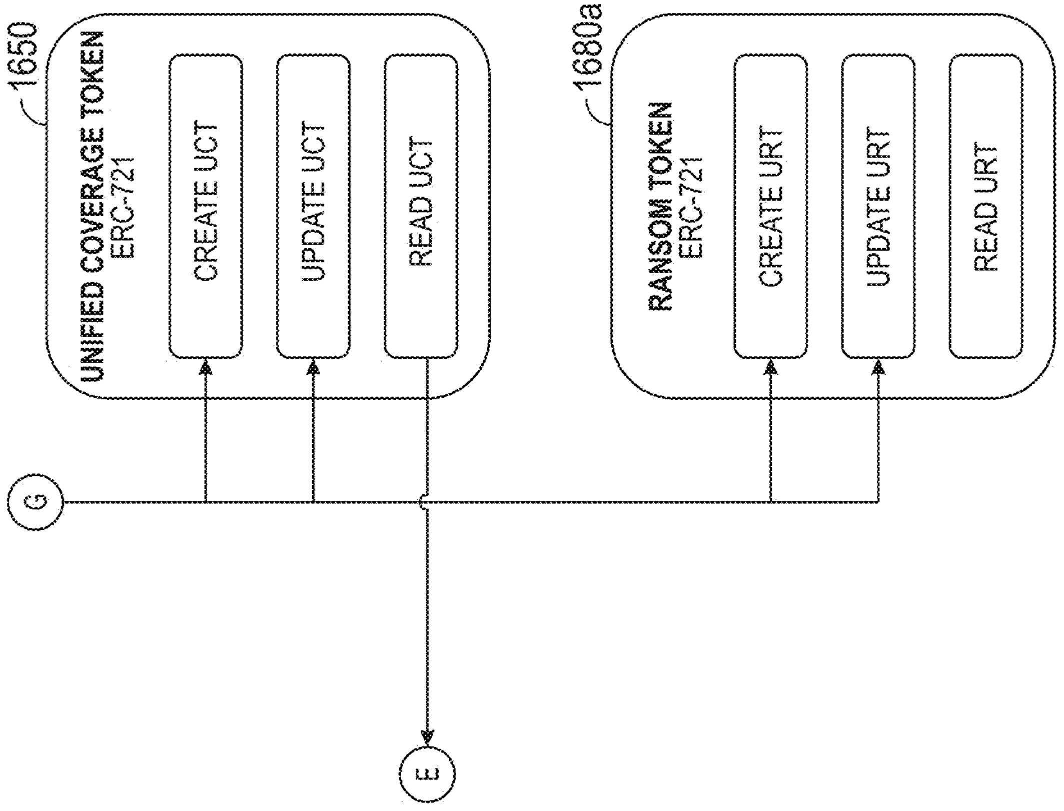

Referring now to FIG. 19E, the dynamic passport 1232 can be linked, via node G, to unified coverage token 1650 and/or ransom token 1680*a*. Further, the unified coverage token 1650 can provide data, via node E, for reading UCT 1650 before decrypting the UCT 1650 at block 1908. In some examples, the unified coverage token 1650 can include interfaces (e.g., APIs and/or other functions) for creating a UCT, updating a UCT, and/or reading a UCT (e.g., the UCT 1650). Further, the ransom token 1680*a* can include interfaces for creating a URT, updating a URT, or reading a URT (e.g., URT 1680*a*).

Figure 20A:
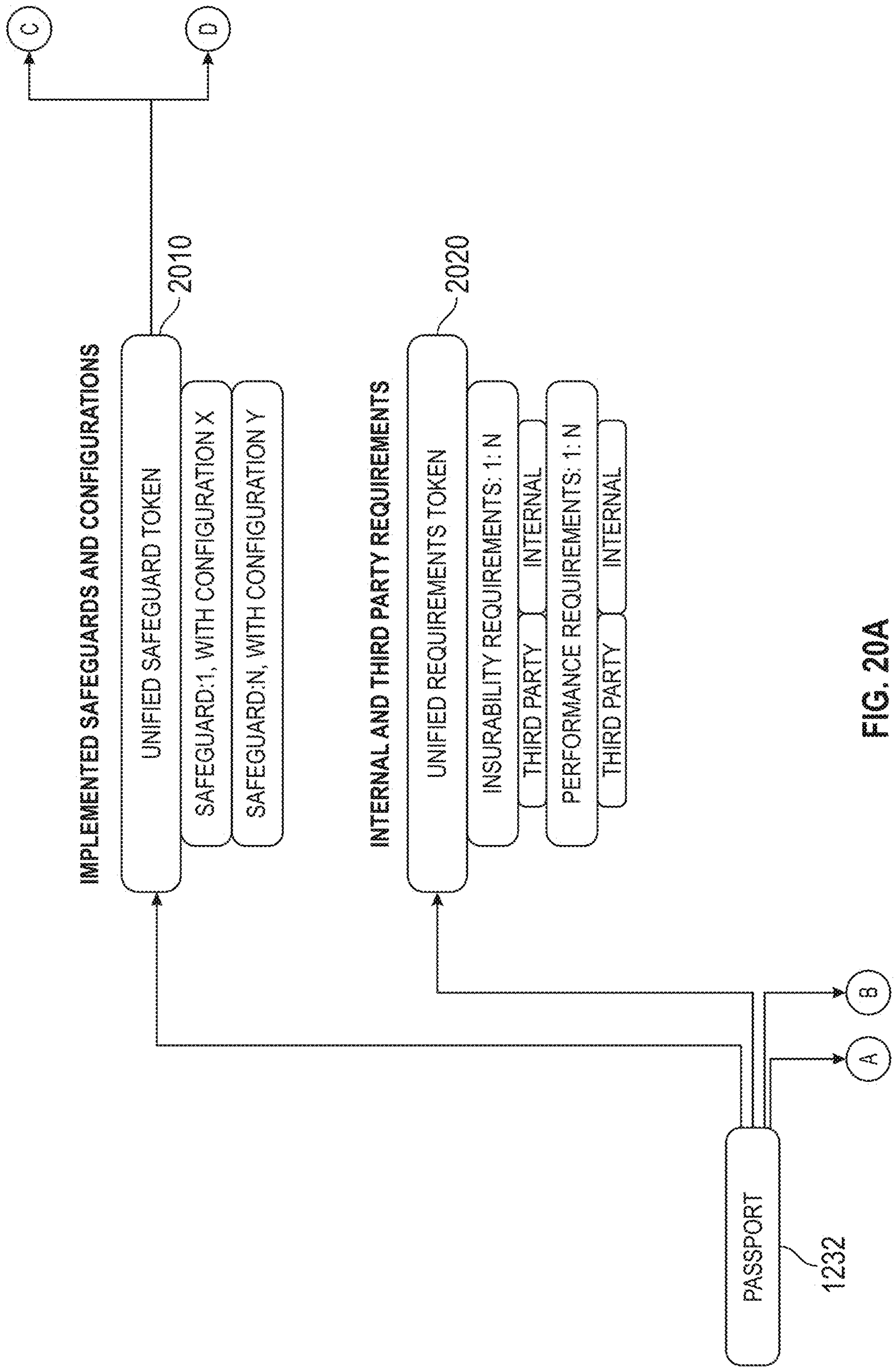
FIGS. 20A-20D depict an architecture for tokenized cyber resilience data, according to some arrangements.

Referring generally to FIGS. 20A-20D, an architecture for tokenized cyber resilience data is shown, according to some arrangements. Referring now to FIG. 20A, in some examples, the dynamic passport 1232 can be linked with data corresponding to implemented safeguards and configurations. For example, a unified safeguard token 2010 can generate by token system 102 and be provided to dynamic passport 1232 and include data corresponding to a number of implemented safeguards or other cyber resilience protections of an entity (e.g., safeguards 1-N with configurations X-Y). That is, the safeguard token 2010 can include data or metadata on various safeguards, protections, or systems implemented by an entity (e.g., Managed Detection and Response (MDR) systems, Extended Detection and Response (XDR) platforms, network segmentation strategies, coding practices, endpoint security protocols, etc.). The unified safeguard token 2010 can further be linked to and/or receive data from node C and/or node D, as further described herein. In some examples, the dynamic passport 1232 can be linked with data corresponding to internal and third party requirements. For example, a unified requirements token 2020 can be linked or provided to dynamic passport 1232 and include data corresponding to a number of cyber resilience requirements or other standards (e.g., insurability requirements 1-N with various third party and internal requirements, performance requirements 1-N with various third party and internal requirements, etc.). That is, the unified requirements token 2020 can include data on various compliance obligations, industry regulations, or contractual requirements that an entity must adhere to (e.g., GDPR, ISO/IEC 27001 standards, contractual security clauses, or sector-specific regulations such as HIPAA). In some examples, the dynamic passport 1232 can be further linked to/receive data from node A and/or node B, as further described herein.

Figure 20B:
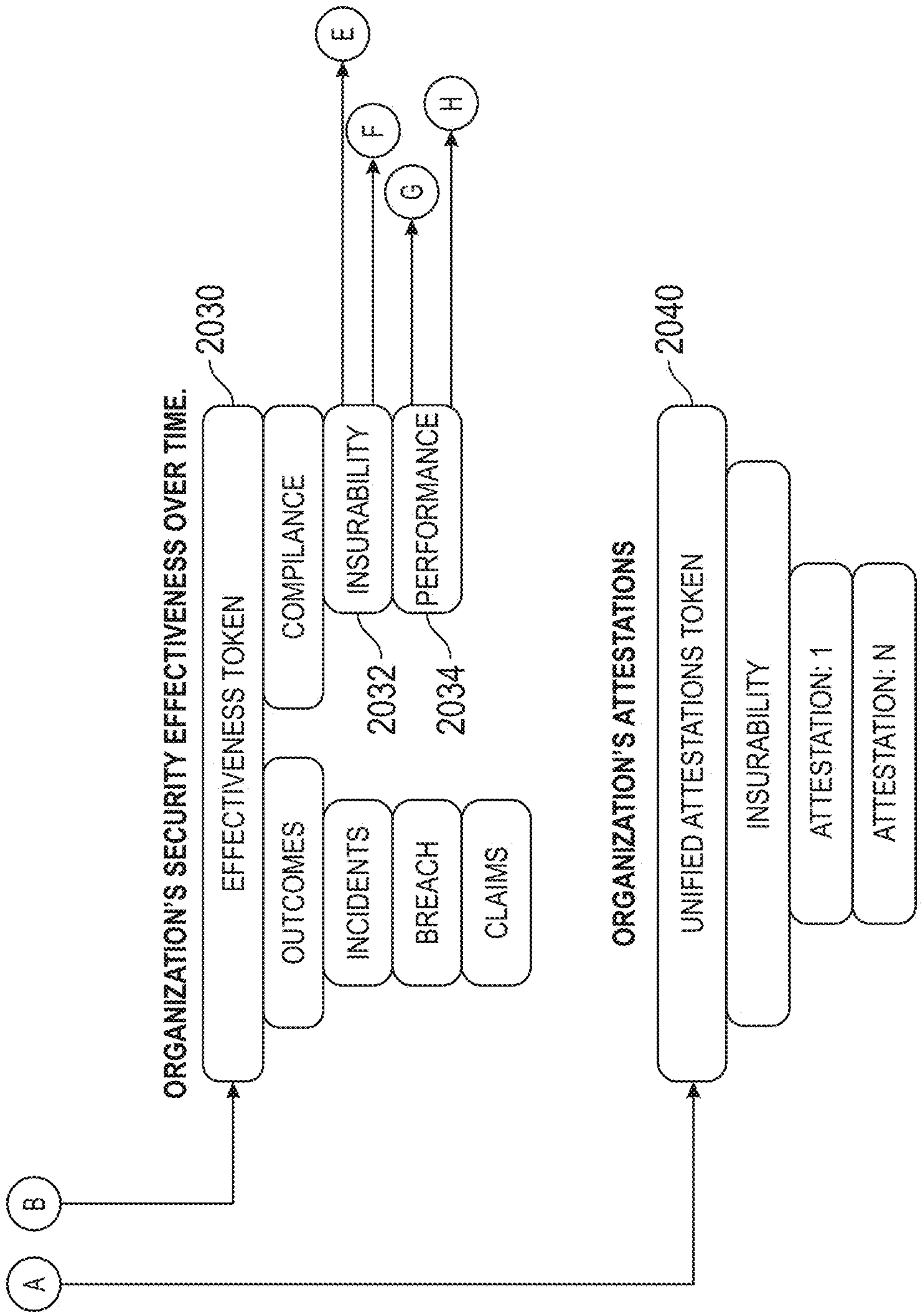

Referring now to FIG. 20B, the dynamic passport 1232 can be linked with data corresponding to an organization's security effectiveness over time. For example, the dynamic passport 1232 can be linked, via node B, to an effectiveness token 2030. In some examples, the effectiveness token 2030 can be generated by the token system 102 and include data such as cyber resilience outcomes, incidents, breaches, and/or claims. That is, the effectiveness token 2030 can include data or metadata related to the organization's historical security incidents, the severity of breaches, and/or the outcomes of any cyber resilience measures implemented over time. Further, the effectiveness token 2030 can include compliance data such as insurability data 2032 and/or performance data 2034 (e.g., stored via tokens). For example, the insurability data 2032 may include tokens or other records of insurance claims, assessments of an organization's risk profile, and compliance with insurance policy requirements related to cybersecurity. In some arrangements, the insurability data 2032 can be linked with other data and/or systems via node E and/or node F, as further described herein. For example, the performance data 2034 may include tokens or other data with metrics related to the efficiency of security protocols, adherence to service level agreements (SLAs), or other key performance indicators (KPIs) relevant to the organization's cyber resilience performance. In some arrangements, the performance data 2034 can be linked with other data and/or systems via node G and/or node H, as further described herein. In other examples, the dynamic passport 1232 can be linked, via node A, to data corresponding to an organization's attestations. For example, the dynamic passport 1232 can be linked to a unified attestation token 2040, which can be generated by the token system 102 and include insurability data corresponding to a number of attestations (e.g., attestations 1-N).

Figure 20C:
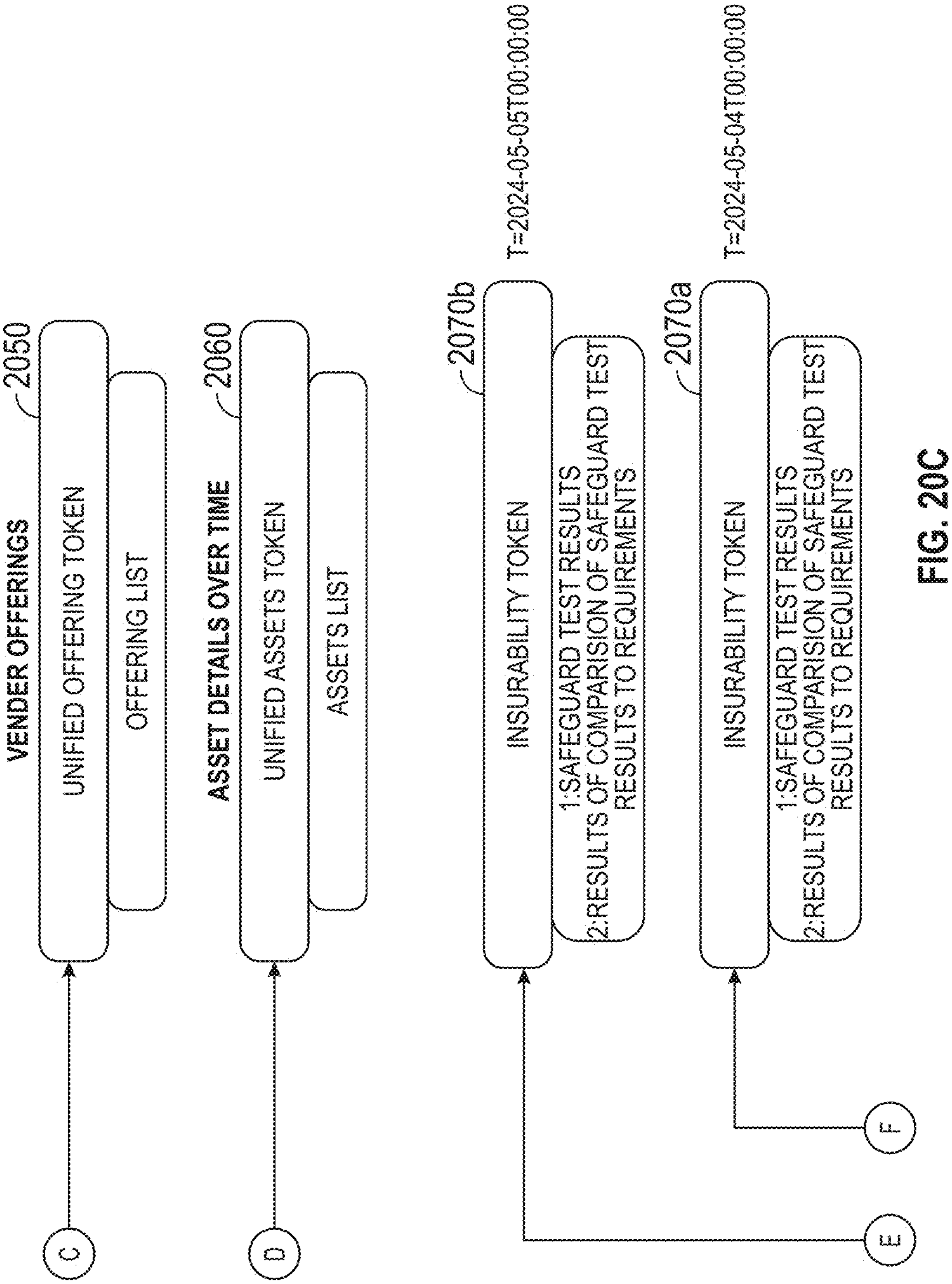

Referring now to FIG. 20C, the dynamic passport 1232, via the unified safeguard token 2010, can be linked with data corresponding to vendor offerings. For example, the passport system 1120 can link the unified safeguard token 2010 via node C to a unified offering token 2050 including vendor data (e.g., offering list, MDR/XDR plans, etc.). In some examples, the dynamic passport 1232, via the unified safeguard token 2010, can be linked with data corresponding to an entity or organization's assets over time. For example, the unified safeguard token 2010 can be linked via node D to a unified assets token 2060 including various asset data, such as assets lists, asset types, and so on. In some examples, the dynamic passport 1232 can be linked with (e.g., mapped to) data corresponding with insurability over time. For example, the dynamic passport 1232 can be linked, via the insurability data 2032 of the effectiveness token 2030, with an insurability token 2070*a* via node E and an insurability token 2070*b* via node F. Each of the insurability tokens 2070 can include various data corresponding to an organization or entity's insurability over time, such as safeguard test results and results of comparisons of safeguard test results to requirements. That is, the insurability token 2070*a* and insurability token 2070*b* can include data or metadata reflecting changes in an entity's risk profile, updates to insurance coverage terms, and/or the impact of implemented security measures on insurability. Further, the insurability token 2070*a* and insurability token 2070*b* can correspond to respective times T at which the insurability data was captured and/or updated for each of the insurability tokens 2070*a*-2070*b*, respectively.

Figure 20D:
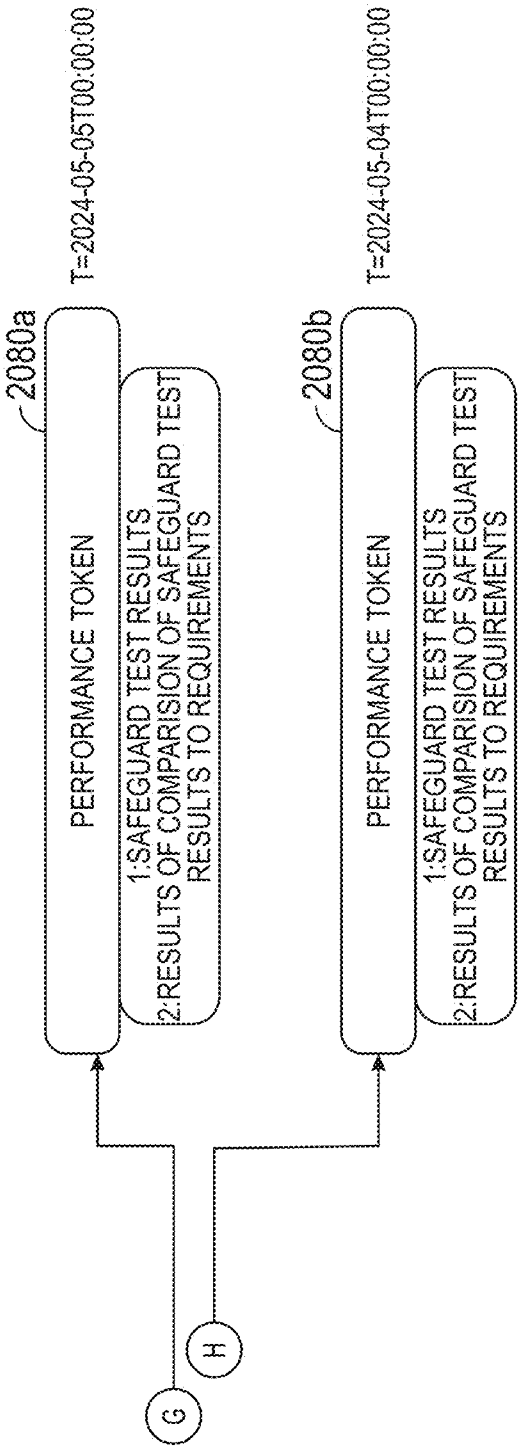

Referring now to FIG. 20D, the dynamic passport 1232 can be linked with (e.g., mapped to) data corresponding with performance over time. For example, the dynamic passport 1232 can be linked, via the performance data 2034 of the effectiveness token 2030, with a performance token 2080*a* via node G and a performance token 2080*b* via node H. Each of the insurability tokens 2070 can be generated by the token system 102 and include various data corresponding to an organization or entity's performance over time, such as safeguard test results and results of comparisons of safeguard test results to requirements. That is, the performance token 2080*a* and performance token 2080*b* can include data or metadata reflecting the effectiveness of implemented safeguards, the frequency of security audits, and adherence to established security protocols over time periods. Further, the performance token 2080*a* and performance token 2080*b* can correspond to respective times T at which the performance data was captured and/or updated for each of the performance tokens 2080*a*-2080*b*, respectively. In some arrangements, one or both of the performance tokens 2080*a*, 2080*b*, and one or both of the insurability tokens 2070*a*, 2070*b*, can be linked to the dynamic passport 1232 as a performance data set and be accessible to various individuals or entities for cyber resilience actions (assessing or adjusting insurance premiums, buying or selling cyber insurance on a marketplace, or making decisions related to the implementation of further security measures) based on rules (e.g., RBACs) or other access controls.

Figure 21A:
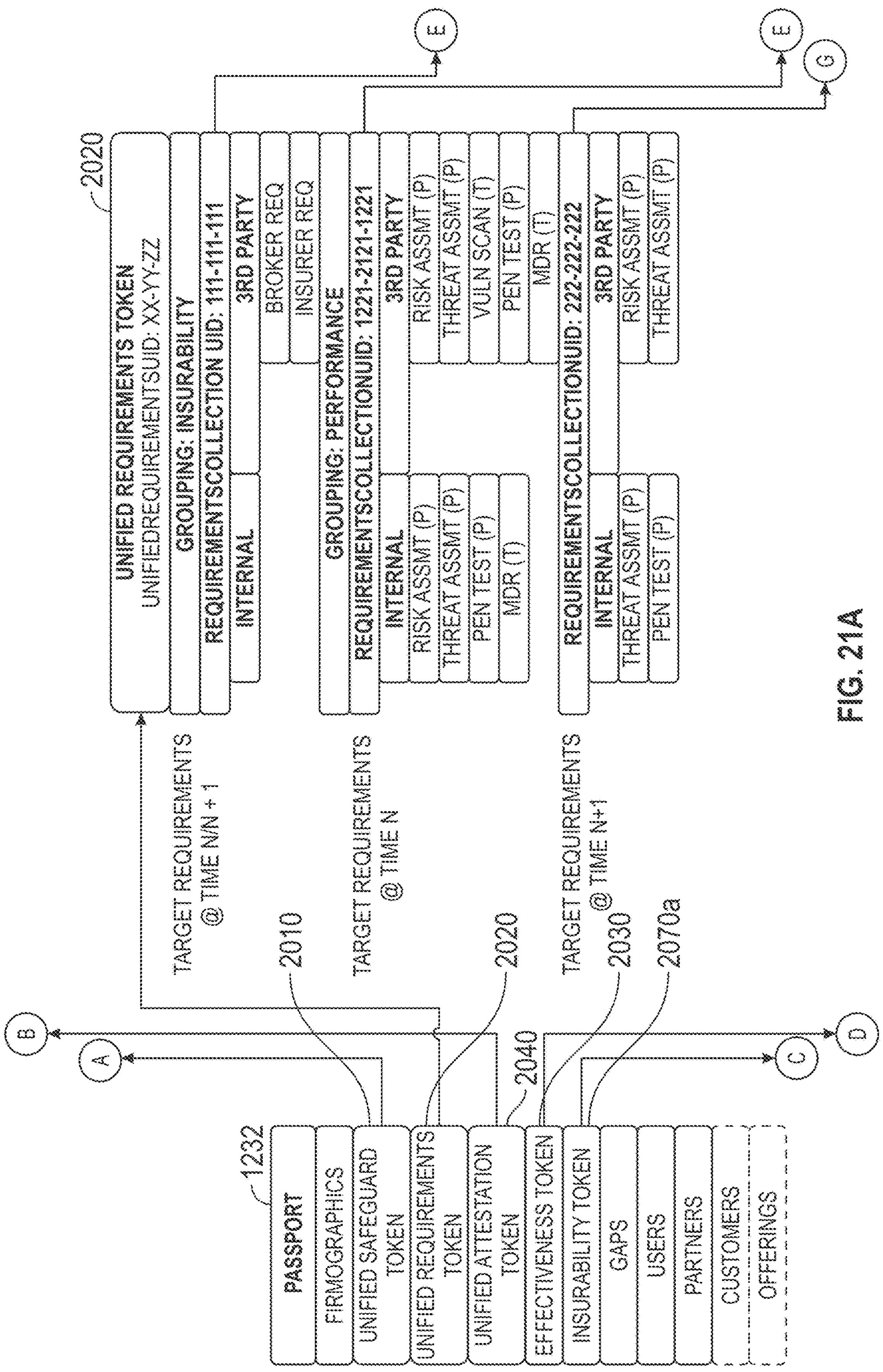
FIGS. 21A-21I depict an architecture for tokenized cyber resilience data, according to some arrangements.

Referring generally to FIGS. 21A-21I, an architecture for tokenized cyber resilience data is shown, according to some arrangements. Referring now to FIG. 21A, the dynamic passport 1232 can include various cyber resilience data, such as firmographics data, unified safeguards token 2010, unified requirements token 2020, unified attestation token 2040, effectiveness token 2030, insurability token 2070*a*, gap information, users, partners, customers, offerings, and so on. In some examples, the unified safeguards token 2010 can receive data/be linked with other systems or data via node A, the unified attestation token 2040 can receive data/be linked with other systems or data via node B, the effectiveness token can receive data/be linked with other systems or data via node C, and the insurability token 2070*a* can receive data/be linked with other systems or data via node D, as further described herein. In some arrangements, entities can interact with and/or access the dynamic passport 1232 and/or linked tokens (e.g., unified safeguards token 2010, unified requirements token 2020) based on various rules (e.g., access controls with various access parameters).

In some arrangements, FIGS. 21A-21I illustrates tokenized cyber security data over various times (e.g., time N/N+1, time N, time N+1, etc.). In some arrangements, unified tokens (e.g., unified safeguards token 2010, unified requirements token 2020, unified attestation token 2040, etc.) can store metadata of cyber resilience data over a time period. For example, the unified requirements token 2020 can be generated by the token system 102 and can include a unified requirements UID and an insurability grouping with grouped cyber resilience data. In another example, the unified requirements token 2020 can include a first requirements collection UID corresponding to requirements (e.g., cyber resilience standards for a policy) at a first time (e.g., time N/N+1), which can be linked with other systems/and or data via node E, as further described herein. In another example, the unified requirements token 2020 can include a second requirements collection UID corresponding to requirements at a second time (e.g., time N+1), which can be linked with other systems/and or data via node F, as further described herein. Still yet, in another example, the unified requirements token 2020 can include a third requirements collection UID corresponding to requirements at a third time (e.g., time N), which can be linked with other systems/and or data via node G, as further described herein. For example, the first, second, and third UID can correspond to various internal and/or third-party cyber resilience requirements at different times, such as risk assessment data, threat assessment data, other testing data, MDR data, pen test data, vulnerability scan data, broker requirements, insurer requirements, and so on.

Figure 21B:
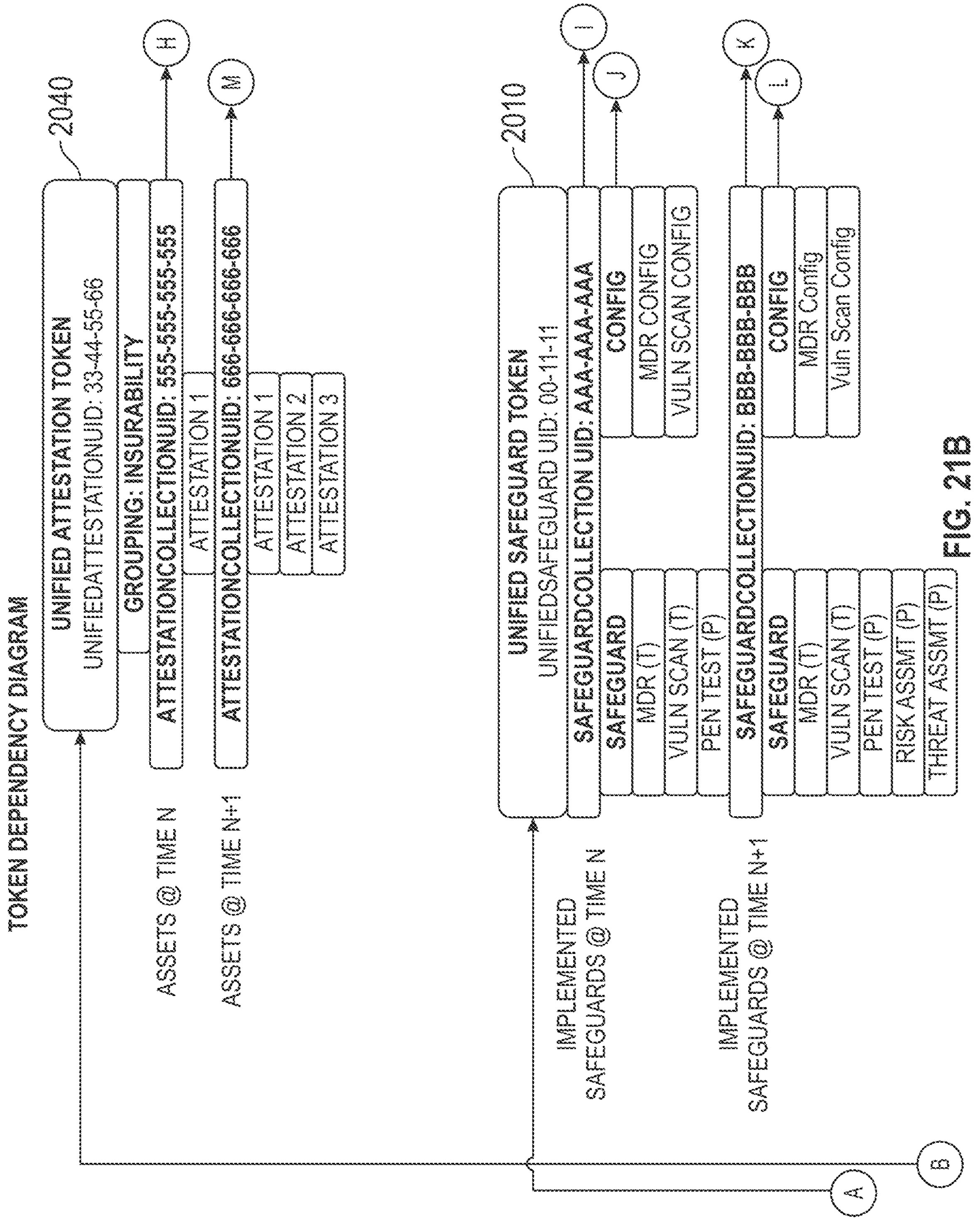

Referring now to FIG. 21B, the unified attestation token 2040 can be linked to the dynamic passport 1232 via node A. As described regarding the unified requirements token 2020, the unified attestation token 2040 can include groupings and/or data corresponding to attestations at various times. For example, the unified attestation token 2040 can be generated by the token system 102 and can include an insurability grouping with a first attestation collection UID corresponding with assets (e.g., attestation 1) at a first time (e.g., time N), and the first attestation collection UID can be linked with other systems/data via node H. Further, the unified attestation token 2040 can include a second attestation collection UID corresponding with assets (e.g., attestation 1, attestation 2, attestation 3, etc.) at a second time (e.g., time N+1), and the second attestation collection UID can be linked with other systems/data via node M. In some arrangements, the unified safeguard token 2010 can be linked to the dynamic passport 1232 via node B. For example, as described above, the unified safeguard token 2010 can include groupings and/or data corresponding to safeguards at various times. For example, the unified safeguard token 2010 can include a first safeguard collection UID corresponding with safeguards (e.g., MDR, vulnerability scans, penetration test rules, etc.) at a first time (e.g., time N), and the first safeguard collection UID can be linked with other systems/data via node I. The unified safeguard token 2010 can further include a first configuration, which can be linked to other data/systems via node J and include data corresponding to cyber resilience systems and/or protection techniques implemented in an organization's cyber resilience architecture (e.g., MDR configurations, vulnerability scan configurations, etc.). Further, the unified safeguard token 2010 can include a second safeguard collection UID corresponding with safeguards implemented at a second time (e.g., time N+1), and the second attestation collection UID can be linked with other systems/data via node K. The unified safeguard token 2010 can further include a second configuration, which can be linked to other data/systems via node L.

Figure 21C:
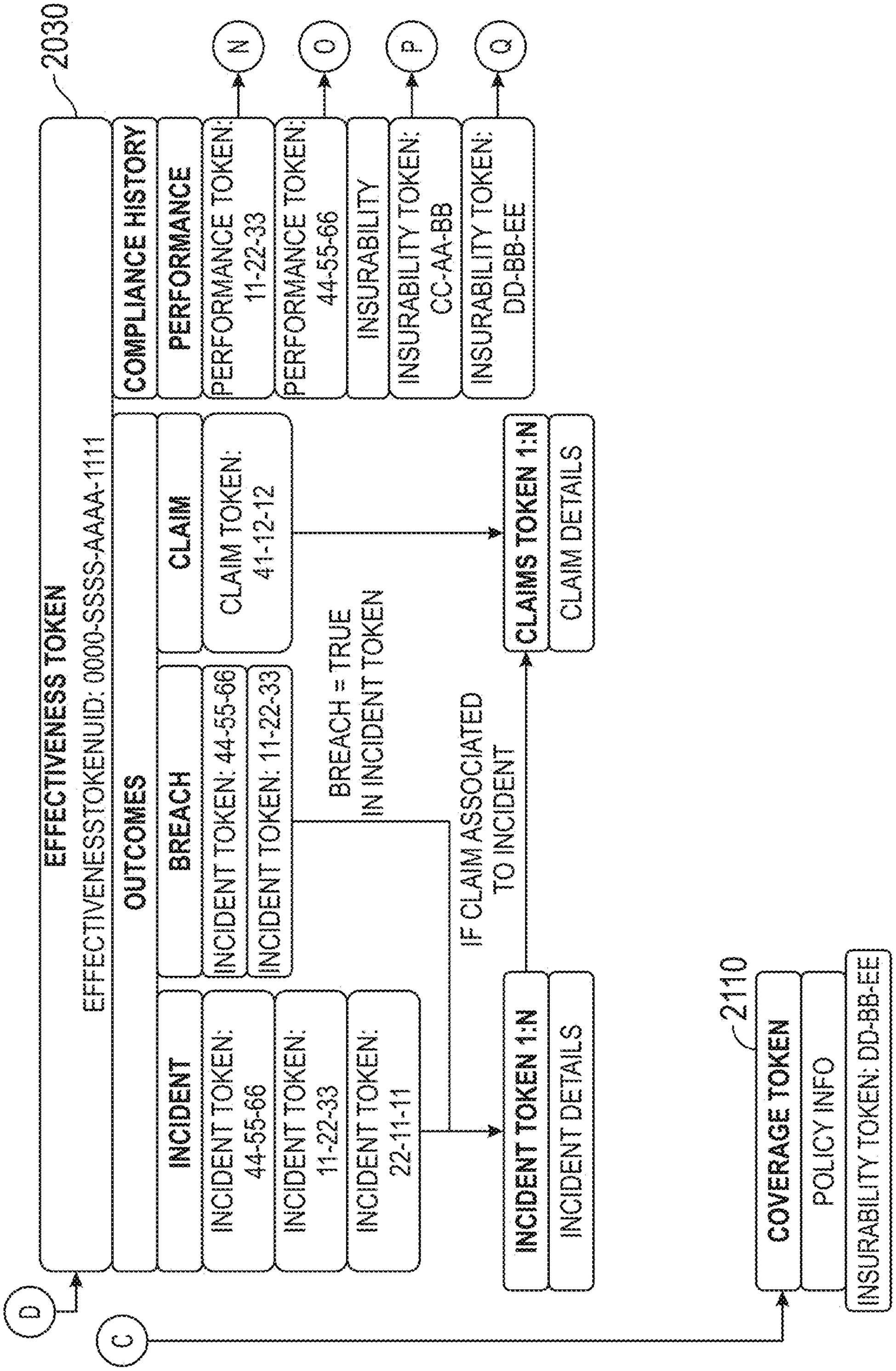

Referring now to FIG. 21C, a coverage token 2110 can be linked to the dynamic passport 1232 via node C. In some examples, the coverage token 2110 can be generated by the token system 102 can include cyber protection information such as policy information (e.g., policy number, type, etc.) and various tokens including insurability information (e.g., an insurability token). In some arrangements, the effectiveness token 2030 can be linked to the dynamic passport 1232 via node D. The effectiveness token 2030 can include various data corresponding to cyber resilience outcomes, such as incident data (e.g., via incident tokens 1 through N), corresponding breach data (e.g., via incident tokens 1 through N), and corresponding claims data (e.g., via claims tokens 1 through N associated with incident tokens 1 through N). In some arrangements, the effectiveness token 2030 can include various data corresponding to cyber resilience compliance history, such as performance data. For example, the performance data can include multiple performance tokens including respective timestamps or identifiers corresponding to cyber resilience performance of an entity during one or more incidents/breaches or claims associated with incident tokens and/or claims tokens, and the performance tokens (e.g., performance tokens 2080*a*-2080*b*) can be linked to other data/systems via node N and node O. In some arrangements, the effectiveness token 2030 can include insurability data, such as one more insurability tokens (e.g., received via coverage token 211). In some examples, the insurability tokens (e.g., insurability tokens 2070*a*-2070*b*) can be linked to other data/systems via node P and node Q.

Figure 21D:
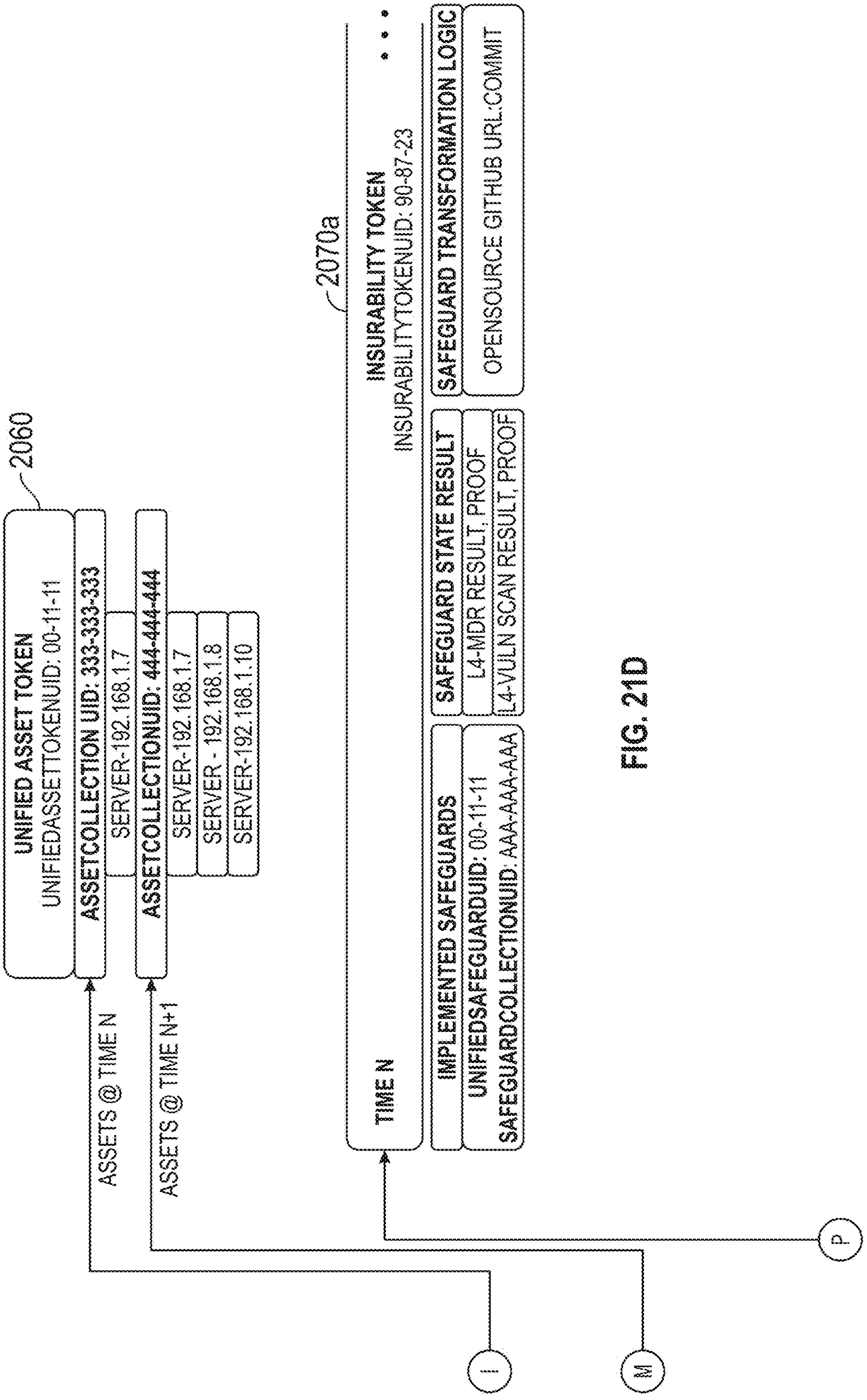
Figure 21E:
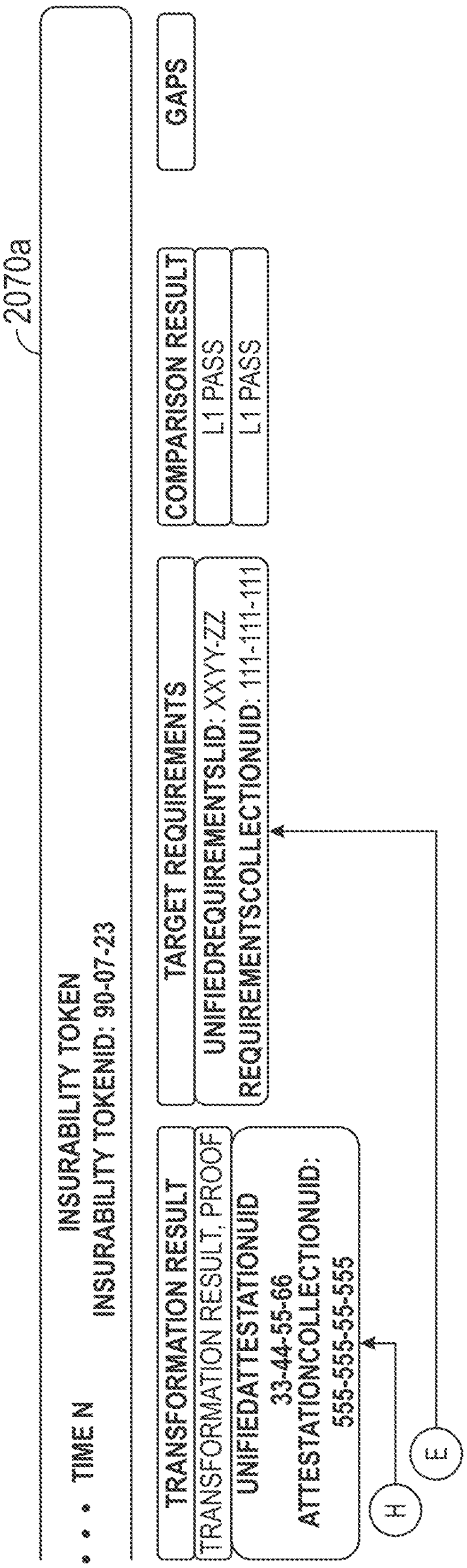

Referring now to FIG. 21D, the dynamic passport 1232 can be linked to the unified asset token 2060 via node I and/or via node M. For example, the unified asset token 2060 can be generated by the token system 102 and can include a first grouping of assets (e.g., server identifier 1) at a first time (e.g., time N) and a second grouping of assets (e.g., server identifier 1, server identifier 2, server identifier 3, etc.) at a second time (e.g., time N+1). In some arrangements, the insurability token 2070*a* can be linked to the dynamic passport 1232 via node P with the effectiveness token 2030. For example, the insurability token 2070*a* can include insurability data at a first time (e.g., time N), such as implemented safeguards and associated identifiers, safeguard state results (e.g., L4-MDR result and proofs, L4-vulnerability scan results and proofs), and/or safeguard transformation logic (e.g., accessible via a URL or other link). Referring now to FIG. 21E, the insurability token 2070*a* can further include a transformation result and/or proof, which can be linked via UIDs to node H with the unified attestation token 2040. The insurability token 2070*a* can further include target requirements, which can be linked via UIDs or other identifiers with the unified requirements token 2020. The insurability token 2070*a* can further include comparison results (e.g. L1) pass, gap data (e.g., data of missing and/or inadequate cyber protections), and more.

Figure 21F:
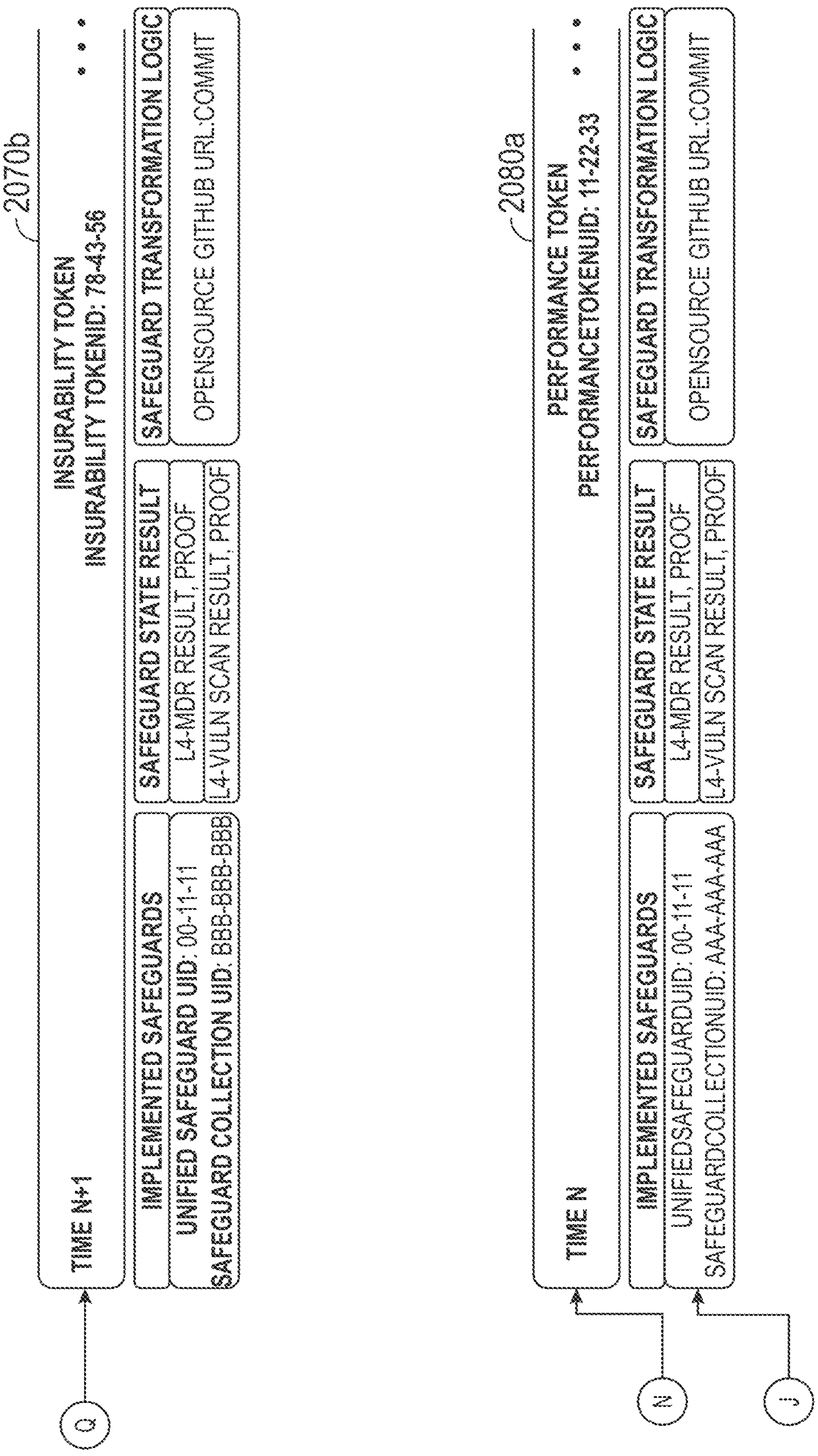

Referring now to FIG. 21F, the dynamic passport 1232 can be linked to the insurability token 2070*b* via node Q. As shown in FIG. 21F, the insurability token 2070*b* can be generated by the token system 102 and can include insurability data at a second time (e.g., time N+1), such as implemented safeguards and associated identifiers, safeguard state results, and/or safeguard transformation logic. For example, the insurability token 2070*b* can include encrypted data of implemented safeguards, such as firewall configurations or endpoint protection settings, verified against cyber resilience requirements. The encrypted data can be encapsulated within a control structure configured to restrict updates or access based on cryptographic proofs, allowing only authorized entities (e.g., those with permitted access based on RBACs) to modify, create, view, and/or retrieve the data in accordance with access controls defined for the dynamic passport 1232. In some arrangements, the dynamic passport 1232 can be linked to the performance token 2080*a* via node N with the effectiveness token 2030.

In some examples, the performance token 2080*a* can include performance data of an entity at a first time (e.g., time N), including implemented safeguards, results, transformation logic, and so on. In some arrangements, the implemented safeguards can be linked, via node J, with a configuration of the unified safeguard token 2010.

Figure 21G:
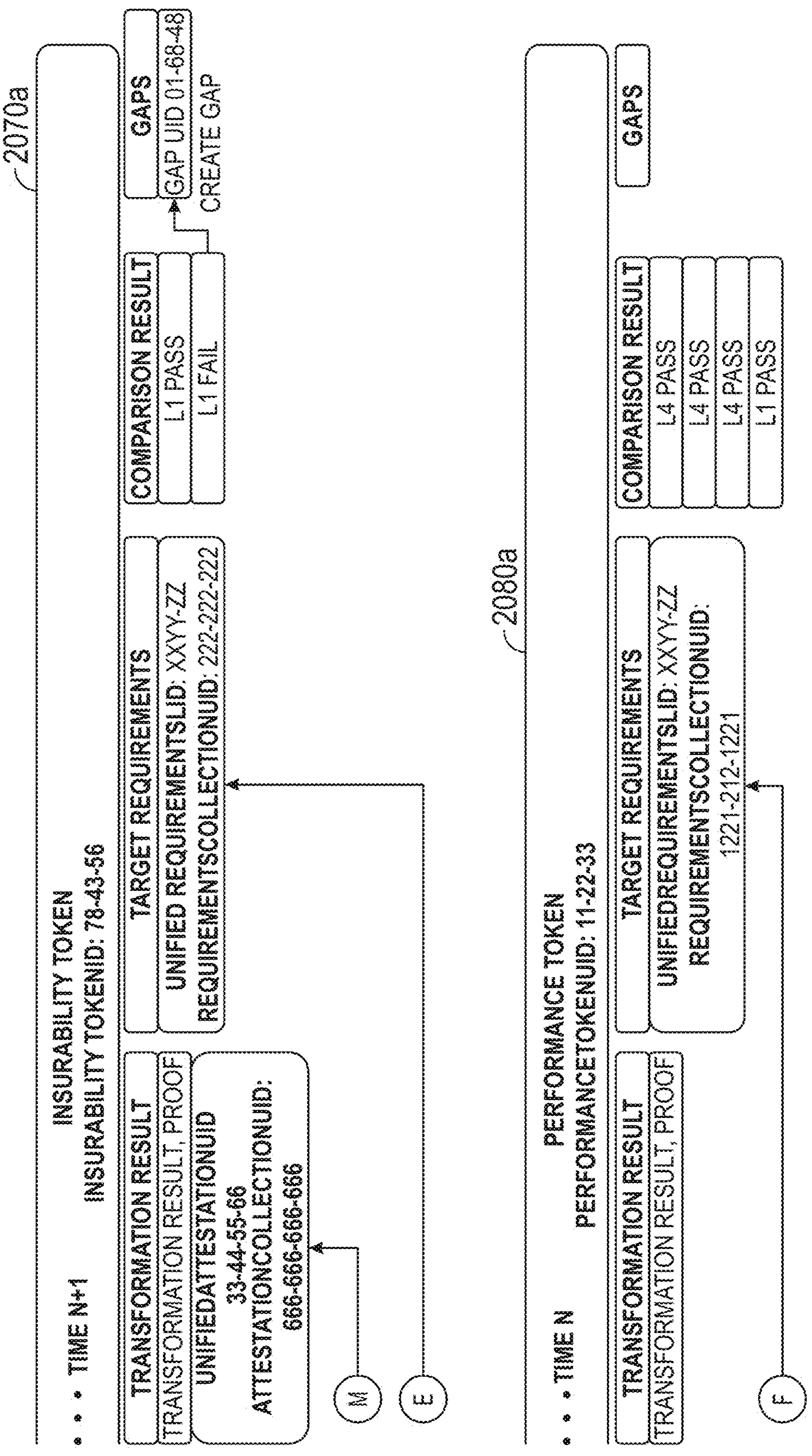

Referring now to FIG. 21G, the insurability token 2070*b* can further include a transformation result and/or proof, which can be linked via UIDs to node M with the unified attestation token 2040. In some arrangements, the insurability token 2070*b* can be generated by the token system 102 and can further include target requirements, which can be linked via UIDs or other identifiers with the unified requirements token 2020 via node E. Further, the insurability token 2070*a* can further include comparison results (e.g. L1 pass/fail), gap data (e.g., gap UIDs), and so on. In some arrangements, the performance token 2080*a* can further include transformation results and/or proofs, comparison results (e.g., L4 pass/fail), and gaps. Further, the insurability token 2070*b* (or another token) may store cryptographic proofs of provenance corresponding with and entity and/or associated cyber resilience data. In some examples, the performance token 2080*a* can include target requirements and associated IDs, accessible via node F, from the unified requirements token 2020.

Figure 21H:
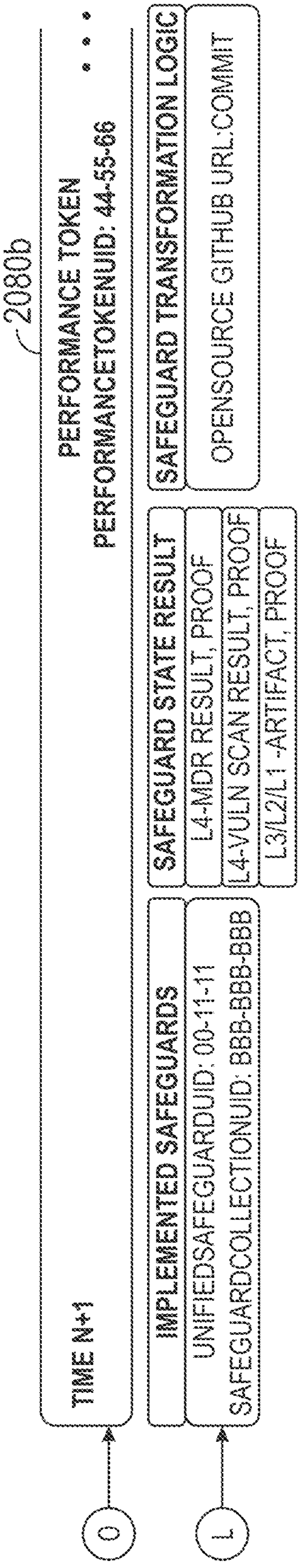
Figure 21I:
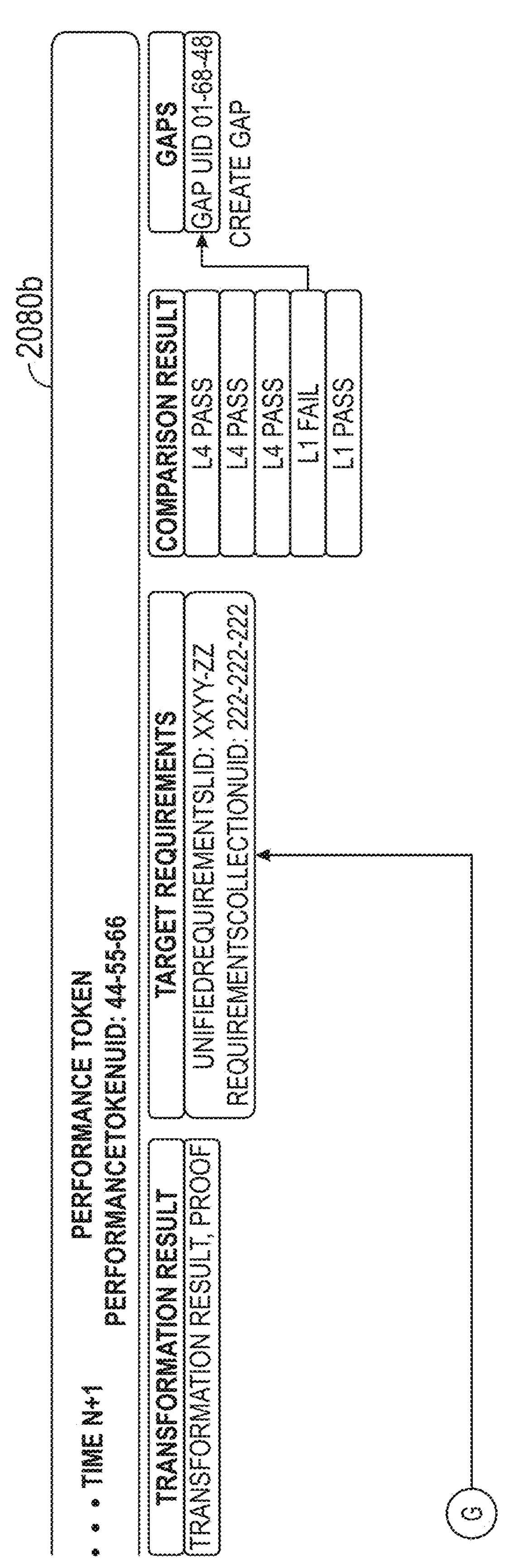

Referring now to FIG. 21H, the dynamic passport 1232 can be linked to the performance token 2080*b* via node O with the effectiveness token 2030. In some examples, the performance token 2080*b* can be generated by the token system 102 and can include performance data of an entity at a second time (e.g., time N+1), including implemented safeguards, results, transformation logic, and so on. For example, the performance token 2080*a* and the performance token 2080*b* may include performance data sets encapsulated within a control structure corresponding to the dynamic passport 1232, and access to data of the performance tokens 2080*a*-2080*b* can be granted based on an access data structure compatible with a control structure (e.g., allowing authorized entities to retrieve and/or update metadata of the performance token 2080*b* based on access controls, restricting access and/or updates to the performance data based on access controls, etc.). In some arrangements, the implemented safeguards can be linked, via node L, with a configuration of the unified safeguard token 2010. Referring now to FIG. 21I, the performance token 2080*b* can further include transformation results and/or proofs, comparison results, and gaps. The performance token 2080*b* can also include target requirements and identifiers received via node G with the unified requirements token 2020.

Figure 22A:
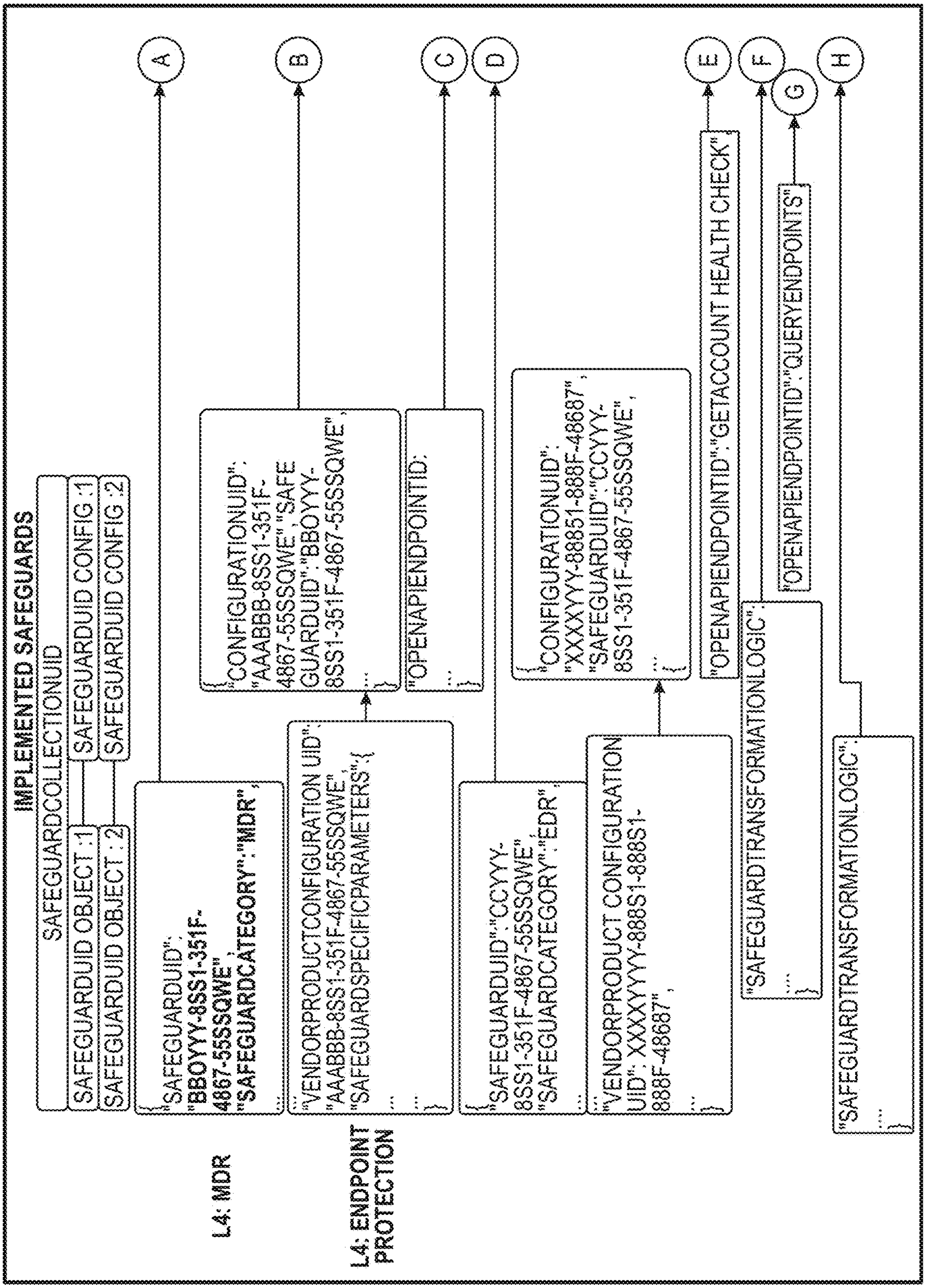
FIGS. 22A-22C depict an architecture for tokenized cyber resilience data, according to some arrangements.
Figure 22B:
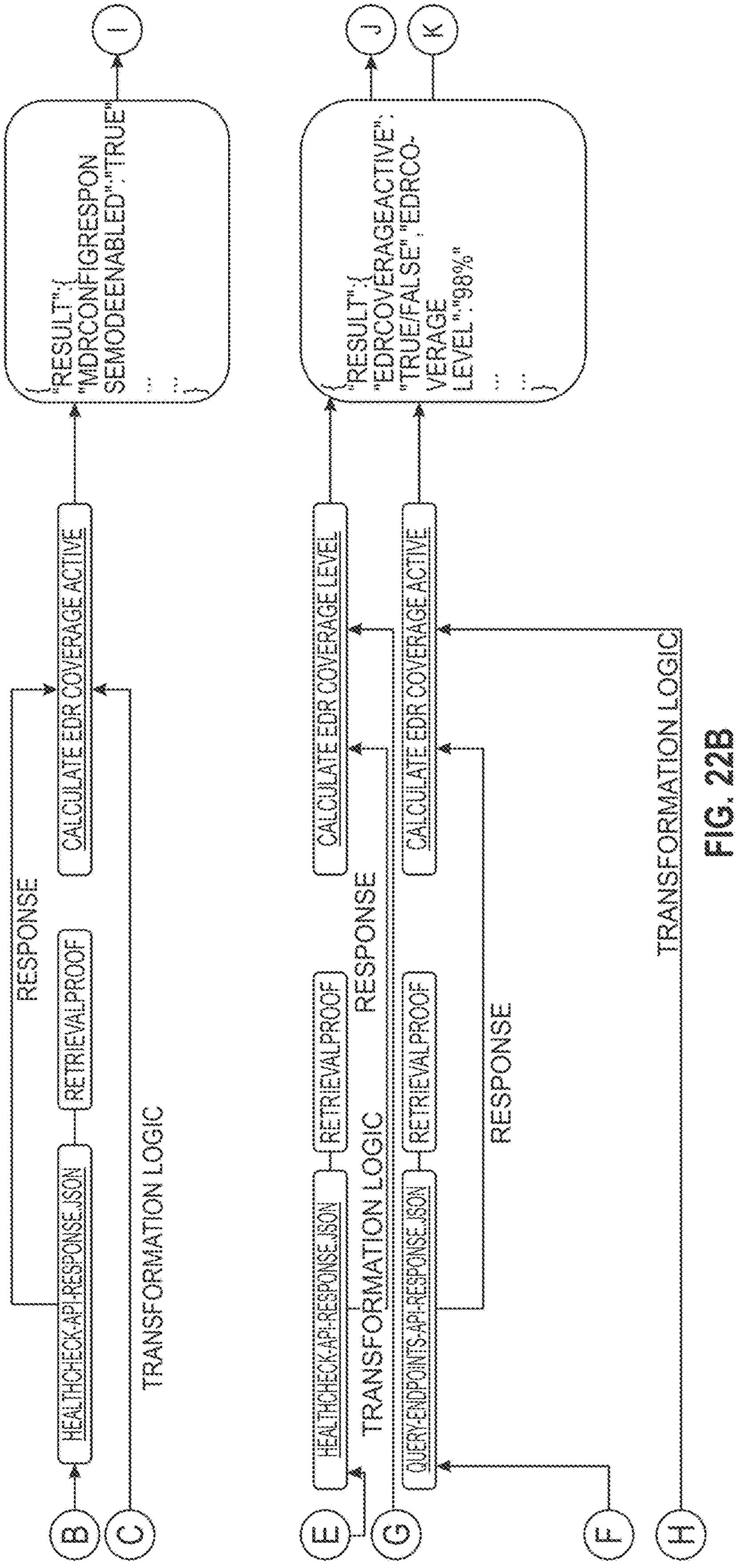
Figure 22C:
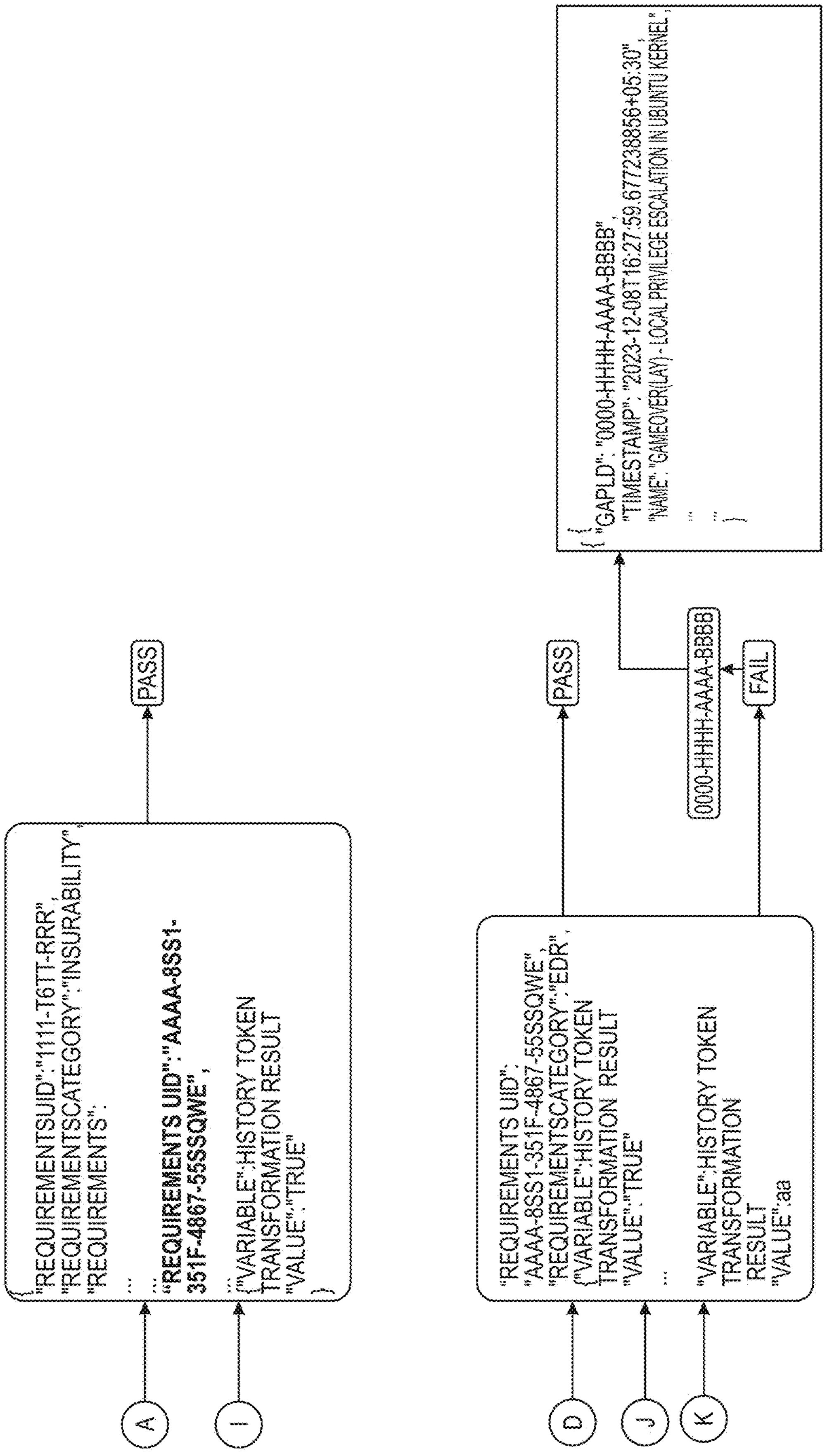

Referring generally to FIGS. 22A-22C, an architecture for tokenized cyber resilience data is shown, according to some arrangements. Referring now to FIG. 22A, implemented safeguards 2200 can include various cyber resilience data (e.g., tokens, locally stored data, etc.) corresponding to cyber safeguards implemented by an entity or organization. For example, the implemented safeguards 2220 can include a safeguard collection UID, various safeguard UID objects, and corresponding safeguard UID configurations. For example, implemented safeguards 2220 can include L4 MDR protections, such as a safeguards UID including a safeguard category (e.g., MDR), which can be linked to other data/systems via node A. The implemented safeguards 2220 can further include L4 endpoint protection data, such as vendor protection configurations or API endpoints, which can be linked to other data/systems via node B and node C. In some examples, EDR safeguards can be linked to other data/systems via node D. Vendor product configurations, safeguards, and/or API endpoints can also be linked to other data/systems via node E. The implemented safeguards 2220 can include safeguard transitional logic linked to other systems/data via node F and node H, and/or API endpoints (e.g., get account health check) linked via node G.

Referring now to FIG. 22B, the vendor product configuration/configuration UID can be provided, via link B, and be further used in an API call to receive an API response. For example, the passport system 1120 can execute a health check API call using a retrieval proof. The passport system 1120 can further calculate EDR coverage based on the response (e.g., active coverage). In some arrangements, the API endpoint ID can be provided via link C and be used to calculate EDR coverage. After calculating, the passport system 1120 can generate or provide a result (e.g., MDR configuration response mode enabled=true), which can be linked via node I. Similarly, in some arrangements, the vendor product configuration, configuration/safeguards, and/or API endpoint call can be provided via node E or node G and can be used for executing a health check, calculating EDR coverage, etc. In some examples, data received via node G can be transformed using transformation logic. Similarly, data received via node F and/or node G and can be used for executing a health check, calculating EDR coverage, etc. In some examples, after calculating EDR coverage level using data received via nodes E, G, F, or H, the passport system 1120 can generate or provide a result (e.g., EDR coverage level=98%), which can be further linked via node J and node K.

Referring now to FIG. 22C, the safeguards (e.g., category, associated identifiers) can be linked with requirements data (e.g., requirements token with UID, category, etc.) via node A. In some arrangements, results can also be linked with the requirements data via node I. For example, based on the requirements data, the passport system 1120 can determine a comparison result (e.g., pass or fail). Similarly, results can be linked with requirements data via node D, node J and/or node K. The requirements data can include a requirements UID, requirements category, history, tokens, transformation results, and more. For example, a first result can correspond to a "pass," and a second result can correspond to a "fail." Based on the results, the passport system 1120 can determine or identify cyber resilience gaps. In some examples, the gaps can include gap identifiers, names, timestamps, and various additional and/or alternative data.

Figure 23A:
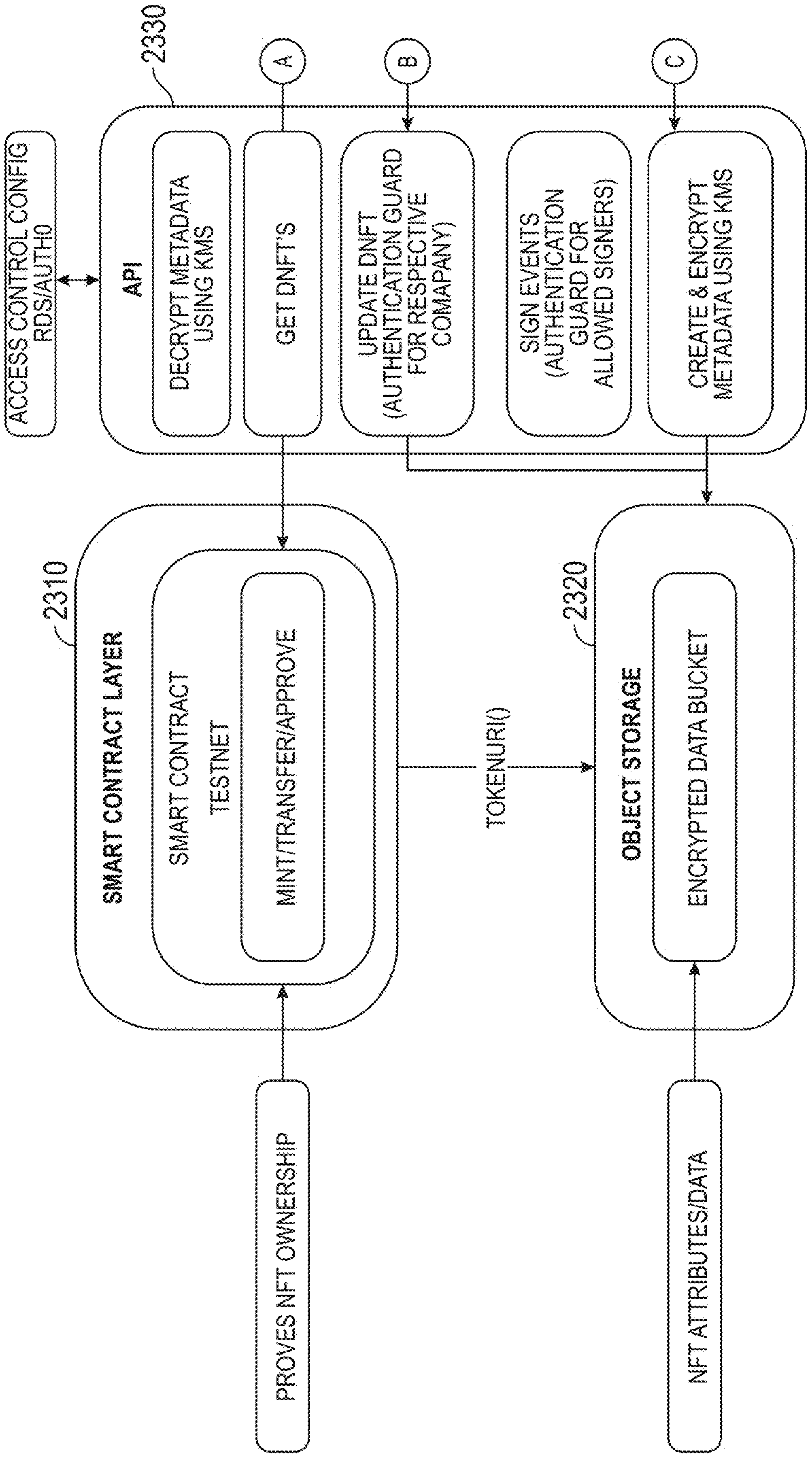
FIGS. 23A-23D depict an access control architecture, according to some arrangements.

Referring now to FIGS. 23A-23D, an access control architecture is shown, according to some arrangements. Referring now to FIG. 23A, the access control architecture can include a smart contract layer 2310, object storage 2320, and a first API 2330. In some arrangements, the smart contract layer can include a smart contract test net connected to proofs of token ownership (e.g., NFT ownership) and/or functions for minting/transferring/approving tokens. For example, the smart contract layer 2310 can be linked with first API 2330 (e.g., a get DNFT function/call), which can be further linked to data/systems via node A. In some arrangements, the smart contract layer 2310 can provide a token/URI to object storage 2320 (e.g., a database or blockchain). For example, the object storage 2320 can include an encrypted data bucket with NFT attributes/data and can be further linked to the API 2330. For example, the object storage 2320 can be linked to an update DNFT function/call of the first API 2330, which can be further linked via node B. In another example, the object storage 2320 can be linked to an create/encrypt metadata function/call of the first API 2330, which can be further linked via node C, as further described herein.

Figure 23B:
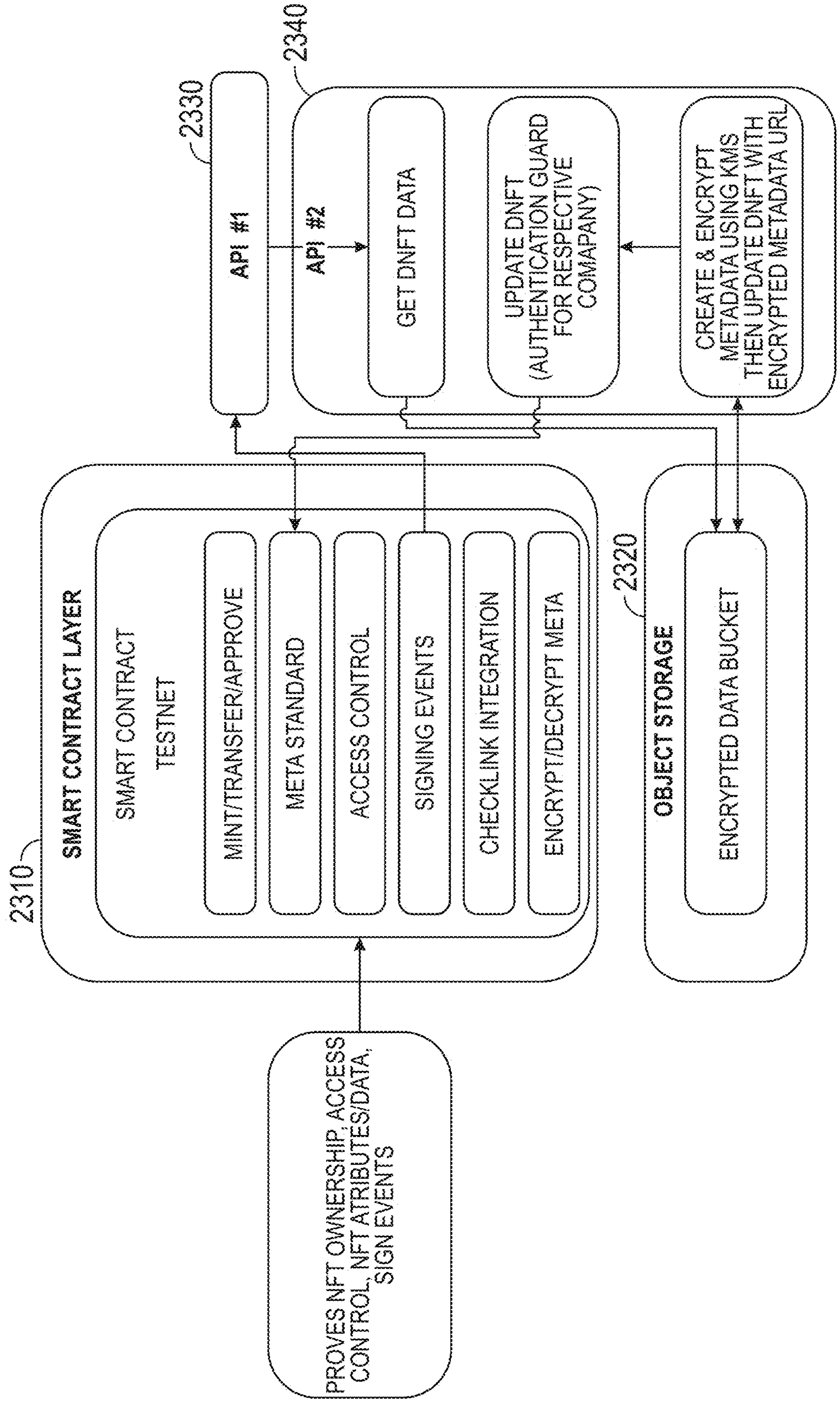
Figure 23C:
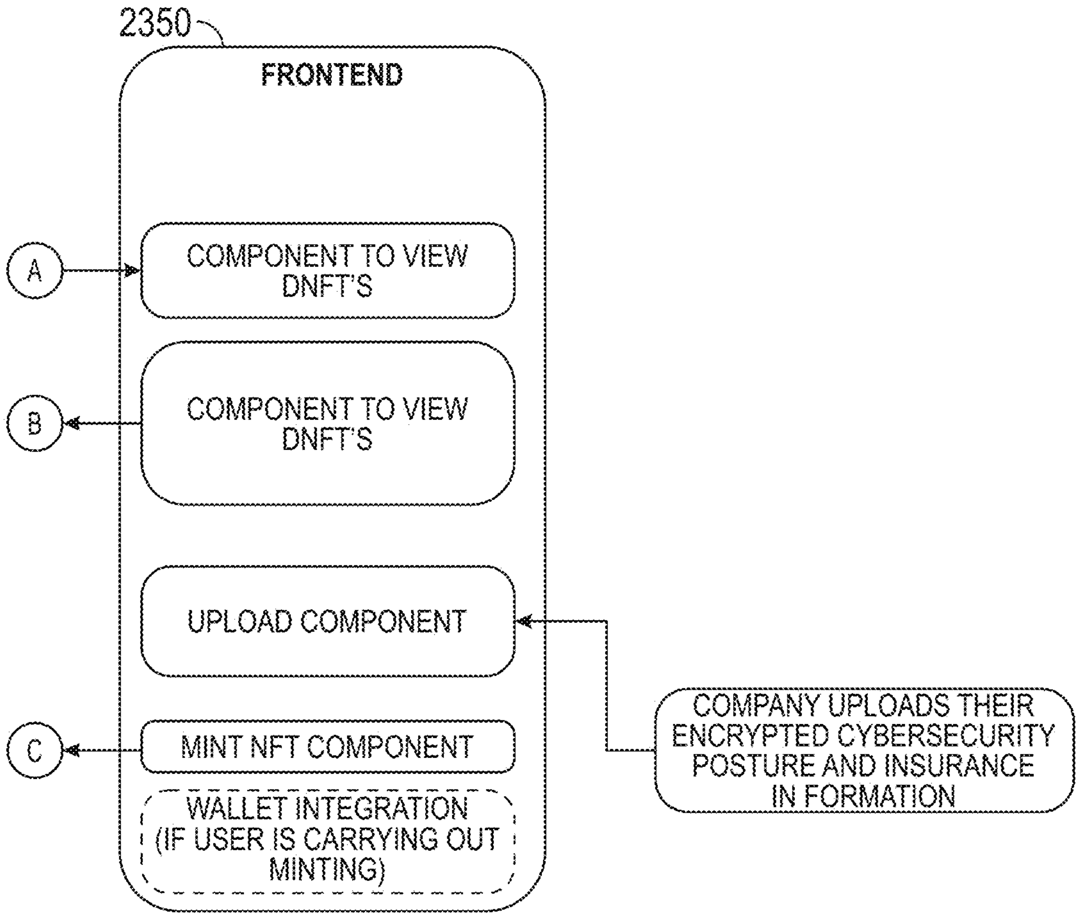

Referring now to FIG. 23B, the access control architecture can include the smart contract layer 2310 with various functions (e.g., mint/transfer/approve, metadata standardization, signing events, access control, checklink integrations, encrypt/decrypt metadata, etc.). The access control architecture can further include a second API 2340, which can include various functions/calls (e.g., get DNFT data, update DNFT, create/encrypt, etc.) linked to one or more of the smart contract layer 2310, object storage 2320, and/or first API 2330, as shown in FIG. 23B. Referring now to FIG. 23C, the functions/calls of the APIs (e.g., first API 2330, second API 2340, etc.) via a front end computing system 2350 (e.g., user computing system 110, passport system 1120, etc.) with various components/interfaces. For example, the front end computing system 2350 can include a component linked via node A with first API 2330 for viewing DNFTs. The front end computing system 2350 can also include a component linked via node B with first API 2330 for viewing DNFTs. Further, the front end computing system 2350 can include a component linked via node C with first API 2330 for minting an NFT, which can include determining a wallet integration (e.g., if a user is carrying out minting). In some arrangements, the front end computing system 2350 can include an upload component for a company (e.g., entity, organization, user, etc.) to upload encrypted cybersecurity posture and insurance information (e.g., as described regarding FIG. 17).

Figure 23D:
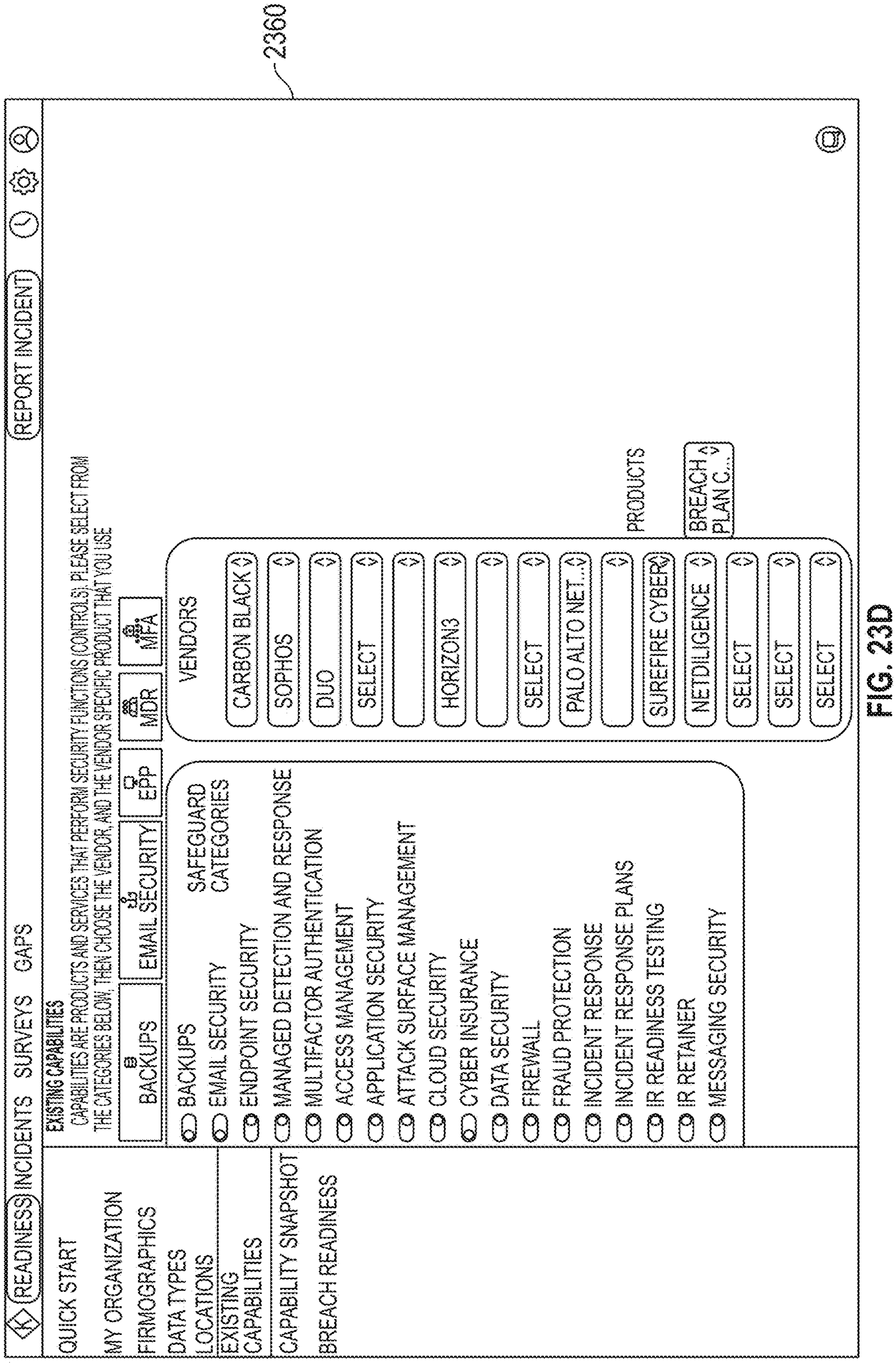

Referring now to FIG. 23D, a graphical user interface (GUI) 2360 can include various cyber resilience data. For example, the GUI 2360 can include user input elements and/or content items corresponding to an entity's cyber posture. In some examples, the GUI 2360 includes a menu and/or tabs for accessing various data (e.g., firmographics, data types, locations, readiness data, incidents, surveys, gaps, etc.). The GUI 2360 can include content/elements corresponding to an entity's existing capabilities, including safeguard categories (e.g., products and services that perform various security functions, such as backups, email security, endpoint security, managed detection and response, multifactor authentication, etc.). Further, the GUI 2360 can include a list of various vendors and/or vendor products. In some arrangements, a user can select one or more of the safeguard categories, then choose a vendor, and the GUI 2360 can display a corresponding vendor product available with the selected vendor (e.g., breach plan) based on the selected safeguard categories. The user can further select the vendor purchase (e.g., to save, for purchase, etc.) via interacting with the GUI 2360.

Figure 24A:
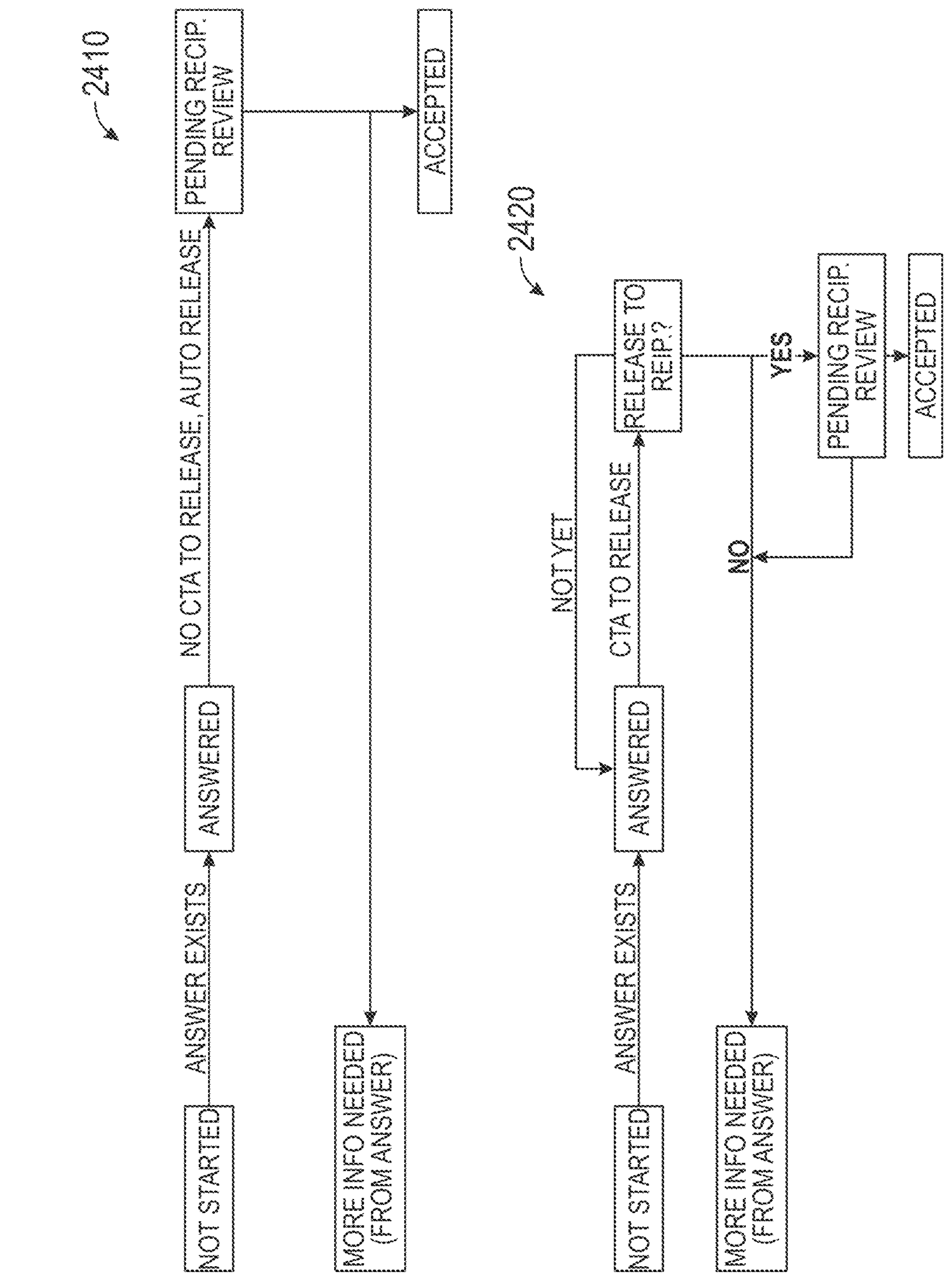
FIGS. 24A-24E depicts flowcharts for methods of resilience data configuration, according to some arrangements.
Figure 24B:
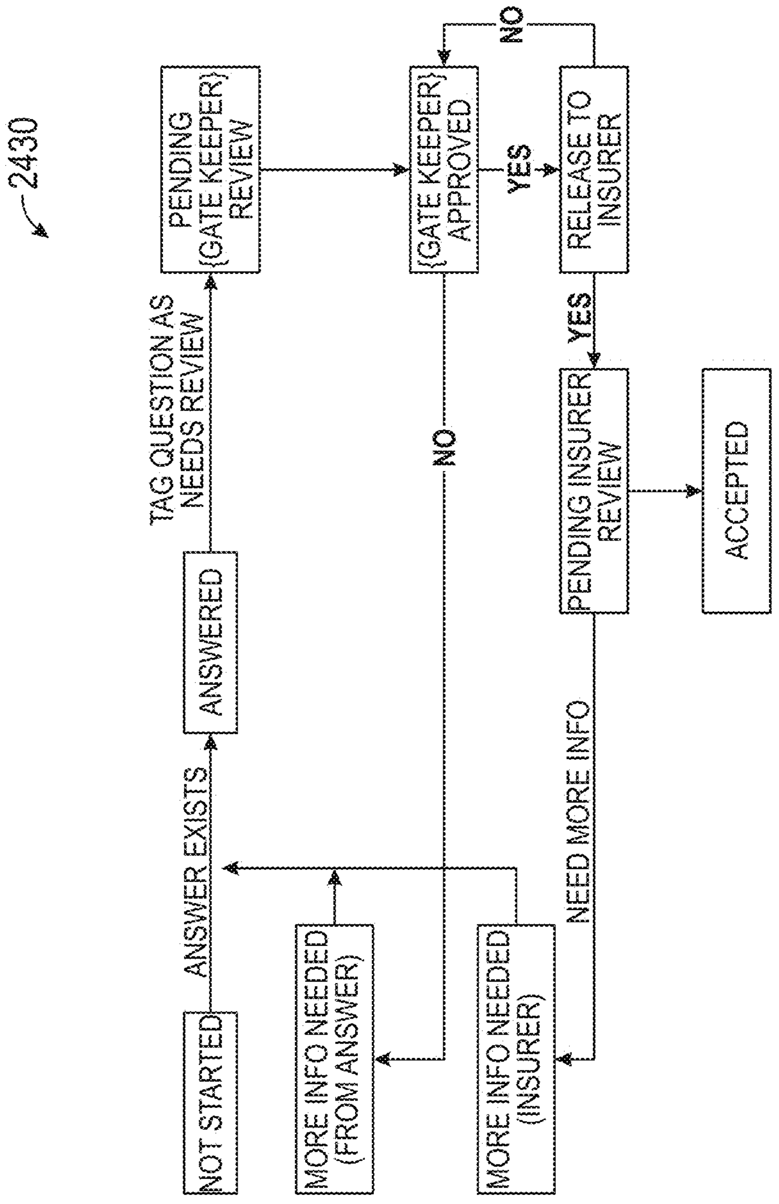
Figure 24C:
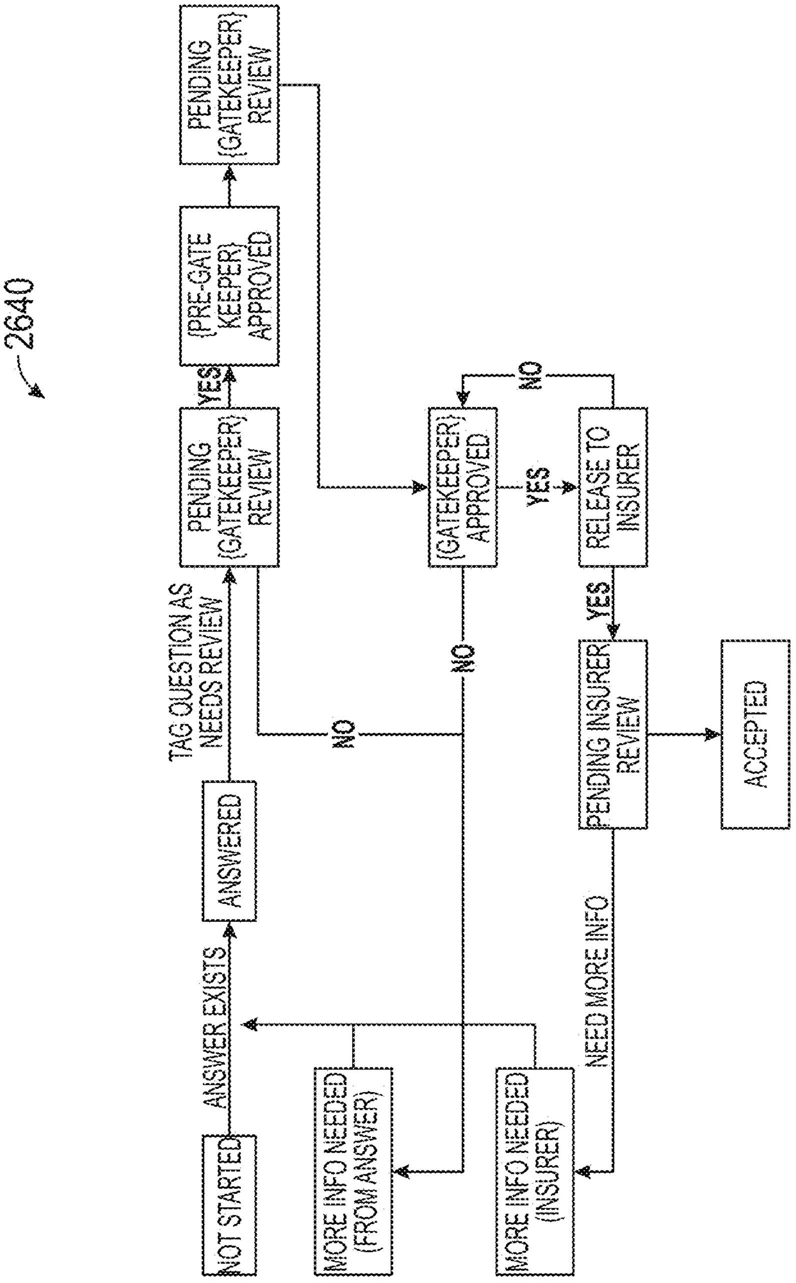

Referring now to FIGS. 24A-24E, flowcharts for methods 2410-2460 of cyber resilience configuration are shown, according to some arrangements. Referring to FIG. 24A, the method 2410 can include a configuration in which permission for a user at an insurer to "accept" a question response is provided. For example, if an answer to a cyber resilience question exists, the question response can be accepted pending recipient review, and more information can be requested/provided by a recipient. Further, the method 2420 can include configuration items to define which entity can release a question to a recipient and/or define a role which has permission to release a question to the insurer. For example, method 2410 can include auto-releases an answer to a question, and method 2420 can include determining whether CTA (e.g., a common threats analysis) to release exists prior to releasing the data to the recipient. Referring now to FIG. 24B, the method 2430 can include configuration items to define which entity can release a question to a recipient, to define a role which has permission to release a question to the insurer, and/or to define a role having permission to request gatekeeper review. For example, the method 2430 can include steps for tagging a question for gatekeeper review and iterating to determine whether gatekeeper approval is received before releasing the acceptance. Referring now to FIG. 24B, the method 2440 can include configuration items to define which entity can release a question to a recipient, to define a role which has permission to release a question to the insurer, and/or to define a role having permission to request gatekeeper review. In some examples, the method 2440 can further include a pre-gate keeper approval step before gatekeeper review.

Figure 24D:
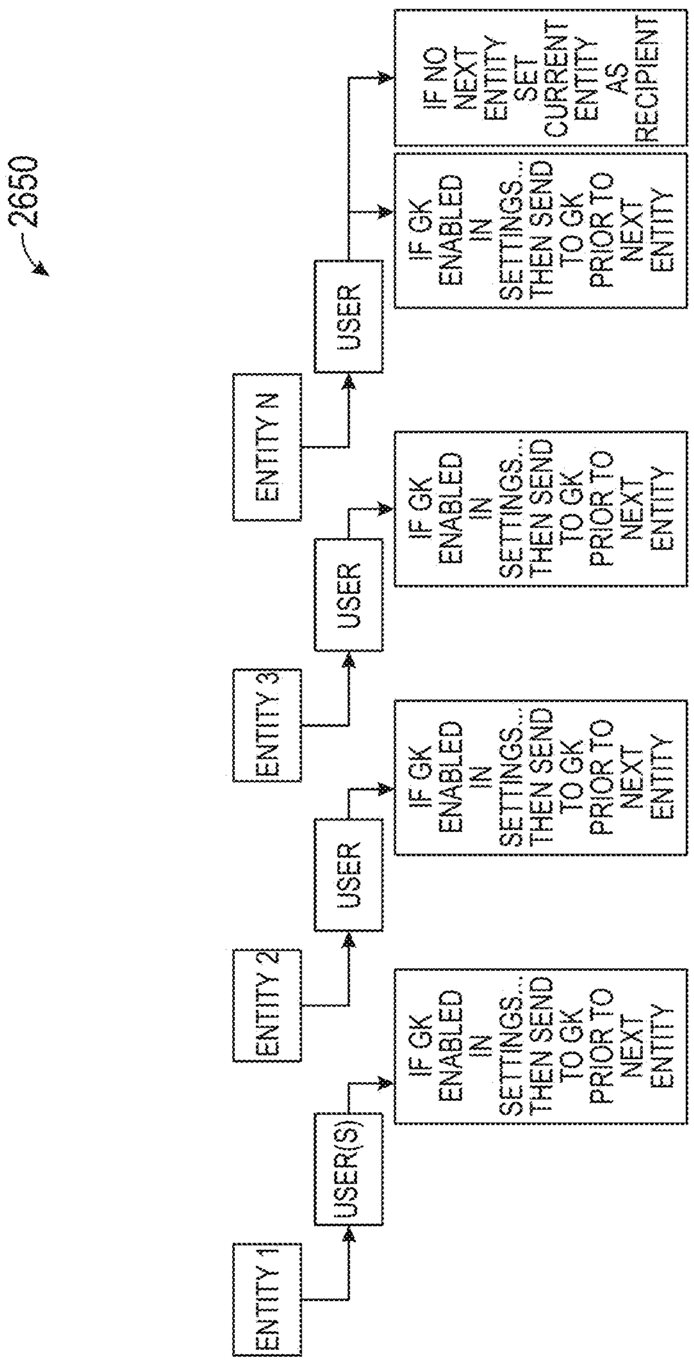

Referring now to FIG. 24D, the method 2450 can include providing a scenario audit trail with various questions and answers. For examples, various entities can include one or more users (e.g., entities 1-4 with corresponding user(s)), and the method 2450 can include determining whether a gatekeeper (GK) setting is enabled in the user or entity's settings for each of the entities 1-4. In some arrangements, if the GK setting is activated, the method 2450 can include determining that any data, questions, or actions initiated by entity 1 must first be reviewed by a gatekeeper before the questions, data, or actions can proceed to the next entity in the process. The gatekeeper can be an individual, team, or automated system responsible for checking, approving, or reviewing the questions, data, or actions before the questions, data, or actions move forward in the workflow.

Figure 24E:
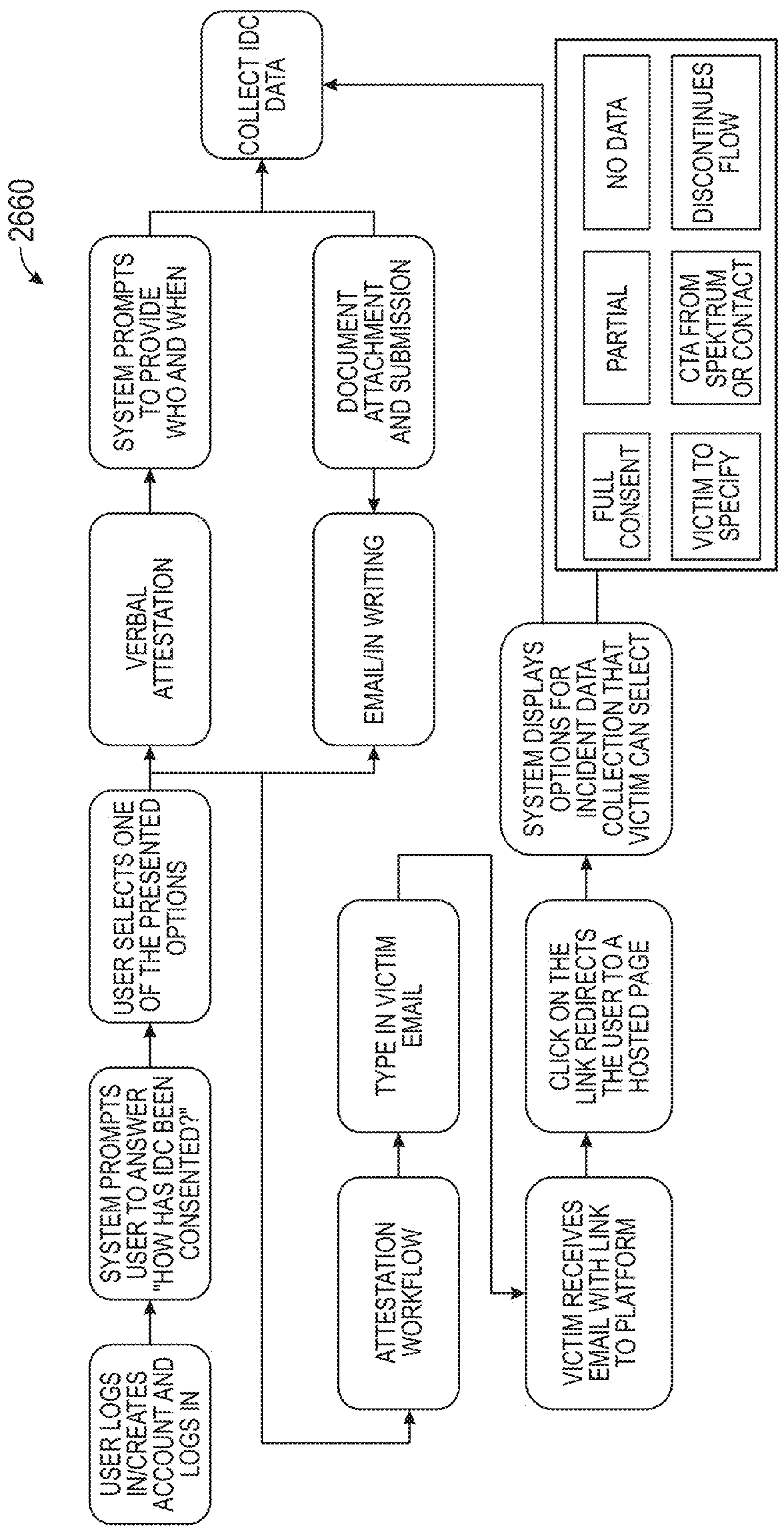

Referring now to FIG. 24E, the method 2460 can include providing and/or confirming proof that user or breach victim has provided consent to a cyber resilience platform to capture incident data (e.g., for tokenization). For example, the method 2460 can include a user logging into an existing account or creating a new account, and the user can be prompted with a question regarding whether consent has been provided. The user can select one or more presented options (e.g., displayed via a GUI) to select a process for providing consent. For example, the user can select verbal attestation, and the prompts can be provided to the applicable user to facilitate verbal attestation as a form of consent before collecting incident data (e.g., IDC data). In another examples, the user can select providing consent via email/in writing, and can further be provided providing with a document attachment and submission prompt before collecting IDC data. In various examples, after the user selects one of the presented options, an attestation workflow may be initiated, which can including typing in the user's (e.g., victim's) email address and the user receiving an email at the address with a clickable link to redirect the user to a hosted page (e.g., webpage) of the cyber resilience platform. In response to the user clicking the link, the cyber resilience platform (e.g., via a GUI) can provide options for incident data collection for selection by the user. In some arrangements, the options can include a full consent option, partial consent option, no data option, "victim to specify" option, and more.

Figure 25:
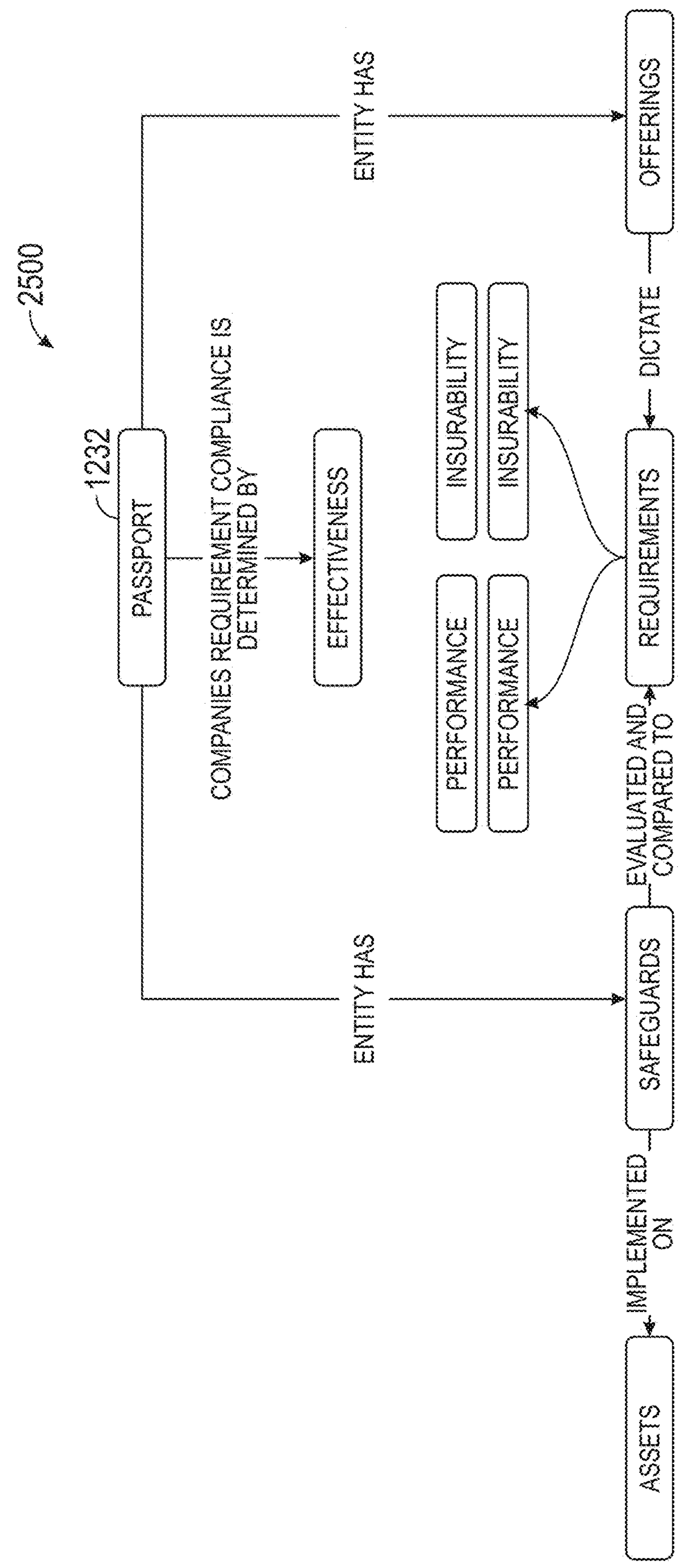
FIG. 25 depicts a flowchart for a method of determining cyber resilience compliance using tokenized cyber resilience data, according to some arrangements.

Referring now to FIG. 25, an architecture 2500 for tokenized cyber resilience data is shown, according to some arrangements. For example, as shown in FIG. 25, the dynamic passport 1232 can be linked to various cyber resilience data/tokens. In some examples, the dynamic passport 1232 can correspond to an entity/company and be linked with effectiveness data (e.g., effectiveness token 2030) used to determine a company's compliance with various criteria and/or parameters. The entity corresponding to the dynamic passport 1232 can further include safeguards (e.g., unified safeguards token 2010). In some examples, the safeguards can be implemented corresponding with various assets (e.g., unified asset token 2060). The safeguards can also be analyzed and compared to requirements (e.g., requirements token 2020), which can be used to determine various offerings (e.g., unified offerings token 2050).

Figure 26:
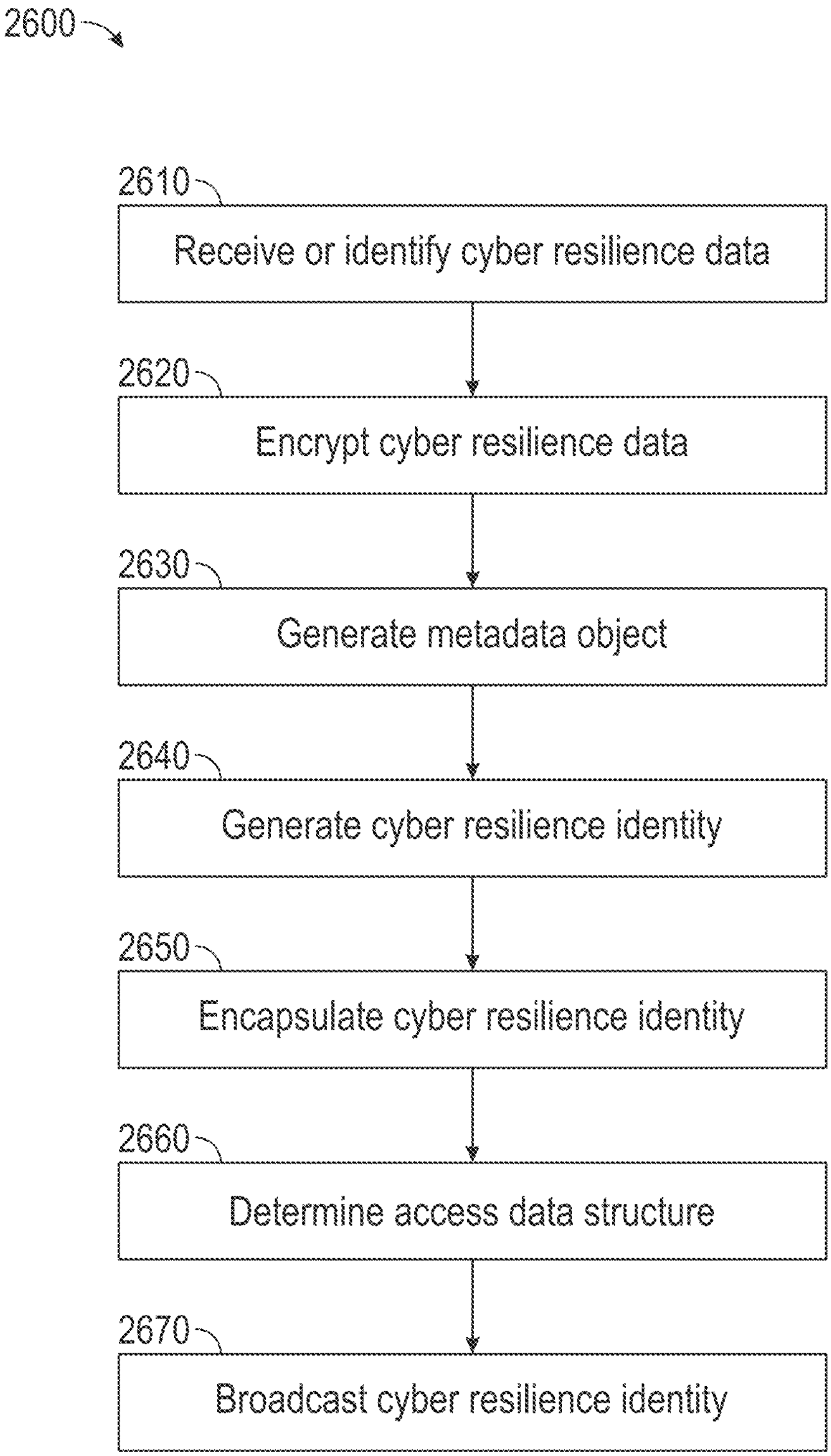
FIG. 26 depicts a flowchart for a method of modeling cyber resilience data using cyber resilience identities and associated metadata, according to some arrangements.

Referring now to FIG. 26, a flowchart for a method 2600 of modeling cyber resilience data using cyber resilience identities and associated metadata is shown, according to some arrangements. One or more of the components described with respect to FIG. 1 or FIG. 11 can be used to perform the steps of method 2600. For example, the response system 130 of FIG. 1 or the passport system 1120 of FIG. 11 can perform one or more of the steps of the method 2600. Additional, fewer, or different operations can be performed depending on the particular arrangement. In some embodiments, some, or all operations of method 2600 can be performed by one or more processors executing on one or more computing devices, systems, or servers. In some embodiments, each operation can be re-ordered, added, removed, or repeated.

In a broad overview of method 2600, at block 2610, the one or more processing circuits (e.g., passport system 1120 of FIG. 11) can receive or identify cyber resilience data. At block 2620, the one or more processing circuits can encrypt the cyber resilience data. At block 2630, the one or more processing circuits can generate a metadata object. At block 2640, the one or more processing circuits can generate a cyber resilience identity. At block 2650, the one or more processing circuits can encapsulate the cyber resilience identity. At block 2660, the one or more processing circuits can determine an access data structure. At block 2670, the one or more processing circuits can broadcast the cyber resilience identity.

In some arrangements, at block 2610, the one or more processing circuits can receive or identify cyber resilience data. For example, the metadata collection system 1126 of the passport system 1120 can gather performance data 1310*a*, firmographics data 1310*b*, safeguard data 1310*c*, policy data 1310*d*, incident data 1310*c*, and claims data 1310*f*. In some examples, the passport system 1120 can interface with blockchain 170 to retrieve historical cybersecurity events and insurance-related data. In another example, the token system 102 can provide data corresponding to token transactions and associated cyber resilience metadata, and the passport system 1120 can receive or identify the tokenized cyber resilience data via interactions with various tokens (e.g., performance tokens, roll-up tokens, etc.). In another example, the metadata collection system 1126 can receive cyber resilience data from user computing systems 110 or from third-party systems 150 through the ledger interface 1124. In another example, the metadata collection system 1126 can receive encrypted cybersecurity posture information and insurance data when a company signs up on the platform. In some arrangements, the passport system 1120 can collect and process retrieved cyber resilience data related to the company's historical cybersecurity performance and current risk assessments. Further, in another example, the passport system 1120 can gather data from external cybersecurity assessment tools integrated via the ledger interface 1124.

In some arrangements, at block 2620, the one or more processing circuits can encrypt the cyber resilience data. For example, the cryptographic system 1122 of the passport system 1120 can apply various encryption algorithms or techniques (e.g., AES-256, RSA, ECC (Elliptic Curve Cryptography), etc.) to encrypt various types of cyber resilience data (e.g., performance data 1310*a*, safeguard data 1310*c*, etc.). In some arrangements, at block 2620, the one or more processing circuits can encrypt a portion of the cyber resilience data. That is, the passport system 1120 can selectively encrypt portions of the cyber resilience data (e.g., encrypting attributes within policy data 1310*d* or particular records in claims data 1310*f*) received at block 2610 based on determined parameters (e.g., sensitivity, relevance, etc.) corresponding to the data or based on various additional factors (e.g., entity preferences, regulations, policy requirements, etc.). For example, the cryptographic system 1122 can selectively encrypt attributes within policy data 1310*d*, such as encryption of policy coverage data, while leaving other attributes unencrypted. In another example, the passport system 1120 can apply encryption to claims data 1310*f* to encrypt sensitive or private data such as financial amounts or claim descriptions based on determined sensitivity levels or regulatory requirements, and the passport system 1120 may not apply encryption to other received data (e.g., firmographics data 1310*b*) such that at least a portion of data received at block 2610 is encrypted. Further, the passport system 1120 can perform encryption dynamically as data is ingested or updated (e.g., encrypting transaction data when such data is entered into the system or encrypting data subsets based on access control policies).

In some arrangements, at block 2630, the one or more processing circuits can generate a metadata object. In some examples, a metadata object generally refers to a structured set of data that provides information about other data, including data such as identification information, descriptive information, administrative information, structural information, and contextual information to assist in organizing, finding, and understanding the underlying data. For example, the passport system 1120 can generate a metadata object including various attributes such as data collection timestamps, data source identifiers, and categorization tags. In another example, the metadata object can be generated to include information about the cyber resilience data, such as data on the data's origin (e.g., user computing systems 110 or third-party systems 150), data processing stages, and data types (e.g., performance data 1310*a* or policy data 1310*d*). In some arrangements, at block 2630, the one or more processing circuits can generate a metadata object including metadata of cyber resilience data. For instance, the passport system 1120 can generate a metadata object (e.g., information of a token) to encapsulate data related to the encrypted cyber resilience data (e.g., encryption algorithms used, encryption timestamps) and include references to related events or records (e.g., linking policy data 1310*d* that can be encrypted to security incidents or compliance checks). Further, the metadata object generated by the passport system 1120 can incorporate contextual information about data handling practices (e.g., data access controls, audit trails) and compliance measures (e.g., adherence to industry standards or internal policies) corresponding to cyber resilience data received or collected at block 2610.

In some arrangements, at block 2640, the one or more processing circuits can generate a cyber resilience identity. In some examples, a cyber resilience identity generally refers to a dynamic, unique identifier that encapsulates various aspects of an entity or organization's cyber resilience posture (e.g., dynamic passport 1232). For example, the passport system 1120 can generate a dynamic passport 1232 that includes a link to the metadata object, and the metadata object can provide context about the cyber resilience data (e.g., data type, encryption data, data source information, etc.). In some embodiments, the passport system 1120 can generate a cyber resilience identity linked to a unique identifier (UID) of an entity or organization. For example, the UID can be assigned by the passport system 1120 to uniquely reference and track the entity's cyber resilience data and provide the entity with access to such data. Further, in some examples, the passport system 1120 can generate a cyber resilience identity incorporating or being otherwise linked to a performance event dataset (e.g., cyber resilience dataset used to record performance metrics, security incidents, or compliance activities linked to the data of the entity). For example, the passport system 1120 can generate the dynamic passport 1232 to reflect updates from performance tokens, track incident logs, and link such records with relevant compliance checks. Further, as new data or events occur, the passport system 1120 can update the cyber resilience identity (e.g., dynamic passport 1232) to reflect new or updated information.

In some arrangements, at block 2650, the one or more processing circuits can encapsulate the cyber resilience identity. For example, encapsulation can generally including securing, containerizing, and/or packaging the cyber resilience identity within a data structure. In some arrangements, at block 2650, the one or more processing circuits can encapsulate the cyber resilience identity within a control structure restricting one or more updates or redemptions of the metadata object. For example, the passport can be linked to a control structure which can define permissions or conditions under which a metadata object (e.g., data of tokens) may be altered or accessed. In some examples, the control structure can include tokens that represent secure access points or validation measures for the encapsulated identity. In another example, the passport system 1120 can use a digital signature within the control structure to verify the authenticity of the encapsulated cyber resilience identity and protect the identity and corresponding resilience data from tampering. Additionally, the passport system 1120 can implement access controls (e.g., RBACs) within the control structure that restrict access based on user roles or access levels to verify that only authorized entities can modify or view elements of the cyber resilience identity. For example, the control structure can incorporate a dynamic passport 1232, which can include tokens 1234*a*-1234*e* (e.g., resilience tokens), each linked to a metadata interface 1270 with metadata objects 1272*a*-1272*e*. In some examples, encapsulating can include the passport system 1120 storing or aggregating the dynamic passport 1232 and tokens 1234 and setting corresponding access permissions (e.g., based on compliance with cyber resilience standards). For example, the control structure processor 1230 may output the encapsulated data only when conditions or permissions are verified or when a valid decryption key is presented.

In some arrangements, at block 2660, the one or more processing circuits can determine an access data structure. For example, an access data structure can define a format and/or organization of data that specifies how access permissions and conditions are structured and/or enforced. For example, the access data structure may incorporate access control lists (ACLs) or attribute-based access control (ABAC) mechanisms to specify access rights and restrictions based on user attributes or roles. In some arrangements, at block 2660, the one or more processing circuits can determine at least one access data structure being compatible with the control structure. For example, the passport system 1120 can identify an access data structure that aligns with the permissions and constraints established by control structure processor 1230. For example, the passport system 1120 can identify an access data structure that conforms to the permissions and constraints established by the smart contract control structure 1220. Additionally, the passport system 1120 can integrate the access data structure with the smart contract control structure 1220 by implementing token-based authorization or rule-based access controls to manage access to the cyber resilience identity. Further, the passport system 1120 can configure the access data structure to enforce access permissions and conditions using control protocols (e.g., token validation procedures through token interface 1210 or multi-factor authentication settings within the smart contract control structure 1220). For example, the passport system 1120 can configure an access data structure that uses token-based authorization to allow only entities with valid tokens (e.g., tokens 1234*a*-1234*e*) generated by token generator 1240 to access certain metadata objects 1272 within the dynamic passport 1232.

In some arrangements, at block 2670, the one or more processing circuits can broadcast the cyber resilience identity. For example, the passport system 1120 can broadcast the generated cyber resilience identity, including its associated metadata and performance event dataset, to a distributed ledger such as blockchain 170. In some examples, broadcasting can include the passport system 1120 using the blockchain interface 1260 to transmit the identity and associated data so that it is securely recorded and accessible across the distributed ledger network. In some arrangements, at block 2670, the one or more processing circuits can broadcast the cyber resilience identity to a ledger or distributed ledger. For example, the passport system 1120 can use the blockchain interface 1260 to broadcast the cyber resilience identity to blockchain 170, where it can be immutably stored and made accessible for future verification and audit. In another example, the passport system 1120 can broadcast the identity to multiple nodes within a distributed ledger, distributing the validation and recording of the cyber resilience identity across the network. Further, the broadcast can include cryptographic proofs or signatures to authenticate the identity, restricting updates or accesses to the identity as recorded on the ledger to authorized entities. For instance, the passport system 1120 can broadcast the dynamic passport 1232, along with linked tokens 1234*a*-1234*e* and associated metadata objects 1272*a*-1272*e*, to blockchain 170, where the broadcasted information can be validated by consensus mechanisms and securely stored across the distributed ledger.

In some arrangements, the one or more processing circuits can receive an access request for the cyber resilience identity. In some arrangements, the one or more processing circuits can receive, from an entity computing system corresponding to the cyber resilience identity or from an authorized entity computing system corresponding to an authorized entity of a plurality of authorized entities, an access request comprising at least one access data structure compatible with a control structure for restricting one or more updates and redemptions of a metadata object corresponding with the cyber resilience identity. That is, the passport system 1120 can receive an access request that includes data structures, such as access tokens or certificates, which are evaluated against role-based access controls (RBACs) defined by the control structure (e.g., smart contract). In some examples, the cyber resilience identity can be associated with an entity and can be encapsulated within a control structure that links the identity to various tokens, such as performance tokens or safeguard tokens, which authorized entities (e.g., vendors, insurers) may request access to (e.g., a type of access such as read access, write access, etc.).

In some arrangements, the one or more processing circuits can verify the access data structure. In some arrangements, the one or more processing circuits can verify the at least one access data structure using the control structure. For example, the control structure (e.g., smart contract) can assess whether the access request complies with the predefined role-based access controls (RBACs) and cryptographic validation protocols. That is, verifying can include determining if the requesting entity has the necessary permissions to access or modify tokens or tokenized data within the cyber resilience identity, allowing authorized entities to interact with the associated metadata objects or performance event datasets in various ways based on various access controls.

In some arrangements, the one or more processing circuits can grant access to the metadata object and the performance event dataset of the cyber resilience identity. In some arrangements, the one or more processing circuits can grant access to the metadata object and the performance event dataset to the entity or the authorized entity. For example, after verifying the access request, the passport system 1120 can grant access to tokens within the cyber resilience identity, such as performance tokens or safeguard tokens. That is, granting access can include permitting or allowing the user computing system 110 or the authorized entity computing system (e.g., third-party system 150 or user computing system 110) to retrieve information about the entity's cyber resilience performance over time or to view and interact with tokenized data, depending on the permissions defined by the RBACs.

In some arrangements, the one or more processing circuits can decrypt the metadata object. In some arrangements, the one or more processing circuits can decrypt the metadata object after access is granted. For example, the passport system 1120 can use the cryptographic system 1122 to decrypt tokens or portions of tokenized data as permitted by the verified access request. That is, the decryption process can be applied selectively, allowing only the data segments authorized by the RBACs to be decrypted and made accessible to the requesting entity. Additionally, the decryption can be performed in real-time as the access request is processed, maintaining the security of the metadata object throughout the interaction.

In some arrangements, the one or more processing circuits can provide access to the metadata object and the performance event dataset. In some arrangements, the one or more processing circuits can provide access to the metadata object and the performance event dataset by facilitating retrieval using a secure interface between the one or more processing circuits and the entity computing system or the authorized entity computing system. For example, the passport system 1120 can use a secure interface, such as a blockchain interface 1260, to allow the user computing system 110 or the authorized entity computing system 150 to retrieve and interact with the decrypted metadata object and performance event dataset. That is, the interface enforces the RBACs and control structure policies during data retrieval, restricting access to the performance tokens and other sensitive information to authorized entities. Additionally, encryption protocols may be applied during data transmission to protect the integrity and confidentiality of the data as it is accessed by the requesting entity.

In some arrangements, the control structure includes a verification function to restrict the one or more updates and redemptions of the metadata object. For example, the smart contract control structure 1220 can include a verification function that validates requests to update or redeem the metadata object based on predefined rules or policies. This function can operate within the control structure to restrict any attempted updates or redemptions to those that meet verification criteria. In some arrangements, the verification function is executable by control structure to validate one or more of the one or more updates and redemptions of the metadata object by verifying one or more cryptographic proofs of authorization of authorized entities prior to updating the cyber resilience identity. For example, the smart contract control structure 1220 can execute a verification function that checks cryptographic proofs, such as digital signatures or hashed authentication tokens, from multiple authorized entities before processing any changes to the metadata object. In another example, the verification function can cross-reference these cryptographic proofs with a list of pre-approved entities stored within the smart contract control structure 1220 to verify that only entities with the correct authorization can initiate updates. Additionally, the verification function can include multi-factor authentication protocols, where authorized entities provide multiple forms of verification (e.g., a combination of cryptographic proofs and biometric data) before any updates to the cyber resilience identity (e.g., dynamic passport 1232) are processed.

In some arrangements, the one or more processing circuits can be further configured to receive or identify additional cyber resilience data of an entity corresponding to the cyber resilience identity. For example, the metadata collection system 1126 of the passport system 1120 can gather additional data that complements the performance data 1310*a*, safeguard data 1310*c*, and other cyber resilience data previously received at block 2610. This additional data may include updated incident data 1310*e* or newly identified vulnerabilities from third-party systems 150. In some arrangements, the one or more processing circuits can be further configured to receive at least one cryptographic proof of provenance of the additional cyber resilience data. For example, the passport system 1120 can generate a cryptographic proof of provenance by creating a secure hash (e.g., using SHA-256) of the additional cyber resilience data, such as a software update or new compliance report. This proof of provenance can be used to verify the origin and integrity of the data, ensuring that it has not been tampered with during transmission or storage. In some arrangements, the one or more processing circuits can be further configured to verify, using the verification function of the control structure, the at least one cryptographic proof of provenance. For example, the smart contract control structure 1220 can compare the cryptographic proof with existing transaction records and digital signatures stored within blockchain 170 or other distributed ledgers, validating the authenticity and integrity of the newly received data before it is appended to the cyber resilience identity.

In some arrangements, the one or more processing circuits can be further configured to update, using the control structure, the cyber resilience identity by updating the metadata object or appending the additional cyber resilience data to the performance event dataset. For example, the smart contract control structure 1220 can automatically update the metadata object to reflect new security incidents or append the additional data to the performance event dataset, linking the metadata object with existing records in dynamic passport 1232. In some arrangements, the one or more processing circuits can be further configured to broadcast, using the control structure, the updated cyber resilience identity to the ledger or the distributed ledger. For example, the passport system 1120 can use blockchain interface 1260 to broadcast the updated cyber resilience identity and verify that nodes within blockchain 170 receive the update and that the updated identity is securely recorded across the distributed ledger for future verification and access.

In some arrangements, the one or more processing circuits can be further configured to receive, from an entity computing system of an entity corresponding to the cyber resilience identity or from an authorized entity computing system corresponding to an authorized entity of a plurality of authorized entities, an access request for the cyber resilience identity. For example, the passport system 1120 can receive an access request from third-party systems 150 or user computing systems 110, where the request may originate from an entity seeking to access or update the cyber resilience identity. This request can be routed through the ledger interface 1124, which can validate the origin of the request and determine the appropriate access level. The request may involve accessing data, such as policy data 1310*d* or performance data 1310*a*, with verification against stored access control policies. In some arrangements, the access request includes the at least one access data structure. For example, the request can include an access data structure such as a token-based authentication key or a cryptographic certificate that aligns with the smart contract control structure 1220's predefined access protocols to identify and authenticate the requesting entity.

In some arrangements, the one or more processing circuits can verify, using the control structure, the at least one access data structure. For example, the smart contract control structure 1220 can cross-reference the access data structure with stored access permissions, checking against the ACLs or ABAC mechanisms to determine if the requesting entity is authorized to access or modify the cyber resilience identity. In some arrangements, the one or more processing circuits can be further configured to grant access to the metadata object and the performance event dataset within the cyber resilience identity to an entity or an authorized entity. For example, upon successful verification, the passport system 1120 can unlock portions of the metadata object and performance event dataset, allowing the authorized entity to retrieve and view the data through a secure access protocol. In some arrangements, the one or more processing circuits can be further configured to decrypt the metadata object. For example, the cryptographic system 1122 of the passport system 1120 can apply decryption algorithms to the metadata object, such as decrypting policy data or incident logs for an authorized entity to review. In some arrangements, the one or more processing circuits can be further configured to provide access to the metadata object and the performance event dataset by facilitating retrieval using a secure interface between the one or more processing circuits and the entity computing system or the authorized entity computing system. For example, the passport system 1120 can establish a secure communication channel with the entity computing system via the ledger interface 1124, transmitting the metadata object and performance event dataset to the verified entity or authorized entity.

In some arrangements, the cyber resilience identity is a data structure encapsulating a plurality of resilience tokens. For example, the passport system 1120 can generate a dynamic passport 1232 that includes multiple resilience tokens 1234. In some arrangements, each of the plurality of resilience tokens corresponds to a cybersecurity dimension of a posture of an entity corresponding to the cyber resilience identity. For example, the unified tokens 1212, real-time tokens 1214, and effectiveness tokens 1216 can each represent distinct cybersecurity dimensions, such as implemented safeguards, compliance with requirements, and ongoing security assessments. That is, a cybersecurity dimension can correspond to an aspect or category of an entity's overall cybersecurity posture, such as a performance, requirements, insurability, or incident response readiness category. For example, one dimension can include the technical measures in place to prevent unauthorized access (e.g., encryption standards, firewall configurations), and another dimension can assess the entity's adherence to industry regulations (e.g., GDPR compliance). The various tokens described herein collectively provide a multi-faceted or multi-dimensional perspective on the entity's cybersecurity posture, reflecting various aspects or dimensions of the entity's security over time.

In some arrangements, the plurality of resilience tokens can include at least one unified token including the cyber resilience data captured over a period of time, at least one evaluation token including the cyber resilience data captured at a plurality of points in time over the period of time, and at least one roll-up token including data of the at least one unified token and the at least one real-time corresponding with a security performance of the entity over the period of time. For example, the unified token processor 1222 of the smart contract control structure 1220 can generate unified tokens 1212 that aggregate cybersecurity data (e.g., safeguards, policies, incidents) over a period of time, providing an overview of the entity's cybersecurity measures. The real-time token processor 1224 can generate real-time tokens 1214 (e.g., evaluation) that capture snapshots of the entity's cybersecurity posture at various intervals, reflecting the entity's ongoing security status. The effectiveness token processor 1226 can generate effectiveness tokens 1216 (e.g., roll-up) by combining data from the unified tokens 1212 and real-time tokens 1214, providing an assessment of the entity's security performance over time, including significant events or changes in security posture.

In some arrangements, the at least one unified token can include a unified safeguard token including data of implemented safeguards and configurations over the period of time, a unified requirements token including data of entity-specific requirements and third-party requirements over the period of time, a unified asset token including data of a plurality of assets of the entity over the period of time, or a unified attestation token including data of entity attestations over the period of time. For example, the unified token processor 1222 can generate a unified safeguard token that includes records of security measures implemented by the entity, such as firewall settings or encryption protocols, over a specified period. In another example, the unified token processor 1222 can generate a unified requirements token that captures compliance data related to internal policies and third-party security standards, tracking how the entity meets these requirements over time. The unified token processor 1222 can also generate a unified asset token that records information about the entity's assets, such as servers, network devices, or software licenses, and their associated security configurations during the period. Additionally, the unified token processor 1222 can generate a unified attestation token that includes data on certifications, audits, and attestations made by the entity regarding its cybersecurity posture over the period.

In some arrangements, the at least one real-time token can include a plurality of evaluation tokens including data of at least one of a posture of the entity, a state of the entity, or a protection of the entity at a point in time of the plurality of points in time over the period of time. For example, the real-time token processor 1224 of the smart contract control structure 1220 can generate evaluation tokens that capture snapshots of the cybersecurity posture of the entity at various points in time. These tokens can include data on the state of implemented security measures (e.g., firewall rules, encryption status), the overall security posture of the entity (e.g., risk levels, compliance status), and the effectiveness of protection mechanisms deployed across the infrastructure of the entity. In another example, the evaluation tokens can reflect the response of the entity to incidents or threats, documenting how the security systems were adjusted or enhanced in real-time. The real-time token processor 1224 can also generate tokens that track the operational status of systems within the entity, such as the availability of services or the integrity of key data at intervals. These tokens provide a time-stamped record of the security environment of the entity, which supports analysis of how the cybersecurity posture of the entity changes over time.

In some arrangements, the one or more processing circuits can be further configured to generate the at least one access data structure for at least one of an entity computing system of an entity corresponding to the cyber resilience identity or an authorized entity computing system corresponding to an authorized entity of a plurality of authorized entities. For example, the passport system 1120 can generate an access data structure that defines access permissions and conditions for the cyber resilience identity, incorporating attributes such as user roles, access levels, and data access rights. In another example, the passport system 1120 can generate a role-based access control (RBAC) mechanism, where each role is associated with predefined access rights and permissions linked to aspects of the cyber resilience identity. Alternatively, in some arrangements, the one or more processing circuits can be further configured to receive, from at least one of the entity computing system or the authorized entity computing system, the at least one access data structure. For example, the passport system 1120 can receive an access data structure from a third-party system 150, where the structure includes access control lists (ACLs), attribute-based access control (ABAC) definitions, RBAC policies, or various additional and/or alternative controls. In another example, the passport system 1120 can receive access tokens or digital certificates from the authorized entity computing system, specifying access permissions and conditions for interacting with the cyber resilience identity.

In some arrangements, the least one access data structure can include a token, key, certificate, or access mechanism. For example, the passport system 1120 can generate a digital token that grants access rights to an authorized entity to interact with certain components of the dynamic passport 1232. In another example, the passport system 1120 can issue a cryptographic key or digital certificate to decrypt certain portions of the cyber resilience data or verify the authenticity of transactions related to the dynamic passport 1232. In some arrangements, the one or more processing circuits are further configured to, in determining the at least one access data structure being compatible with the control structure, in response to receiving the at least one access data structure, configure the at least one access data structure by updating the control structure to enforce restrictions on the one or more updates and redemptions of the metadata object. For example, the passport system 1120 can receive a token from an authorized entity computing system and update the smart contract control structure 1220 to restrict the modification of metadata objects linked to the dynamic passport 1232 based on the permissions encoded within the token. In another example, the passport system 1120 can update the smart contract control structure 1220 to incorporate the received access data structure, thereby enforcing restrictions on how and when metadata objects can be accessed or modified.

In some arrangements, updating the control structure includes updating one or more access parameters of the control structure. For example, the passport system 1120 can modify access control lists (ACLs) or role-based access control (RBAC) settings within the smart contract control structure 1220 to align with the permissions granted by the new access data structure. For example, RBACs can include rules for accessing tokenized data (e.g., metadata object) based on roles (e.g., entity types or roles of a user within an entity) or other access control parameters (e.g., date/time, user preferences, etc.) In some examples, users or entities associated with a cyber resilience identity (e.g., passport) can select or provide information used for generated RBACs (e.g., based on consent preferences selected via a user interface, other data sharing preferences associated with an entity, regulations, etc.). For example, the passport system 1120 can modify access control lists (ACLs) or role-based access control (RBAC) settings within the smart contract control structure 1220 to align with the permissions granted by the new access data structure. That is, the passport system 1120 can dynamically adjust the control structure to reflect changes in authorized entities, permission levels, and data access restrictions as defined by the new access data structure. Further, the passport system 1120 can update cryptographic keys or tokens associated with the control structure to ensure that only the entities with the updated permissions can access or modify the cyber resilience identity. Additionally, the passport system 1120 can track and log these updates in the distributed ledger.

In another example, the passport system 1120 can adjust encryption parameters or key management policies within the smart contract control structure 1220 to confirm that entities with a correct or matching access data structure can interact with the dynamic passport 1232. In some arrangements, the one or more processing circuits are further configured to, in determining the at least one access data structure being compatible with the control structure, in response to generating the at least one access data structure, provide, to the entity computing system or the authorized entity computing system, the at least one access data structure. For example, the passport system 1120 can generate a digital certificate or token and transmit it to the authorized entity computing system, granting access to components of the dynamic passport 1232 based on the permissions encoded within the access data structure. In another example, the passport system 1120 can provide an access key to the entity computing system, authorizing interaction with the metadata object or performance event dataset associated with the dynamic passport 1232 (e.g., interaction with the tokens 1234) to one or more entities (e.g., an entity corresponding to the passport, another authorized entity such as an insurer of a group of approved insurers, etc.).

In some arrangements, the cyber resilience data can include at least one of firmographics data, safeguard data, performance data, policy data, incident data, or claims data. For example, the passport system 1120 can collect and categorize cyber resilience data from various sources, such as firmographics data **1310*b* detailing organizational characteristics, safeguard data 1310*c* describing implemented security measures, performance data 1310*a* capturing cybersecurity performance metrics, policy data 1310*d* outlining internal and external security policies, incident data 1310*e* reporting security breaches or vulnerabilities, and claims data 1310*f* related to insurance or legal claims following security incidents. In some arrangements, the control structure can include a smart contract, and the control structure can include a smart contract control structure. For example, a smart contract generally refers to a self-executing contract with the terms of the agreement written into code. In some examples, the smart contract control structure can manage the execution of rules and conditions tied to the cyber resilience identity. For example, the smart contract control structure can automate token transactions, verify cryptographic proofs, and enforce access control measures without manual intervention. The smart contract can interact with the tokens (e.g., unified tokens 1212, real-time tokens 1214, effectiveness tokens 1216) to validate actions such as updating the metadata object, transferring ownership of tokens, or adjusting permissions within the control structure. The smart contract control structure can also execute predefined functions based on the conditions encoded in the smart contract, such as triggering updates to the dynamic passport 1232** when new resilience data is received or when certain criteria are met.

In some arrangements, tokenization of the data can provide a secure and efficient method for clients to share their cyber risk information with brokers and carriers. For example, the passport system 1120 can use a tokenization process to convert cyber resilience data into tokens that can be securely shared and managed. In some arrangements, DNFTs can include a journal of performance history events, such as cybersecurity management events or insurance-related events. For example, the passport system 1120 can generate DNFTs verifiable through a multi-signature wallet or a signature verification mechanism within the smart contract, involving trusted entities to sign off on events they participated in. In some arrangements, insureds can create and manage their DNFTs using an interface provided by the passport system 1120, securely storing their cybersecurity posture and insurance information and updating it as necessary. In some examples, DNFTs can track and verify performance history events, maintaining authenticity and transparency.

In some arrangements, access to sensitive data can be controlled through an access control mechanism within the smart contract, restricting decryption and access to authorized parties. For example, the passport system 1120 can manage access controls to sensitive data, ensuring only authorized entities can decrypt and access data. The DNFT structure can feature a unique identifier, encrypted metadata, and a list of performance history events. The passport system 1120 can use an updateDNFT function (e.g., DNFT.updateDFNT( )) to update the encrypted metadata link in the DNFT, and a signEvent function to verify the authenticity of performance history events by including a fee in tokens, allowing only the DNFT owner to add event signatures. The passport system 1120 can implement DNFT visibility and access control through an access control mechanism in the smart contract or the API.

In some arrangements, the components and data flow for creating a dynamic NFT (DNFT) for each business that tokenizes its security posture can include business registration and data collection. For example, the passport system 1120 can facilitate the registration process, where businesses provide information, including firmographics, posture information, and insurance data. Once the data is collected, it can be encrypted using key management via an API and stored in a secure data storage service. The passport system 1120 can deploy a smart contract to facilitate the creation, update, and transfer of DNFTs, using blockchain oracles to access encrypted data from the API and include it in the DNFT as metadata.

In some arrangements, the DNFT structure can include a unique identifier, encrypted metadata linked to data accessible via the API, and a journal of performance history events. For example, as a company's cybersecurity posture and insurance information change, the encrypted data can be updated in secure storage, and the metadata link in the DNFT can be revised as necessary. The passport system 1120 can use a multi-signature wallet or a signature verification mechanism within the smart contract to maintain the authenticity of performance history events, involving trusted entities to sign off on events they were involved in. For example, authorized parties can access the encrypted information via an access control mechanism in the smart contract or the API, restricting decryption and access to only the DNFT owner, authorized insurers, or brokers. The architecture of the passport system 1120 can achieve tokenization of a business's cybersecurity posture while maintaining data confidentiality and allowing authorized parties to securely access the information.

In some arrangements, a company can register on a platform and create an account. For example, the passport system 1120 can facilitate the company in uploading its encrypted cybersecurity posture and insurance information to the platform. The company can create metadata from the uploaded information, encrypt it with key management systems, and upload it to a secure data storage service. The passport system 1120 can facilitate the creation of the DNFT using platform-acquired tokens and incorporate the encrypted data as metadata within the DNFT. In some arrangements, the company can view and manage its DNFTs through an interface provided by the passport system 1120. For example, this can involve handling performance history events, such as cybersecurity management events or insurance-related events, and updating the encrypted metadata link as necessary. The passport system 1120 can use a signEvent function to verify the authenticity of events, involving a fee paid in tokens and engaging trusted entities to sign off on events they participated in. In some arrangements, insurers or brokers can access the encrypted information in the DNFTs with the company's permission to assess risk and propose suitable insurance policies. For example, the passport system 1120 can provide a method for authorized parties to securely manage and verify the cybersecurity posture and insurance information of a company, improving trust and reducing the likelihood of fraud.

Configuration of Exemplary Embodiments

While this specification contains many specific implementation details and/or arrangement details, these should not be construed as limitations on the scope of any inventions or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative arrangement described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations and/or arrangements described above should not be understood as requiring such separation in all implementations and/or arrangements, and it should be understood that the described program components and systems can generally be integrated together in a single software product or packaged into multiple software products.

Having now described some illustrative implementations, implementations, illustrative arrangements, and arrangements it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements and features discussed only in connection with one implementation and/or arrangement are not intended to be excluded from a similar role in other implementations or arrangements.

The phraseology and terminology used herein is for the purpose of description and should not be regarded as limiting. The use of "including" "including" "having" "containing" "involving" "characterized by" "characterized in that" and variations thereof herein, is meant to encompass the items listed thereafter, equivalents thereof, and additional items, as well as alternate implementations and/or arrangements consisting of the items listed thereafter exclusively. In some arrangements, the systems and methods described herein consist of one, each combination of more than one, or all of the described elements, acts, or components.

Any references to implementations, arrangements, or elements or acts of the systems and methods herein referred to in the singular may also embrace implementations and/or arrangements including a plurality of these elements, and any references in plural to any implementation, arrangement, or element or act herein may also embrace implementations and/or arrangements including only a single element. References in the singular or plural form are not intended to limit the presently disclosed systems or methods, their components, acts, or elements to single or plural configurations. References to any act or element being based on any information, act or element may include implementations and/or arrangements where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Any arrangement disclosed herein may be combined with any other arrangement, and references to "an arrangement," "some arrangements," "an alternate arrangement," "various arrangements," "one arrangement" or the like are not necessarily mutually exclusive and are intended to indicate that a particular feature, structure, or characteristic described in connection with the arrangement may be included in at least one arrangement. Such terms as used herein are not necessarily all referring to the same arrangement. Any arrangement may be combined with any other arrangement, inclusively or exclusively, in any manner consistent with the aspects and arrangements disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations and/or arrangements are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for controlling access to cyber resilience data using cyber resilience identities and associated metadata, the method comprising:

receiving, by one or more processing circuits from an entity computing system of an entity corresponding to a cyber resilience identity or from an authorized entity computing system corresponding to an authorized entity of a plurality of authorized entities, an access request for the cyber resilience identity, the access request comprising at least one access data structure compatible with a control structure for restricting one or more updates and redemptions of a metadata object corresponding with the cyber resilience identity;

verifying, by the one or more processing circuits using the control structure, the at least one access data structure;

granting, by the one or more processing circuits, access to the metadata object and a performance event dataset of the cyber resilience identity to the entity or the authorized entity;

decrypting, by the one or more processing circuits, the metadata object; and providing, by the one or more processing circuits, the access to the metadata object and the performance event dataset by facilitating retrieval using a secure interface between the one or more processing circuits and the entity computing system or the authorized entity computing system.

2. The method of claim 1, wherein the metadata object comprises metadata of the cyber resilience data, wherein the cyber resilience identity comprises at least a link with the metadata object, a unique identifier (UID), and the performance event dataset, wherein at least a portion of the cyber resilience data is encrypted, wherein the cyber resilience identity is encapsulated in the control structure, and wherein the cyber resilience identity is broadcasted to a ledger or a distributed ledger.

3. The method of claim 2, wherein the control structure comprises a verification function to restrict the one or more updates and redemptions of the metadata object, the verification function executable by the control structure to validate one or more of the one or more updates and redemptions of the metadata object by verifying one or more cryptographic proofs of authorization of the plurality of authorized entities prior to updating the cyber resilience identity.

4. The method of claim 3, further comprising:

receiving or identifying, by the one or more processing circuits, additional cyber resilience data of the entity corresponding to the cyber resilience identity;

receiving, by the one or more processing circuits, at least one cryptographic proof of provenance of the additional cyber resilience data;

verifying, by the one or more processing circuits using the verification function of the control structure, the at least one cryptographic proof of provenance;

updating, by the one or more processing circuits using the control structure, the cyber resilience identity by updating the metadata object or appending the additional cyber resilience data to the performance event dataset; and broadcasting, by the one or more processing circuits using the control structure, the updated cyber resilience identity to the ledger or the distributed ledger.

5. The method of claim 1, wherein the cyber resilience identity is a data structure encapsulating a plurality of resilience tokens, each of the plurality of resilience tokens corresponding to a cybersecurity dimension of a posture of the entity corresponding to the cyber resilience identity, the plurality of resilience tokens comprising at least:

at least one unified token comprising the cyber resilience data captured over a period of time;

at least one evaluation token comprising the cyber resilience data captured at a plurality of points in time over the period of time; and at least one roll-up token comprising data of the at least one unified token and at least one real-time token corresponding with a security performance of the entity over the period of time.

6. The method of claim 5, wherein the at least one unified token comprises:

a unified safeguard token comprising data of implemented safeguards and configurations over the period of time;

a unified requirements token comprising data of entity-specific requirements and third-party requirements over the period of time;

a unified asset token comprising data of a plurality of assets of the entity over the period of time; or a unified attestation token comprising data of entity attestations over the period of time.

7. The method of claim 5, wherein the at least one real-time token comprises:

a plurality of evaluation tokens comprising data of at least one of the posture of the entity, a state of the entity, or a protection of the entity at a point in time of the plurality of points in time over the period of time.

8. The method of claim 1, further comprising:

generating, by the one or more processing circuits, the at least one access data structure for at least one of the entity computing system of the entity corresponding to the cyber resilience identity or the authorized entity computing system corresponding to the authorized entity of the plurality of authorized entities; or receiving, by the one or more processing circuits from at least one of the entity computing system or the authorized entity computing system, the at least one access data structure.

9. The method of claim 8, wherein the at least one access data structure comprises a token, key, certificate, or access mechanism, and wherein the at least one access data structure is determined to be compatible with the control structure based on:

in response to receiving the at least one access data structure, configuring the at least one access data structure by updating the control structure to enforce restricting the one or more updates and redemptions of the metadata object, wherein updating the control structure comprises updating one or more access parameters of the control structure; or in response to generating the at least one access data structure, providing, by the one or more processing circuits to the entity computing system or the authorized entity computing system, the at least one access data structure.

10. The method of claim 1, wherein the cyber resilience data comprises at least one of firmographics data, safeguard data, performance data, policy data, incident data, or claims data, and wherein the control structure comprises a smart contract.

11. A system for controlling access to cyber resilience data using cyber resilience identities and associated metadata, the system comprising:

one or more processing circuits configured to:

receive, from an entity computing system of an entity corresponding to a cyber resilience identity or from an authorized entity computing system corresponding to an authorized entity of a plurality of authorized entities, an access request for the cyber resilience identity, the access request comprising at least one access data structure compatible with a control structure for restricting one or more updates and redemptions of a metadata object corresponding with the cyber resilience identity;

verify, using the control structure, the at least one access data structure;

grant access to the metadata object and a performance event dataset of the cyber resilience identity to the entity or the authorized entity;

decrypt the metadata object; and provide access to the metadata object and the performance event dataset by facilitating retrieval using a secure interface between the one or more processing circuits and the entity computing system or the authorized entity computing system.

12. The system of claim 11, wherein the metadata object comprises metadata of the cyber resilience data, wherein the cyber resilience identity comprises at least a link with the metadata object, a unique identifier (UID), and the performance event dataset, wherein at least a portion of the cyber resilience data is encrypted, wherein the cyber resilience identity is encapsulated in the control structure, and wherein the cyber resilience identity is broadcasted to a ledger or a distributed ledger.

13. The system of claim 12, wherein the control structure comprises a verification function to restrict the one or more updates and redemptions of the metadata object, the verification function executable by the control structure to validate one or more of the one or more updates and redemptions of the metadata object by verifying one or more cryptographic proofs of authorization of the plurality of authorized entities prior to updating the cyber resilience identity.

14. The system of claim 13, the one or more processing circuits further configured to:

receive or identify additional cyber resilience data of the entity corresponding to the cyber resilience identity;

receive at least one cryptographic proof of provenance of the additional cyber resilience data;

verify, using the verification function of the control structure, the at least one cryptographic proof of provenance;

update, using the control structure, the cyber resilience identity by updating the metadata object or appending the additional cyber resilience data to the performance event dataset; and broadcast, using the control structure, the updated cyber resilience identity to the ledger or the distributed ledger.

15. The system of claim 11, wherein the cyber resilience identity is a data structure encapsulating a plurality of resilience tokens, each of the plurality of resilience tokens corresponding to a cybersecurity dimension of a posture of the entity corresponding to the cyber resilience identity, the plurality of resilience tokens comprising at least:

at least one unified token comprising the cyber resilience data captured over a period of time;

at least one evaluation token comprising the cyber resilience data captured at a plurality of points in time over the period of time; and at least one roll-up token comprising data of the at least one unified token and at least one real-time token corresponding with a security performance of the entity over the period of time.

16. The system of claim 15, wherein the at least one unified token comprises:

a unified safeguard token comprising data of implemented safeguards and configurations over the period of time;

a unified requirements token comprising data of entity-specific requirements and third-party requirements over the period of time;

a unified asset token comprising data of a plurality of assets of the entity over the period of time; or a unified attestation token comprising data of entity attestations over the period of time.

17. The system of claim 15, wherein the at least one real-time token comprises:

a plurality of evaluation tokens comprising data of at least one of the posture of the entity, a state of the entity, or a protection of the entity at a point in time of the plurality of points in time over the period of time.

18. The system of claim 11, the one or more processing circuits further configured to:

generate the at least one access data structure for at least one of the entity computing system of the entity corresponding to the cyber resilience identity or the authorized entity computing system corresponding to the authorized entity of the plurality of authorized entities; or receive, from at least one of the entity computing system or the authorized entity computing system, the at least one access data structure.

19. The system of claim 18, wherein the least one access data structure comprises a token, key, certificate, or access mechanism, and wherein the at least one access data structure is determined to be compatible with the control structure based on:

in response to receiving the at least one access data structure, configuring the at least one access data structure by updating the control structure to enforce restricting the one or more updates and redemptions of the metadata object, wherein updating the control structure comprises updating one or more access parameters of the control structure; or in response to generating the at least one access data structure, providing, by the one or more processing circuits to the entity computing system or the authorized entity computing system, the at least one access data structure.

20. A non-transitory computer-readable medium (CRM) comprising one or more instructions stored thereon and executable by one or more processors to:

receive, from an entity computing system of an entity corresponding to a cyber resilience identity or from an authorized entity computing system corresponding to an authorized entity of a plurality of authorized entities, an access request for the cyber resilience identity, the access request comprising at least one access data structure compatible with a control structure for restricting one or more updates and redemptions of a metadata object corresponding with the cyber resilience identity;

verify, using the control structure, the at least one access data structure;

grant access to the metadata object and a performance event dataset of the cyber resilience identity to the entity or the authorized entity;

decrypt the metadata object; and provide access to the metadata object and the performance event dataset by facilitating retrieval using a secure interface between the one or more processors and the entity computing system or the authorized entity computing system.

* * * * *